US007966099B2

(12) United States Patent
Fima

(10) Patent No.: US 7,966,099 B2
(45) Date of Patent: Jun. 21, 2011

(54) MONITORING AND CONTROLLING WATER CONSUMPTION AND DEVICES IN A STRUCTURE

(75) Inventor: Giovanni Fima, Oceanside, CA (US)

(73) Assignee: LiquidBreaker, LLC, Carlsbad, CA (US)

( * ) Notice: Subject to any disclaimer, the term of this patent is extended or adjusted under 35 U.S.C. 154(b) by 0 days.

(21) Appl. No.: 12/639,837

(22) Filed: Dec. 16, 2009

(65) Prior Publication Data

US 2010/0114386 A1 May 6, 2010

Related U.S. Application Data

(60) Division of application No. 11/013,249, filed on Dec. 15, 2004, now abandoned, and a continuation-in-part of application No. 10/668,897, filed on Sep. 23, 2003, now abandoned, and a continuation-in-part of application No. 10/252,350, filed on Sep. 23, 2002, now Pat. No. 6,766,835.

(51) Int. Cl.
*G05D 11/00* (2006.01)
*G06F 19/00* (2011.01)

(52) U.S. Cl. ......................... 700/276; 700/282; 239/128

(58) Field of Classification Search .................. 700/278, 700/282; 239/128
See application file for complete search history.

(56) References Cited

U.S. PATENT DOCUMENTS 392,803 A 11/1888 Herndon
2,126,564 A * 8/1938 Leins ........................... 136/220
2,409,947 A * 10/1946 Mantz ............................ 137/66
2,749,043 A * 6/1956 Eskin ......................... 236/21 B
3,307,613 A 3/1967 Rexer
4,180,088 A * 12/1979 Mallett ...................... 137/87.03
4,291,388 A 9/1981 Ecker, Jr. et al.
4,414,994 A 11/1983 Hogan
4,480,173 A 10/1984 Butterfield
4,560,323 A 12/1985 Orchard
4,608,560 A 8/1986 Allgood
4,635,668 A 1/1987 Netter
4,730,637 A * 3/1988 White ............................ 137/62
4,848,654 A * 7/1989 Zelczer et al. ............... 236/49.4
5,042,520 A 8/1991 Reznik
5,113,892 A 5/1992 Hull et al.
5,139,044 A 8/1992 Otten et al.

(Continued)

OTHER PUBLICATIONS

"Self Correting HVAC Controls", Pacific NOrthwest National Laboratory, Fernandez et al, Dec. 2009.*

(Continued)

*Primary Examiner* — Michael D Masinick
(74) *Attorney, Agent, or Firm* — Fish & Associates, PC

(57) ABSTRACT

Systems and methods for monitoring and controlling water consumption in a water-based system are disclosed using one or more sensors for generating signals indicative of the operation thereof. One or more interface modules are provided as breaker circuits for receiving the generated signals, and a fluid control device is operable for limiting the water consumption. A motherboard receives the interface modules and provides communication therebetween for information processing. Signals from the various sensors are supplied to a controller, which provides signals to status indicators, and also operates to provide alarm signals via network interfaces to remote locations. In an alternate embodiment, a water monitoring system is designed to shut off the water supply to the water device and to shut off either the electrical supply or the gas supply to the heating unit of the water device in response to sensing a malfunction through one or more sensed parameters.

17 Claims, 144 Drawing Sheets

U.S. PATENT DOCUMENTS

| | | | | |
|---|---|---|---|---|
| 5,248,084 | A | 9/1993 | Latarius | |
| 5,267,587 | A * | 12/1993 | Brown | 137/624.12 |
| 5,433,118 | A | 7/1995 | Castillo | |
| 5,441,070 | A | 8/1995 | Thompson | |
| 5,568,825 | A | 10/1996 | Faulk | |
| 5,574,229 | A | 11/1996 | Castillo | |
| 5,655,561 | A | 8/1997 | Wendel et al. | |
| 5,740,031 | A | 4/1998 | Gagnon | |
| 5,908,980 | A | 6/1999 | Hwang | |
| 5,956,248 | A | 9/1999 | Williams et al. | |
| 6,024,116 | A | 2/2000 | Almberg et al. | |
| 6,035,240 | A | 3/2000 | Moorehead et al. | |
| 6,061,603 | A | 5/2000 | Papadoppoulos et al. | |
| 6,104,987 | A | 8/2000 | Farnsworth | |
| 6,123,093 | A | 9/2000 | D'Antonio et al. | |
| 6,186,162 | B1 | 2/2001 | Purvia et al. | |
| 6,195,002 | B1 | 2/2001 | Evans, Jr. et al. | |
| 6,220,520 | B1 | 4/2001 | Gibbs | |
| 6,317,051 | B1 | 11/2001 | Cohen | |
| 6,357,467 | B1 | 3/2002 | Ringer | |
| 6,374,850 | B1 | 4/2002 | Timm | |
| 6,510,350 | B1 | 1/2003 | Steen, III et al. | |
| 6,675,826 | B1 | 1/2004 | Newman et al. | |
| 6,798,341 | B1 * | 9/2004 | Eckel et al. | 340/521 |
| 6,926,028 | B2 | 8/2005 | Murray et al. | |
| 6,939,470 | B2 | 9/2005 | Bannan et al. | |
| 2002/0033759 | A1 | 3/2002 | Morello | |
| 2004/0163705 | A1 | 8/2004 | Uhler | |

OTHER PUBLICATIONS

"MIMO Robust Control for Heating Ventilating and Air Conditioning (HVAC) Systems", Michael L. Anderson, Colorado State University, Spring 2001.*

* cited by examiner

C2 INTERFACE

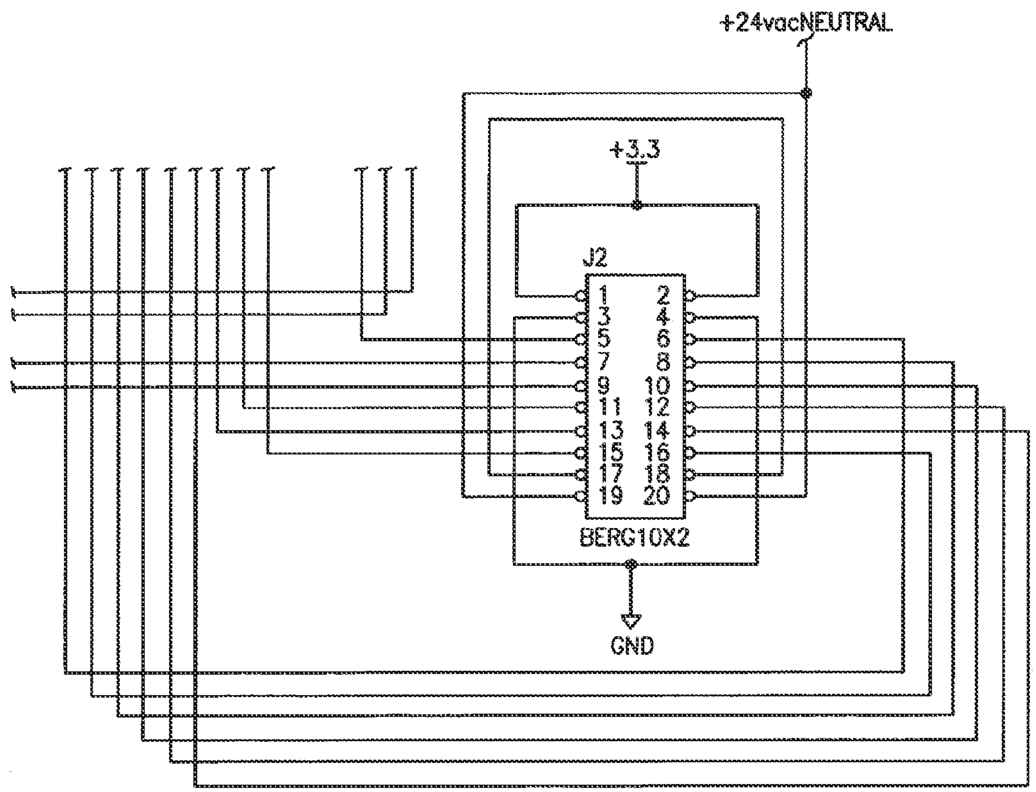
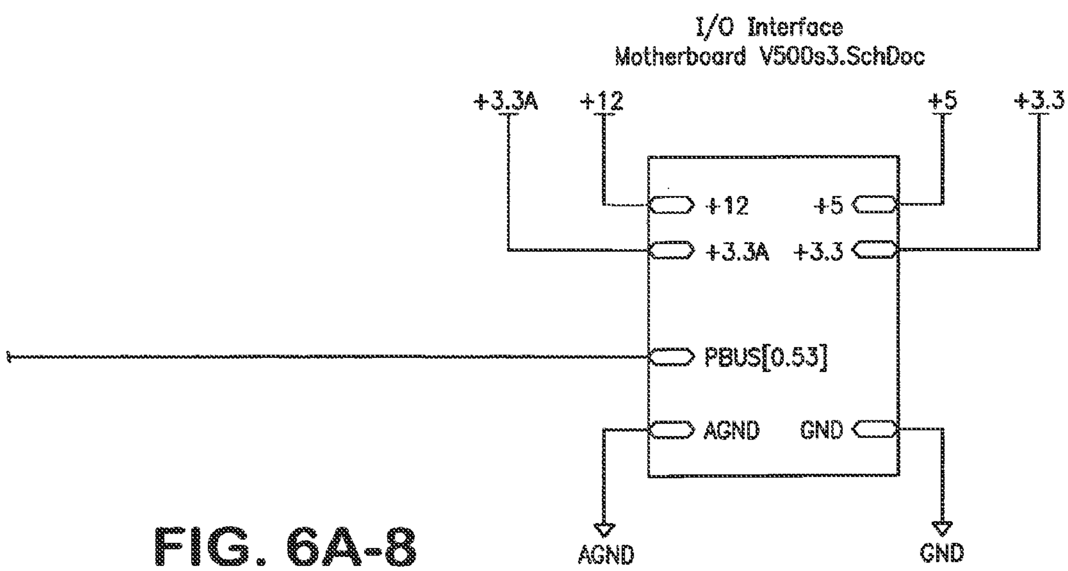
FIG. 6A-8

C2 INTERFACE

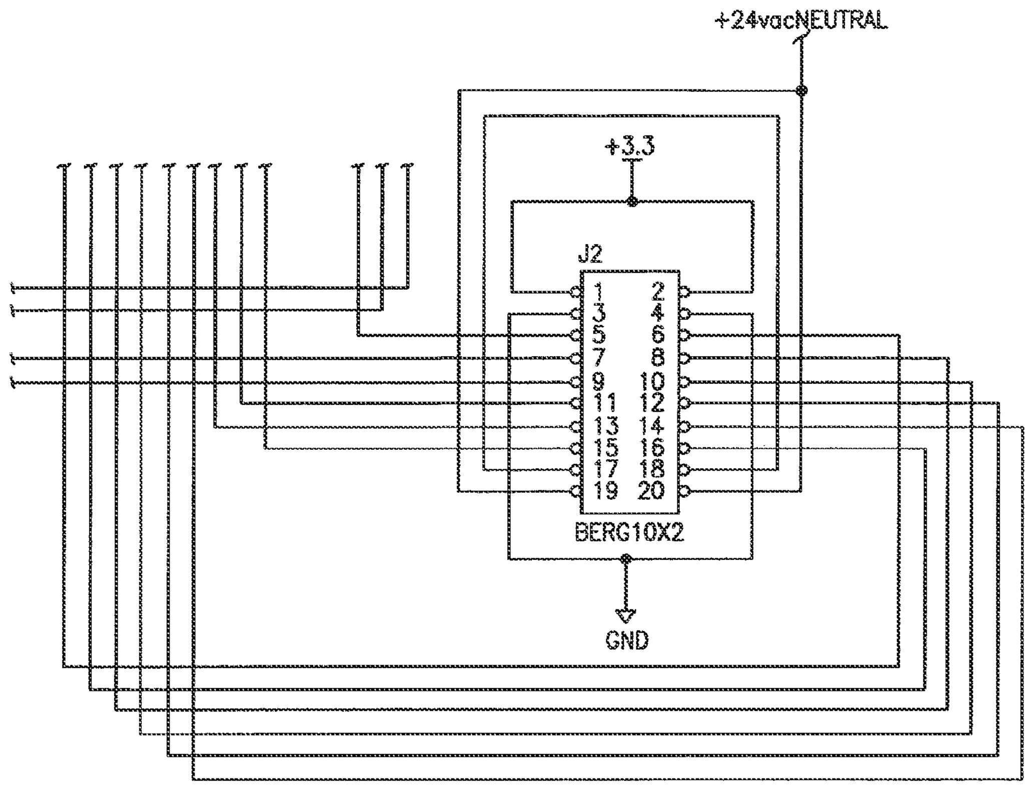
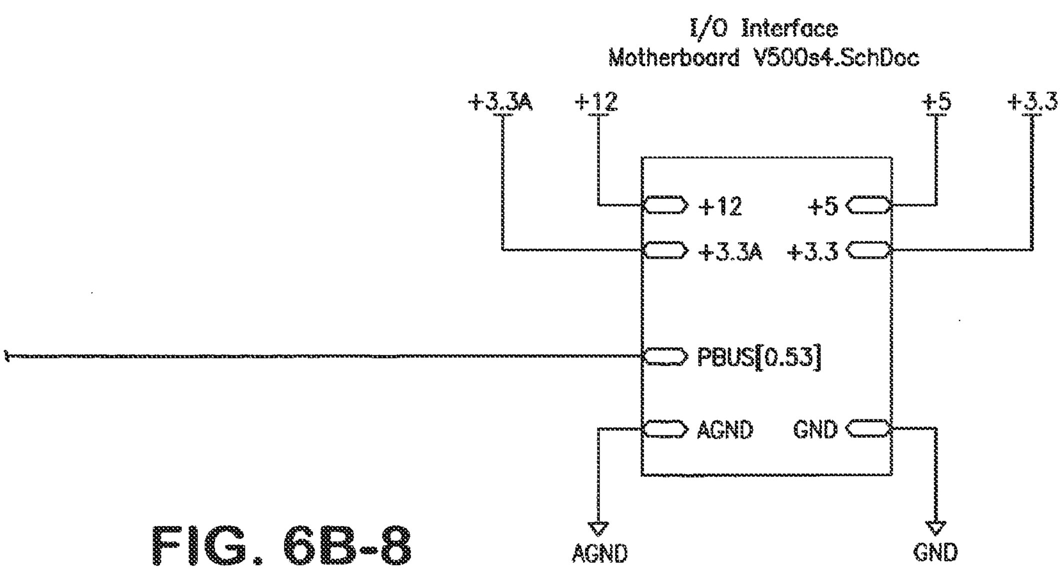
FIG. 6B-8

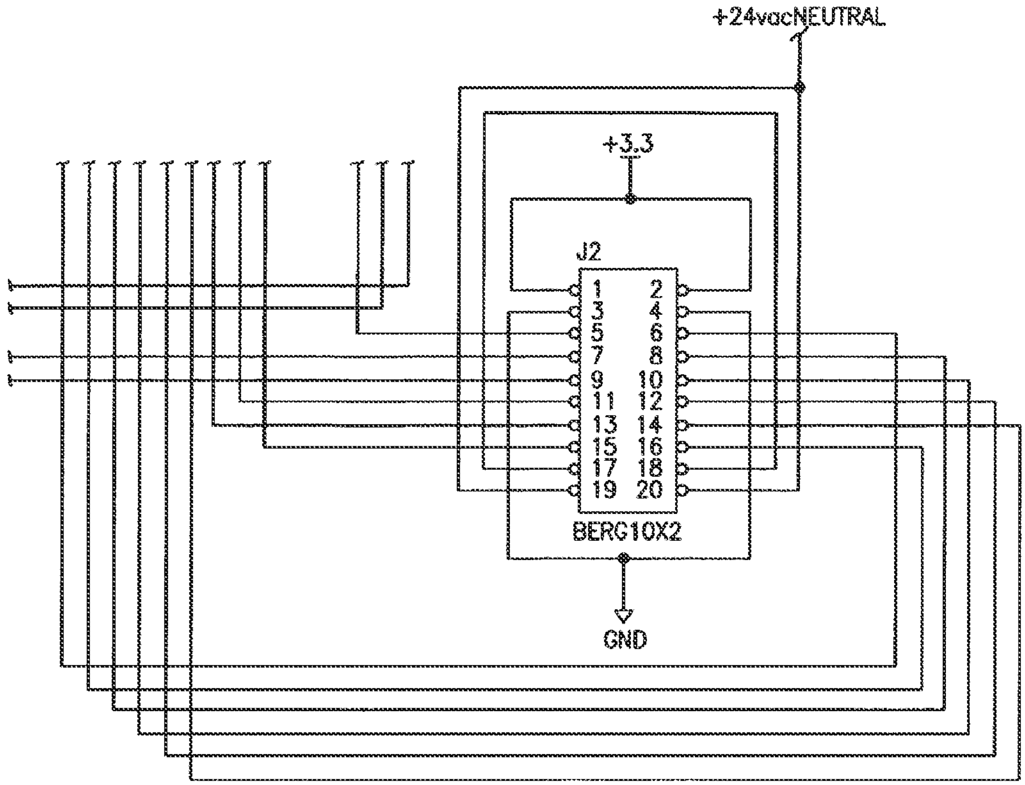
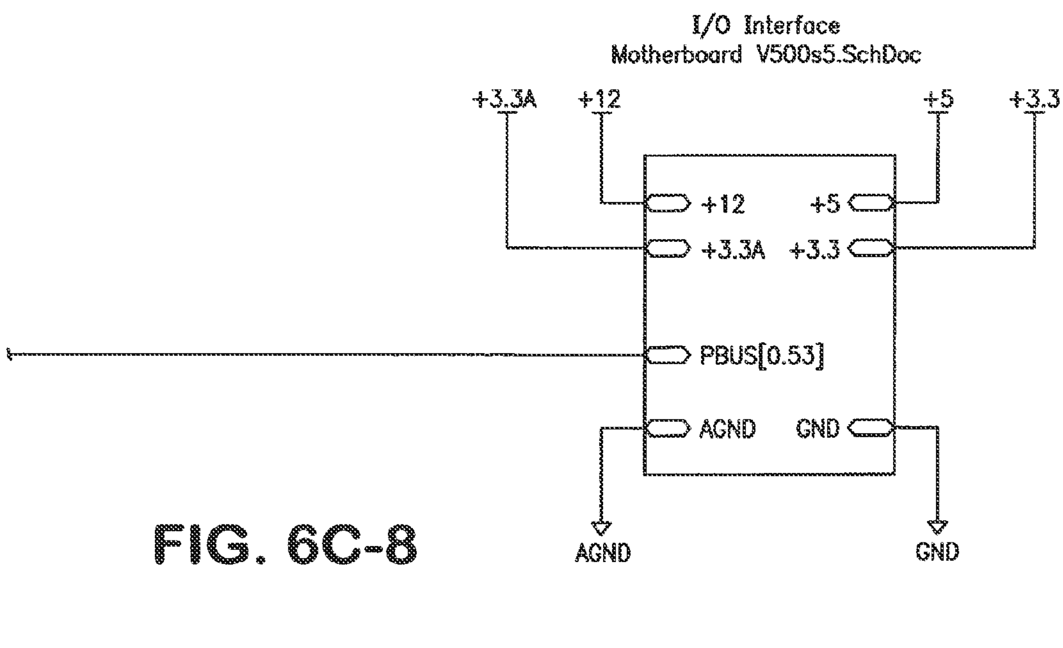
FIG. 6C-8

C2 INTERFACE

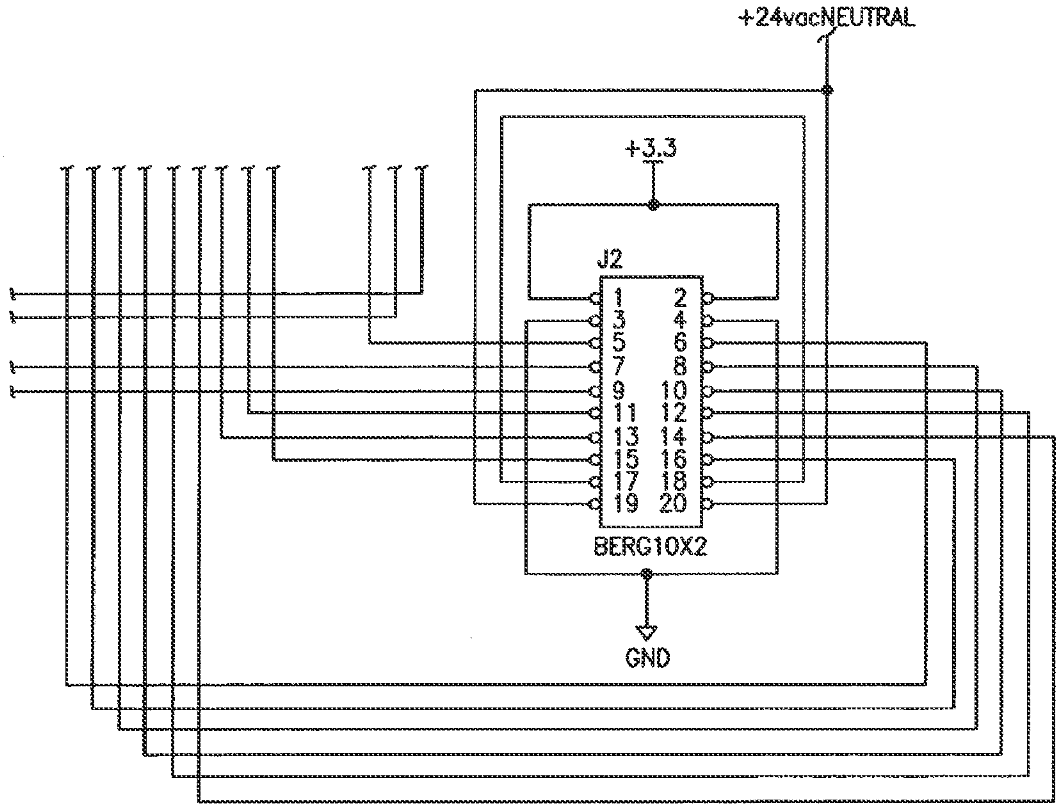
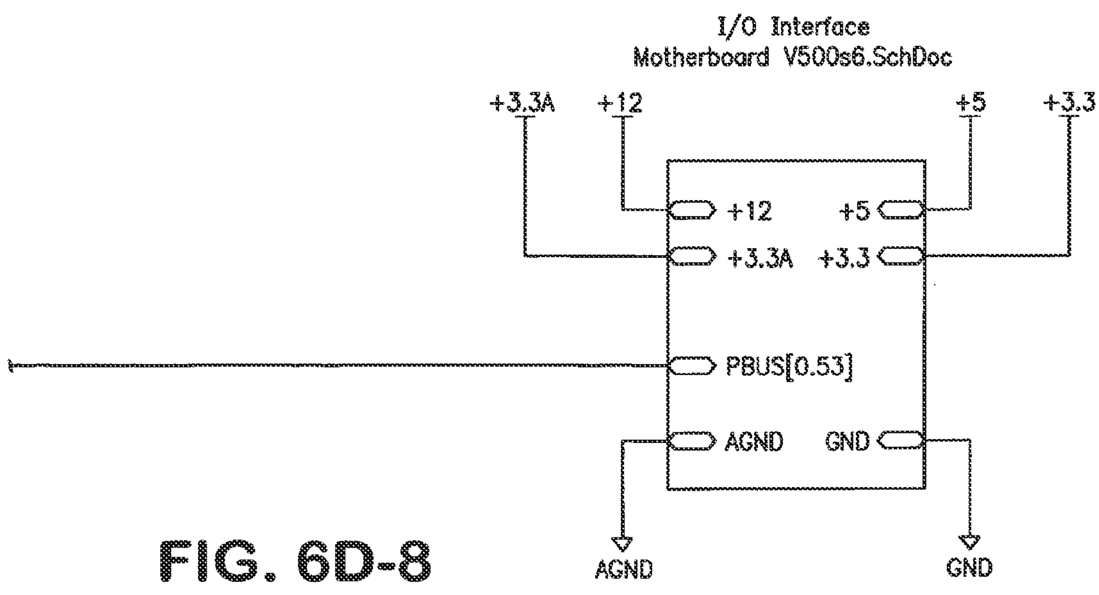
FIG. 6D-8

NS7520 MAIN CPU ADDRESS AND DATA

1800

2500

VALVE, SENSOR AND FLOW METER INTERFACE CIRCUITS

| CONTACTS | SENSOR VDC |
|---|---|
| OPEN | 3.3 |
| SW CLOSED | 2.5 |
| SHORT | 1.6 |

3800

RF TRANSMITTER POWER SELECT RESISTOR – R16

| POWER STEP | OUTPUT POWER (dBm) | RESISTANCE | TRANSMITTER CURRENT (mA) |
|---|---|---|---|
| 4 | 9 | OPEN | 10.7 |
| 3 | 2 | 100K | 6.5 |
| 2 | −4 | 47K | 4.7 |
| 1 | −12 | 22K | 3.5 |
| 0 | −70 | 0R | 2.7 |

MONITORING AND CONTROLLING WATER CONSUMPTION AND DEVICES IN A STRUCTURE

This application is a divisional application of U.S. Utility application Ser. No. 11/013,249, filed Dec. 15, 2004, which is a continuation-in-part of U.S. Utility application Ser. No. 10/668,897, filed Sep. 23, 2003, which is a continuation-in-part of U.S. Utility application Ser. No. 10/252,350, filed Sep. 23, 2002, now U.S. Pat. No. 6,766,835, issued Jul. 27, 2004. These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

BACKGROUND OF THE INVENTION

1. Field of the Invention

The present invention relates to fluid consumption systems in the home and commercial environments. More particularly, the invention relates to automated controls and monitoring of fluid-based systems employing methods and systems for detecting, communicating, and preventing operational failures.

2. Description of the Related Art

There are various water-consuming fixtures, appliances, and systems in both residential and commercial installations. Typical water-based systems include sinks, toilets, dishwashers, washing machines, water heaters, lawn sprinklers, swimming pools and the like. For example, hot water tanks include a heating element located at the bottom of the tank, with a hot water outlet pipe and a make-up water inlet pipe connected through the top of the tank. In water tanks a thermostat is generally included for setting the desired temperature of the hot water withdrawn from the tank, and typically a blow-out outlet is connected through a pressure relief valve to allow hot air, steam and hot water to be removed from the tank through the relief valve when the pressure exceeds the setting of the relief valve. The relief valve may be periodically operated for relatively short intervals during the normal operation of the hot water tank. This allows bubbling steam and water to pass through the relief valve for discharge. Once the pressure drops below the setting of the relief valve, it turns off and normal operation of the hot water tank resumes.

After a period of time, however, mineral deposit buildup and corrosion frequently take place in relief valves and the like, as a result of these periodic operations. In time, such corrosion or scale build up may impair operation. When this occurs, the possibility of a catastrophic failure exists. In addition to the possibility of high pressure explosions taking place in water tanks, other conditions can also lead to significant damage to the surrounding structure. As hot water tanks age, frequently they develop leaks, or leaks develop in the water inlet pipe or hot water outlet pipe to the tank. If such leaks go undetected, water damage from the leak to the surrounding building structure results.

U.S. Pat. No. 5,240,022 to Franklin discloses a sensor system, utilized in conjunction with hot water tanks designed to shut off the water supply in response to the detection of water leaks. In addition, the Franklin patent includes multiple parallel-operated sensors, operating through an electronic control system, to either turn off the main water supply or individual water supplies to different appliances, such as the hot water heater tank.

U.S. Pat. No. 3,154,248 to Fulton discloses a temperature control relief valve operating in conjunction with an over heating/pressure relief sensor to remove or disconnect the heat source from a hot water tank when excess temperature is sensed. The temperature sensor of U.S. Pat. No. 4,381,075 to Cargill et al. is designed to be either the primary control or a backup control with the pressure relief valve. Three other U.S. patents, to Lenoir, U.S. Pat. No. 5,632,302; Salvucci, U.S. Pat. No. 6,084,520; and Zeke, U.S. Pat. No. 6,276,309, all disclose safety systems for use in conjunction with a hot water tank. The systems of these patents all include sensors which operate in response to leaked water to close the water supply valve to the hot water tank. The systems disclosed in the Salvucci and Zeke patents also employ the sensing of leaked water to shut off either the gas supply or the electrical supply to the hot water tank, thereby removing the heat source as well as the supply water to the hot water tank. U.S. Pat. No. 3,961,156 to Patton utilizes sensing of the operation of the standard pressure relief valve of a hot water tank to also operate a microswitch to break the circuit to the heating element of the hot water tank.

While the various systems disclosed in the prior art patents discussed above function to sense potential malfunctioning of a hot water tank to either turn off the water supply, the energy supply, or both, to prevent further damage, none of the systems disclosed in these patents are directed to a safety system for monitoring potentially damaging pressure increases in the hot water tank in the event that the pressure relief valve malfunctions. This potential condition, however, is one which is capable of producing catastrophic damage to the structure in the vicinity of the hot water tank.

U.S. Pat. No. 5,428,347 to Barron shows a water monitoring system with minimal expansion and protection capabilities. The input and outputs (I/O) offered by the system limit the number of water appliances individually protected. The Barron device was designed such that a normal installation would use a single control unit. The number and types of inputs suggest it was designed primarily to protect a single water heater, and to act as an external control unit for an air conditioner. A number of auxiliary devices could be protected using an auxiliary water sensor input. Outputs provide for control of a hot water solenoid, a cold water solenoid, three alarm signals for external buzzers or bells and an optional external air conditioner control unit. This requires that the unit control be a single standard 24 vac water control valve for the main hot water in feed and the main cold water in feed line. Thus, it can cut off the power to the unit that tripped the alarm. No matter which sensor is triggered, it appears that the unit can only cut off the main water in feed line(s) to the home and can only remove power from the unit plugged into it. However, the unit does not have a one-to-one correspondence between a sensor and a control valve. The valve control outputs are wired such that if any one of the units sense a water leak, it could close the valves.

SUMMARY OF THE INVENTION

The following summary sets forth certain example embodiments of the invention described in greater detail below. It does not set forth all such embodiments and should in no way be construed as limiting of the invention.

Embodiments of the invention relate to systems and methods of monitoring and controlling fluid-based (e.g., water-based) systems in the home or commercial business. These include, for example, water heater, sinks, toilets, dishwashers and clothes washer, swimming pool and lawn sprinklers.

Embodiments of the invention provide a monitoring and control system which overcomes the disadvantages of the prior art, which is capable of monitoring one or more parameters of fluid-based systems (e.g., water consumption parameters), which may be installed with an after-market add on, or which may be incorporated into original equipment, and which further includes the capability of remote monitoring of branches or areas of the fluid-based systems. Moreover, embodiments relate to an improved water sensor unit wherein a plurality of water-related appliances or equipment can be simultaneously monitored and, in the event of sensing water with respect to any one of the several items being monitored, appropriate action is taken, such as shutting off the power to the unit and simultaneously shutting off the water supply to that particular unit.

In an embodiment, the invention includes a system in which one or more electrical circuit interface modules communicate with a motherboard. The motherboard and each interface module "protects" a branch or area of the home or business from water/liquid based overloads or malfunctions.

Systems and methods herein involve one or more sensors in a fluid-based system for generating signals indicative of the operation thereof. One or more interface modules are provided as breaker circuits for receiving the generated signals, and a fluid control device (e.g., a control valve) is operable for limiting or otherwise regulating the fluid consumption. A motherboard receives the interface modules and provides communication therebetween for information processing. Signals from the various sensors are supplied to a controller, which provides signals to status indicators, and also operates to provide alarm signals via network interfaces to remote locations and to operate an alarm. The controller provides control signals to the interface modules, which in turn provide signals to the fluid control devices.

Interface modules can operate with direct wire connection to one or more valves and sensors. Individual interface modules can also transmit or receive wireless data, between the valve and sensor directly to the interface module. Similarly, interface modules can communicate with the controller via wire connections or wirelessly. The interface modules can also be operated in a timed mode or sensor mode.

In other embodiments, the system can be connected to a local area network (LAN) or a wide area network (WAN) such as the World Wide Web, which enables users to configure, monitor, or otherwise control the system and the fluid-based systems and devices interfaced therewith.

The system can be configured to automatically cycle devices on a periodic or ad hoc basis. For instance, at a predetermined time, normally closed valves can be opened and then closed. In addition, the system can be configured to monitor and take action when sensed conditions indicate the possibility of multiple failure points in a fluid-based system.

In another embodiment, the system interfaces with other systems or devices of a building, such as the heating and/or cooling system and/or hot water tank(s) of a building. Based on detected water flow in component(s) of the water-based system, the system controls those other systems or devices. For instance, if no or negligible water movement has been detected within a predetermined time period, the heat is turned off, thus conserving energy and reducing energy costs.

In another embodiment, the system is configured to individually monitor and control the water supply to multiple units in a structure, such as an apartment building. Accordingly, the water supply can be shut off when particular tenants vacate or are delinquent, and water leaks can be contained within particular unit(s) without disrupting service to other units.

Embodiments herein also provide a water monitoring system which turns off the water supply and the energy supply to a water appliance or system upon the sensing of one or more parameters of operation of the water appliance or system. Further; embodiments provide a monitoring system for sensing excess pressure in a water appliance or system to shut off the water supply to the appliance or system and to shut off the energy supply to it.

Other embodiments provide a monitoring system including a pressure sensor located to sense the pressure variations of the water appliance or system without water flow through the pressure sensor to provide an output for shutting off the water supply and/or the energy supply to the heating unit of the water appliance or system when excess pressure is sensed.

In an alternate embodiment, a monitoring System is designed to shut off the water supply to a water appliance or system and to shut off either the electrical supply or the gas supply to the heating unit of the water appliance or system in response to sensing a malfunction of one or more of a number of different sensed parameters. These parameters can be sensed by devices including a water leak detector located beneath the water appliance, a water level float sensor, a temperature sensor to sense excess temperature; and a pressure sensor located in line.

In accordance with one embodiment of the invention, a monitoring system having an input water supply, an output water line and a source of heat energy is provided. The system includes a pressure sensor connected to sense the pressure inside the appliance or system and provide an output signal when the sensed pressure exceeds a predetermined threshold. Additional sensors also may be provided to respond to one or more additional operating parameters of the appliance or system, including excess temperature, water level, and water leaks to provide additional output signals whenever a sensed parameter reaches a predetermined threshold. A valve is located in the input water supply. A control for disconnecting the source of heat energy from the water appliance or system is also provided. A controller is coupled to receive output signals from the pressure sensor and the additional parameter sensors, if any, and operates in response to an output signal from a sensor to close the valve in the water supply line, and to cause the source of heat energy to be disconnected from the water appliance or system.

BRIEF DESCRIPTION OF THE DRAWINGS

FIGS. 1B and 1B-1 comprise a block diagram of an embodiment of the invention.

FIGS. 4-1 through 4-6 comprise a schematic diagram showing circuitry for an interface module for the embodiment shown in FIGS. 1B and 1B-1, providing breaker circuitry that monitors and controls water consumption in accordance with the invention.

FIGS. 5-1 through 5-6 show a motherboard including master-slave microcontrollers.

FIGS. 6A-1 through 6A-8, 6B-1 through 6B-8, 6C-1 through 6C-8 and 6D-1 through 6D-8 show eight (8) additional slave microcontrollers provided on the motherboard of FIGS. 5-1 through 5-6.

FIGS. 7-1 through 7-4 comprise a schematic diagram showing alarm enunciation devices used for indicating alarm conditions and the like.

FIGS. 8-1 and 8-2 and FIGS. 9-1 and 9-2 show power and battery backup circuitry, respectively, for the monitoring and controlling circuitry of the described system.

FIGS. 14-1 through 14-3 comprise a block diagram of a main controller for monitoring and controlling fluid consumption according to an embodiment of the invention.

FIGS. 15-1 through 31-4 are schematic diagrams showing example implementations of various blocks of the main controller of FIGS. 14-1 through 14-3.

DETAILED DESCRIPTION OF THE INVENTION

Reference now should be made to the drawings, in which the same reference numbers are used throughout the different figures to designate the same or similar components. As used herein, the term water-based system denotes a system that involves components, devices, and/or systems that facilitate the flow of water, such as plumbing components, devices, and/or systems. Although some of the below examples relate to systems involving water, it is to be appreciated that embodiments of the invention are not limited in their application to systems involving water, and can be implemented in settings that involve one or more kinds of fluids. Moreover, various embodiments below can be integrated into larger systems that perform useful operations in addition to monitoring and controlling systems involving water and/or other fluids.

Figure 1:
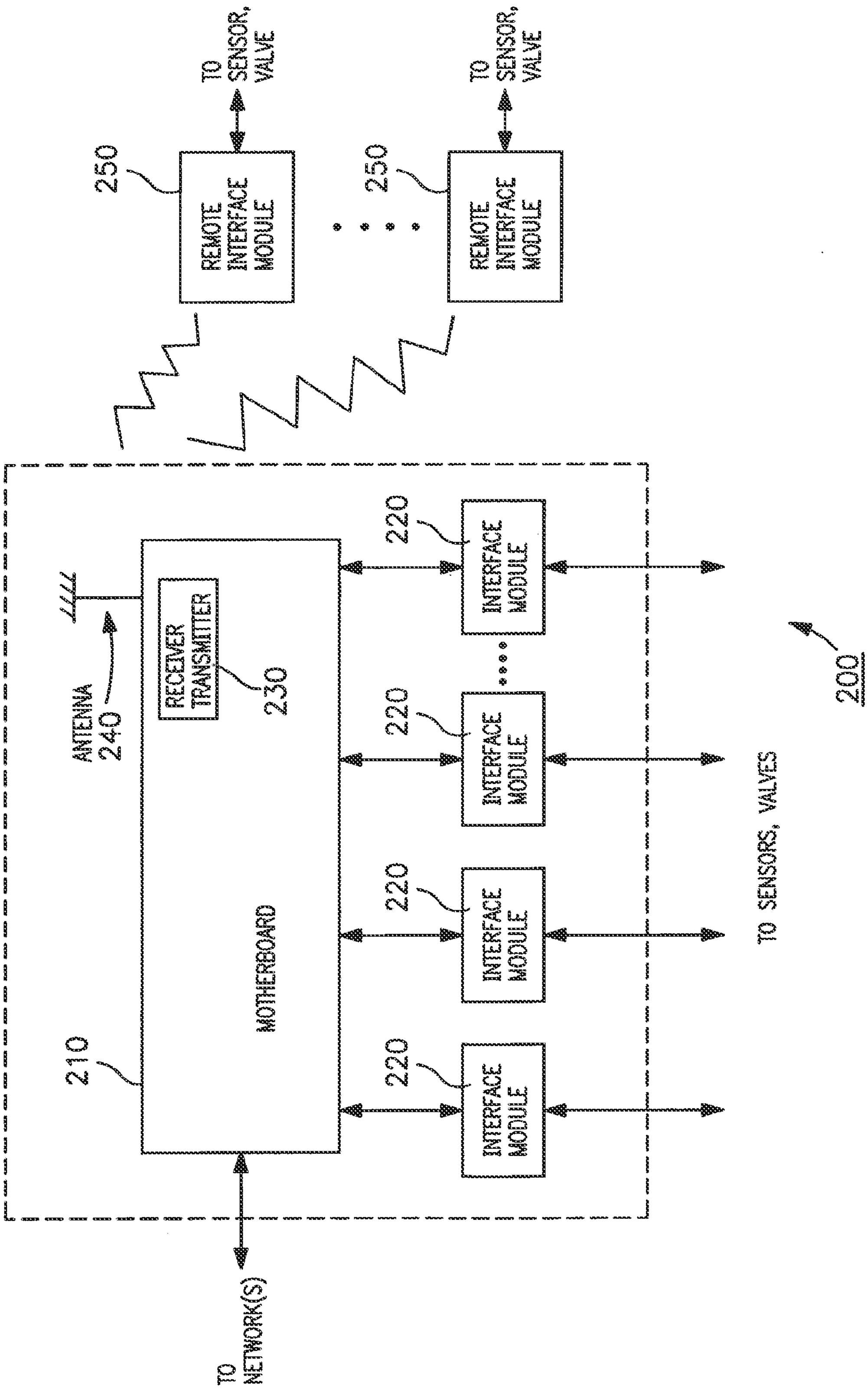
FIG. 1 is a block diagram of a system for monitoring and controlling a fluid-based system according to an embodiment of the invention.

FIG. 1 is a block diagram of a system 200 for monitoring and controlling a fluid-based system according to an embodiment of the invention. The architecture of the system 200 includes two basic circuit modules. The first module is an interface module 220 (breaker). The second module is a motherboard 210, which acts as a main controller.

Each interface module 220 is connected to a respective sensor and/or control valve of an object (e.g., an appliance, a pipe, etc.) in the fluid-based system. As such, each interface module 220 can receive, as an input, sensor information indicative of system conditions and/or send, as an output, control information to, for example, open or close a valve.

In the system 200, multiple interface modules 220 are connected to the motherboard 210. In an embodiment, each interface module 220 plugs into the motherboard 210. The motherboard 210 receives sensor information provided by the interface modules 220. The motherboard 210 sends control information to an interface module 220.

The motherboard 210 and/or interface modules 220 are programmed to take appropriate actions in response to sensed conditions and user inputs. The motherboard 210 can communicate over one or more networks, such as a LAN, WAN, intranet, or internet. The dashed box in FIG. 1 signifies that the motherboard 210 and interface modules 220 can be, but are not necessarily, located in close proximity to one another, such as within a panel housing.

The system 200 can include one or more remote interface modules 250. Each remote interface module 250 is a standalone module connected to a respective sensor and/or control valve, and can receive sensor information and send control information as described above. Each remote interface module 250 wirelessly communicates with the motherboard 210, which includes a receiver/transmitter 230 and an antenna 240. As such, sensor information and/or control information can be exchanged between a remote interface module 250 and the motherboard 210.

In an embodiment, an interface module 220 and a remote interface module 250 are interchangeable units that operate in dual modes (plug-in or stand-alone). In another embodiment, the interface module 220 and remote interface module 250 have some common circuitry, but are distinct units. Power for interface modules 220 can be provided by power supplies of the motherboard 210 or by another suitable power source. Power for remote interface modules 250 can be provided by a wall outlet, batteries, or another suitable power source.

Examples of alarm conditions that can be detected in the system 200 include: an interface module sensor has been tripped (i.e., the sensor is active); an RF transmitter of an interface module has a low battery; a loss of communication with an RF transmitter has occurred; a loss of communication with a slave panel has occurred; a loss of communication with an interface module has occurred; the main supply valve is active; and a valve solenoid error has occurred.

Figure 1A:
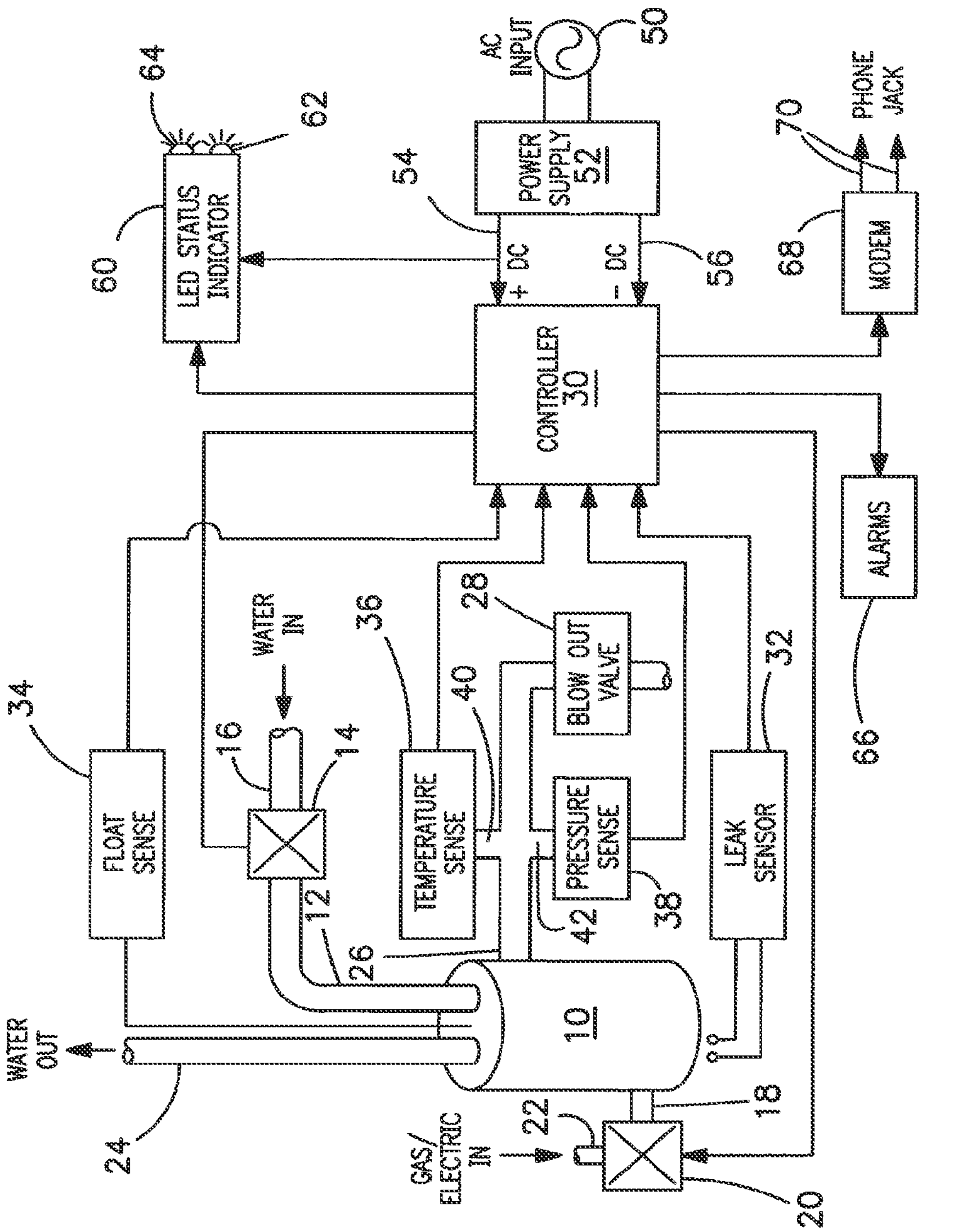
FIG. 1A is a block diagram of an embodiment of the invention.
Figure 1B:
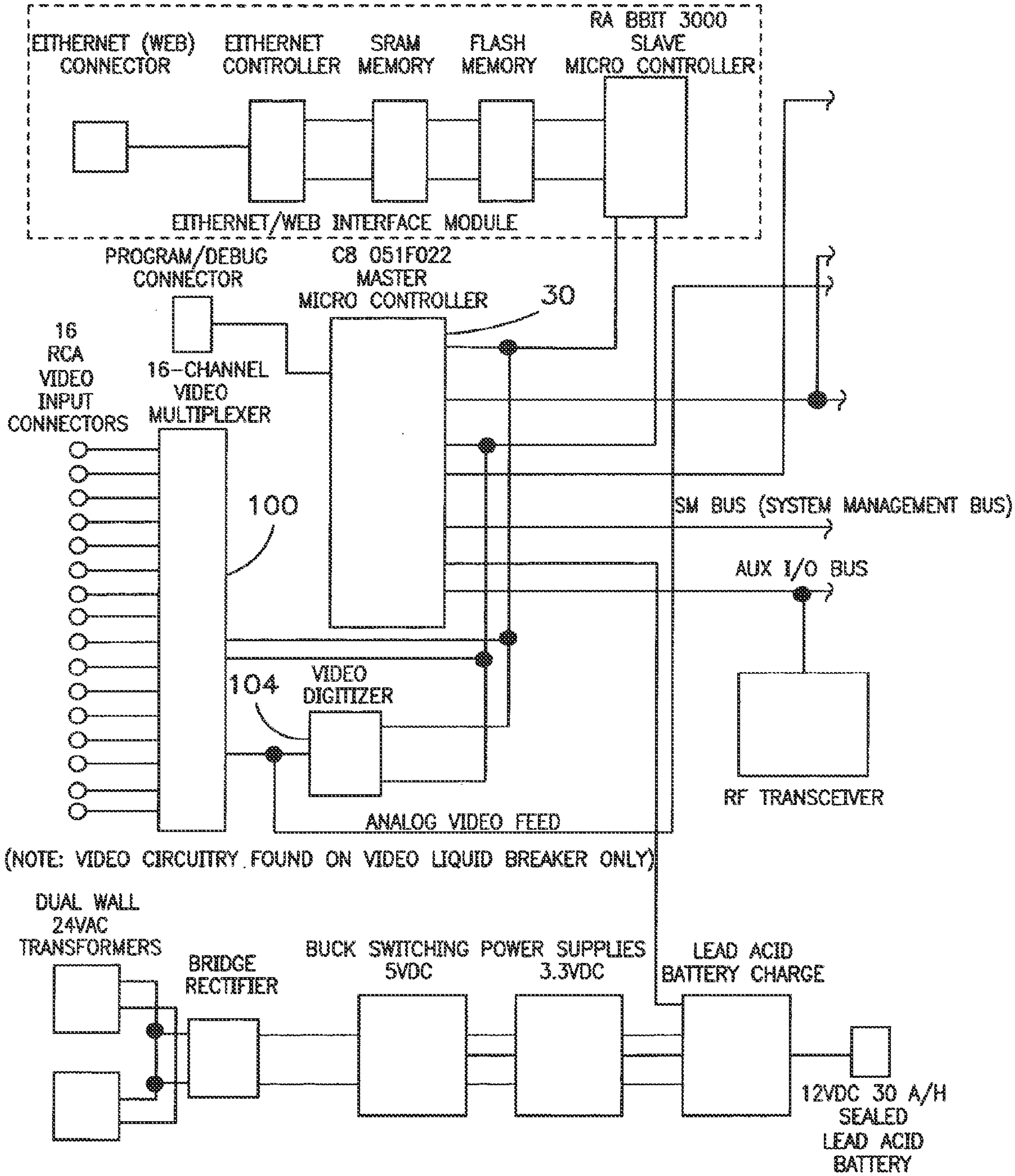
Figures 1, 1B:
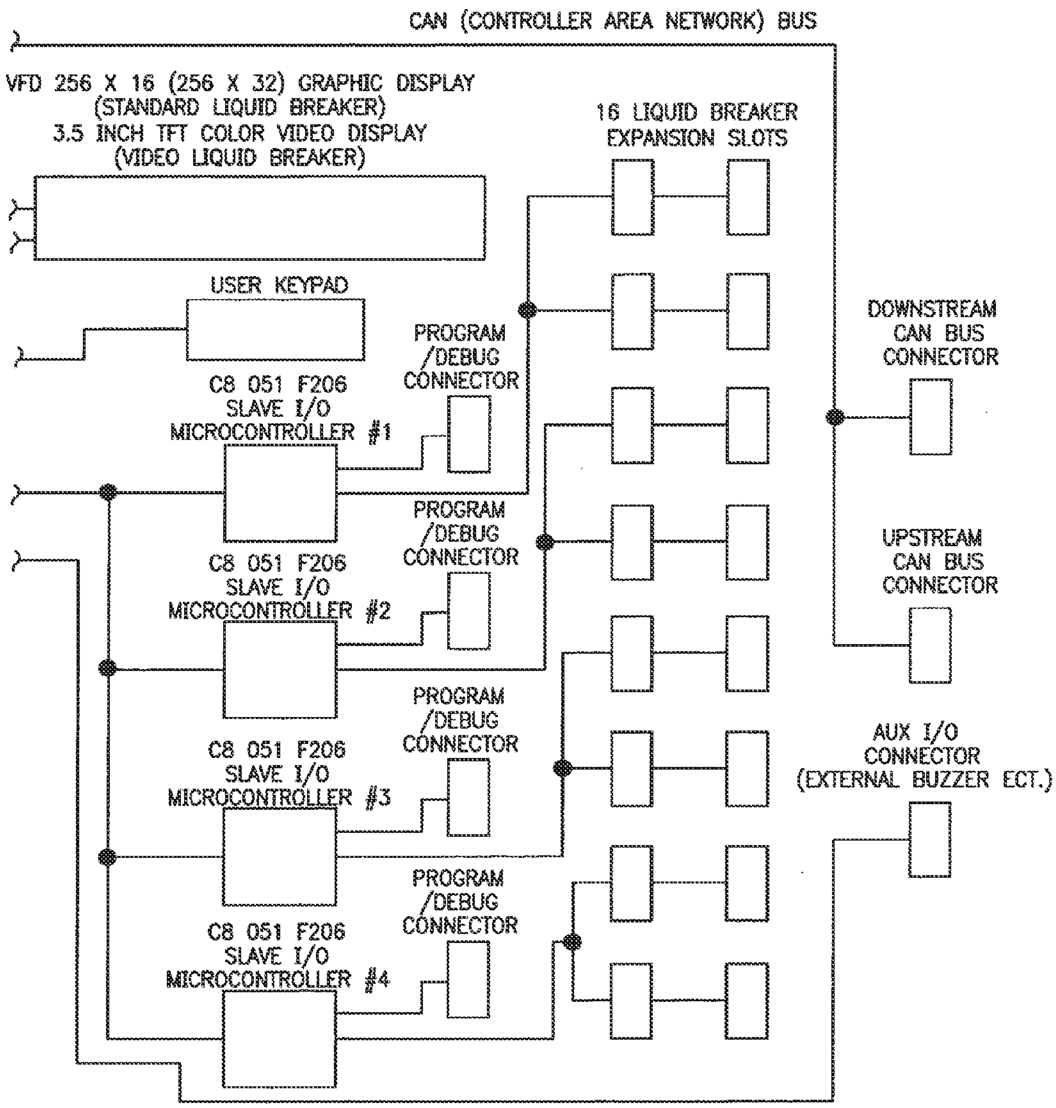

FIG. 1A and FIGS. 1B and 1B-1 are block diagrams of water monitoring systems providing comprehensive monitoring of various alarm conditions representative of malfunctioning parameters in water-based systems and the like according to embodiments of the invention. In particular, the system of FIG. 1A operates in response to a water appliance or system malfunction to turn off the input water supply and to disconnect the energy source supplying heat to the water appliance or system when such a malfunction occurs.

In the monitoring system shown in FIG. 1A, a hot water tank 10, which may be of any conventional type, is illustrated. The hot water tank 10 may be heated either by a gas supply or an electric supply. The system operates in the same manner, irrespective of which type of heat source is employed for the hot water tank 10. Inlet or make-up water for the hot water tank 10 is supplied through an inlet supply pipe 12 through an electrically operated valve 14, from a water inlet pipe 16. The heating energy is supplied, either through a gas pipe or through electrical lines 18, through a gas shut-off valve 20 (or alternatively, an electric power switch 20), with gas/electric power input being supplied through a gas pipe 22 (or suitable electrical leads).

Hot water produced by the tank is supplied to a water output pipe 24 in a conventional manner. The final portions of the hot water tank system include a blow-out pipe or outlet 26, which is connected to a conventional pressure relief valve 28, designed to relieve pressure in the tank 10 when the internal tank pressure exceeds a predetermined amount. Such a blow-out outlet 26 and relief valve 28 are conventional.

In the remainder of the system shown in FIG. 1A, various parameter sensors are connected to a central controller 30 for providing indicia representative of the operating condition of the water tank, and for sensing different parameters of the operation of the water tank 10. If the parameters either exceed some pre-established threshold or indicate a condition which is indicative of a failure of the hot water tank 10, a signal is sent to the controller 30, which then operates to provide outputs indicative of the status of the water tank operation, and, in addition, operates to turn off the water supply to the tank and turn off the source of heat energy to the tank 10.

As indicated in FIG. 1A, one of the parameter sensors is a water leak detector 32. This is indicated diagrammatically in FIG. 1, with a pair of contacts shown located beneath the water tank 10. A suitable container (not shown) to catch water leaks from the water tank 10 and the pipes 12 and 24 may be provided. When the water level becomes sufficient to bridge the contacts which are shown extending from the leak sensor 32, it provides a signal to the controller 30 indicative that a leak, either from the water tank 10 itself or from the supply pipe 12 or the water outlet pipe 24, in the vicinity of the hot water tank 10, has occurred. The signal sent to the controller 30 then is processed to place the system in its alarm and safety shut down mode. Also shown in FIG. 1A is a float sensor 34 to provide an indication that the water level within the tank 10 has dropped below a safe level. The output from the float sensor 34 is supplied to the controller 30 to cause it to operate in a manner similar to the response to the leak sensor 32.

In addition to the generally conventional leak sensor 32 and float sensor 34, the hot water tank system shown in FIG. 1A has been modified in the region of the connection to the hot water tank at 26 for the pressure relief valve 28 to employ two additional branches to sense parameters at the blow-out outlet 26. One of these is to sense temperature through a branch or leg 40 coupled with the pipe 28. A temperature sensor 36 is provided in the branch 40. A pressure sensor 38 is coupled through a branch or leg 42 to the blow-out relief valve line 26. The outputs of the temperature sensor 36 and the pressure sensor 38 also are supplied to the controller 30, as indicative of a temperature exceeding a safe operating temperature (as determined by the manufacturer of the hot water tank 10) and by sensing through the pressure sensor 38 a pressure in excess of a safe threshold (again, determined by the manufacturer of the hot water tank 10) to supply signals to the controller 30. Thus, the sensors 32, 34, 36 and 38 all supply 8 independent malfunction signals, depending upon the parameter being sensed, to the controller 30 to cause it to operate whenever one of the hot water tank malfunctions occurs.

Ideally, the pressure sensor 38 is selected to provide a signal to the controller 30 at a pressure slightly above the pressure which normally would operate the relief valve 28 for the hot water tank 10. Thus, the safety system operates prior to a condition which causes the relief valve 28 to operate.

The controller 30 is supplied with operating power from a suitable power supply 52, supplied with input from an alternating current input 50. The power supply 52 is shown in FIG. 1A as supplying positive and negative DC power over lines 54 and 56, respectively. It should be noted, however, that DC power levels at other voltage levels also may be obtained from the power supply 52 for operating various electronic circuits and sub-circuits through the controller 30. Operating power also is supplied, as indicated in FIG. 1A, over the positive DC power lead 54 to an LED status indicator 60. The LED status indicator 60 has at least two output status lights in the form of LED lamps 62 and 64 located in a convenient location for a home owner or maintenance person to obtain a quick visual check of the status of the hot water heater 10. Under normal conditions, with no outputs from any of the sensors 32, 34, 36 and 38, the controller 30 sends a signal to the LED status indicator 60 to illuminate a green LED light 62. In the event that anyone or more of the sensors should supply an alarm signal to the controller 30, a signal is sent from the controller 30 to the LED status indicator 60 to turn off the green LED 62 and to illuminate a red LED 64. This indicates to a person checking on the water heater 10, either at the location of the water heater 10 or at a remote location where the LED status indicator 60 may be located, the operating condition of the water heater 10.

If an alarm condition occurs, the controller 30 also sends signals to the electric shut-off valve 14 to turn off the water supply through the inlet pipe 16, and a signal to the gas/electric shut-off valve switch 20 to turn off the supply of gas or electricity to the heating element of the water heater 10. Consequently, no water is supplied to the water tank 10 and the source of heat is removed, thereby establishing as safe as possible a condition for the environment around the hot water heater 10 whenever an alarm condition exists.

At the same time, the controller 30 also may operate one or more alarms 66, which may be local or remote audible or visual alarms, and in addition, may provide, by way of a modem 68 to phone jacks 70, an automatically dialed alarm signal to a pre-established connection. In this manner, it is possible for a person at a remote location to have a call forwarded from the controller 30 indicative of the presence of shut down of the hot water tank 10 coupled with a message indicative of either an alarm condition in general, or a specific message tailored to the particular alarm condition which was sensed by the controller 30 in response to the one or more of the sensors 32, 34, 36 and 38 which created the alarm in the first place.

Figure 2:
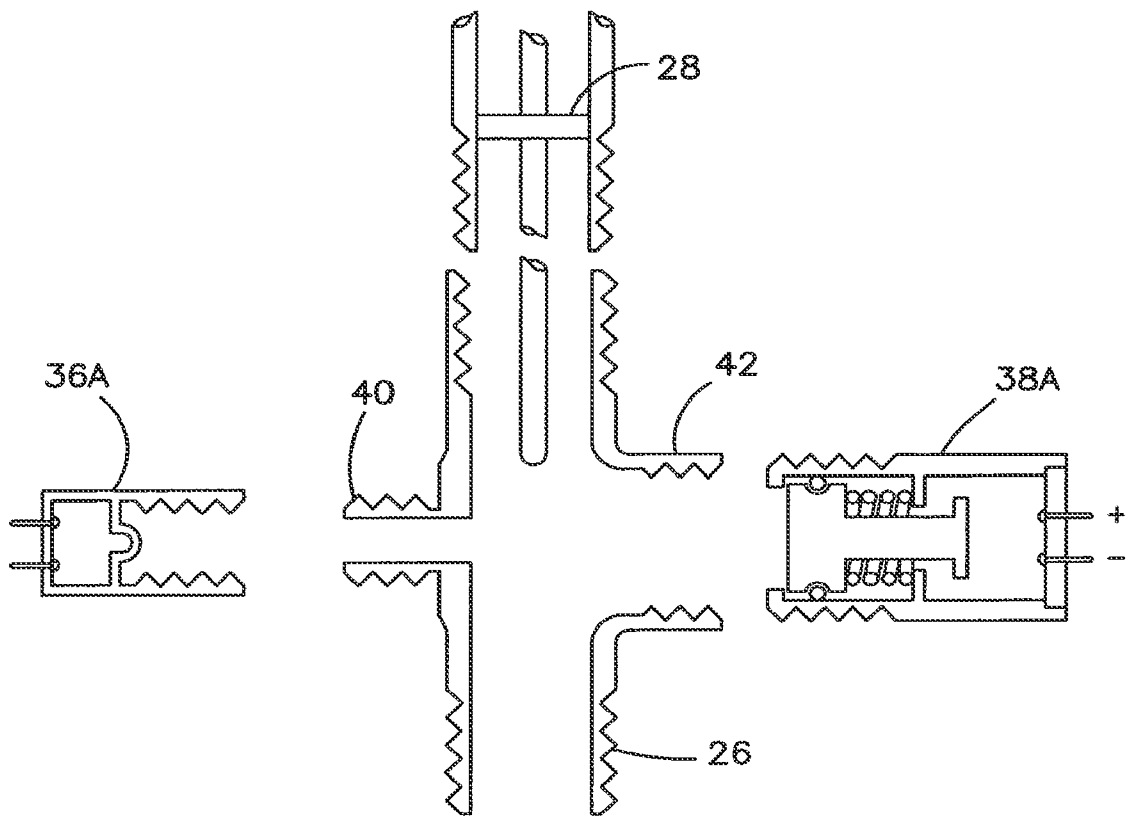
FIG. 2 is a detail of a portion of the embodiment shown in FIG. 1A.

FIG. 2 is directed to a diagrammatic indication of a modification of the connections to a standard hot water heater, which are employed for providing inputs to the temperature sensor 36 and the pressure sensor 38 in a manner which are not subject to the corrosive effects of water flow in the blow-out pipe 36. As mentioned previously, the pressure relief valve 28 of most hot water tanks undergoes periodic operation during the course of the operation of the hot water tanks 10. This particularly may occur when the hot water tank 10 becomes aged. In any event, when repeated discharge occurs of bubbling water and steam of sufficient pressure to open the pressure relief valve 28, the hard water, scale and other corrosive effects of the water flow through the pressure relief valve 28 over a period of time may cause the relief valve 28 to become sufficiently corroded or clogged, as described previously, so that it may not work; or it may require pressure in excess of the designed pressure to operate it. To safely and repeatedly, if necessary, sense excess pressure without subjecting the pressure sensor to the corrosive effects of escaping water or steam, the pipe 26 supplying a connection to the relief valve 28 is fabricated with a generally "X" shaped coupler, as shown in FIG. 2. The coupler includes the portion

26 which is connected to the blow-out outlet of the hot water heater. The blow-out relief valve 28 is screwed into the opposite end in a normal manner.

On opposite sides of the pipe 26 and extending outwardly at a 90.degree. angle to the central axis between the outlet 26 and the blow-out relief valve 28, are a pair of outlets 40 and 42. The outlet 40 has a temperature sensor element 36A threaded onto it which includes a bimetallic operator. This bimetallic operator normally is not in contact with the electrical inlet leads of the sensor 36A. When temperature in excess of what is considered to be a safe amount by the manufacturer of the hot water tank 10 is reached, the bimetallic element in the temperature sensor 36A pops or is moved to the left, as viewed in FIG. 2, to bridge the electrical contacts and to provide an output warning signal of excess temperature to the controller 30 for operating the system as described previously. It should be noted that once the temperature sensor 36A has been operated by an excess temperature, it typically must be replaced with a new sensor, since the bimetallic element has been moved from the position shown in FIG. 2 to an operating position, described previously. Generally, such sensors are not re-settable.

On the right-hand side of the fitting shown in FIG. 2 is a pressure sensor 38. The pressure sensor element 38A is threaded onto or otherwise secured to the arm 42 of the fitting shown in FIG. 2. The sensor 38A includes a pressure activated plunger which is indicated as spring-loaded toward the left of the sensor 38A shown in FIG. 2. When pressure in excess of the designed 12 parameters of the pressure sensor 38A is reached, the pressure within the pipe 26/42 forces the sealed diaphragm of the sensor element 38A toward the right to bridge the electrical contact shown to then provide an output signal to the controller 30. When the excess pressure condition terminates, the element 38A returns to the position shown in FIG. 2, and the alarm indication is removed.

Figure 3A:
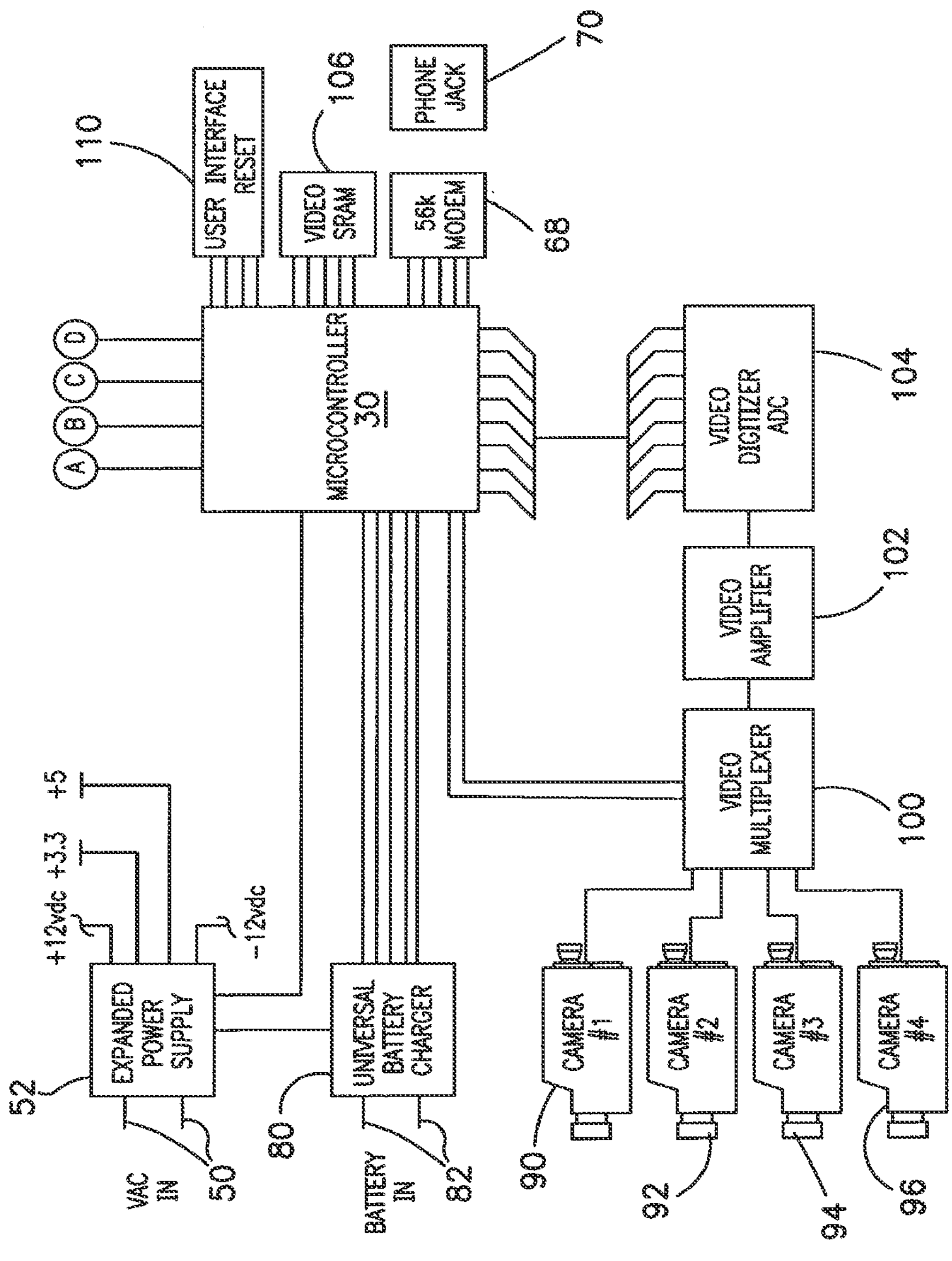
FIGS. 3A and 3B together comprise a more detailed circuit block diagram of the embodiment of the invention shown in FIG. 1A.
Figure 3B:
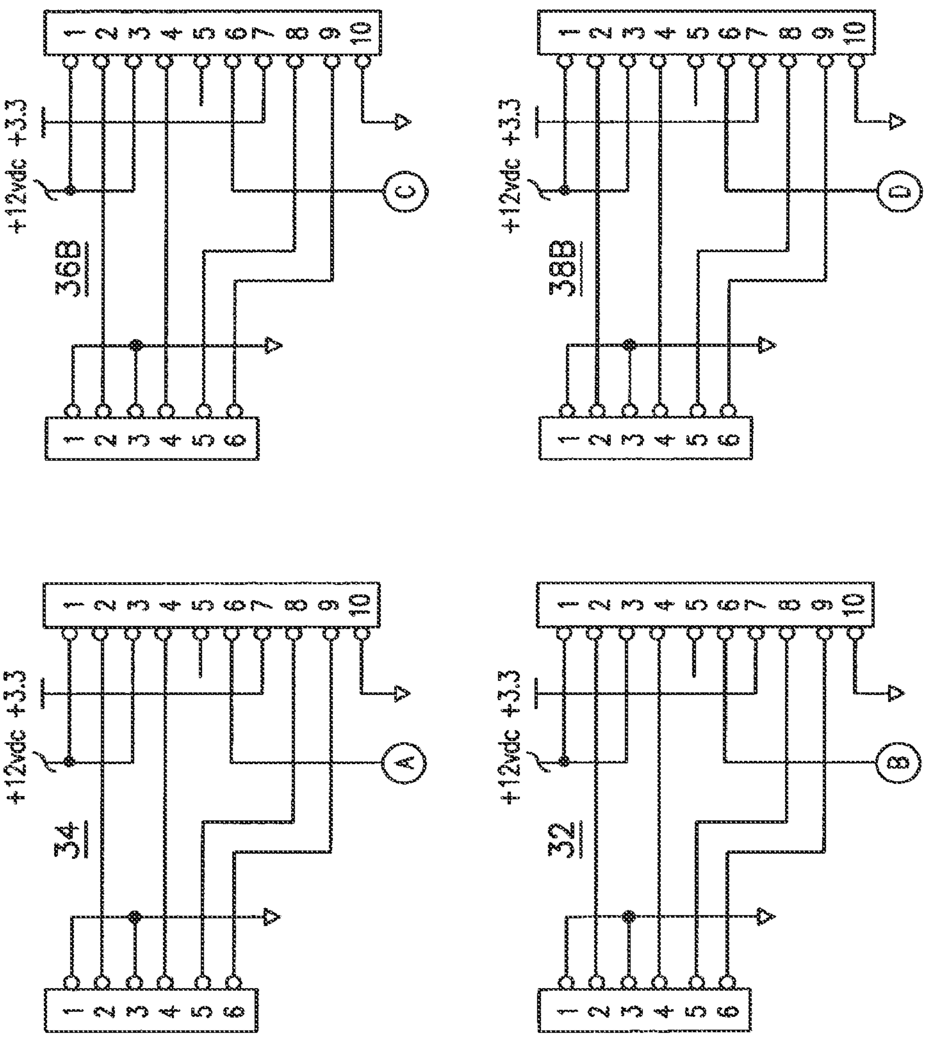

FIGS. 3A and 3B are a diagrammatic circuit diagram of the microcontroller 30 and various other connections to that microcontroller for responding to the various sensed parameters which are shown in the block diagram of FIG. 1A. The microcontroller 30 is supplied with power from the power supply 52, as indicated previously. The power supply 52 includes, for example, 24 VDC, 24 VAC, and/or some or all of the different voltages shown in FIG. 3A, namely +12 VDC, −12 VDC, +3.3 VDC, and +5 VDC. These are typical operating voltages for various integrated circuits and are employed in an embodiment of the invention to operate the different sensors 32, 34, 36 and 38, as well as other elements of the system. Some of these voltages are supplied through the microcontroller 30, and others are obtained directly from the power supply 52. The manner in which this is done is conventional, and for that reason, all of the various circuit interconnections have not been shown in FIGS. 3A and 3B.

In the event a power failure should occur, the power supply 52 also is coupled with a backup battery input shown at 82 in FIG. 3A. A universal battery charger operated in conjunction with the microcontroller 30 and the power supply 52 is employed, so that in the event there is a failure of the alternating current input at 50, the battery input at 82 continues to operate through the power supply 52 to the microcontroller 30 and other circuit components to maintain operation of the system.

The sensor circuits 32, 34, 36B and 38B are illustrated diagrammatically in FIG. 3B. All of these sensors include identical circuitry, operated in response to the respective sensed condition to supply an output signal to the controller 30. Consequently, it is possible to operate the system with a sensing of all of the various parameters which have been described in conjunction with FIG. 1A, or less than all of them. Whichever system is employed, however, the overall operation with respect to the manner in which the signal is supplied from the sensor to the controller 30 is the same. Each of the sensors 32, 34, 36B and 38B includes a circuit for sensing the interconnection of contacts, such as the contacts described above in conjunction with the leak sensor 32, or with the temperature activated switch 36A, or the power sensor element 38A to supply a signal to the integrated circuit sensor block 32, 34, 36B or 38B. If not all of the sensors shown in FIG. 1A are employed, the appropriate one or more of them may be eliminated. The operation of the remainder of the system, however, is unchanged from that described above.

The LED status indicator 60 also may be operated in conjunction with a user interface reset 10, as shown in FIG. 3A. Typically, the reset includes a reset switch (not shown), which will provide a signal through the controller 30 to re-open the water supply valve 14 and to re-open the gas/electric valve or switch 20 for the heat source of the water tank 10. The user reset also will operate through the microcontroller 30 to reset the LED status indicator lamps to turn on the green lamp 62 and to turn off the red lamp 64. As indicated previously, however, if a temperature sensor bimetallic switch of the type shown in FIG. 2 is employed, it also is necessary to replace the bimetallic sensor or the alarm condition sensed by the controller 30 will continue to persist, leaving the system in its alarm state of operation.

As shown in FIG. 3A, the system also may employ video cameras with built-in sound chips 90, 92, 94 and 96 directed at the water heater or the area surrounding the water heater for providing a monitoring signal to the controller 30 whenever the alarm condition sensed by the microcontroller 30 is reached. Camera 90 (No. 1), for example, could be directed to the area beneath the hot water tank to provide a visual and audible indication of a water leak. Others of the cameras may be directed to different regions around the water tank, or in the room in which it is located, to provide a visual and audible output indicative of whatever area is being scanned by that particular camera. Normally, the cameras 90, 92, 94 and 96 are not turned on. Whenever an alarm condition is sensed by the microcontroller 30, a signal is supplied to the cameras from the microcontroller 30, through a video multiplexer 100, to turn them on, or turn on the one associated with the particular alarm condition sensed by the microcontroller, depending upon the programming of the microcontroller 30. The video multiplexer 100 also supplies signals through a video amplifier 102 to a digitizer 104 coupled to the microcontroller 30, which then receives the sound and video signals from the camera (or cameras) out of the group of cameras 90, 92, 94 and 96 which has been turned on by the microcontroller 30. The signals from the cameras then are supplied to a video S-RAM 106 for storing the signals temporarily. The video signals may be sent from the microcontroller 30 through a 56K modem 68 to the phone jack 70 in the manner described previously for supplying telephone signals from the modem 68 through the phone jack 70.

FIGS. 1B through 1B-1 show a second embodiment block diagram for monitoring and controlling water consumption in a water-based system. The embodiment shown is a motherboard for use in a system involving two basic circuit modules, namely, the motherboard (circuit panel) and one or more interface modules (breakers) that optionally plug into the motherboard. The implementation of FIGS. 1B through 1B-1 can be accomplished using modular computer aided design (CAD) and modular computer aided manufacturing (CAM) design concepts.

In the embodiment specifically shown in FIGS. 1B through 1B-1, a motherboard design includes single or dual microcontrollers, user interface, USB port for Web/network interface, video interface, and provisions for sixteen interface modules. One interface module acts as a main shut off valve and controls flow meter expansion connectors, power supply, sealed lead-acid battery backup with charger. Modular in design, the interface module is based on two separate printed circuit boards (PCBs). Sixteen interface modules are plugged into the motherboard.

Each interface module is connected to one or more water leak sensors that detect water leaks or levels, and to one or more control valves used to control the associated water in feed. For example, a water leak sensor can be attached to a water heater and connected to an interface module. A cutoff valve is attached to the water in feed of the water heater and connected to the same interface module. The motherboard microcontroller monitors the water leak sensor. If the microcontroller detects a leak, it closes the control valve and issues an alarm. An interface module can also be used to monitor the level of water in such items as a swimming pool. A water level detector is attached to the swimming pool along with a control valve that controls the water in feed to the pool. When the microcontroller detects a low level condition, it opens the in control valve and adds water to the pool until the level is normal.

Each interface module can operate with direct wire connection, to the N.O. (normally open) or N.C. (normally closed) valve and sensor. Individual interface modules can also transmit or receive wireless data, between the valve and sensor directly to the interface module. The interface modules can also be operated in a timed mode or sensor mode. This allows the user to set multiple on/off times for the control valves. This allows the system to control a lawn sprinkler, for example, on and off at any given time.

The system motherboard and control panel of FIGS. 1B through 1B-1 is a web appliance. It includes a standard 10-mega-byte Ethernet TCP/IP connection. This allows it to be connected to either a local area network (LAN) or a wide area network (WAN) such as the World Wide Web. The web connection is used for configuring the system via a remote PC connected to the same network (LAN or WAN). It is also used to communicate alarm warnings to those parties of interest via standard simple mail transfer protocol (SMTP) e-mail. Alarm e-mails can be sent to multiple addresses such as the home, homeowner's office, a cell phone, or even the plumber.

The system also has the capability to host a web page on the Internet. This allows the owner or security service to monitor the status of all water facilities in a home or business remotely. The web page can be configured to provide remote operation and control. That is, remote commands can be issued by clicking controls on the web page. As an example, the owner of a home could shut off the main water feed remotely.

The interface module supports a video uplink. It provides sixteen standard RCA video input connectors, one for each interface module. Small low cost video cameras can be plugged in and aligned to show a picture of each water appliance. The alarm e-mail can be set up to include a JPEG video image as an attachment. The picture can be used without the network interface. The motherboard provides a graphic vacuum fluorescent display (VFD) and a keypad. The display and keypad can be used to set up, configure, and operate the system even during power failures. A sealed lead-acid battery provides power for the system during a power failure. The motherboard includes an onboard buzzer to signal alarm conditions. In addition, it provides a connection for one or more external alarm buzzers. These can be located around the home or business.

An interface module is shown in FIGS. 4-1 through 4-6 and FIG. 10 discussed below. The motherboard is shown in FIGS. 5-1 through 5-6 and FIG. 11 discussed below.

There can be two versions of interface modules-plug-in or stand-alone. While the design of the circuitry can be identical for both versions, selective loading or placing of groups of parts (modules) on the printed circuit board (PCB) varies from version to version during manufacturing. As an example, the stand-alone version includes a radio frequency (RF) transceiver allowing wireless communications with the motherboard. It is included, or CADed in the design of the stand-alone version circuit board, but is not CADed (or added) on the plug-in version. The circuitry for the input sensor on both versions supports various types of digital or analog input sensors, including 24 vdc, 24 vac, 5 vdc, and/or 2.4 to 3.2 vdc or vac voltage sensors.

Various kinds of sensors can be implemented in embodiments of the system, including, for instance, leak detectors, flow (volume) sensors, pressure sensors, temperature sensors, level detectors, optical sensors, ultrasonic sensors, and proximity sensors. The color of interface modules in the molded panel housing can be used to identify the controlled appliance, fixture, or other water-consuming device or system. For example, blue interface modules monitor toilets, dishwashers, washing machines, hot water tanks, ice makers, sinks, swimming pools, or spas, while green interface modules control lawn sprinklers. While the PCB is the same for each, using modular CAM techniques, the circuitry for each type of input circuit is selectively loaded (installed or placed) on the circuit board as required for each interface module type.

In both versions of the interface module, the output is provided by a single pole double throw (SPDT) relay. The off state of the interface module can be jumper configured for normally open or normally closed. An interface module configured to detect leaks would use the normally open (N.O.) configuration, and close the relay (valve) during an alarm condition (leak detected). An interface module configured to control a lawn sprinkler would be normally closed, opening at a scheduled time to apply water, and closed after a programmed time period or volume had been applied. Likewise, wherein the water-based system includes a tank-less toilet, measurement and control of the water may be metered with a normally closed (N.C.) valve configuration, opening to apply water and closing thereafter for a programmed time period or volume directed through the tank-less toilet system.

In one example implementation, a primary difference between the stand-alone version of the interface module and the plug-in version of the interface module is that the stand-alone version includes an onboard microcontroller and power supply. This allows it to operate without the support provided by the motherboard. The plug-in version does not include either the microcontroller or a power supply. The inputs and outputs of the plug-in version are monitored/controlled by a microcontroller on the motherboard. Power for the plug-in version is provided by the power supplies found on the motherboard.

To provide consistency and familiarity, the motherboard, interface modules, and panel housing (see FIG. 11) resemble a traditional electrical circuit breaker panel found in a home or business. The motherboard and each interface module protects a branch or area of the home or business, offering protection from water/liquid based overloads or malfunctions. A remote interface module can have its own modular housing (see FIG. 10).

The layout of the motherboard and associated panel housing is much more sophisticated than that found in a traditional electrical circuit breaker panel. The top of the panel is provided with a 256.times.64 dot matrix blue vacuum fluorescent display (VFD) surrounded by a number of keys (forming a keypad), the sum of which provide a user interface. The user interface allows the user to configure and control many of the functions and options available on the motherboard. Below the display are two rows of eight interface modules. Wires to the inputs and outputs for each interface module run out of the bottom of the unit to the appropriate sensor or valve. Alternatively or additionally, configuration of functions and options can occur from an external computer (e.g., a laptop) connected to the motherboard via a USB port provided on the motherboard.

The system provides for virtually unlimited system expansion of the number of devices protected. The initial motherboard (as referred to as the master motherboard) provides protection for sixteen devices, appliances or systems. Some devices may require two or more interface modules for full protection. As an example, if the protected device has both hot and cold water in feeds, two interface modules would be required to protect the device. Additional expansion is accomplished by simply adding additional expansion motherboards (known as slave motherboards) to the system. In an embodiment, each interface module can be interfaced with two or more valves. For instance, an interface module can be interfaced with each in feed valve (hot and cold) of a device to be protected. If a sensor interfaced with the module indicates a problem condition, both in feed valves can be shut off.

In an embodiment, each expansion motherboard provides protection for twenty-four additional devices. One hundred slave motherboards may be added to a system. Thus, 2400 additional devices can be protected in the system when fully expanded. The master motherboard communicates with and controls slave motherboards via a private controller area network (CAN) bus. Multiple systems may be connected via a local area network connection. This gives the system a 1 to N correspondence. That is, a single sensor can determine the action of N number of valves. The simplest example is a device with both hot and cold water in feeds. One sensor can control the two valves needed to stop water flow to that device.

The system is based on state of the art microcontrollers, which are in fact complete computers on a chip, or system(s) on a chip (SoC). The microcontroller is completely programmable, allowing new features and functionality to be added at any time, in the field via the Internet. When this feature is combined with the hardware expansion capabilities described previously, the system has virtually unlimited expansion capability.

A graphical user interface (GUI) provides operational information to the user. The display presents real-time display of system status, alarm conditions, configuration options, network (web) status, and power status. The status of each interface module is displayed for a set period of time, one after the other. As an example, if the display time is set for one second, then the status of each interface module is displayed for one second before moving on to the next interface module in line. The user interface also provides a number of keys, allowing the user to set the configuration and operation of each interface module, as well as various operational parameters of the motherboard. Other display options allow viewing of the status of various interface module parameters for all sixteen interface modules in a system in a single graphic screen format. Accordingly, the malfunction of, e.g., a valve coil or the like, will be informed through the interface module of the system. In an embodiment, the system is programmed to detect reduced current flow or an open circuit, which are indicative of a malfunctioning coil. Such a malfunction can be indicated, for instance, with a yellow LED.

The graphical user interface thus indicates, for example, when the blowout valve in the hot water tank is inoperable, to permit the user to replace the failed valve rather than the entire water tank. The reason for the water tank failure would be indicated separately, for instance, from identifying leaks and the like, which would require replacement of the tank itself. Failure information relating to components of a lawn sprinkler system can be similarly indicated by the user interface.

The interface module provides a TCP/IP based 10Base-T Ethernet interface. This interface by default supports DCHP protocol for dynamic IP addressing. An interface module master may be connected to either a local area network (LAN, a private network found in the home or company) or a WAN (Wide Area network) such as the Internet (World Wide Web). In addition to visual and audible warnings (internal and optional external buzzers and lights), an email alarm warning can be sent to one or more email addresses programmed by the user. As an example, the home user may program an interface module to send an alarm email to the user's office, home, cell phone and plumber. A commercial user can send emails to key management and/or maintenance personnel.

The interface module can receive emails. A text template is included with the system, and information associated with each appliance connected to the system can be graphically displayed. In particular, the main panel can display streaming text along with graphics, such as a pictorial representation of a component that has failed (e.g., a toilet). The user can edit the template and email it to his/her interface module to configure it. An interface module can be configured directly at the motherboard panel housing input buttons, or from a computer via a USB port provided on the motherboard.

The interface module can be used to host (serve) a web page. This mode of operation is provided to allow security companies that normally monitor homes and businesses for break-ins, to monitor all water appliances from their central office. The web page provides Java applets, which allows remote control of the system. As an example, the security service or water company can issue a (password protected) command to close the main water in feed valve.

The interface module provides both physical and battery (power) backup for a power failure.

Physical backup holds the state of the valves in the event of a system failure. This is accomplished with latching relays. Once the relay is turned on, it will hold its state indefinitely until reset. As long as power is available, the valve(s) will be closed or open depending on their programmed functions. In an embodiment, each valve has a manual override function to enable a valve to be closed or opened irrespective of the control signals being provided by an interface module.

The battery backup provided by the interface module allows the system to operate normally during a power failure (optional battery packs allow longer protection). This protection allows interface modules to continue to monitor, control, and warn interested parties of a failure.

The interface module provides total, selective, configurable, protection. One sensor can be assigned to protect one or more devices, each with one or more valves. Multiple sensors can be configured to protect a single device with one or more valves.

Support for water appliances is virtually unlimited. Any device with water in feed or out feed can be protected and/or controlled. This includes, but is not limited to, water heaters, air conditioners, laundry and dish washing machines, toilets, tank-less toilets, ice makers, sinks, spa, swimming pool, sprinkler system, water meters, etc. In a tank-less toilet water-based system or lawn sprinkler system, for example, the water may be metered to apply water, closing thereafter for a programmed time period or volume directed through the respective system.

An interface module can be configured to monitor for leaks, control liquid levels or time the application of liquids. Examples include monitoring the bath tub, water heater, dishwasher, clothes washer, toilets, sinks and icemaker for leaks, controlling the water level in the spa, swimming pool, and bath tub, and timing the lawn sprinkler on/off times. Water amounts may be monitored by time or volume, such as, for example, to check whether the water company correctly read the meter and whether the lawn or the tree line on the south side of the house was sufficiently or excessively watered. Many cities do not like to see lawn sprinklers with water run-off and fine residents for excessive water usage during a period of water shortage or drought. Interface modules can be configured to deliver an exact amount of water by the gallon. In a water-based system that includes a tank-less toilet, embodiments herein can limit water consumption by controlling the water flow time period and/or volume directed through the tank-less toilet system.

With reference to FIGS. 4-1 through 4-6, the stand-alone interface module circuitry is based on a state-of-the-art microcontroller, such as a Cygnal Integrated Products C8051F310 device 111. The F310 is an 8-bit device with an 8051 family central processing unit (CPU) operating at 25 mhz, requiring as little as one clock cycle per instruction and instruction cycle time of 40 nanoseconds. This means the device is capable of executing a single instruction in 40 ns, or 25 million instructions per second (MIPS). Seventy percent of the instruction set operates with one clock cycle. The balance requires two, three, or four clock cycles. The device includes sixteen megabytes of FLASH program memory for storing the control (application) program and non-volatile data and 1280 bytes of random access memory (RAM) for temporary data storage. A total of 29 Input/Output port pins are provided. That means that 29 input and/or output signals can be connected to the device.

Three different serial port protocols are supported (available concurrently): 1) a standard 9-bit serial port (UART) compatible with PC COMM Ports; 2) a system management bus (SMBus) compatible with the SMBus found on many PC motherboards used to control a variety of devices found on the board; 3) a serial peripheral interface (SPI) bus used to control additional peripheral devices on a given system. Additional peripheral devices found on the device include 4 timer/counters, 5 programmable counter arrays, 10-bit analog to digital converters with 21 channels, voltage comparators, reset manager, software watchdog, brownout detector, missing clock detector, and an internal clock oscillator accurate to 2% and a real time clock. The F310 includes a JTAG interface 112. This provides support for a built-in in-circuit emulator (ICE) for direct program debugging (no expensive external ICE needed), program code download (programming) and boundary layer scanning (for device testing during manufacturing).

When configured as a plug-in version, the interface module includes an expansion connector 113. Many of the control signals used by the onboard microcontroller on the stand-alone version are routed to this connector. This allows a microcontroller found on the motherboard to monitor and control plug-in interface modules in the same manner as the onboard microcontroller on a stand-alone interface module.

These signals include the user reset switch 114 used to reset an alarm condition. An opto-isolated sensor input 115 provides the real-time state of the attached input sensor. The voltage used to power the opto-isolator is jumper configurable to allow a wide range of digital sensors to be used with an interface module. Two jumpers 116, 126 allow the voltage to be set to either 24 vac or 5 vdc. An amplifier 117 is used to detect current flow in the valve control circuit. This allows the system to detect and report a valve coil failure. The sensor input and valve output are routed to a four position, screw terminal block 118. The external sensor and valve are attached to the interface module at this connector. An alarm buzzer 120 is found on the stand-alone version, driven by a PNP transistor driver 119. The plug-in version does not support it. Instead, a single buzzer is found on the motherboard. In addition, four external buzzers or warning lights can be attached to the system (see the motherboard circuit description to follow).

A relay is used to drive the valve output 123. The relay is a latching relay. Two control drivers 121 are incorporated in the design, one to latch the relay and one to reset the relay. The latching relay can be configured to provide either 24 vac or 24 vdc, to allow the use of either an AC or DC valve set by two jumpers 122, 125. The latching relay has one pole and two contacts. One is normally open and the other is normally closed. A jumper allows the default state of the output to be set to either normally open or normally closed. Two status LEDs 130 are found on each interface module. A blue LED flashes to indicate a normal operational state. A red LED will flash during an alarm state.

Additional support circuitry includes a resettable PTC fuse 127 on the AC input. This device opens (trips) if the current flow reaches a predetermined level. A 5 vdc voltage regulator 128 and a +3.3 vdc regulator 129 form an onboard power supply for the stand-alone version of the interface module (not used on the plug-in version).

One optional circuit is found on the stand-alone version only. A radio frequency transceiver 131 operates at 912 Mhz. It is used to allow wireless operation of a stand-alone interface module within 300 feet from a motherboard.

Figures 1, 4:
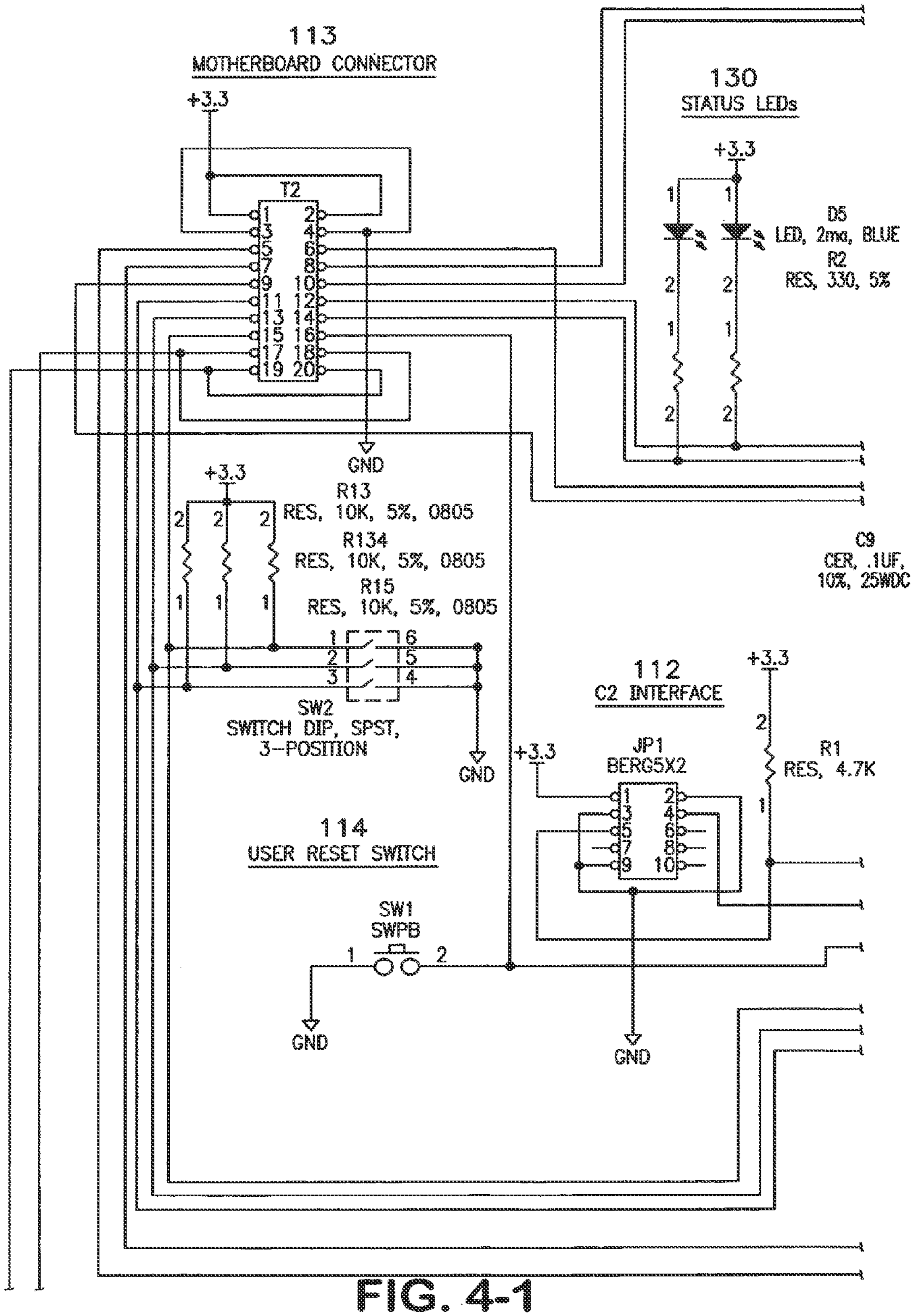
Figures 2, 4:
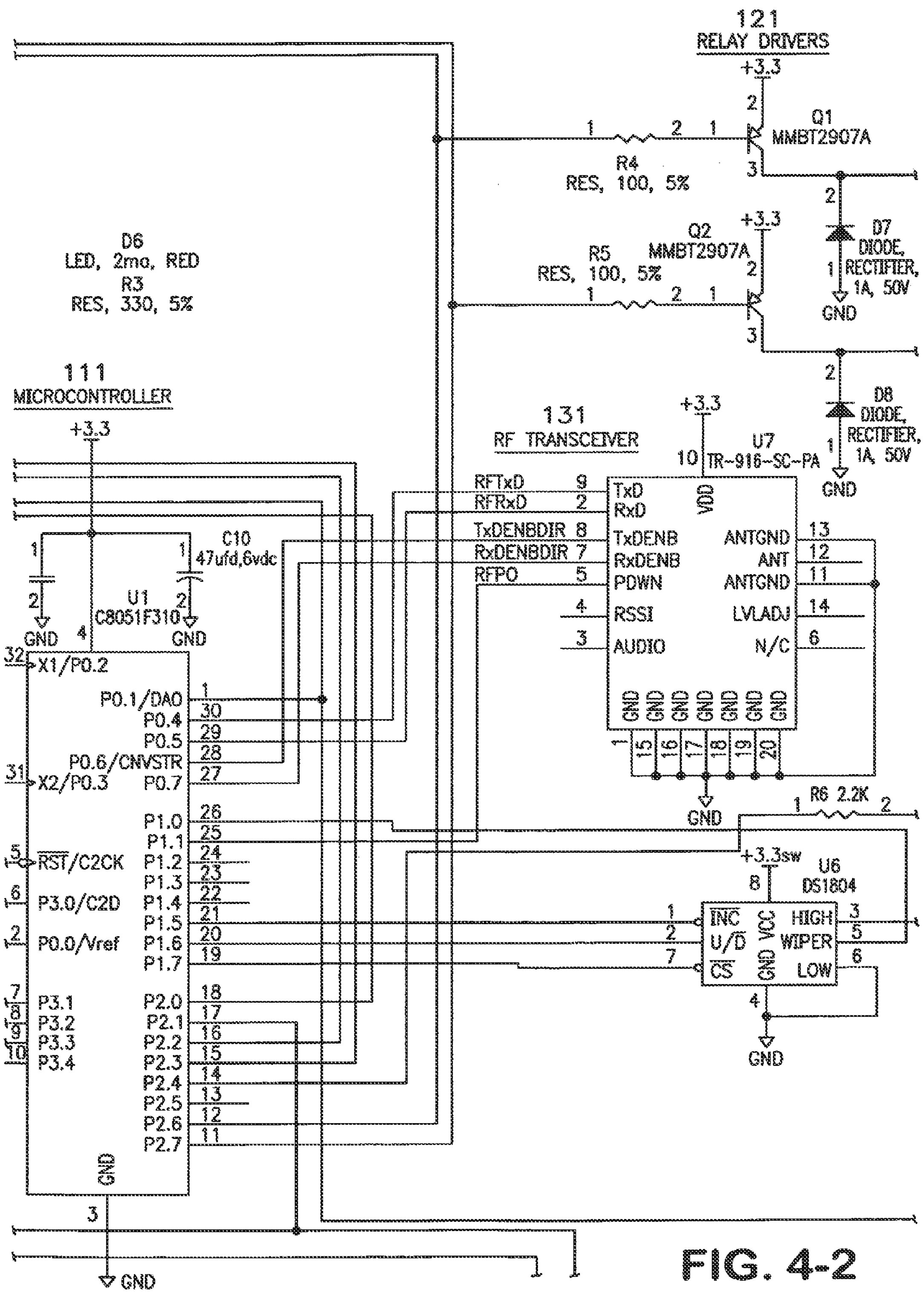
Figures 3, 4:
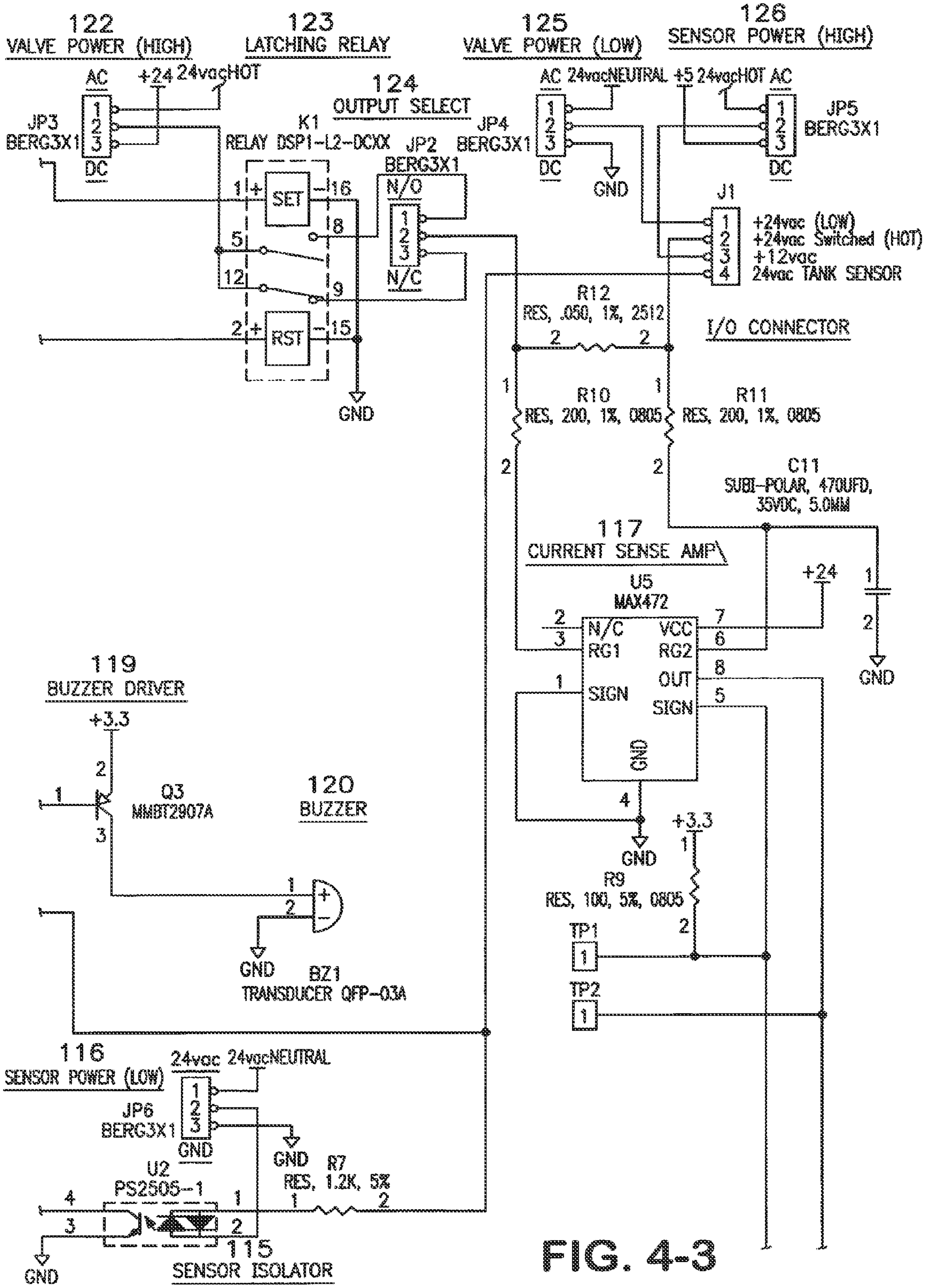
Figure 4:
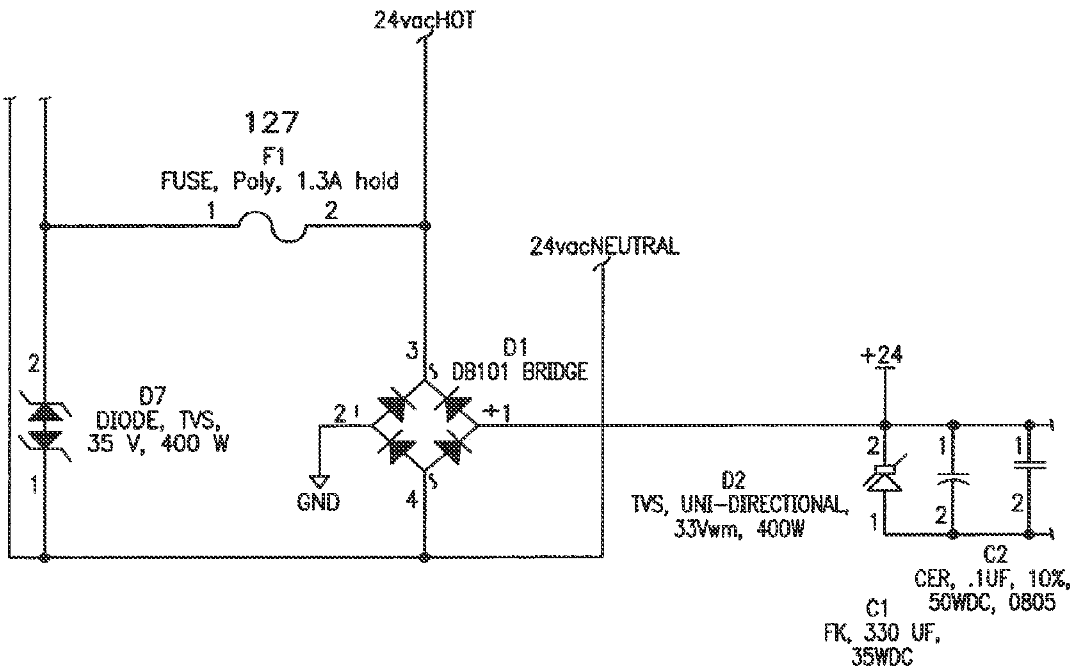
Figures 4, 5:
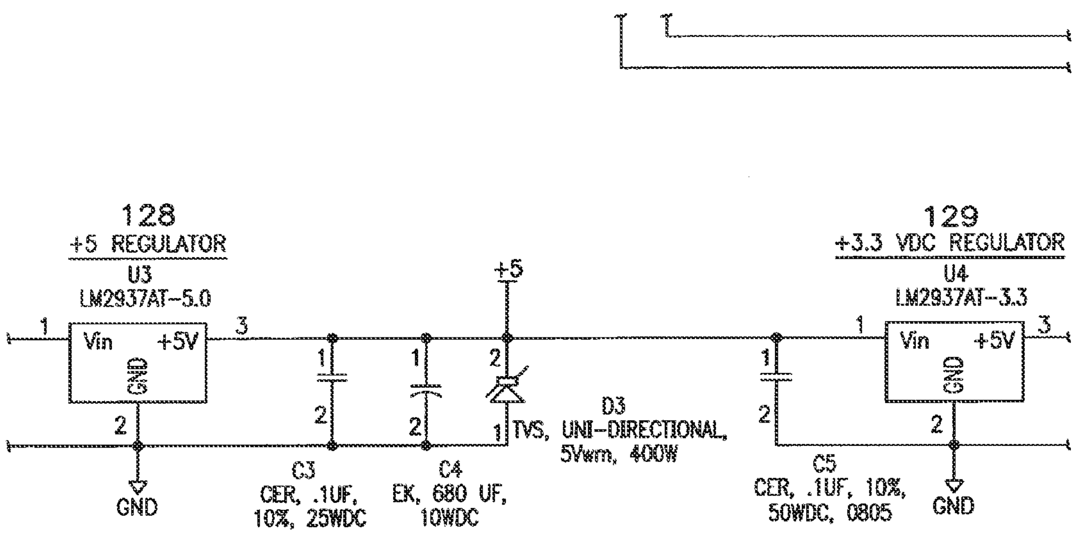
Figures 4, 5, 6:
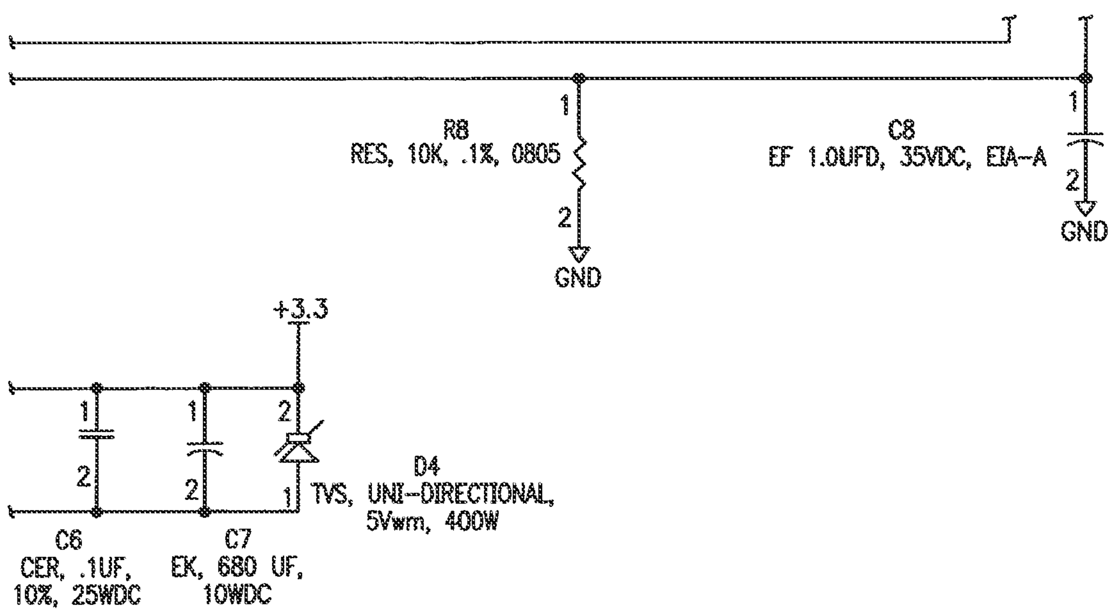
Figures 1, 5:
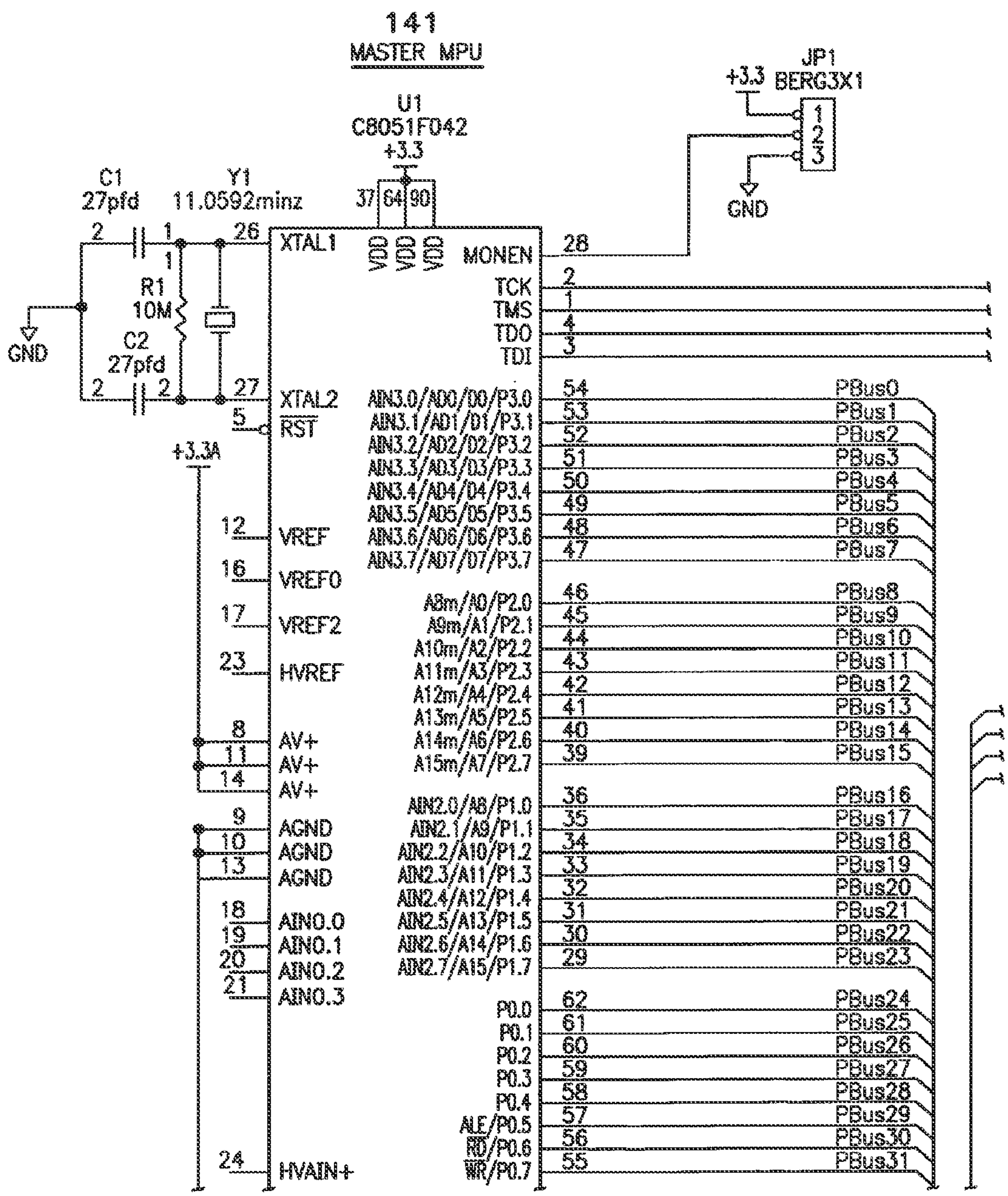
Figures 2, 5:
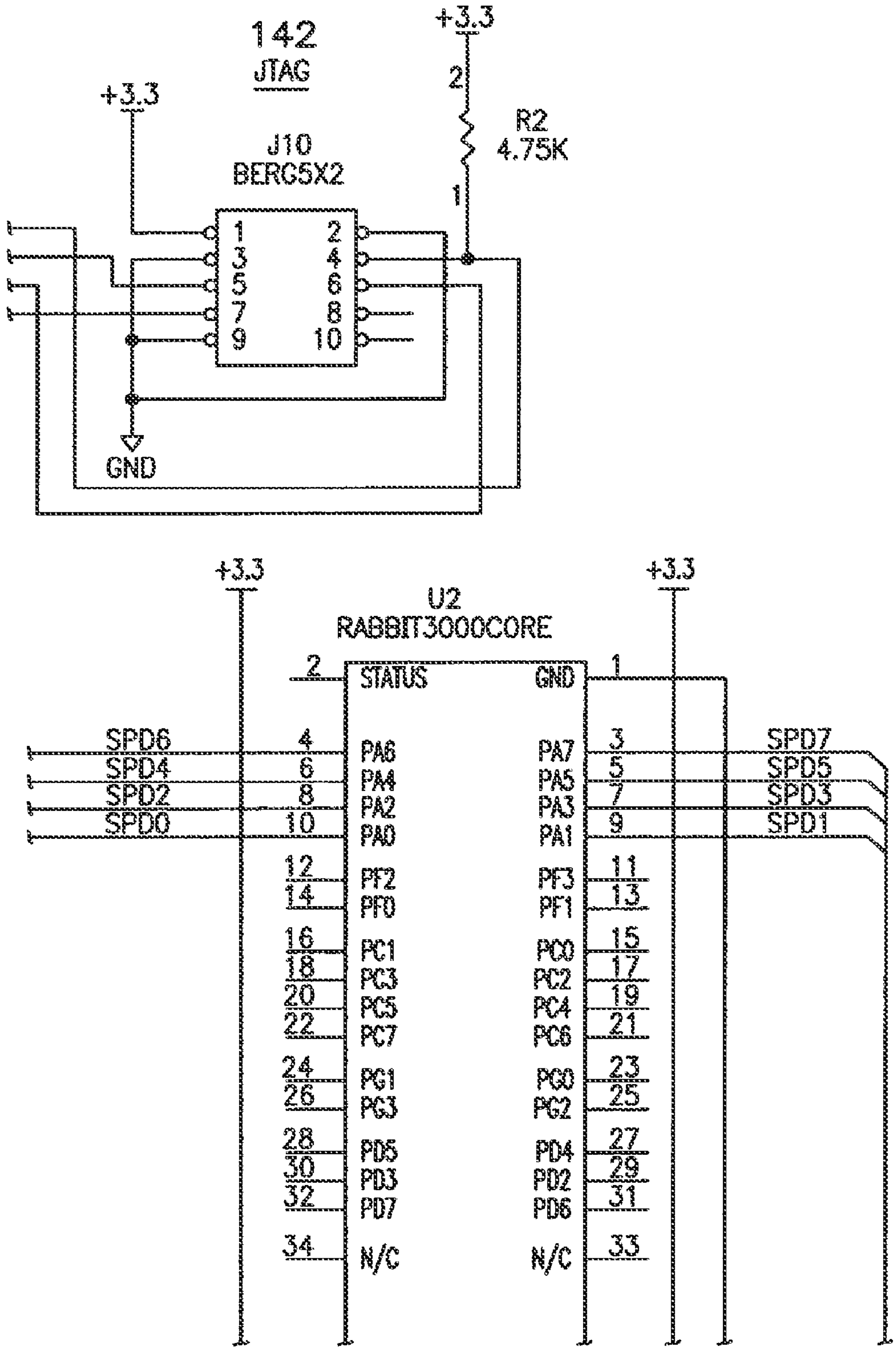
Figures 3, 5:
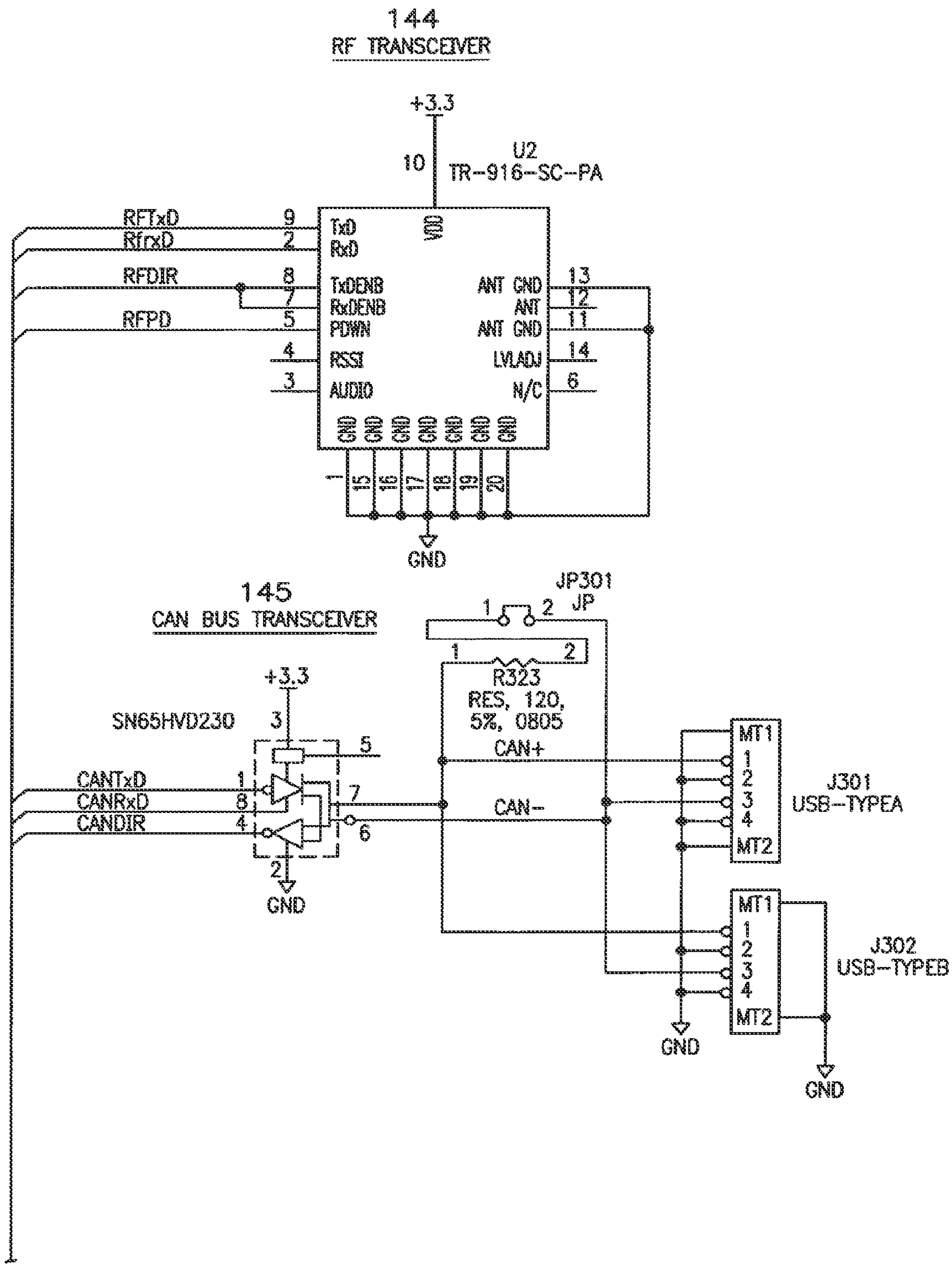
Figures 4, 5:
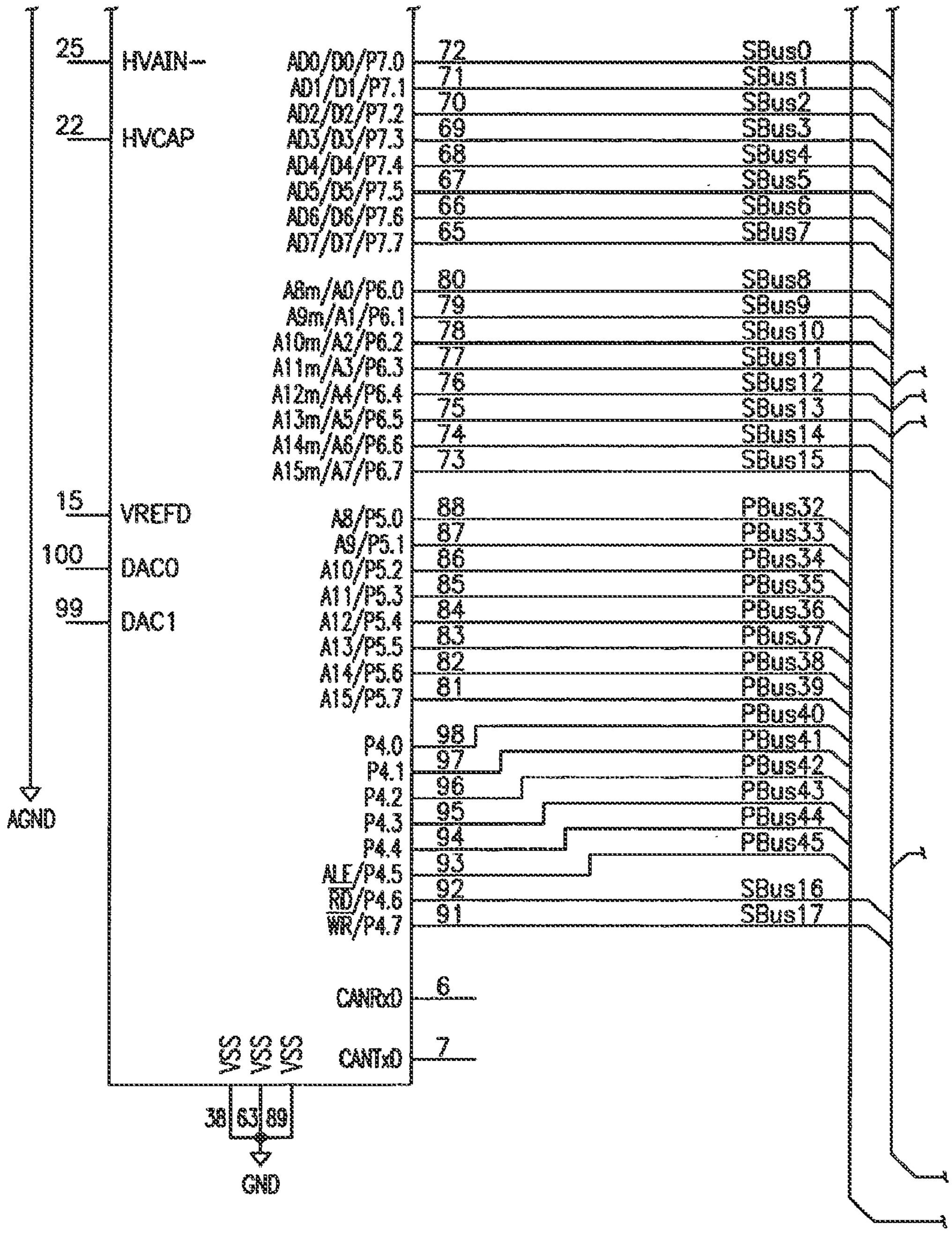
Figure 5:
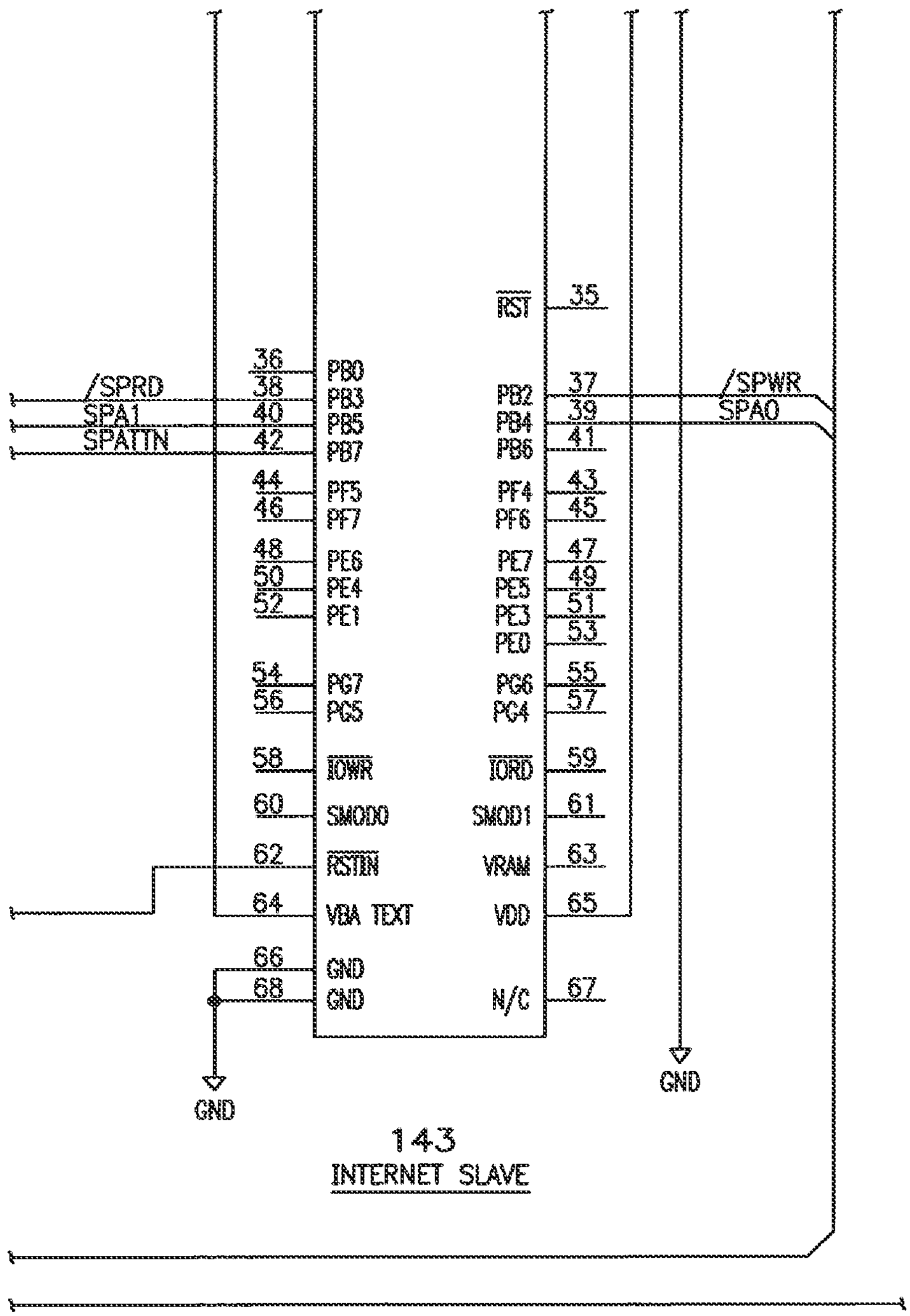
Figures 5, 6:
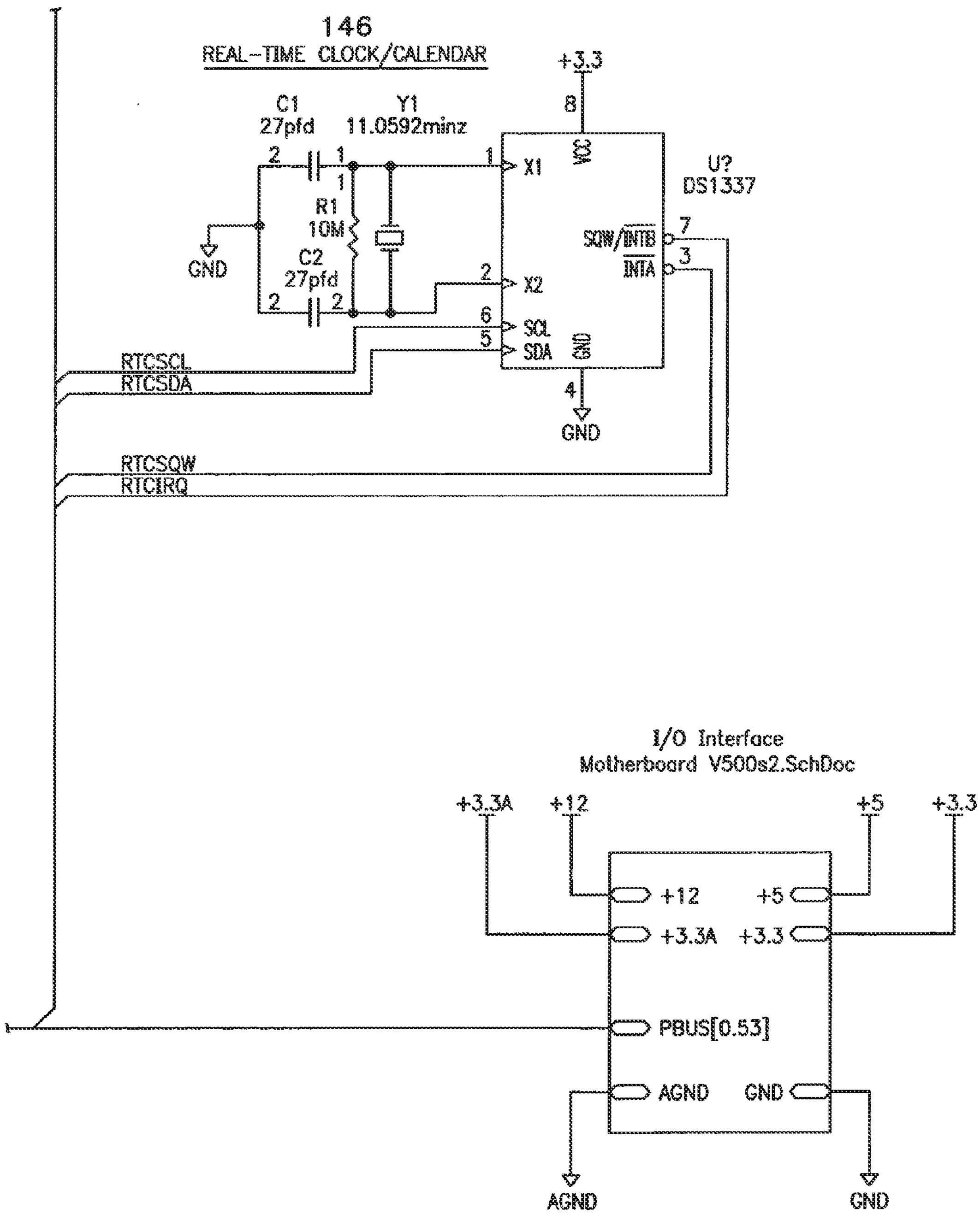

As shown in FIGS. 5-1 through 5-6, the motherboard is a very high integration design provided by no less then ten microcontrollers. At the heart of the board is a master microcontroller 141, such as a Cygnal Integrated Product microcontroller, C8051F042. This device is a parent to the F310 device used on the stand-alone interface module. It incorporates the same 25 MIPS 8051 central processing unit (CPU)—with JTAG interface 142 as found on the F310. It also includes all the features and peripherals found on the F310 plus a large number of additional features. These include expanded onboard FLASH program memory (64K bytes total), expanded random access memory (RAM) (4352 bytes), a larger number of input/output port pins (64 total), a controller area network (CAN) protocol serial port, an additional PC compatible COMM port (UART), an additional timer and an additional 8-bit analog to digital converter. The F042 also incorporates an external expansion bus, which allows further memory and peripheral expansion off-chip.

Nine slave microcontrollers are found on the motherboard. The first is a special purpose microcontroller module 143. Referred to as the network slave, it is designed to provide a TCP/IP based, 10 base-T Ethernet interface, allowing direct connection to a local (LAN) or wide (WAN) area network. It includes 256K of FLASH and 128K of RAM memory onboard. It also incorporates a slave port. This port is connected directly to the master F042 microcontroller's external expansion bus, allowing bi-directional communication between the two microcontrollers. The master sends warning messages across the slave bus (which includes the network address of the recipient) to the network slave, which in turn manages the TCP/IP stack protocol needed to send email warnings over the Internet. Incoming emails are passed to the master via the slave port as well. The network slave also can be configured to serve a Web status page. The basic web page is retained in the network slave. The dynamic data representing the current real-time status of the system is sent to the network slave across the slave port. The network slave collates the data and places it on the page, serving it to requesting web clients. A key purpose of the network slave is to manage web based traffic.

In addition to the sixteen plug-in interface modules directly supported on the motherboard, an additional 256 remote interface modules can be monitored and controlled by a motherboard. This is accomplished using a radio frequency (RF) link, or network. A FCC part 68 certified RF transceiver 144 is an option available on the motherboard. Operating at a frequency of 912 Mhz, a band of frequencies is set aside for among other things, process control and monitoring, and remote interface modules can be situated as far away as 300 feet.

Each motherboard incorporates a controller area network 145, known in the industry as "CAN." It is an intelligent, bi-directional, collision detection, serial communication protocol, commonly used in industrial automation and automotive control applications. The system uses it to link multiple motherboards together to form large systems used in commercial applications.

To allow time/date stamping of alarm warnings, the motherboard incorporates a real time clock/calendar 146. The device includes battery backup to retain current time and date during power failures.

In FIGS. 6A-1 through 6A-8, 6B-1 through 6B-8, 6C-1 through 6C-8, and 6D-1 through 6D-8, eight additional slave microcontrollers or module slaves 149 are found on the motherboard. Each is a Cygnal Integrated Products C8051F310, the same device used on the stand-alone interface module. Each interface module slave monitors two plug-in interface modules 150 in real-time. Each interface module slave communicates with the master via the SMBus. When an alarm condition on any one plug-in interface module is detected, the status is reported to the master. It should be noted that, in the depicted embodiment, the circuitry is the same for all eight interface module slaves 154, 160.

Figures 1, 6A:
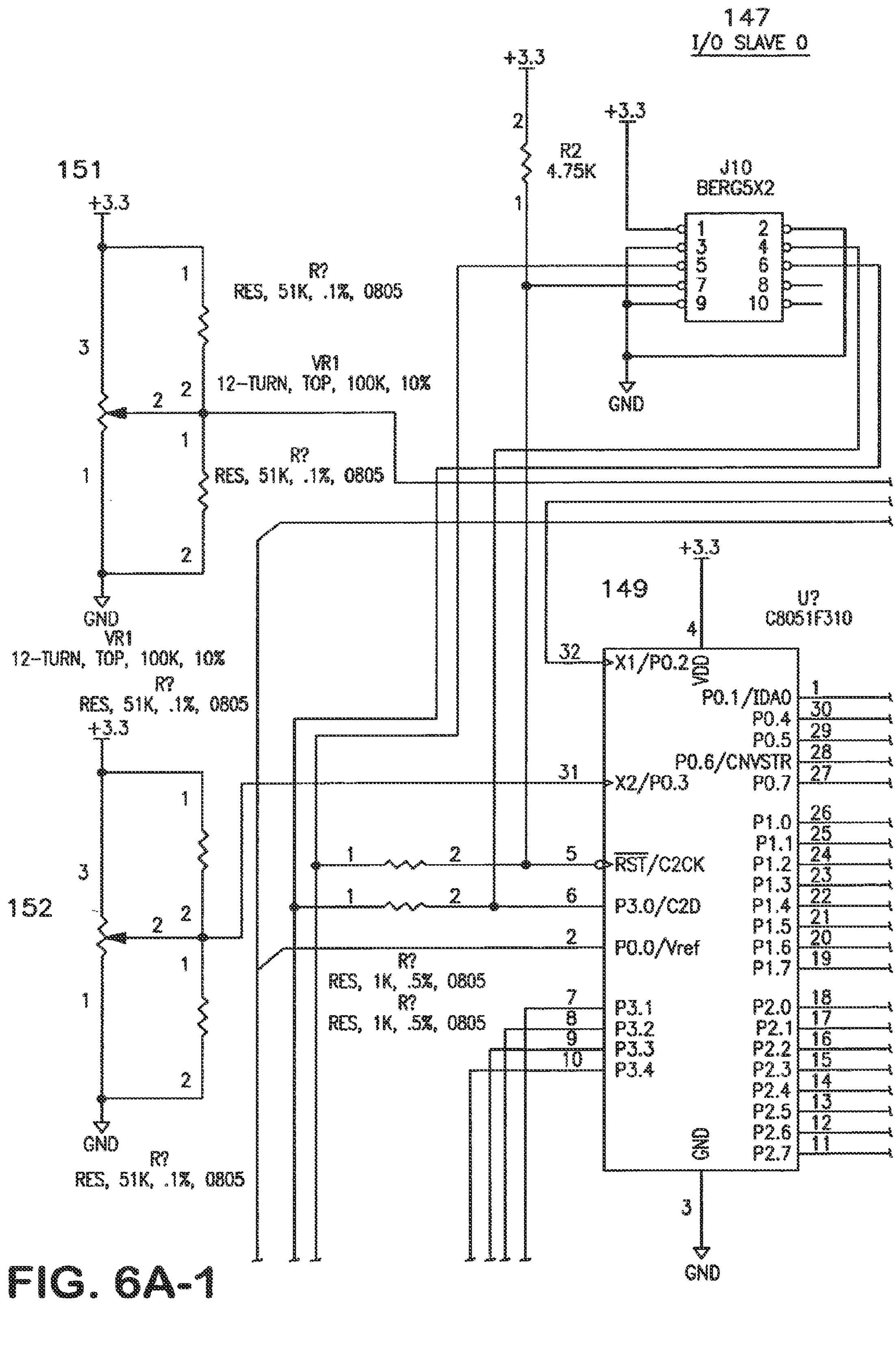
Figures 2, 6A:
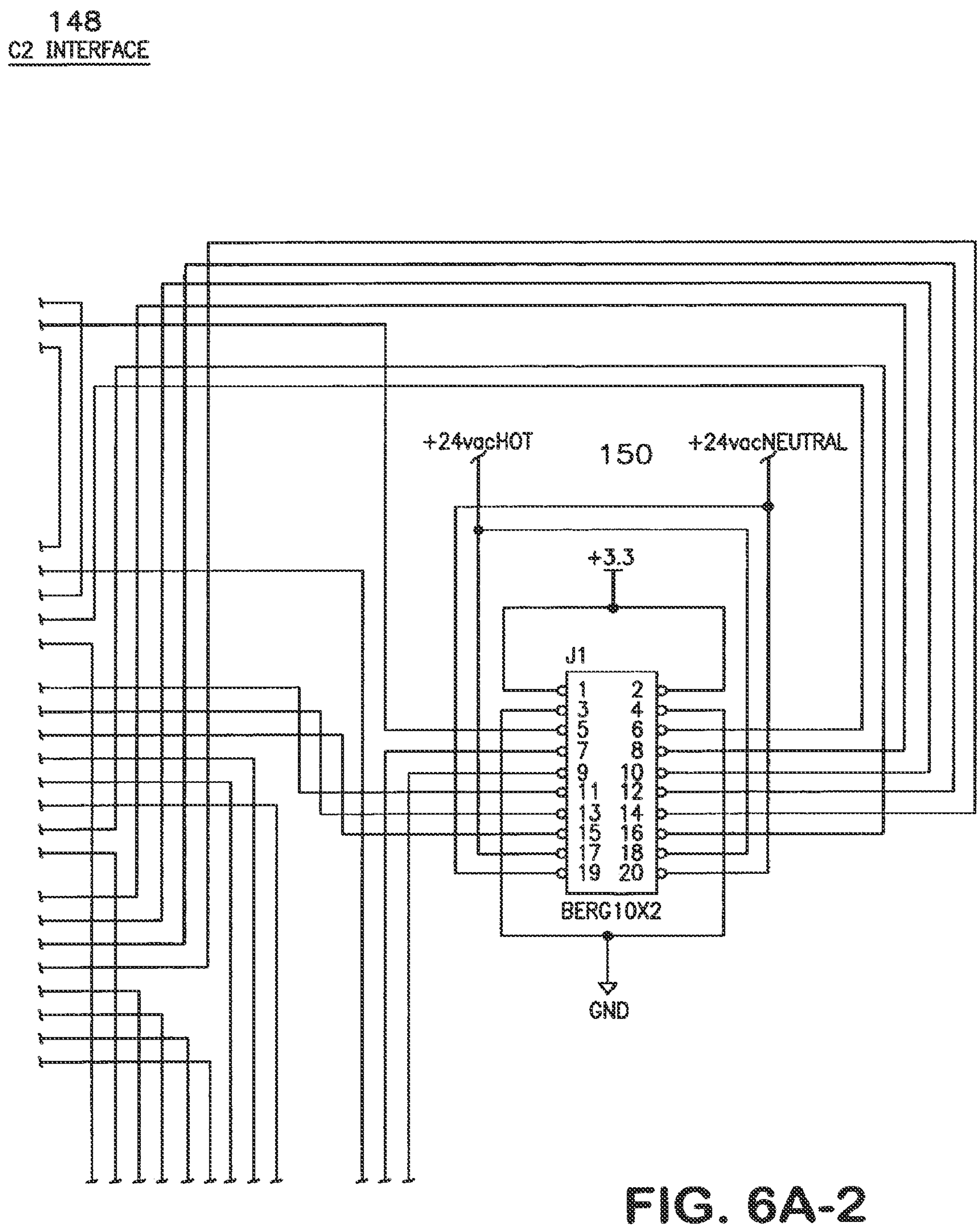
Figures 3, 6A:
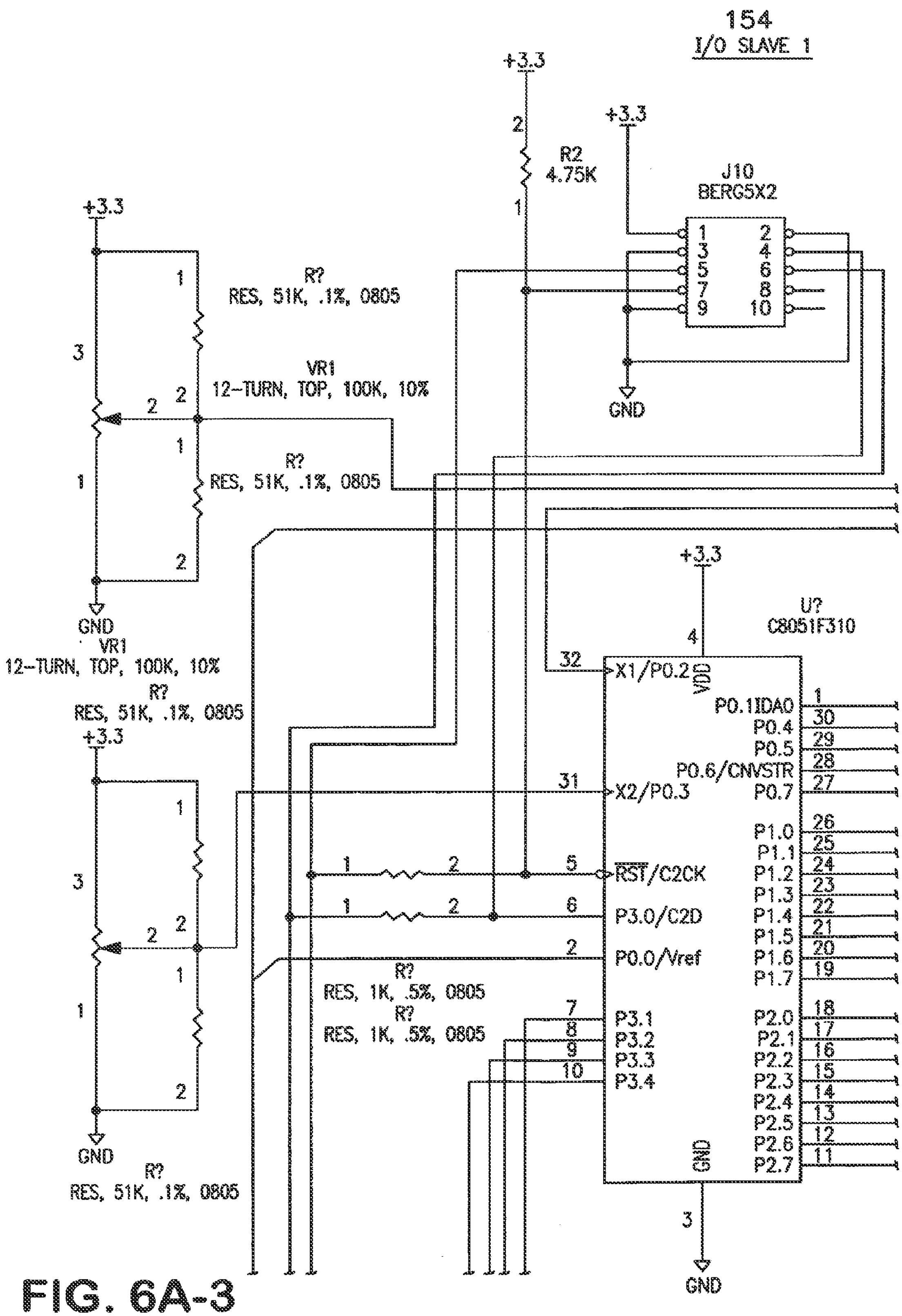
Figures 4, 6A:
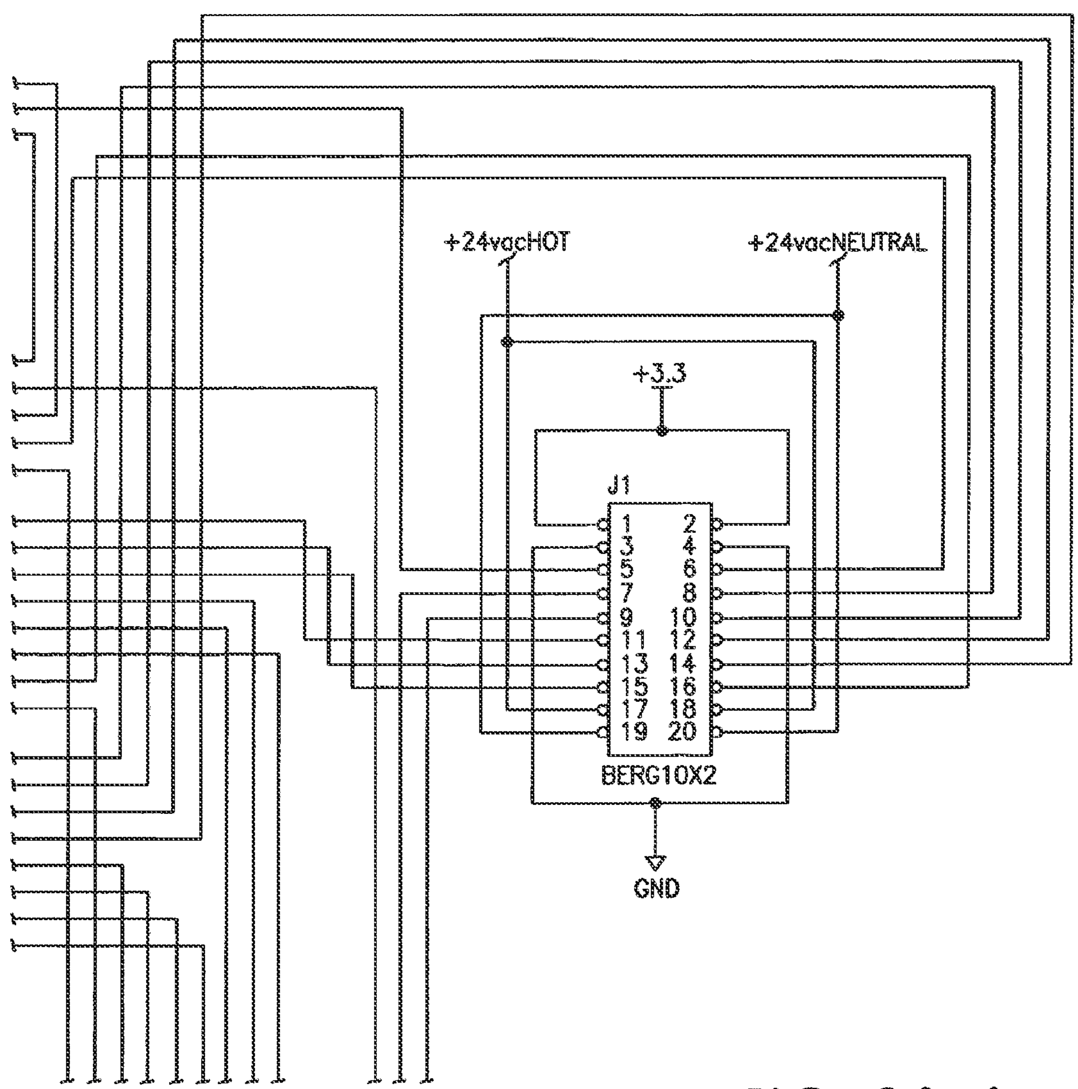
Figures 5, 6A:
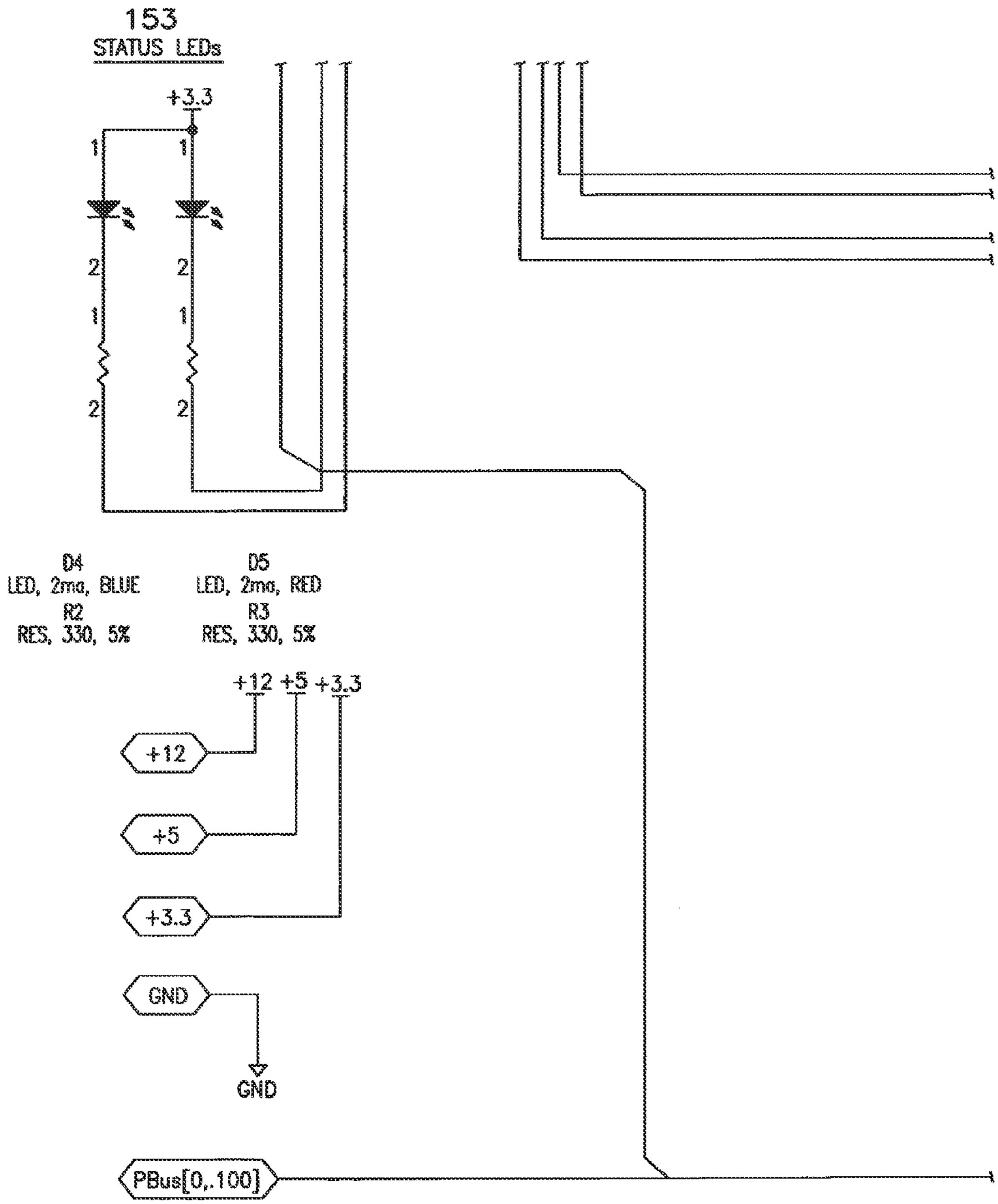
Figures 6, 6A:
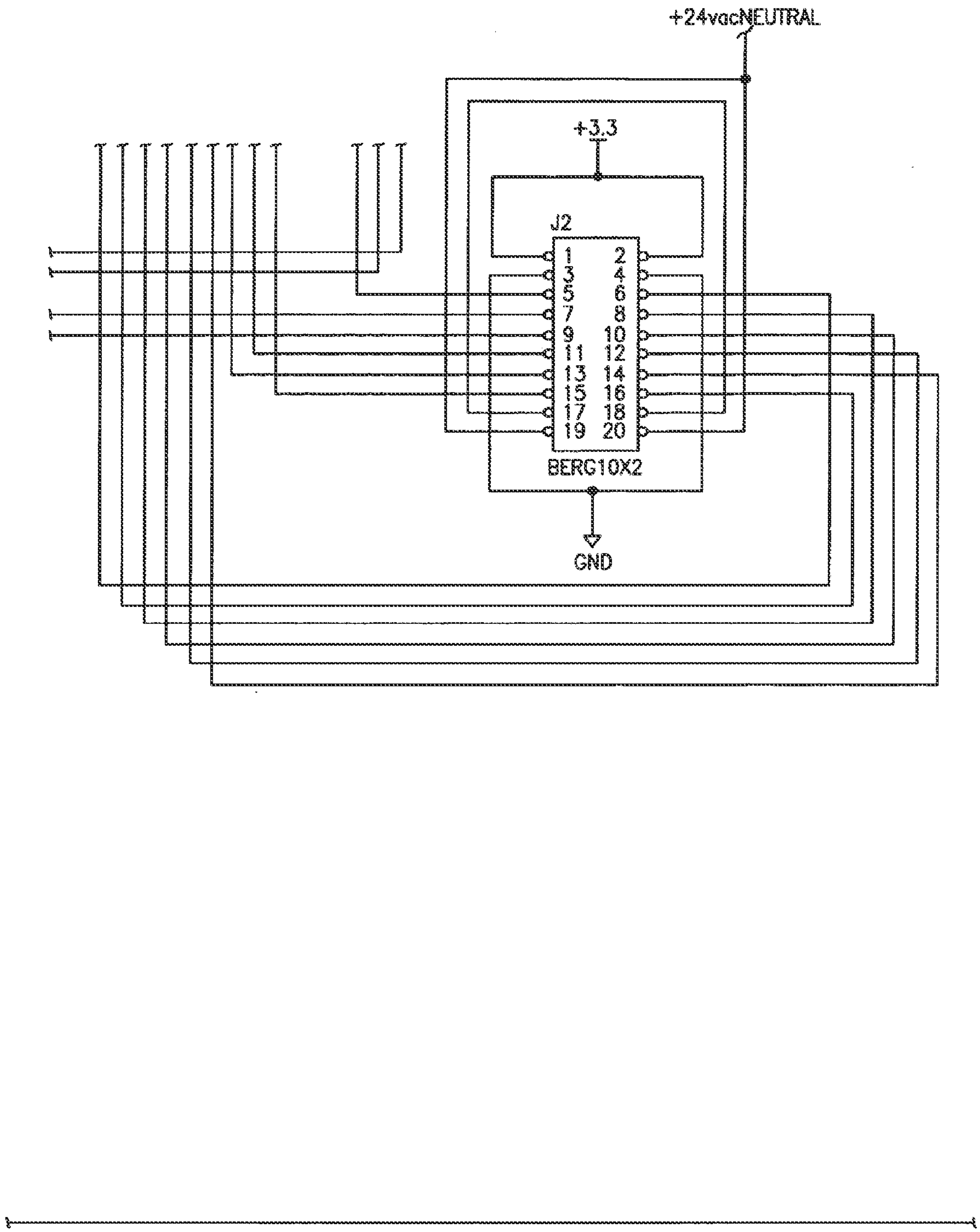
Figures 6, 6A, 7:
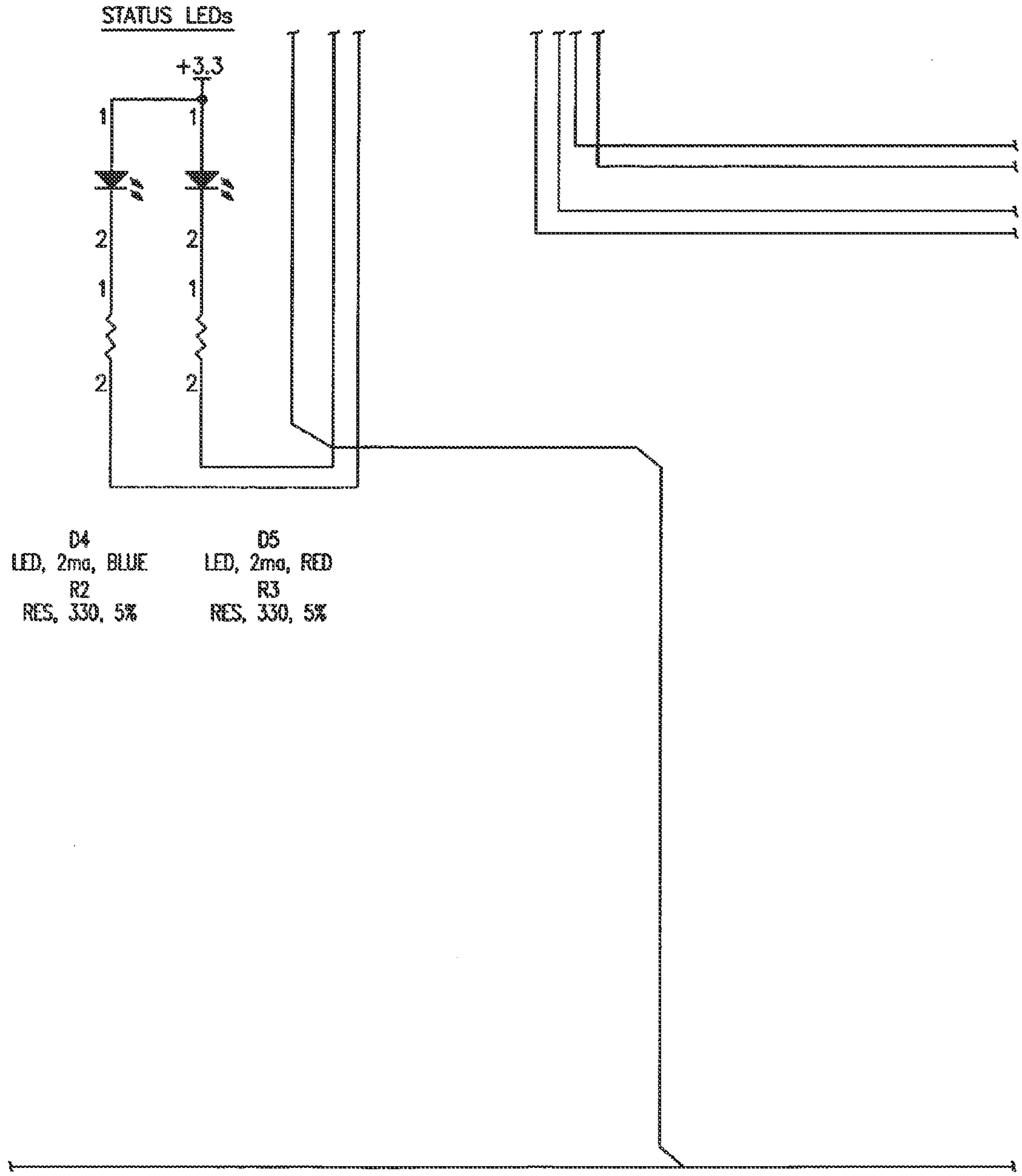
Figures 1, 6B:
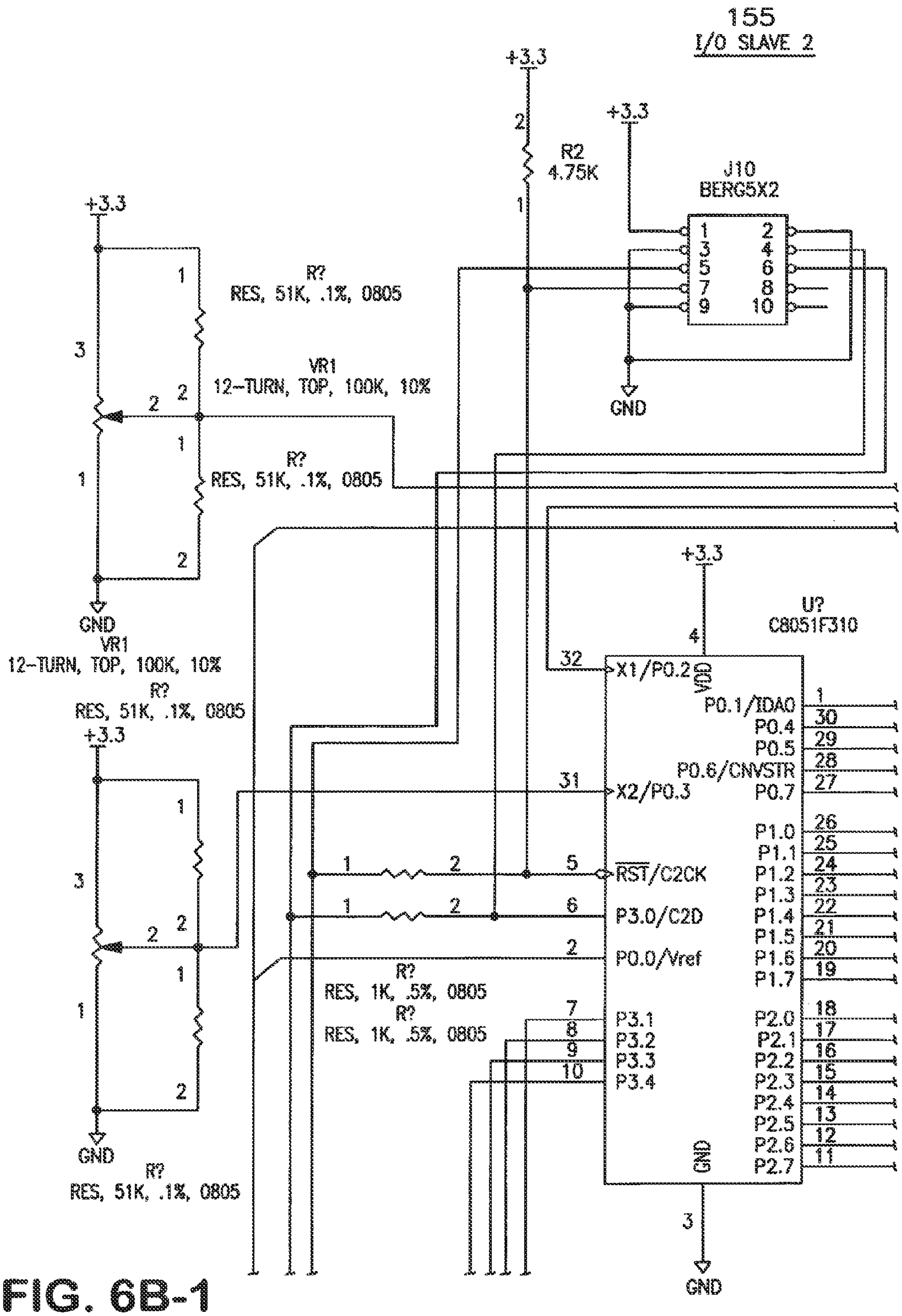
Figures 2, 6B:
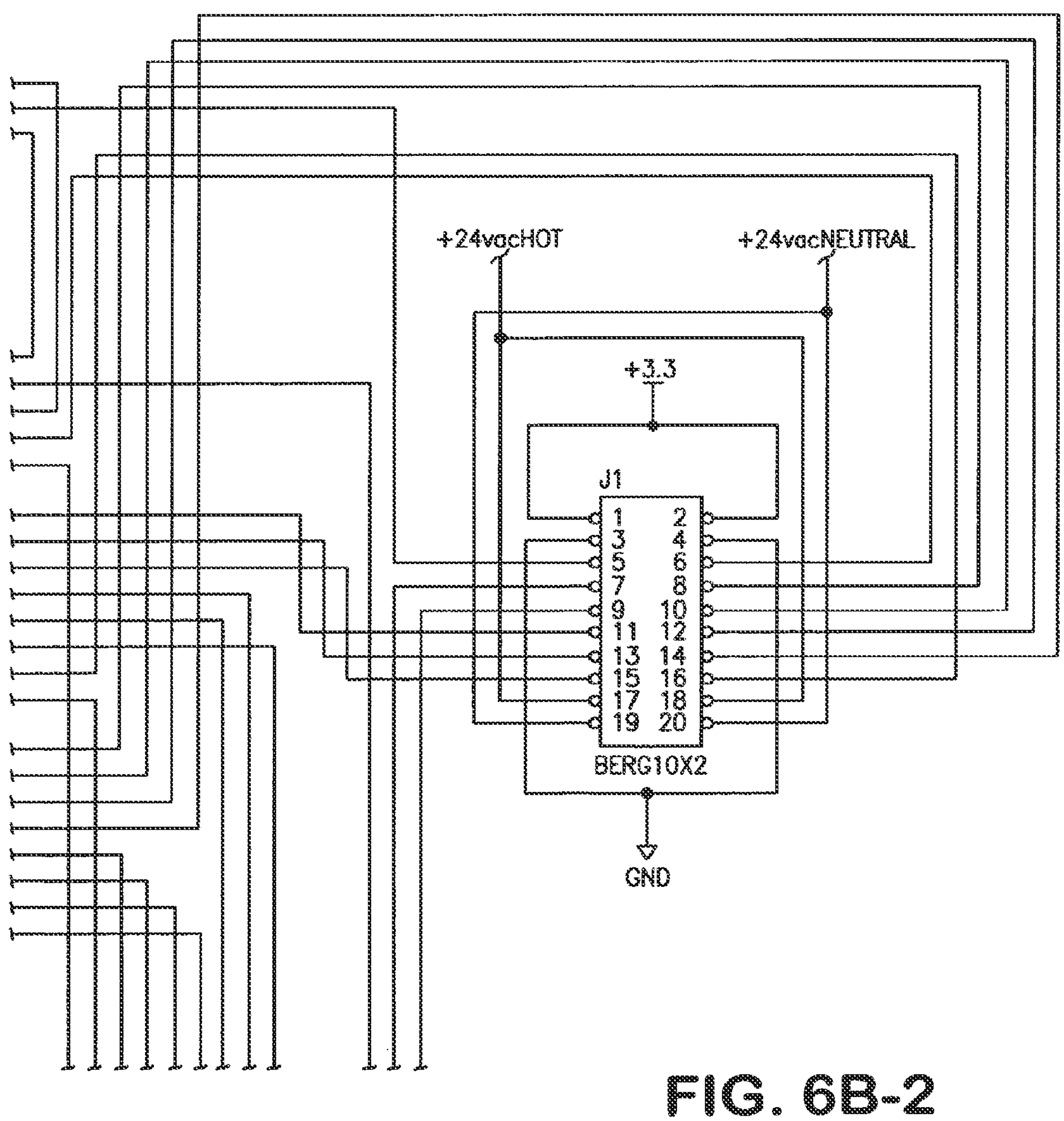
Figures 3, 6B:
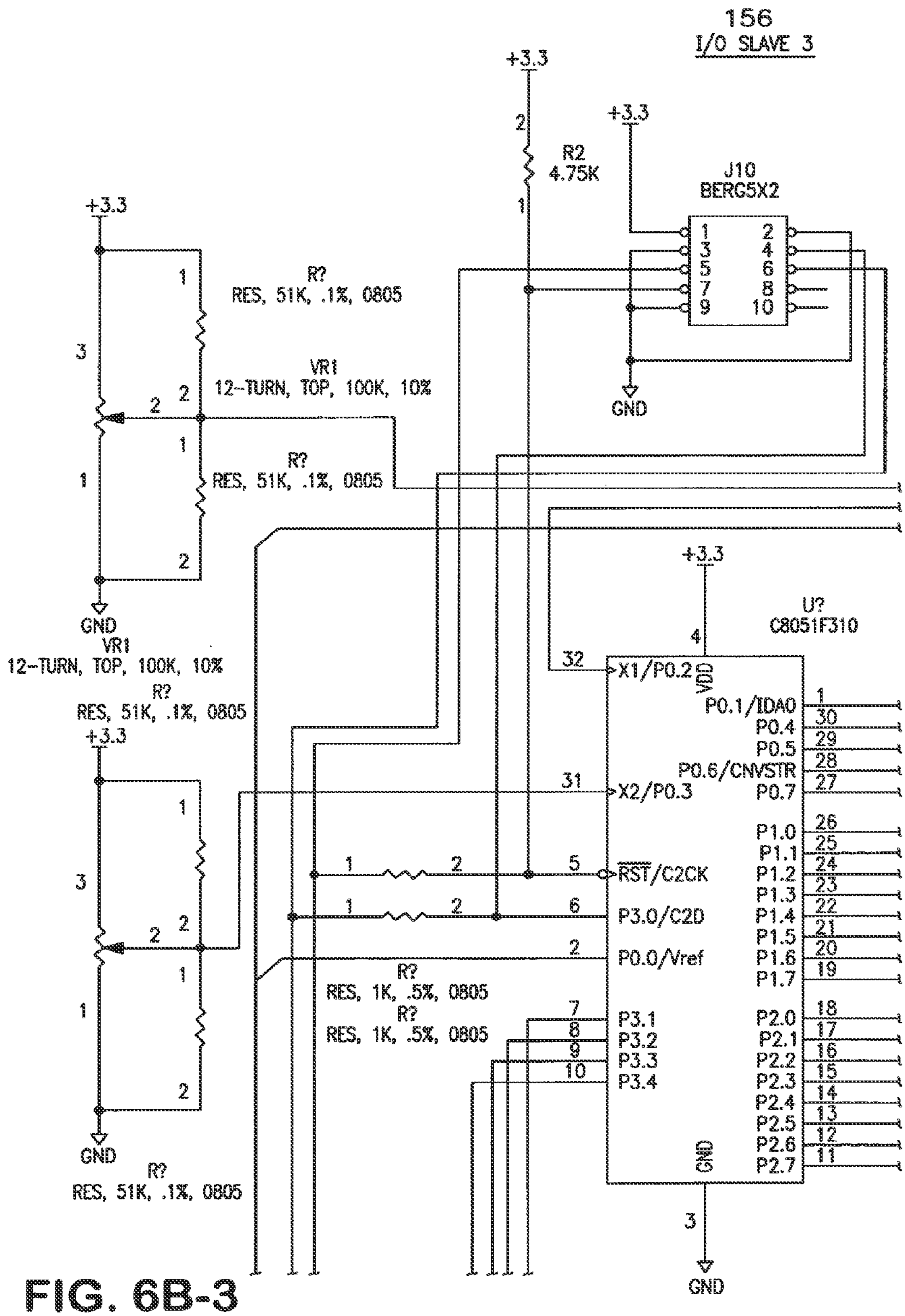
Figures 4, 6B:
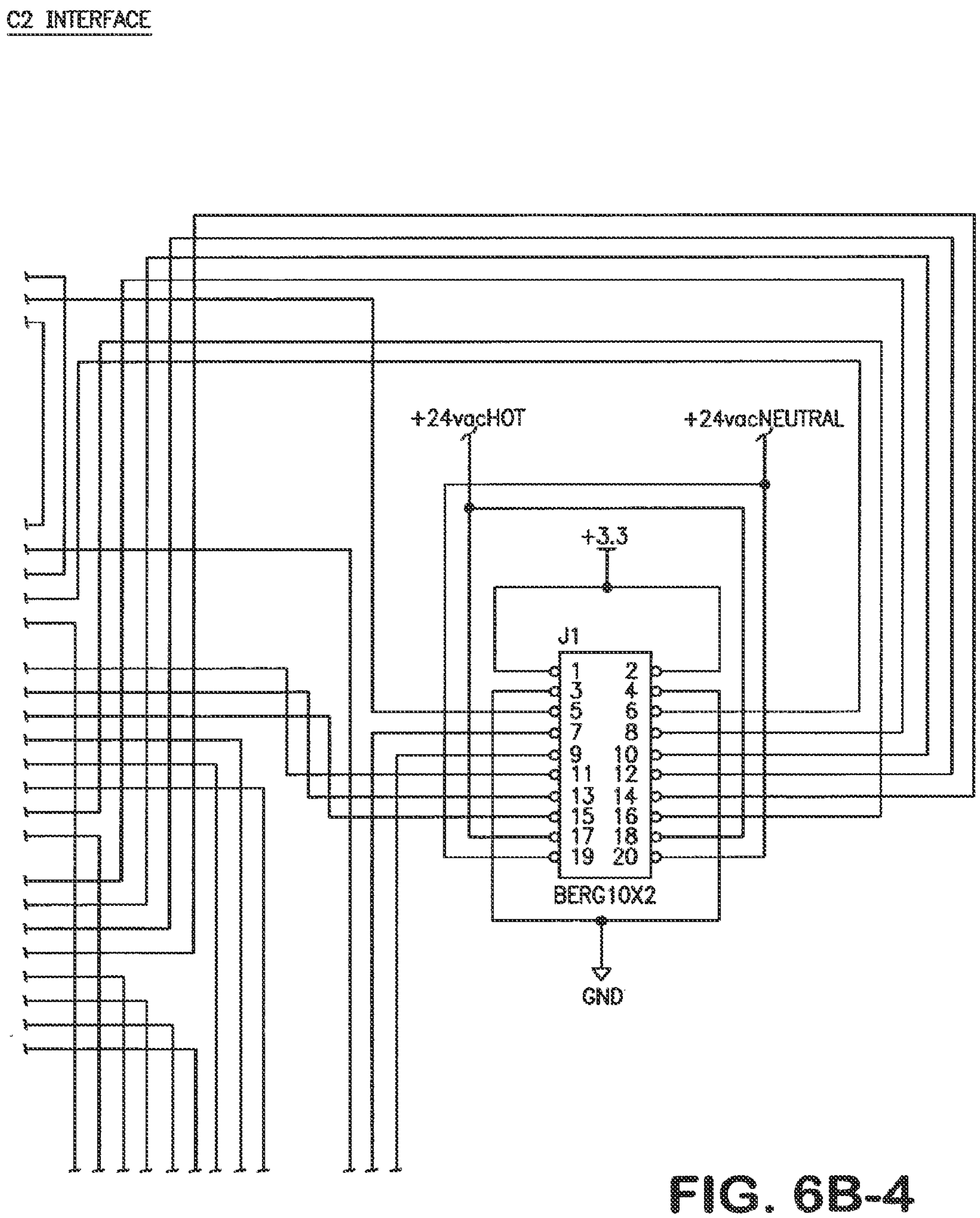
Figures 5, 6B:
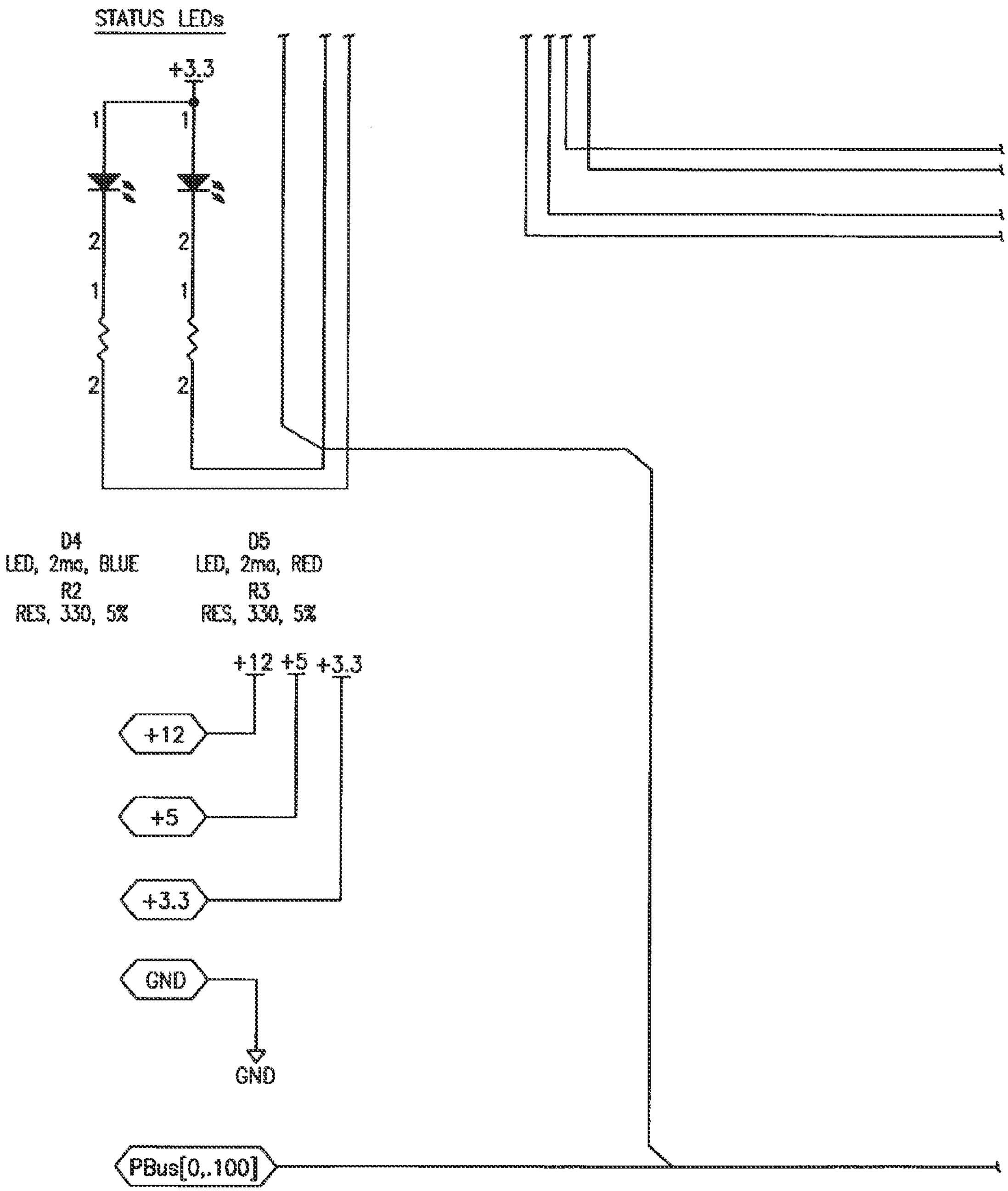
Figures 6, 6B:
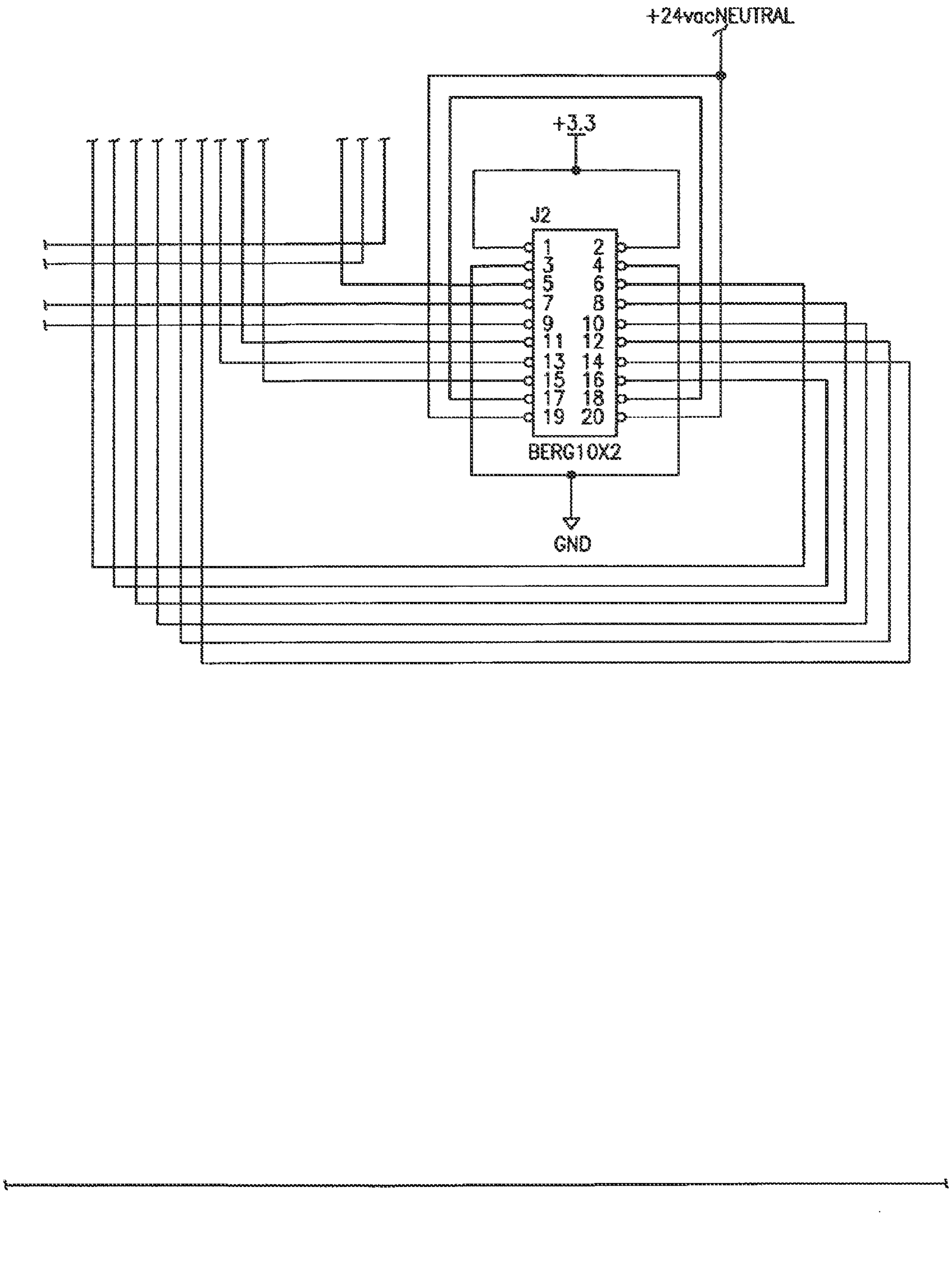
Figures 6, 6B, 7:
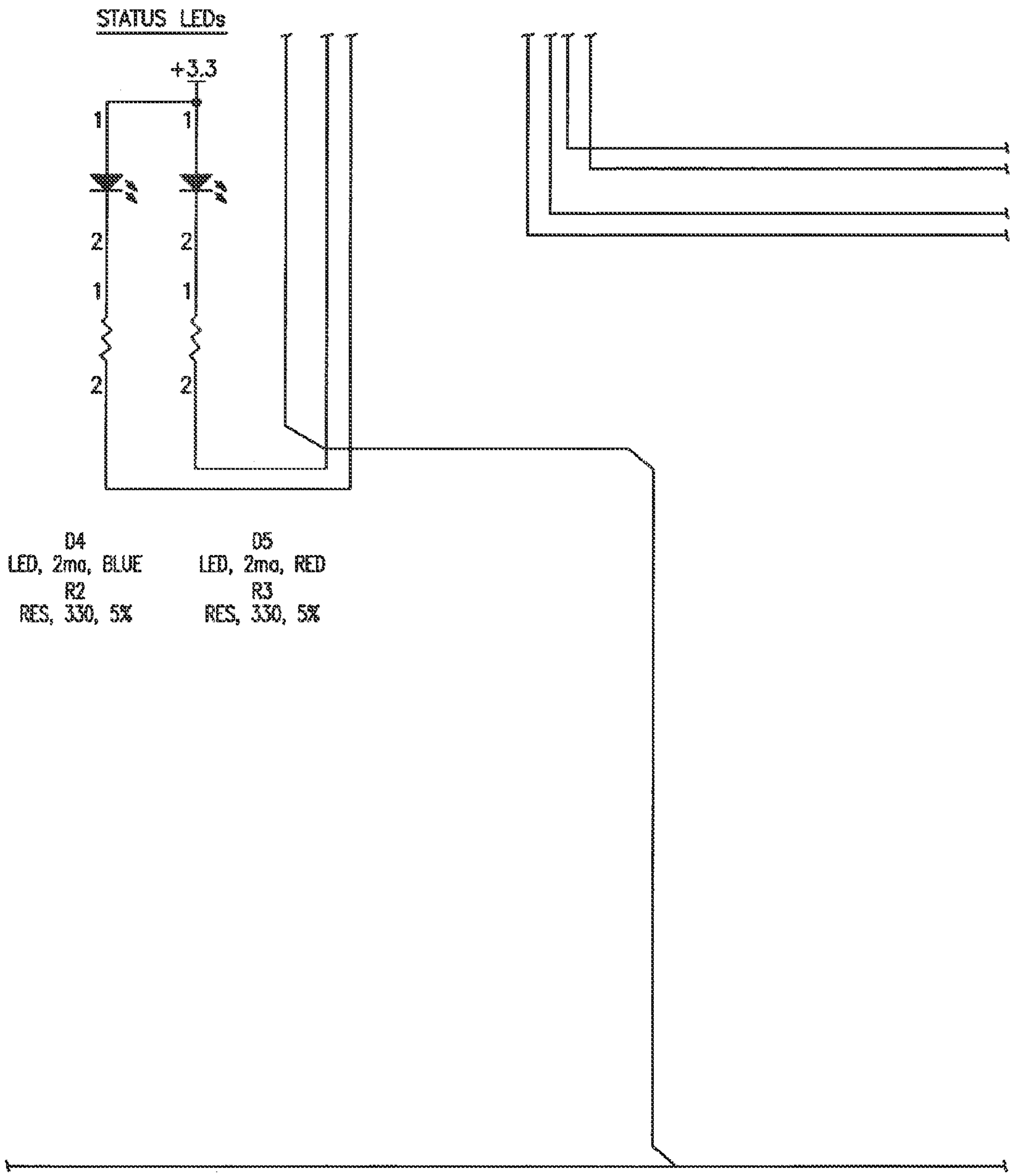
Figures 1, 6C:
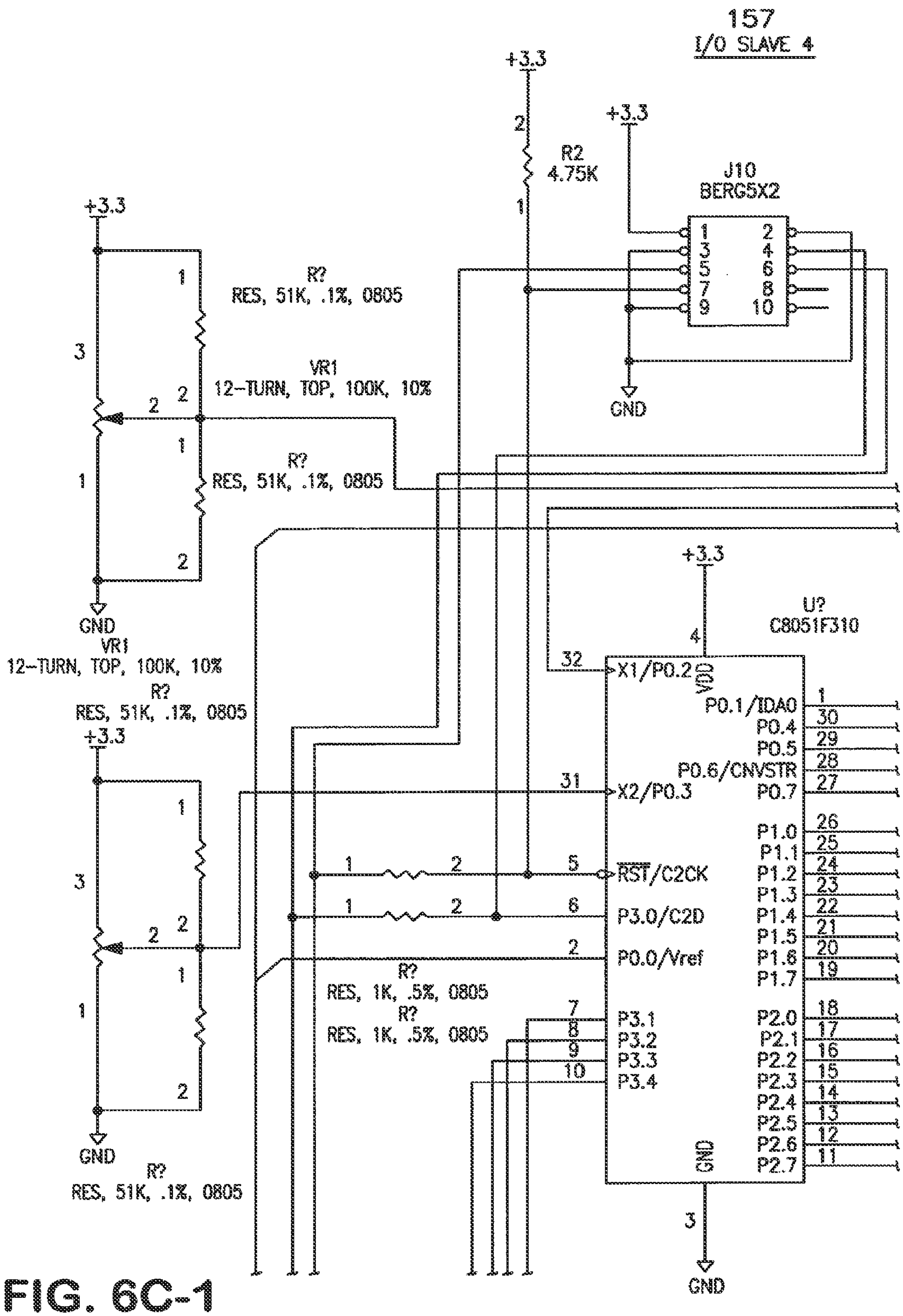
Figures 2, 6C:
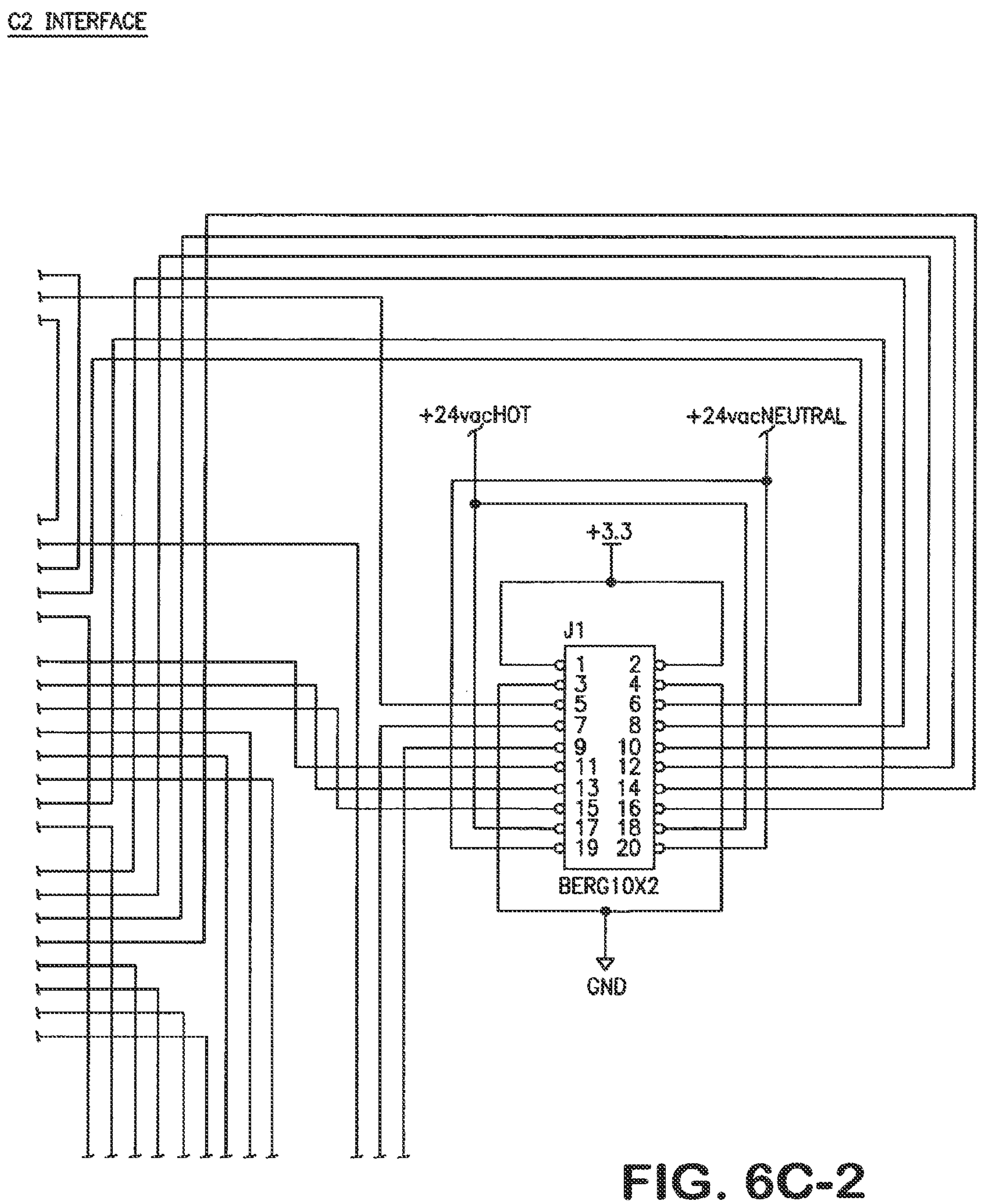
Figures 3, 6C:
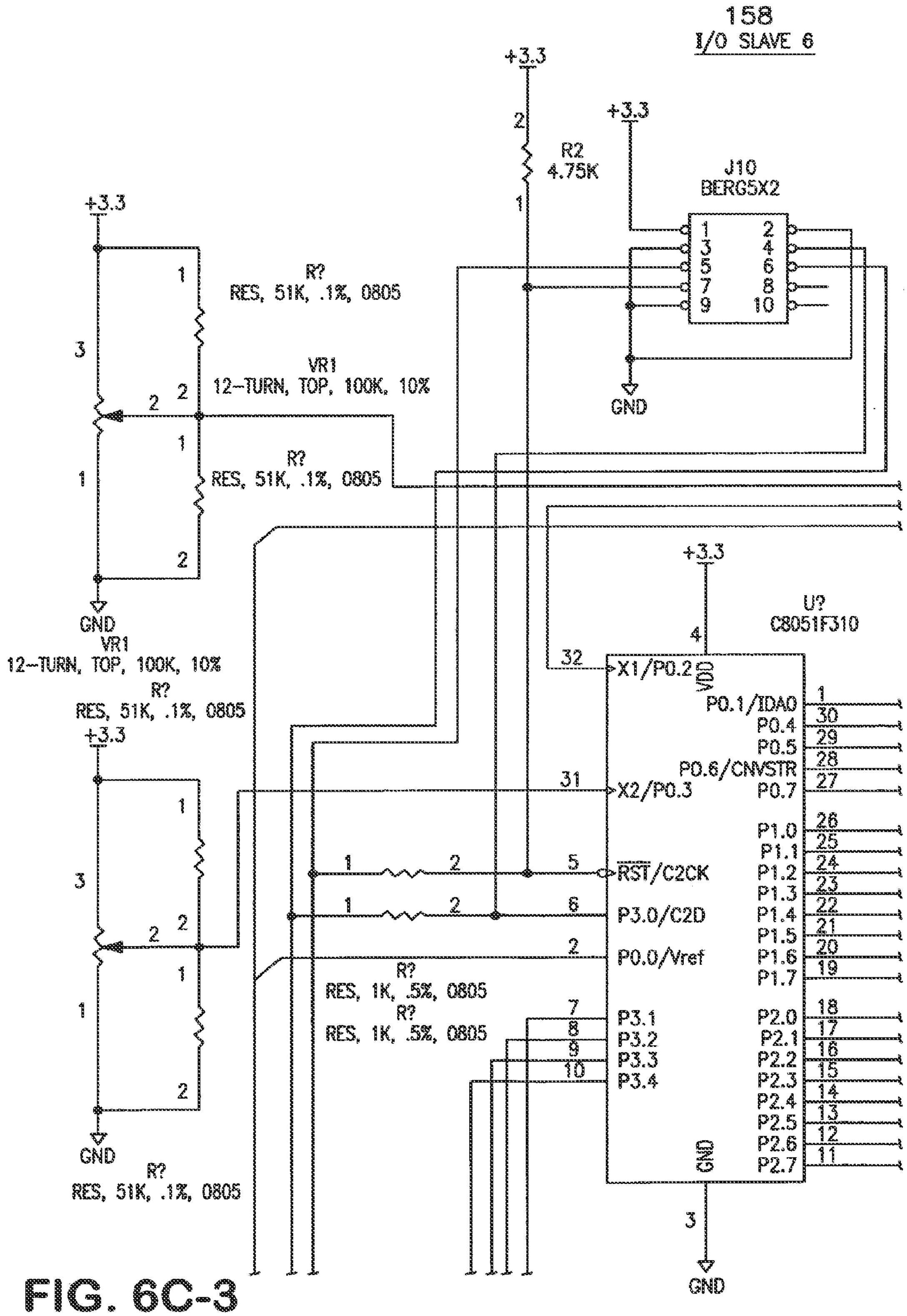
Figures 4, 6C:
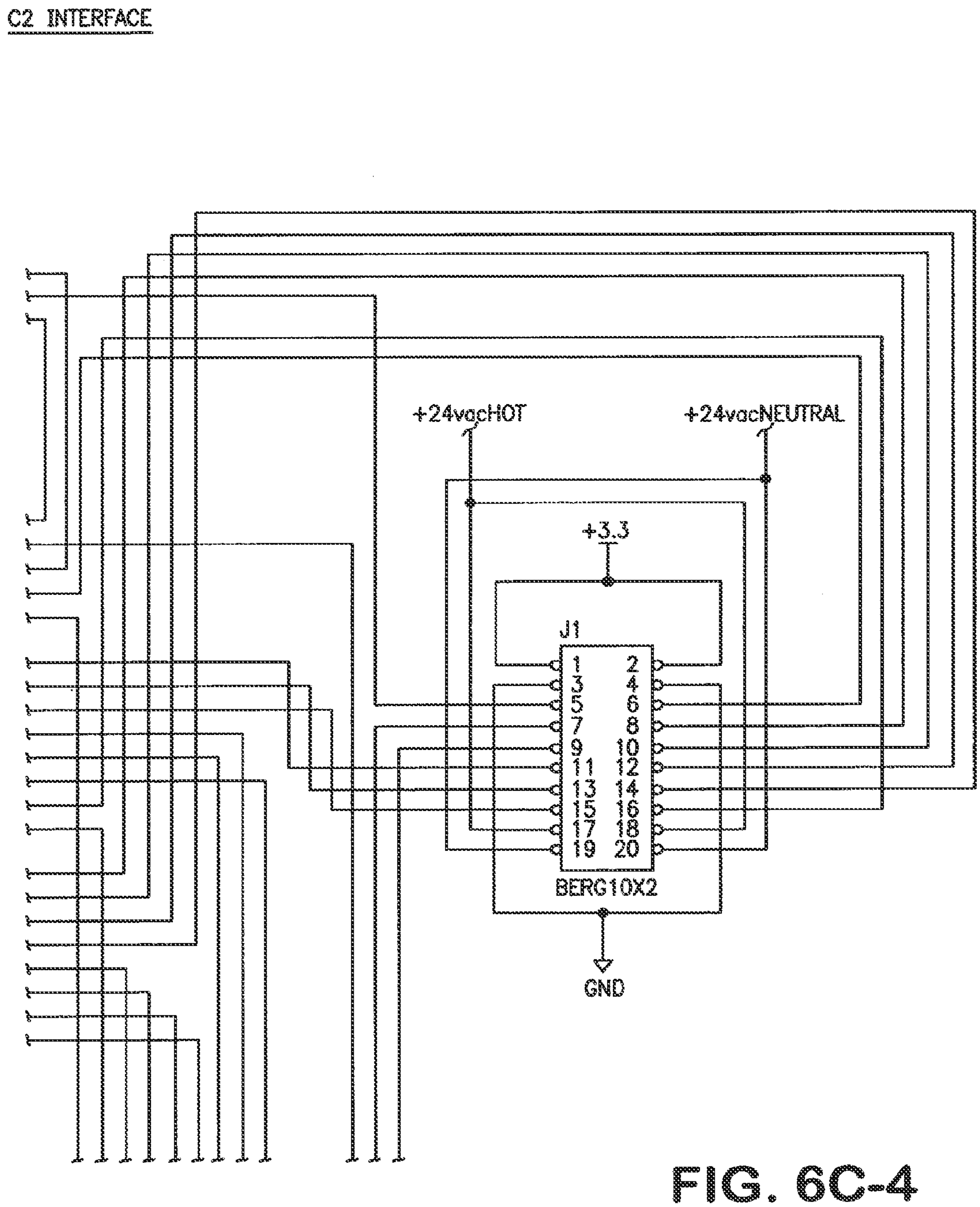
Figures 5, 6C:
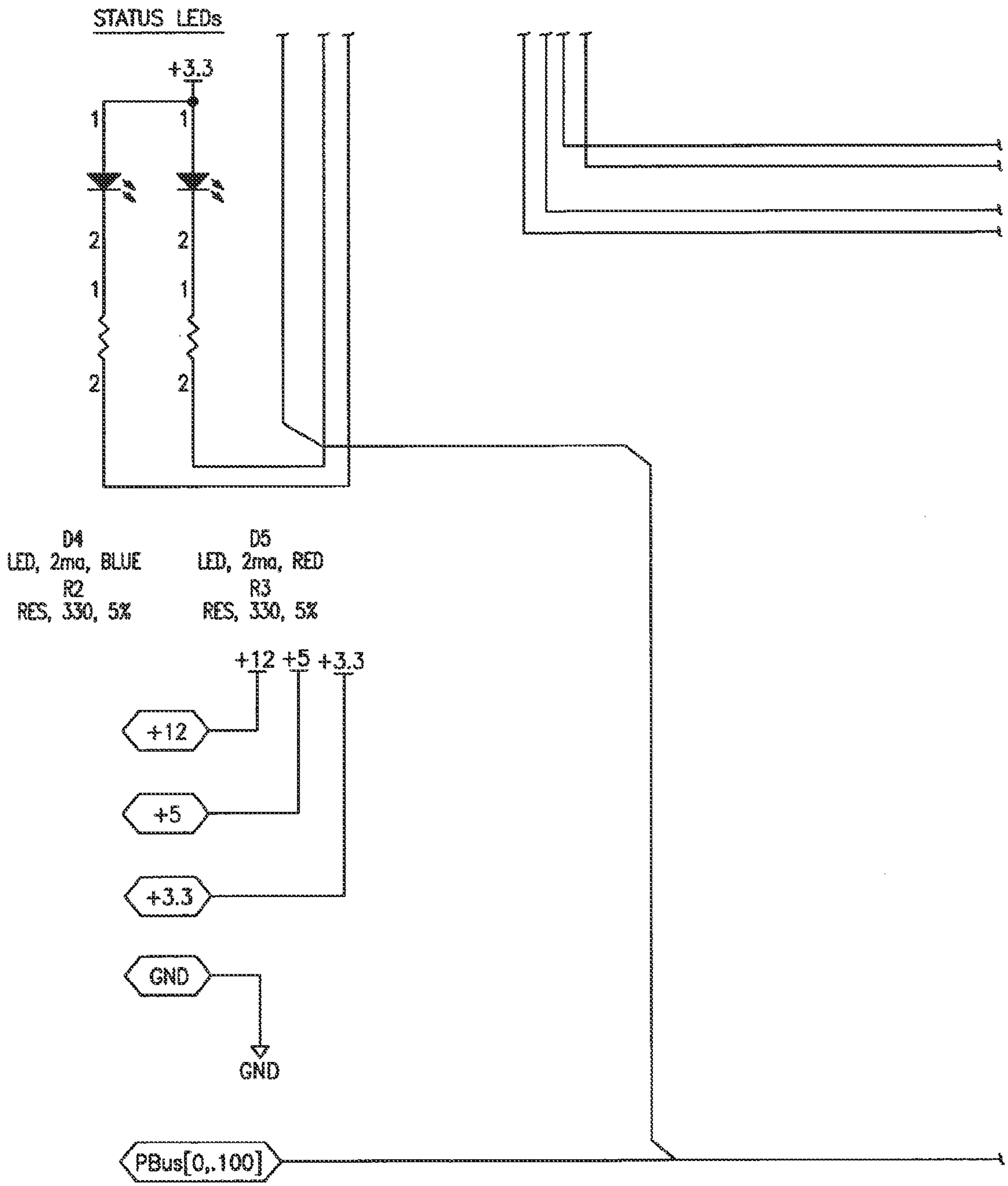
Figures 6, 6C:
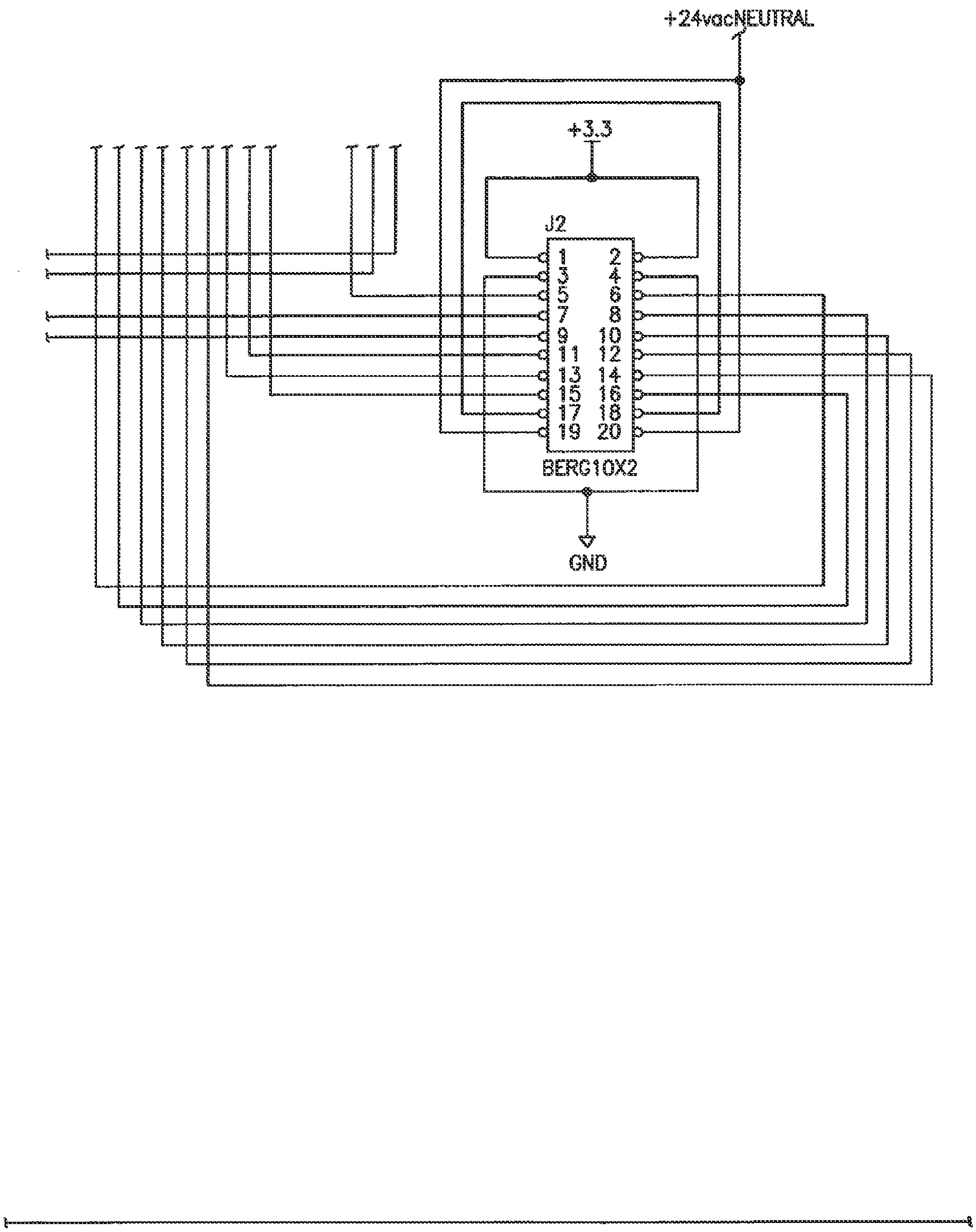
Figures 6, 6C, 7:
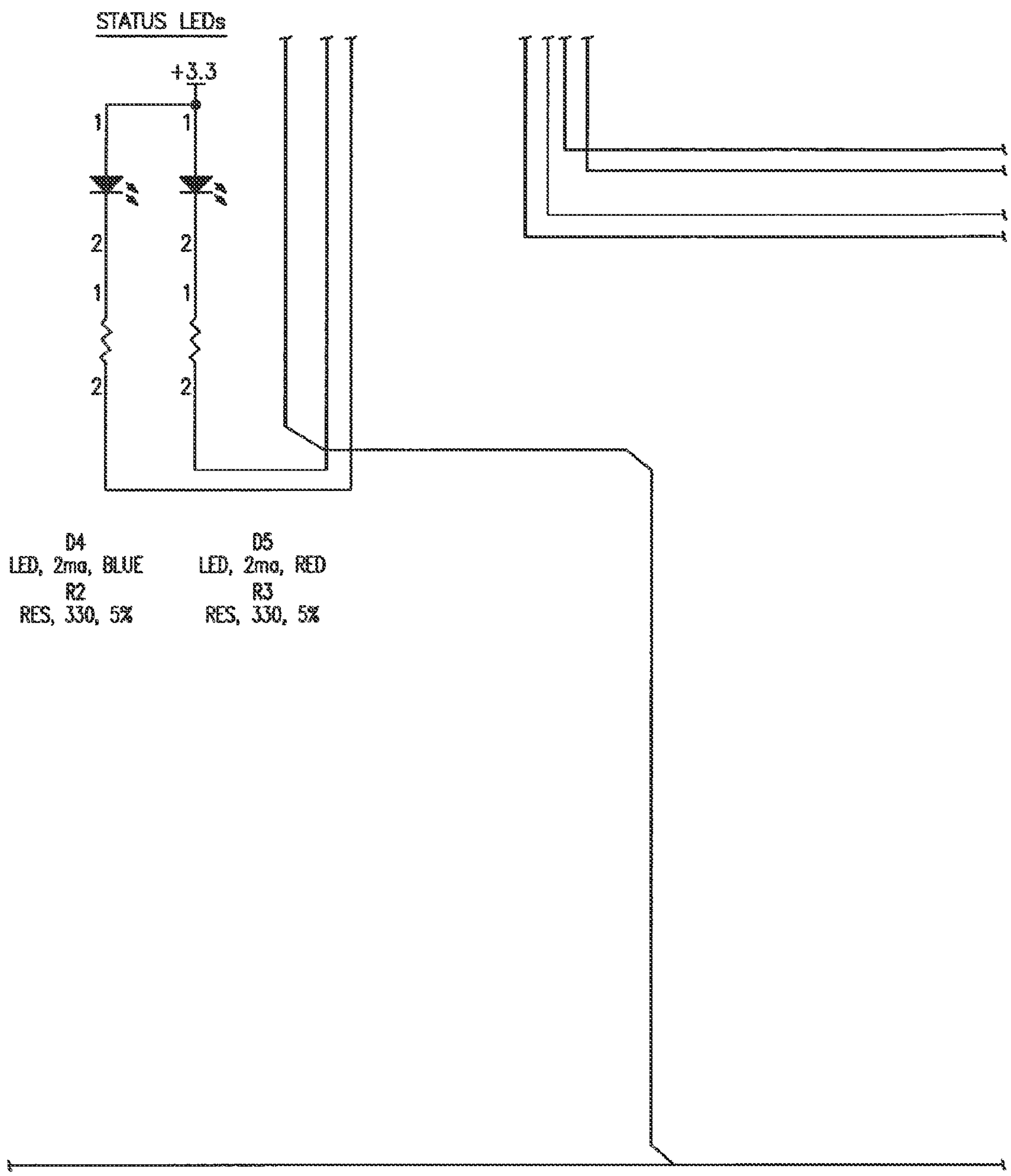
Figures 1, 6D:
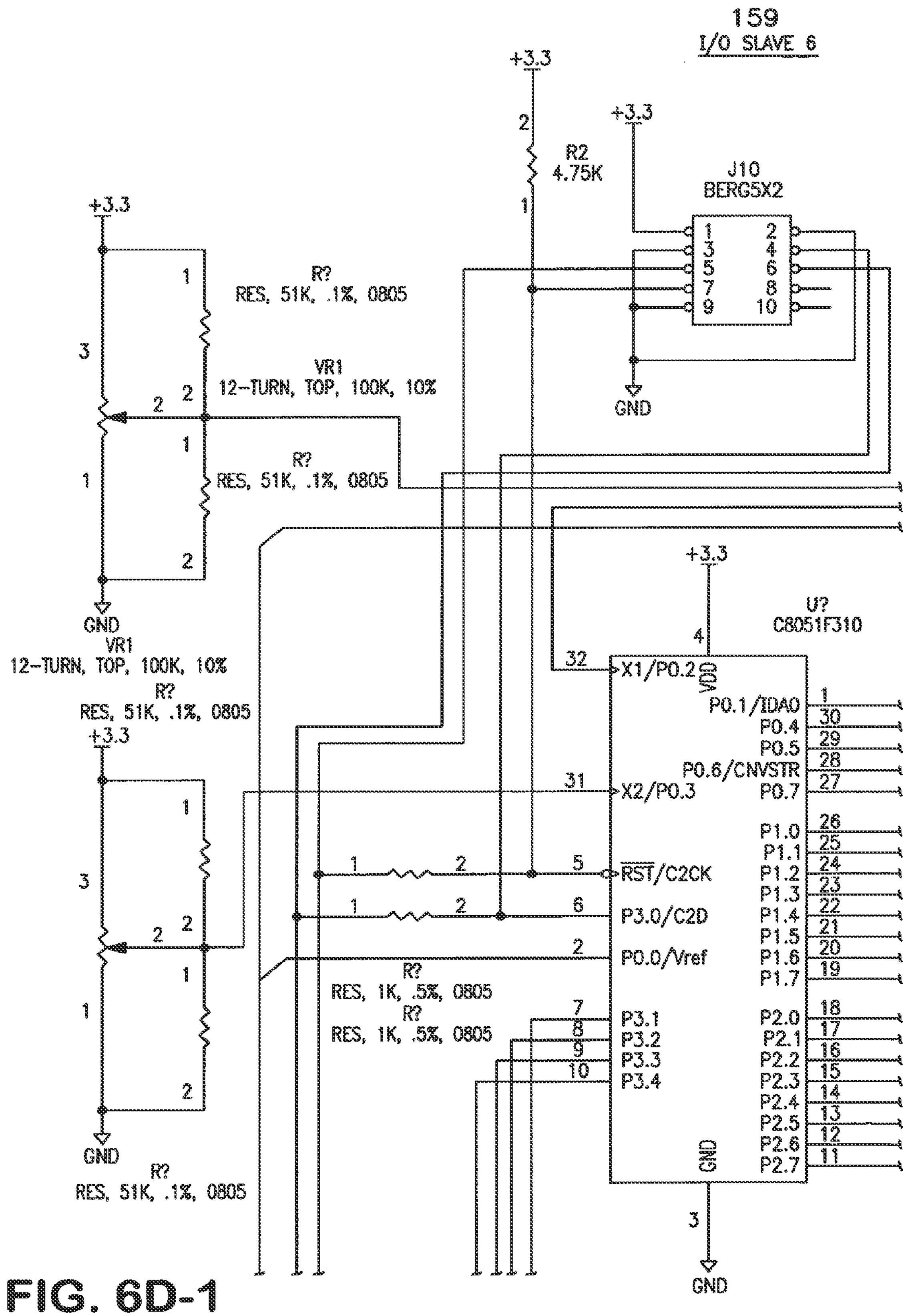
Figures 2, 6D:
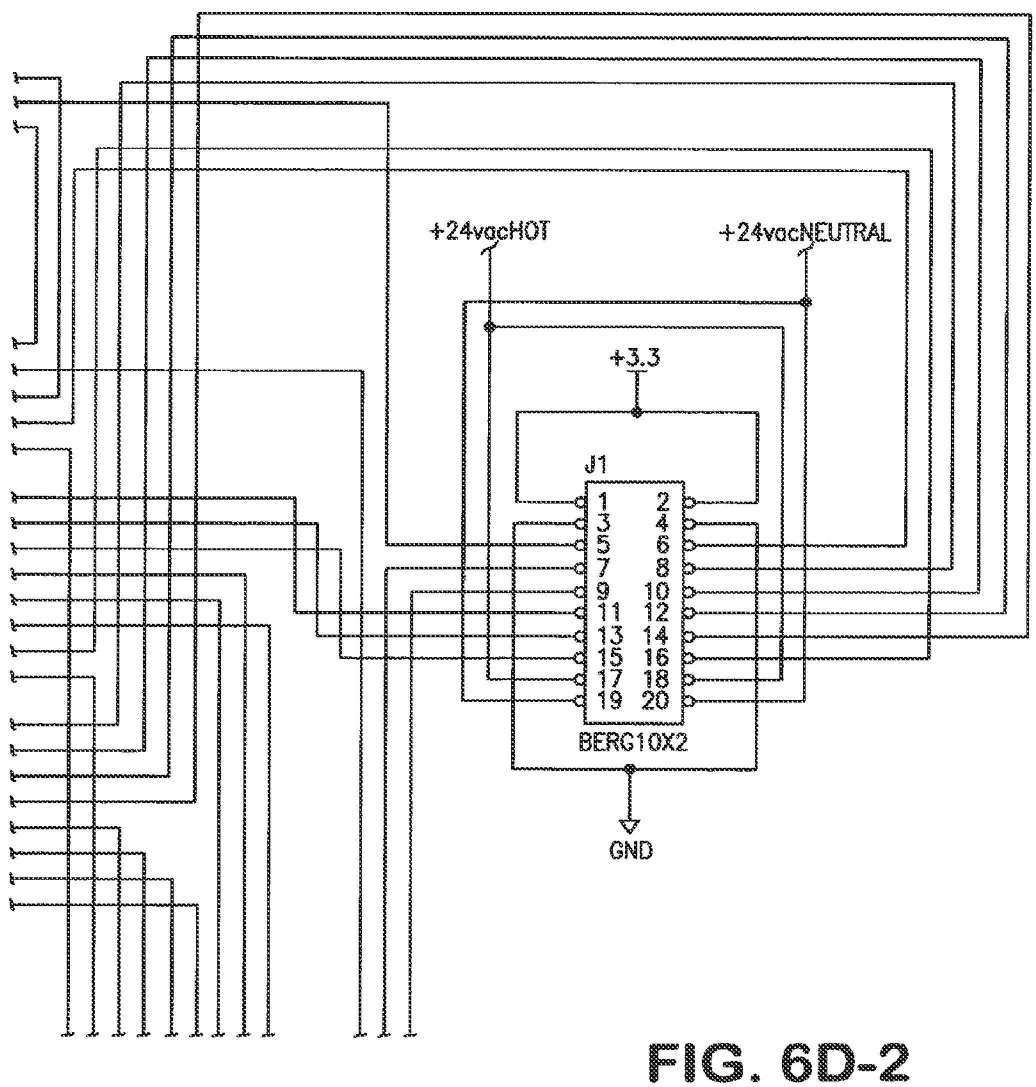
Figures 3, 6D:
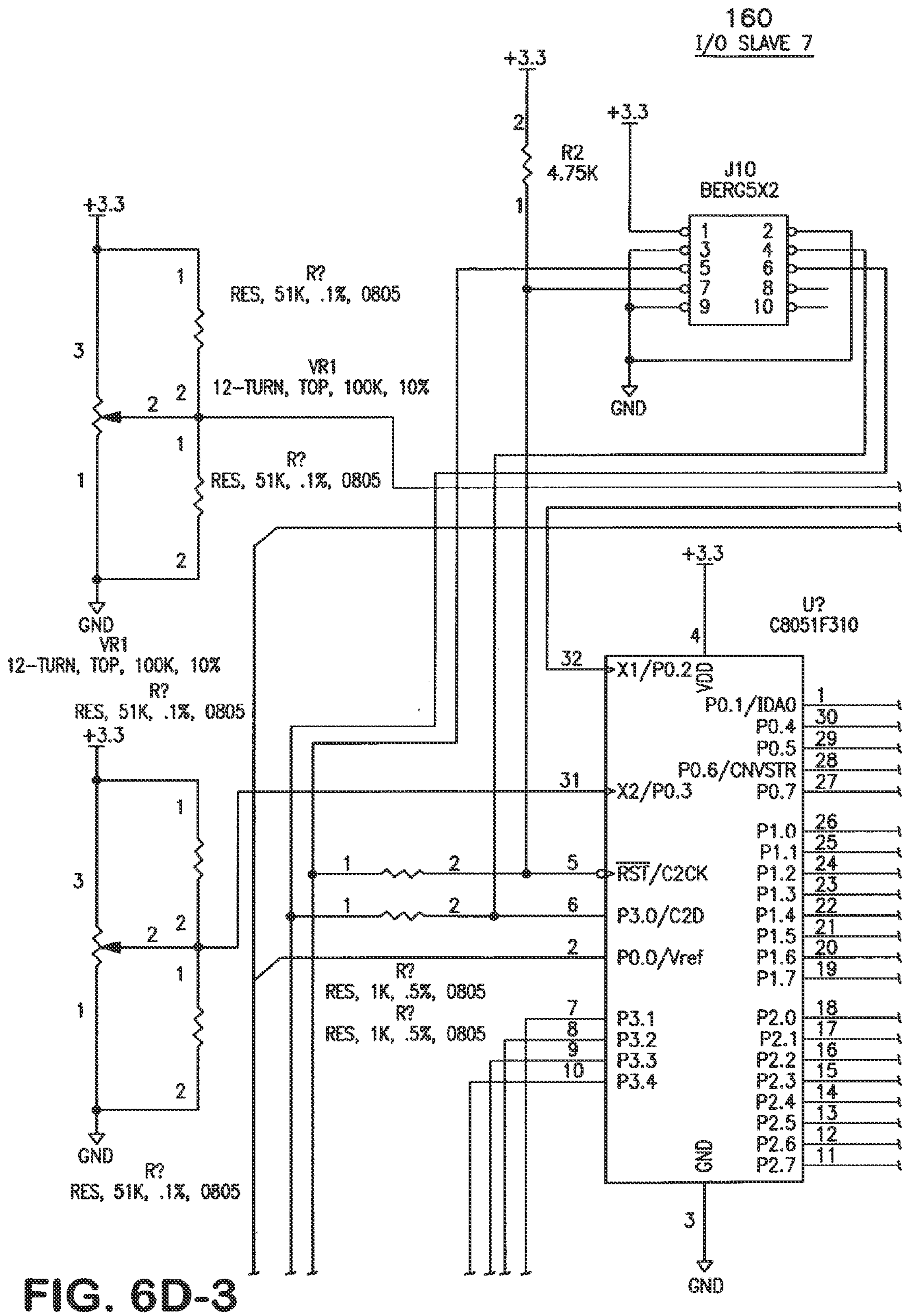
Figures 4, 6D:
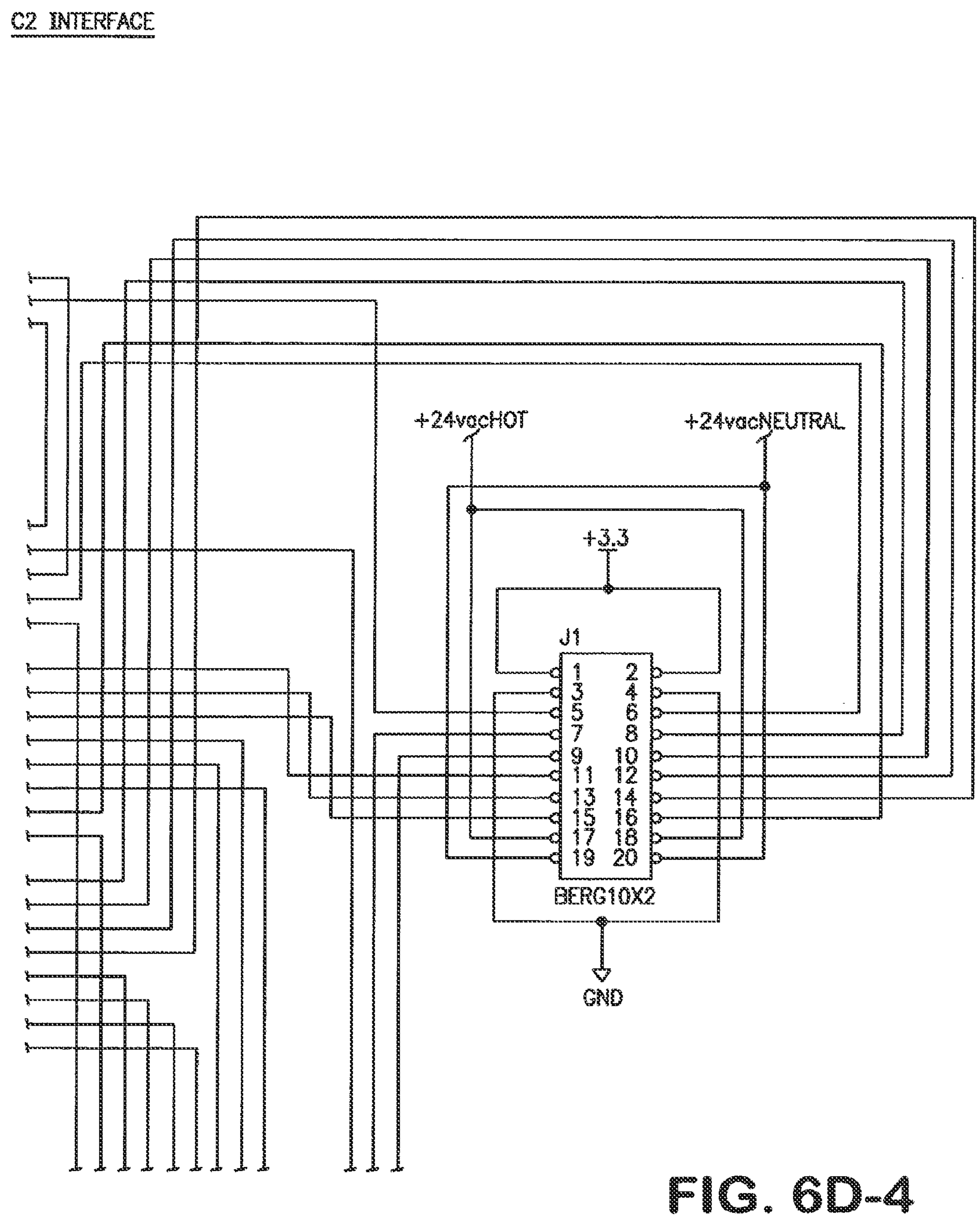
Figures 5, 6D:
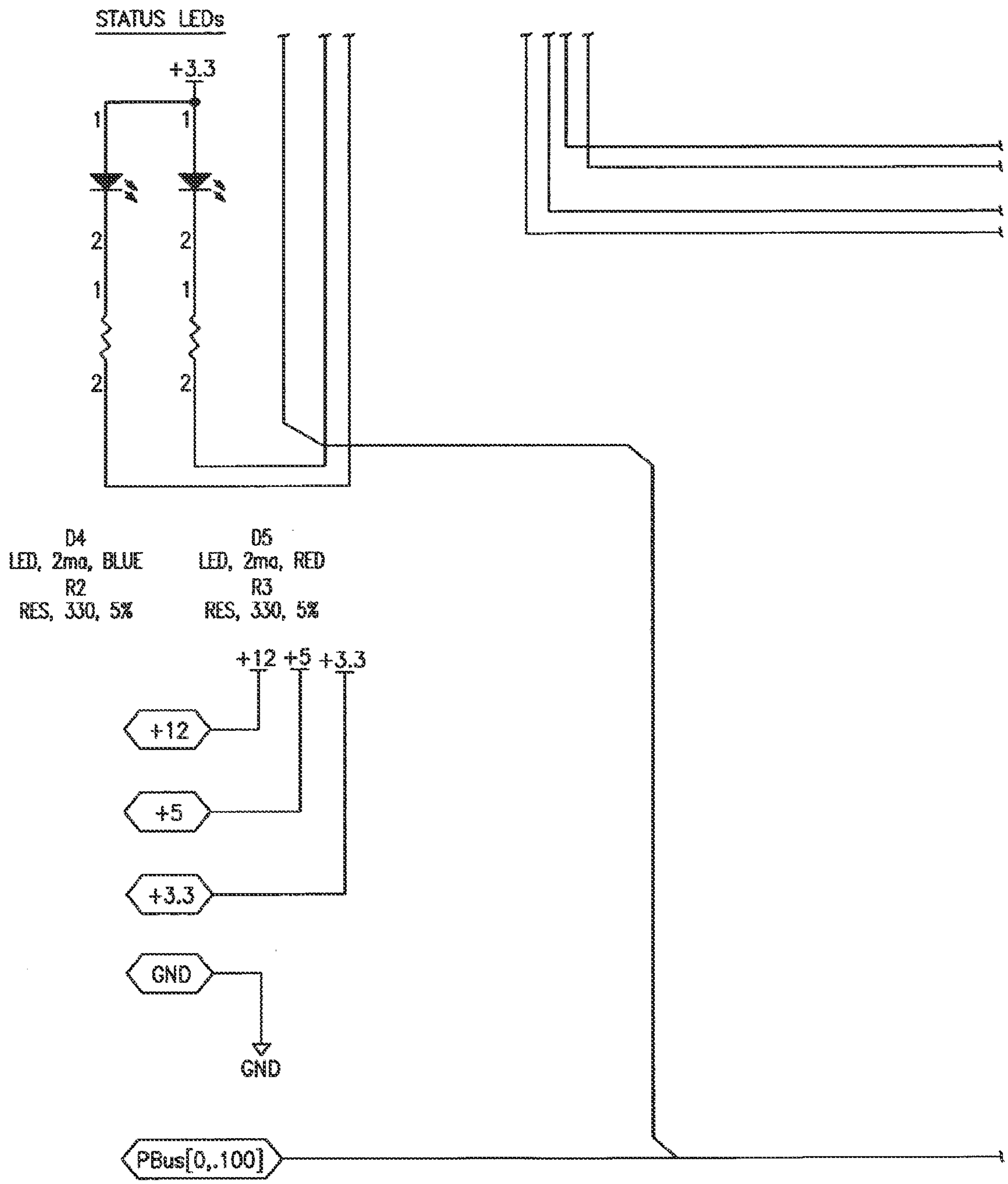
Figures 6, 6D:
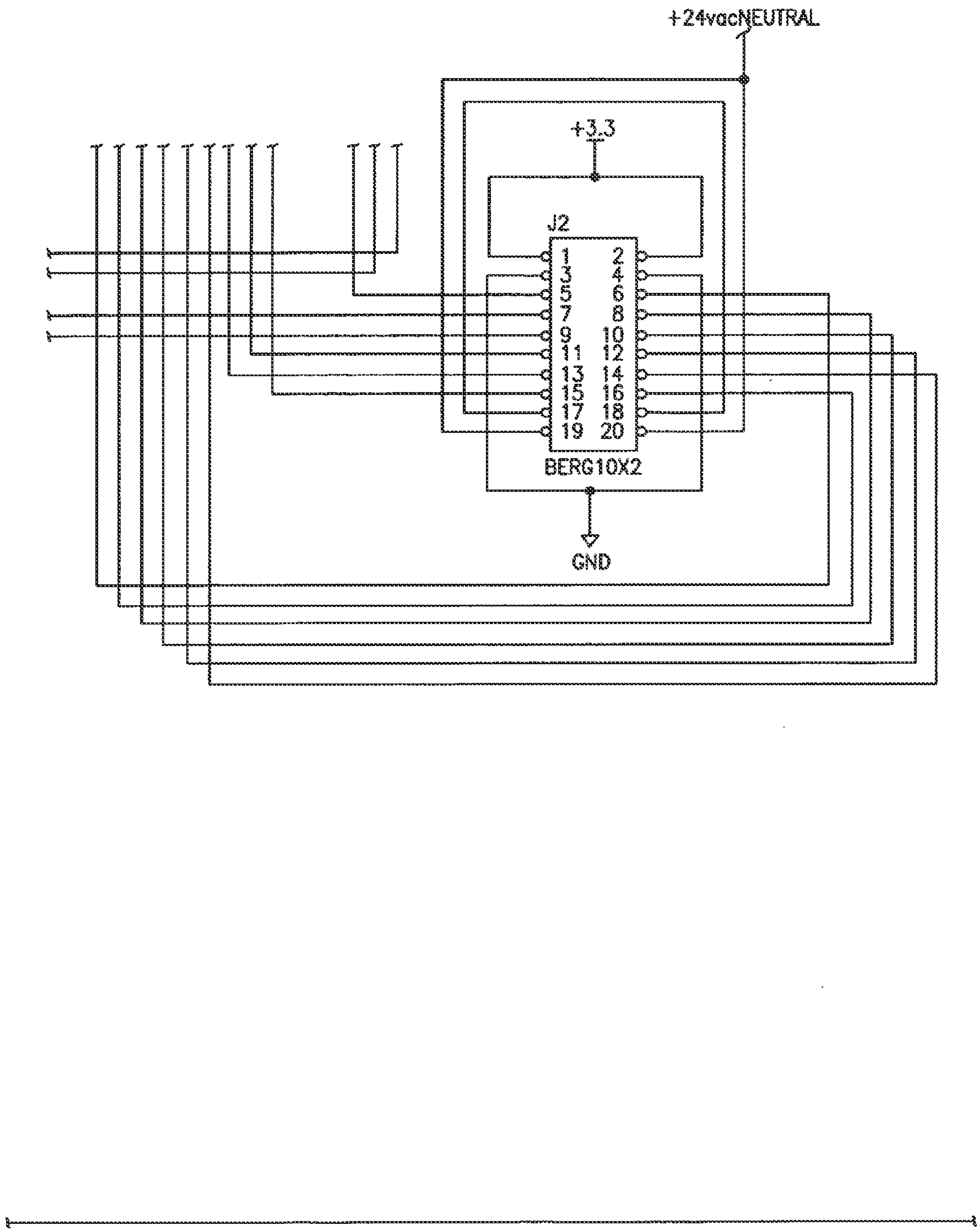
Figures 6, 6D, 7:
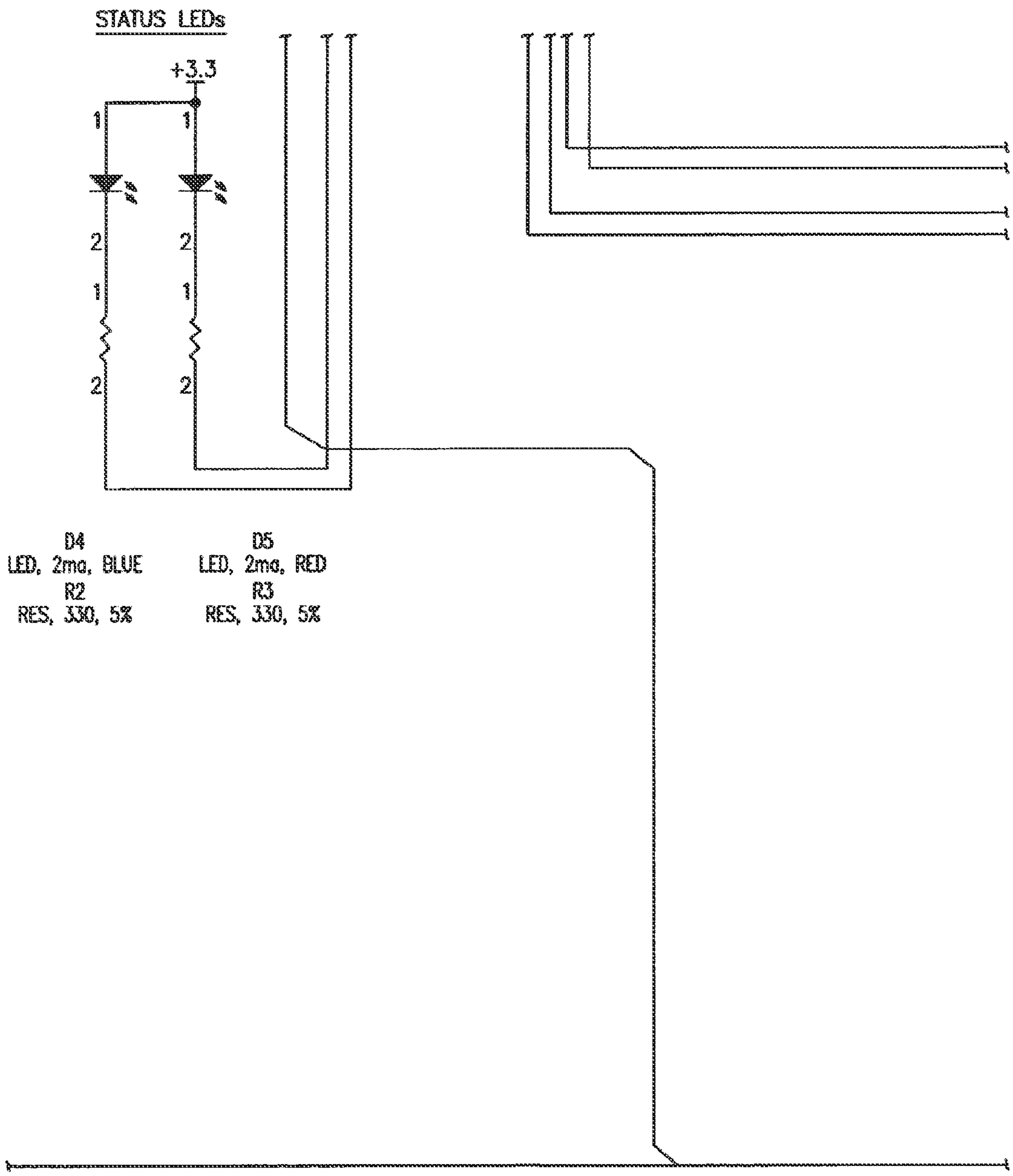
Figures 1, 7:
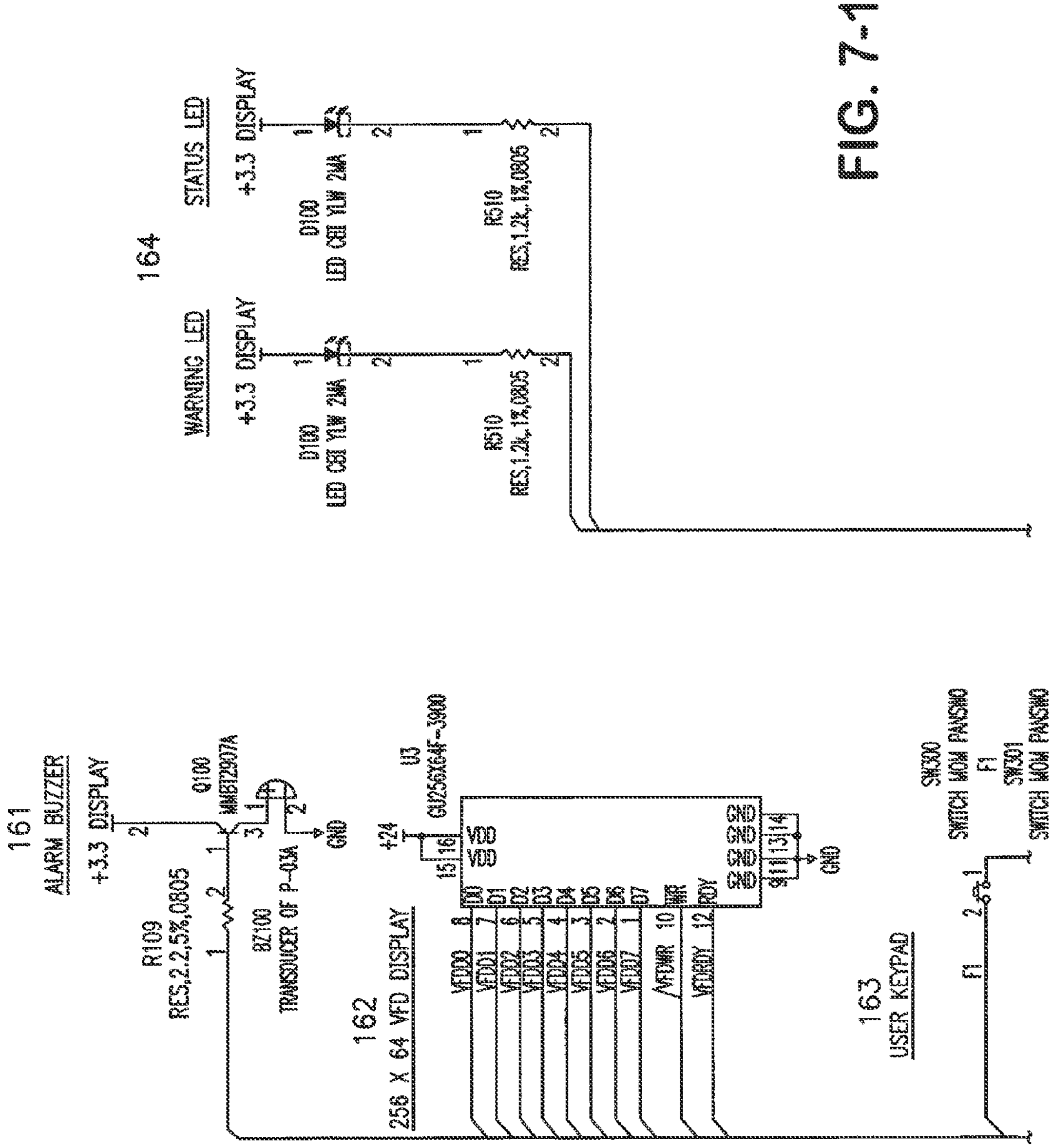
Figures 2, 7:
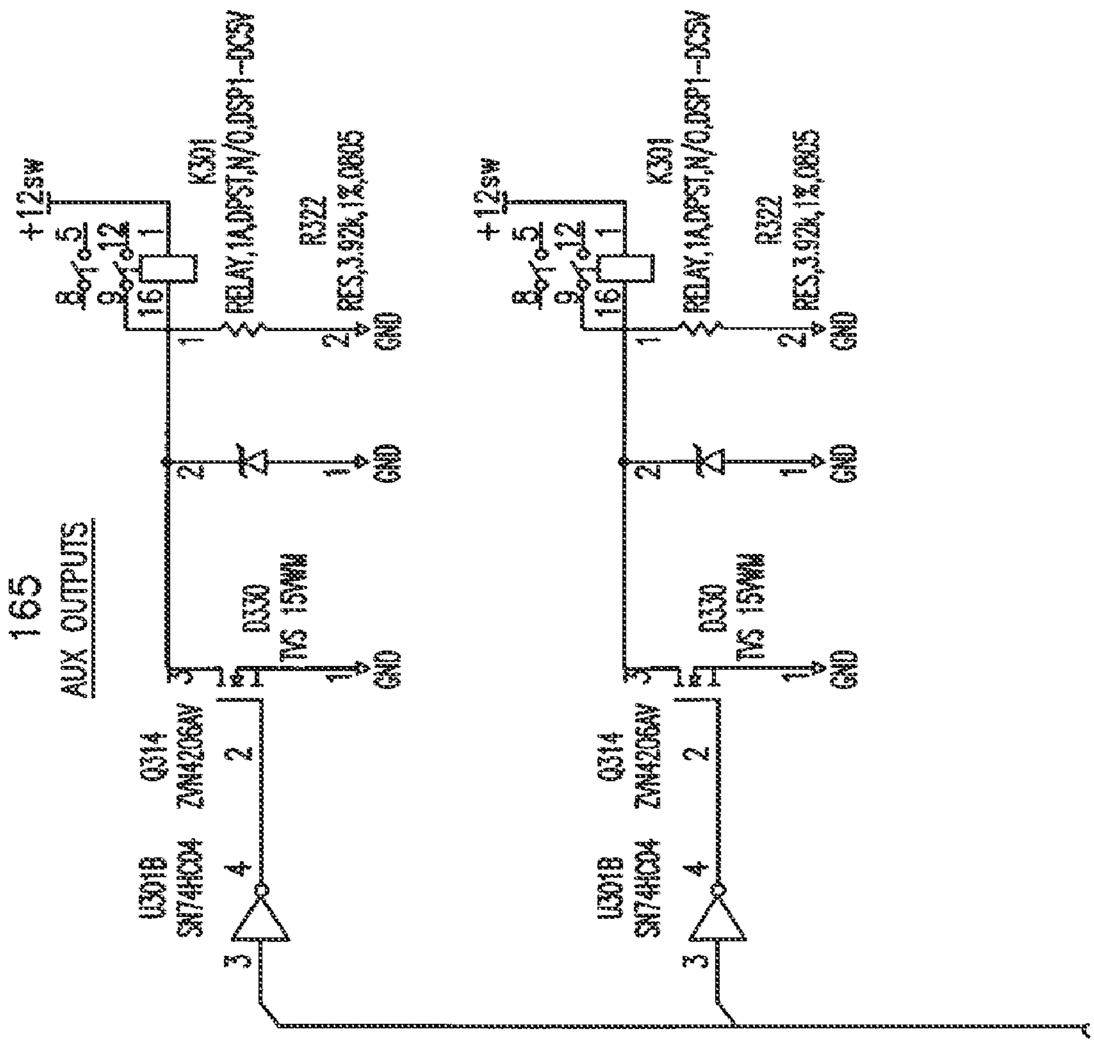
Figures 3, 7:
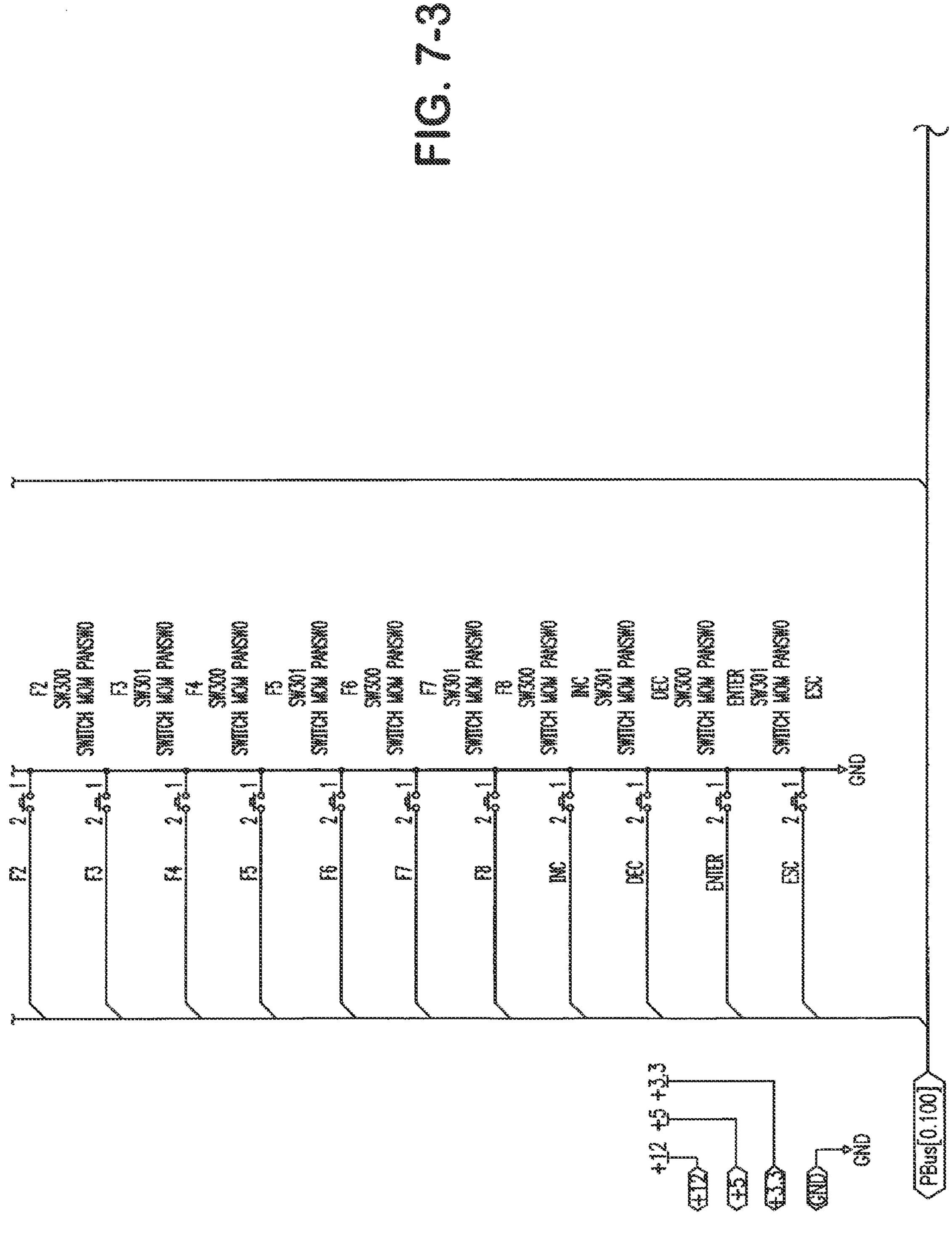
Figures 4, 7:
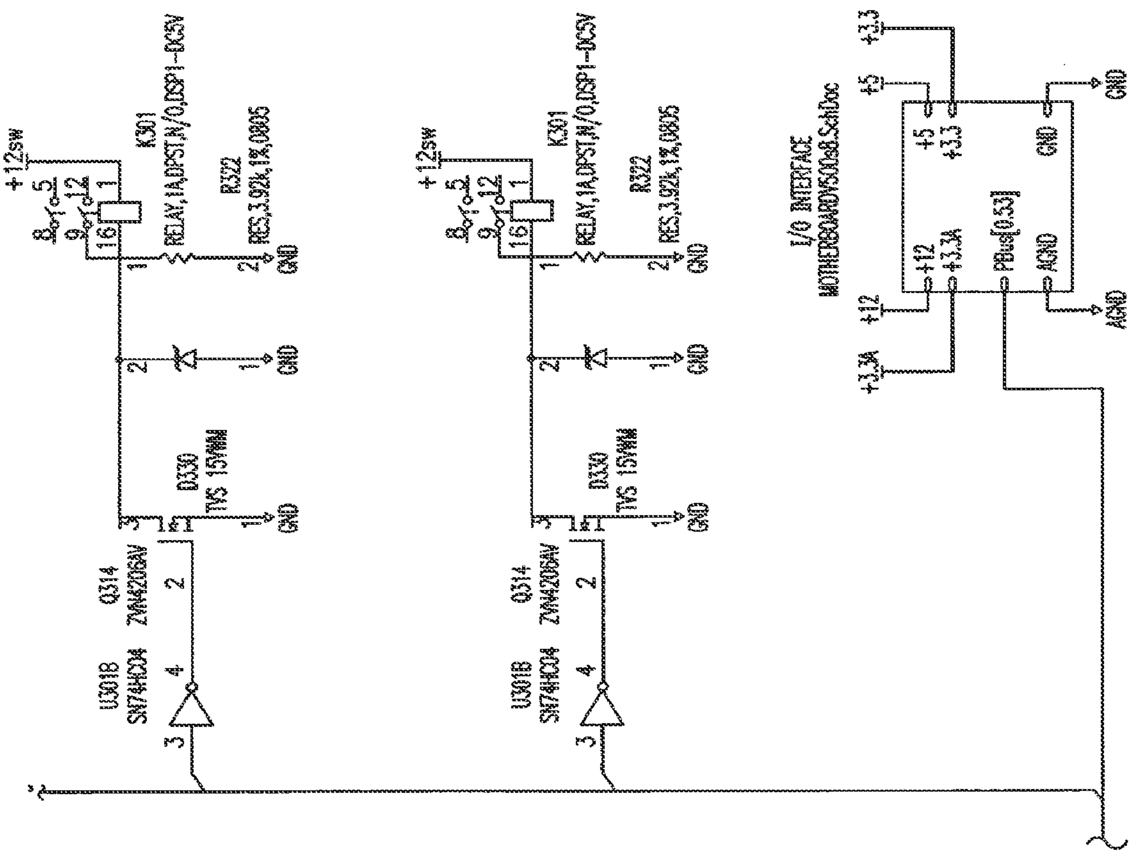
Figures 1, 8:
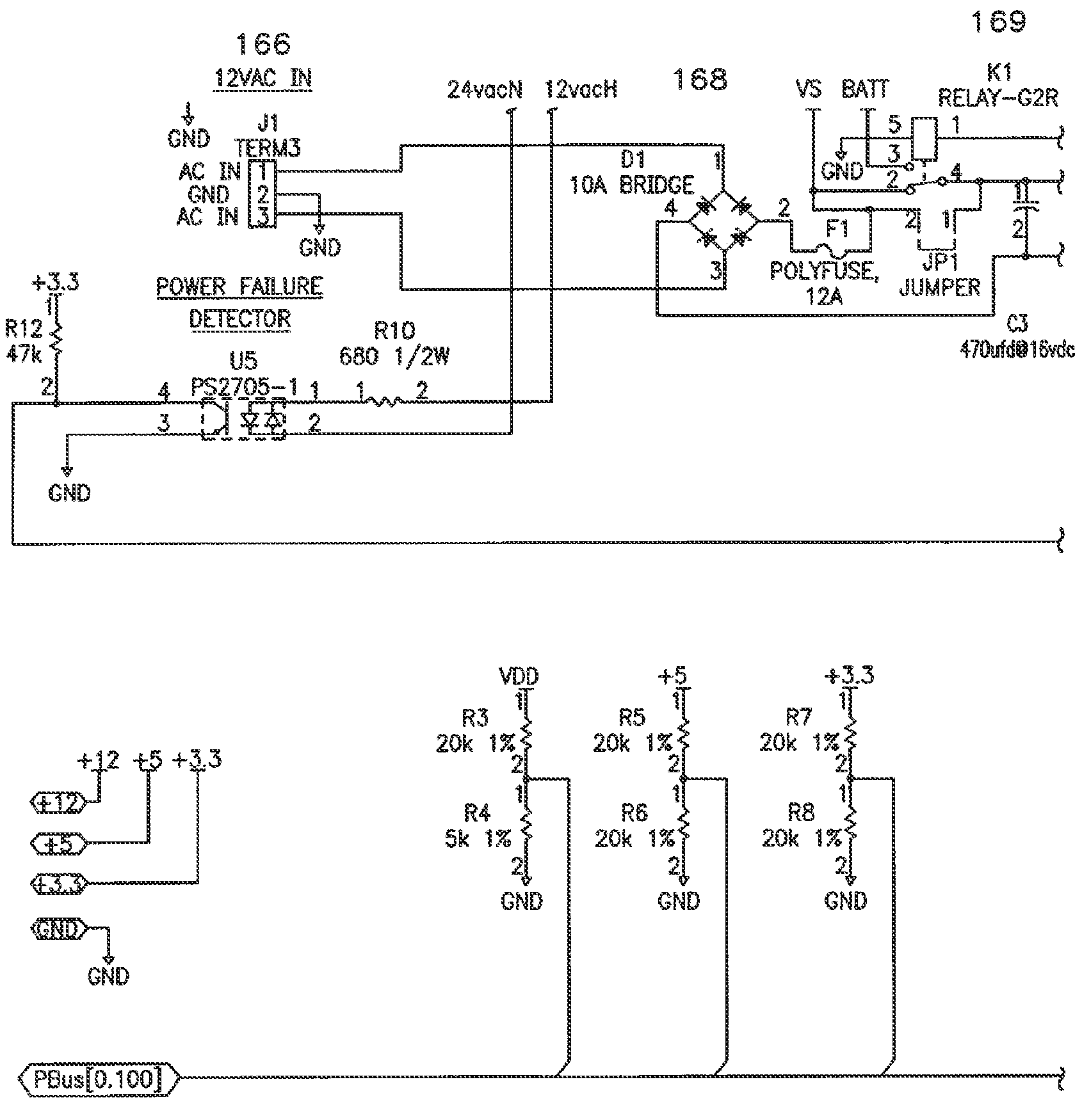
Figures 2, 8:
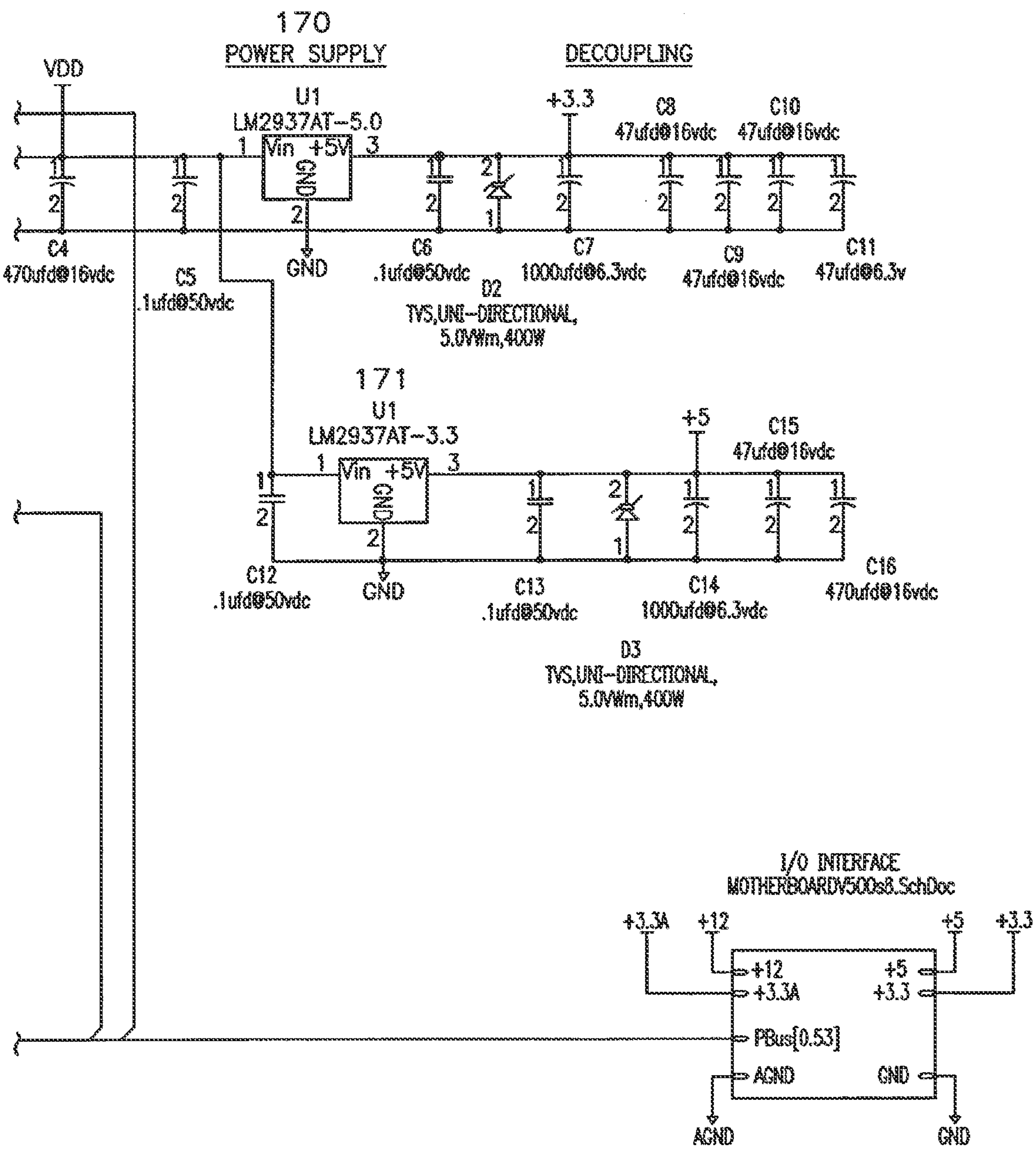

In FIGS. 7-1 through 7-4, a single buzzer 161 is provided on the motherboard. It provides an audible warning of an alarm condition. Four external alarm outputs 165 are available on the motherboard. Four external buzzers, bells, sirens or warning lights may be remotely located within the boundaries of an installation.

Two master status LEDs 164 are provided on the motherboard. They duplicate the functionality of the status and warning LEDs found on a stand-alone interface module. A blue status LED flashes during normal operation. A red warning LED flashes during an alarm condition.

The motherboard provides a user interface to allow its operation to be configured. A large blue 256 pixel by 64 pixels vacuum fluorescent display (VFD) 162 provides graphic information on the current status of the system. Twelve keys 163 form a keypad allowing the user to configure the system. Alternatively or additionally, the motherboard can be configured via an onboard USB port.

In FIGS. 8-1 and 8-2, 24 vac power is supplied to the motherboard by a screw terminal 166. A full wave bridge rectifier 168 converts the 24 vac to 24 vdc. A relay circuit 169 is used by the master to switch the input voltage supply from the 24 vac to 24 vdc battery backup. Two voltage regulators, one 5 vdc and the other 3.3 vdc, form a power supply to power the circuitry found on the motherboard. This includes power for 16 interface modules. The master monitors the power supply voltages 172 for normal operation. Voltages outside allowable tolerances generate an alarm condition.

Figures 1, 9:
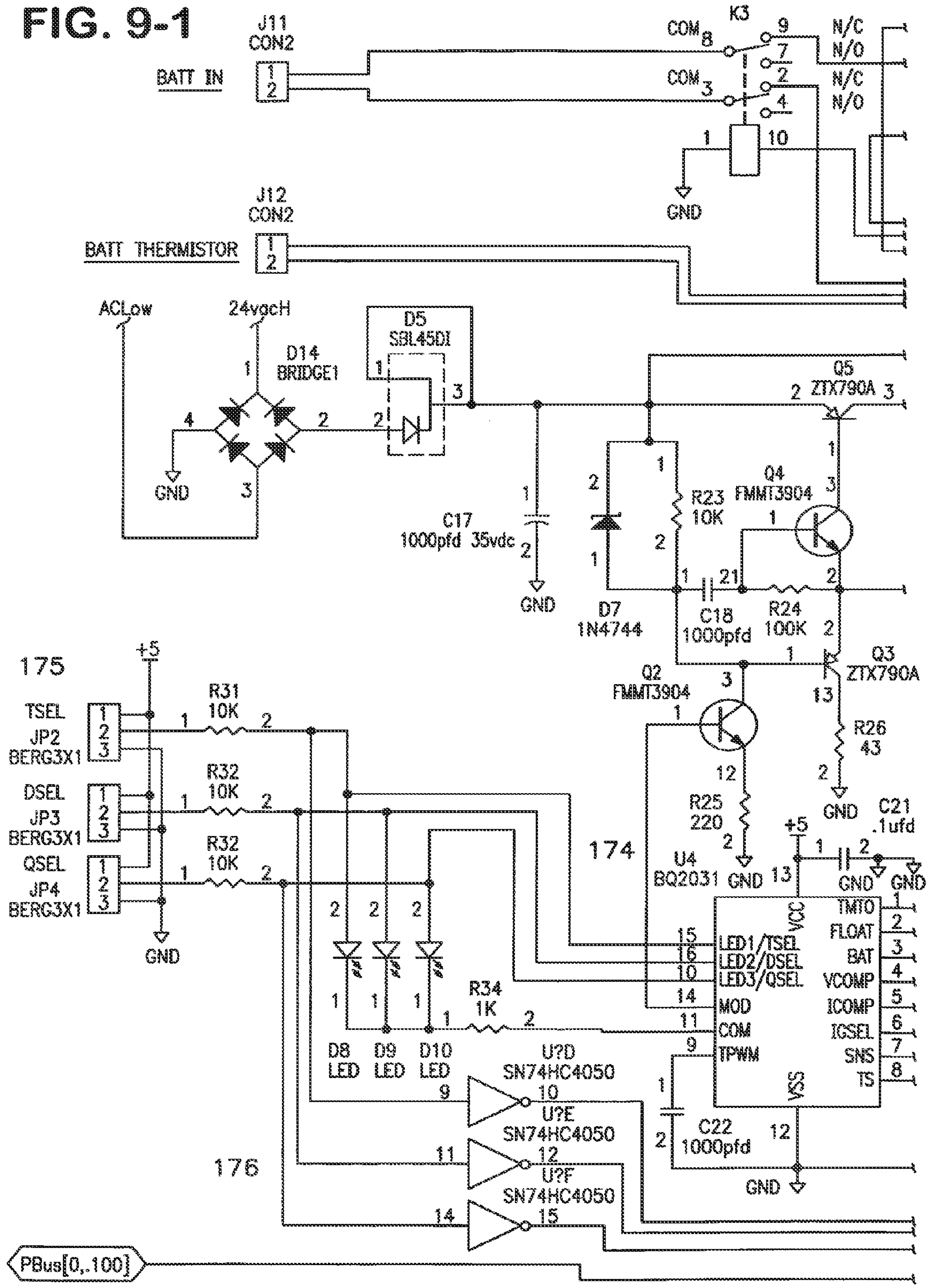
Figures 2, 9:
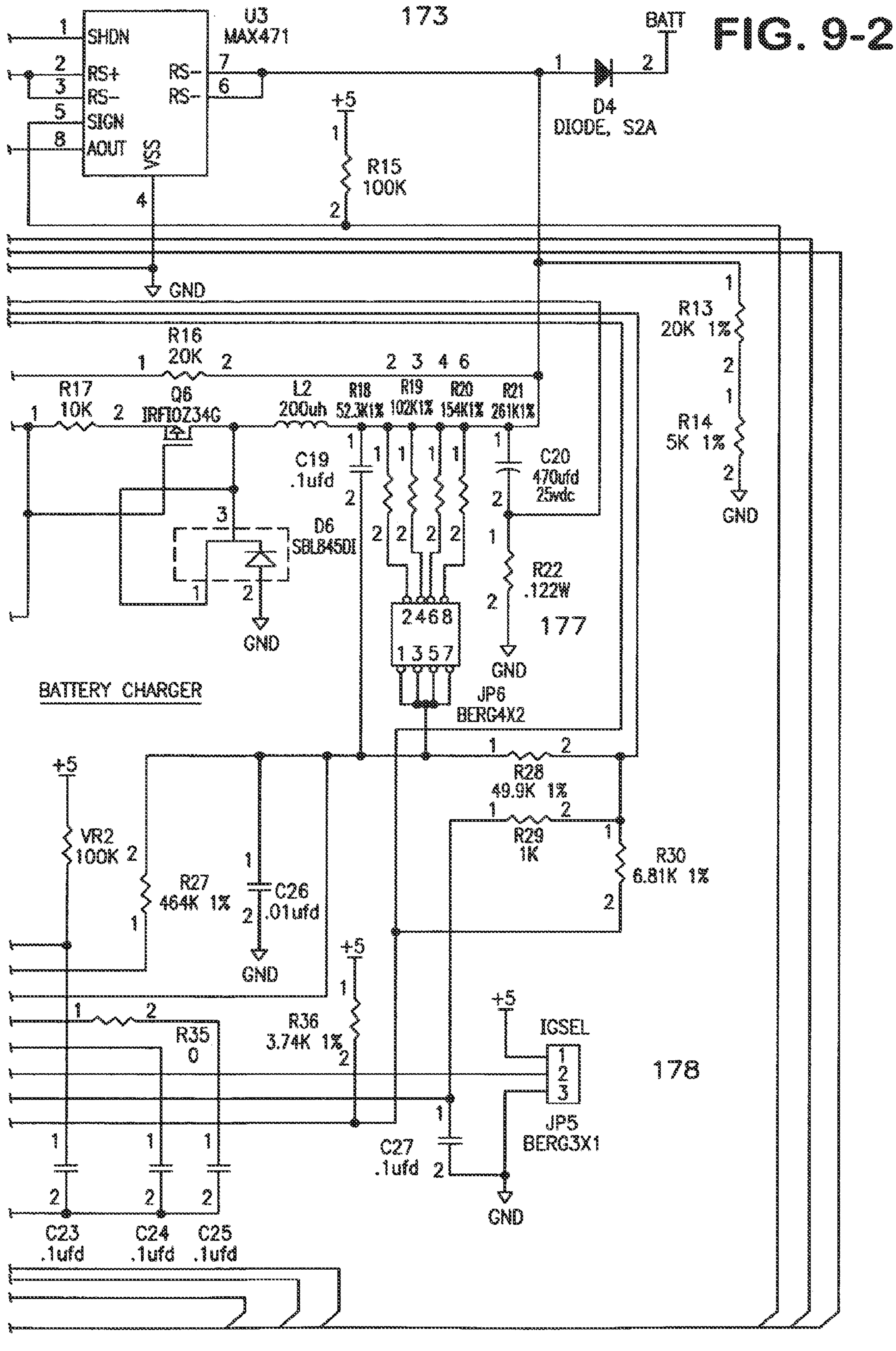
Figure 10:
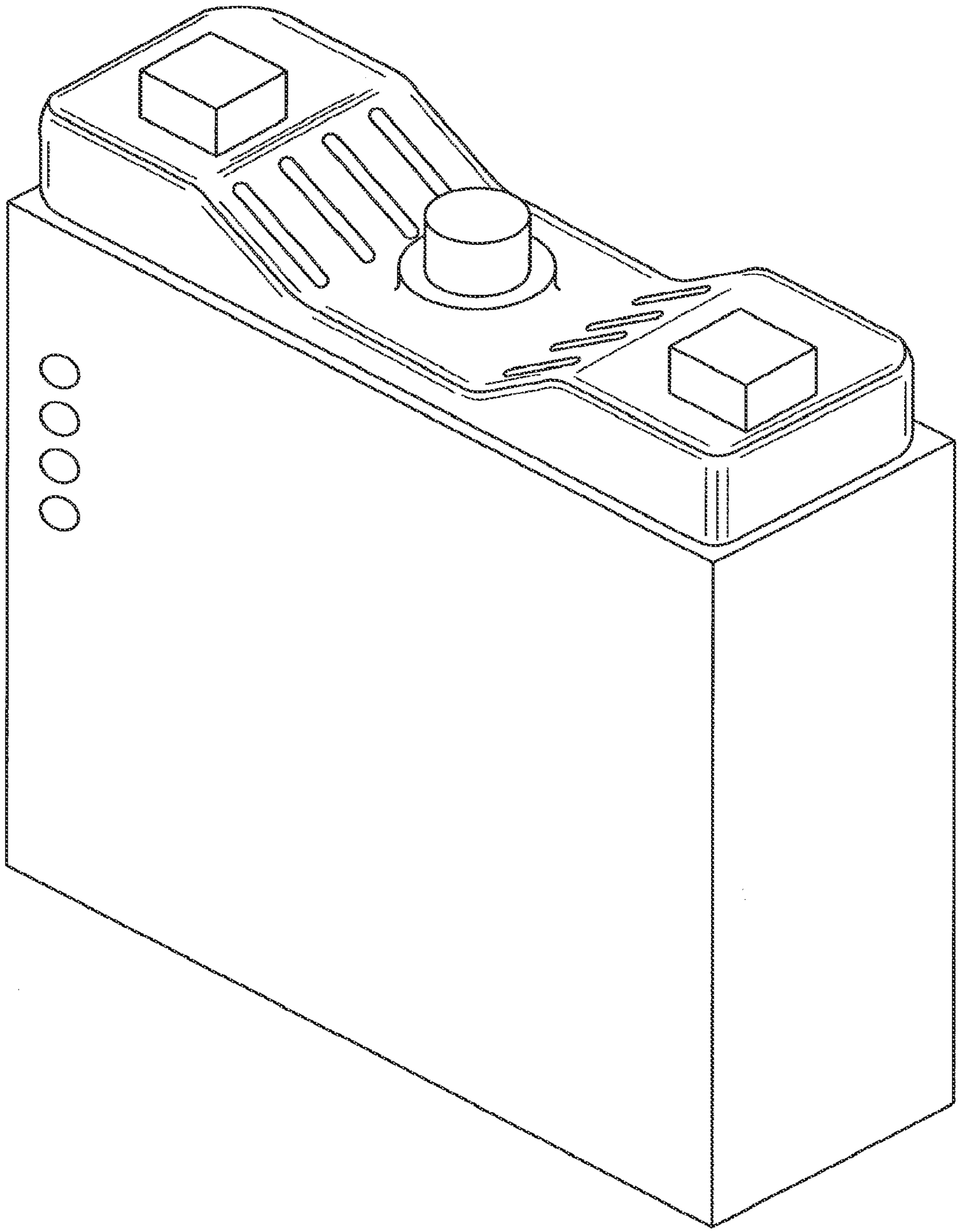
FIG. 10 shows the interface module "breaker" housing for the circuitry of FIGS. 4-1 through 4-6, providing breaker circuitry that monitors and controls water consumption in accordance with the invention.
Figure 11:
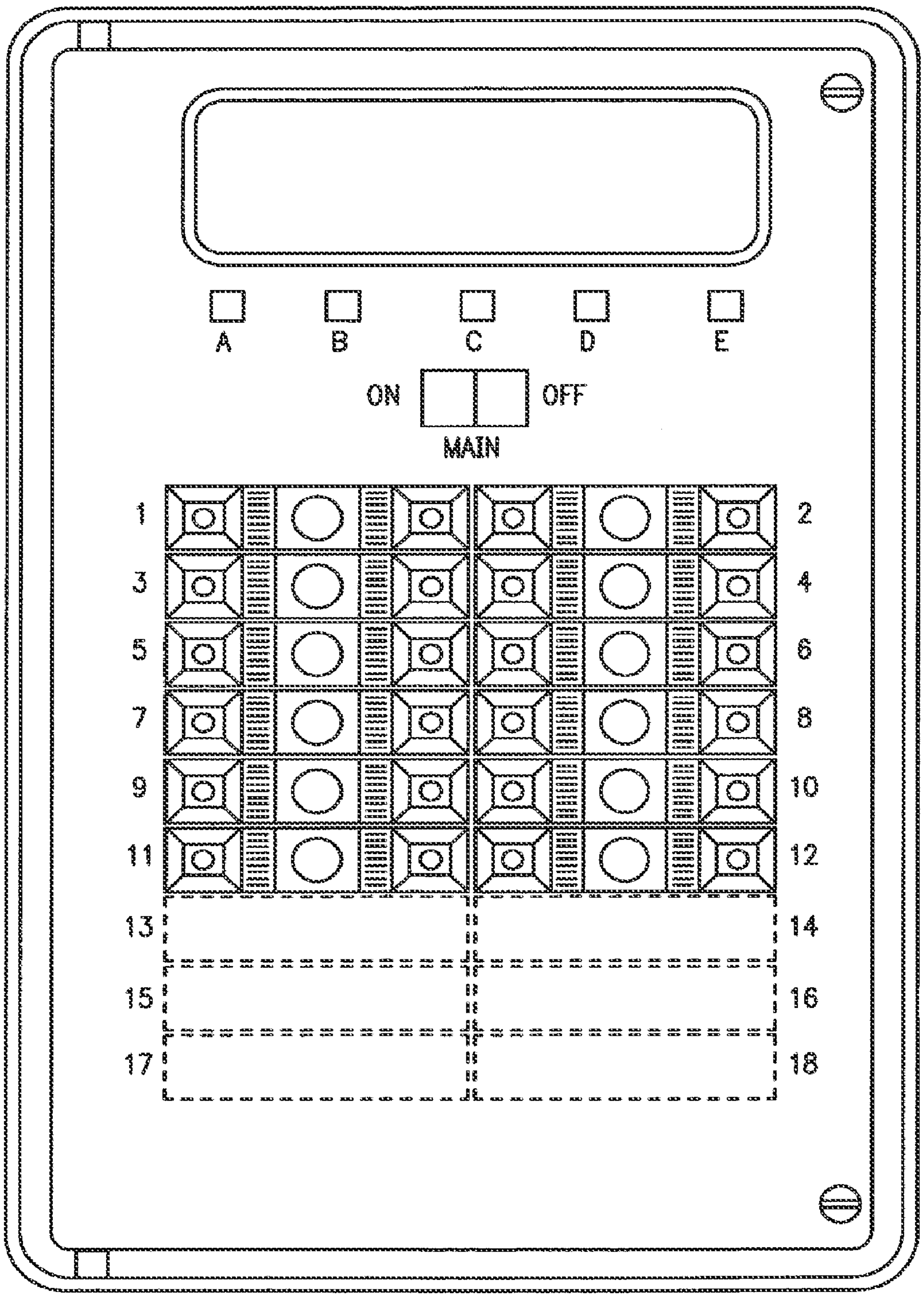
FIG. 11 shows the panel housing for the motherboard of FIGS. 5-1 through 5-6 to receive a plurality of interface modules.

In FIGS. 9-1 and 9-2, the motherboard provides 24 vdc and/or 24 vac battery backup for the complete system. This is provided by two 12 vdc sealed lead-acid 30 amp/hr batteries connected in series (24 vdc). An onboard charger 174 maintains a charge on the batteries. The master microcontroller monitors and controls the operation of the charger. This includes monitoring the charge/discharge current 173, the battery voltage 172, and the current status of the charge cycle 176. The charger can be configured for a number of different battery configurations 177, 178.

In other embodiments of the invention, systems herein can be configured to automatically cycle valves on a periodic (e.g., scheduled) and/or ad hoc basis. N.O. valves typically are cycled from on to off and back to on, whereas N.C. valves are cycled from off to on and back to off. For instance, at timed intervals (e.g., once every thirty days, once every fourteen days, or on the fifth and nineteenth day of a calendar month), the water supply to tank toilets can be automatically shut off and then turned back on. Such cycling can act as a test to determine whether valves in the system are working properly. Moreover, by counteracting corrosion and other problems associated with infrequent use of valves, such cycling can significantly extend the life of valves in the system, reducing the need for maintenance, repairs, and replacement and associated costs and down-time.

In a particular embodiment, the system maintains a clock and calendar and a schedule, such as via a control program. The program operates all or selected valves in accordance with the logic of the program and consistent with any configured settings by which a user specifies valves to be cycled, cycling intervals, cycling calendar days, cycling clock times, etc. It is to be appreciated that the program can take any of a number of forms consistent with the needs of a user and within the framework of the system. In an example implementation, the valves are cycled at a fixed interval of approximately thirty days. The cycling operations for a given valve can be performed as quickly as possible to ensure that normal flow functions are only interrupted for a minimal time period. Additionally, cycling can be programmed to occur during times of low system usage (e.g., during non-business hours, hours in which residents are at work or asleep, etc.).

In other embodiments, a given valve is not cycled if its associated liquid sensor valves are closed, thus indicating a fluid leak. Alternatively or additionally, selected valves in the system, including the main shut off valve and/or the valves connected to respective interface modules, can be cycled individually one at a time.

If desired, an interface module can be configured such that, responsive to a control signal, the interface module causes the control valve to cycle from an original position (e.g., closed) to its complementary position (e.g., open) and back to the original position. As such, the control program described above need only transmit one control signal to the interface module at periodic or ad hoc times when cycling is required.

Moreover, in other embodiments, an interface module can be used in a stand-alone manner at, for example, an appliance. The interface module has an onboard timer to cycle a valve on and off (or vice versa) at a predetermined interval and/or responsive to a user input. Such an interface module can have wide application in settings where installation of a system is deemed impracticable, unnecessary, or too costly, such as in older dwellings or commercial buildings.

Figure 12:
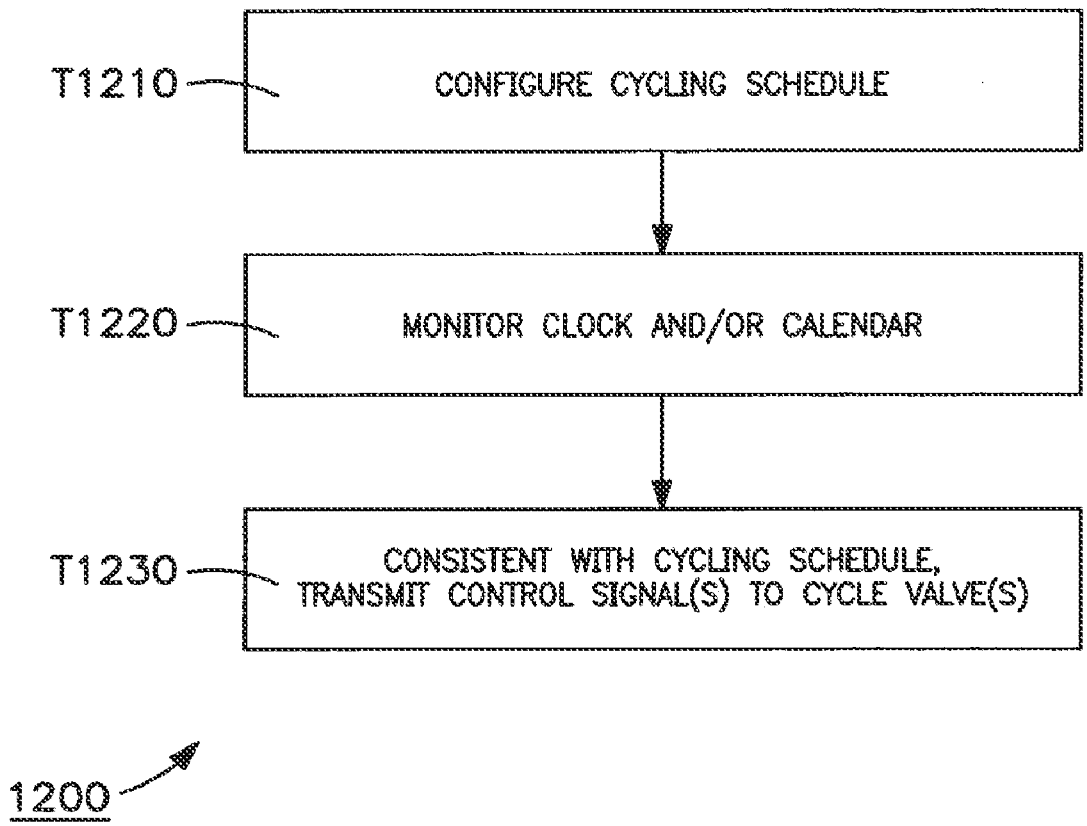
FIG. 12 is a flow diagram of a process according to an embodiment of the invention.

FIG. 12 shows a flow diagram of a process 1200 according to an embodiment of the invention. The process 1200 can be implemented, for example, in connection with the embodiments described above. Task T1210 configures a cycling schedule that defines when and/or which valve(s) are to be cycled. The configuration can include receiving input from a user, such as via a mouse. Task T1220 monitors a clock and/or calendar, which can be maintained by component(s) of a system. Task T1230 transmits control signal(s) to cycle valve(s) consistent with the configured cycling schedule.

In other embodiments of the invention, systems herein can be configured to provide additional safeguards. For instance, the system can monitor the status of multiple interface modules (breakers). If more than a predetermined number of breakers in the system are triggered within a predetermined period, then an alarm condition is registered, the main fluid supply valve is optionally shut off, and one more notifications (e.g., e-mail, voice, pager, fax, visual, audible, etc.) are optionally sent or activated.

In an example configuration, if more than four breakers are triggered simultaneously or within five minutes of each other, the system overrides the respective breakers and shuts off the main water supply valve, sending an alarm e-mail to parties that need to be notified. The master panel (see, e.g., FIGS. 10 and 43) indicates which breakers have been triggered by flashing associated red LEDs.

Figure 13:
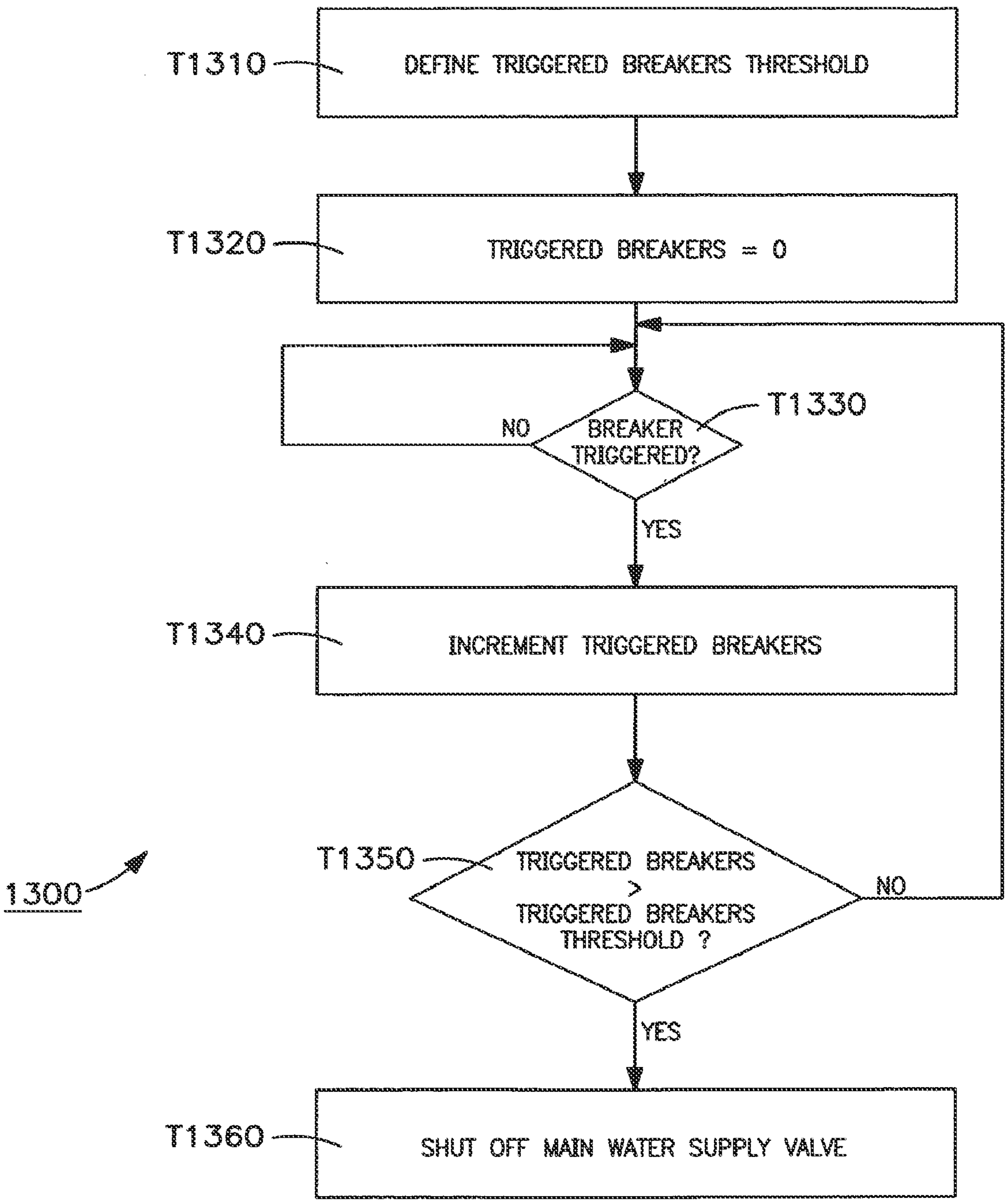
FIG. 13 is a flow diagram of a process according to an embodiment of the invention.

FIG. 13 shows a flow diagram of a process 1300 according to an embodiment of the invention. The process 1300 can be implemented, for example, in connection with the embodiments described above or below. Task T1310 defines a triggered breakers threshold, which can be a variable or static number that defines a maximum acceptable number of triggered breakers. Task T1320 initializes a triggered breakers counter to 0. Task T1330 determines whether a breaker has been triggered. If not, task T1330 is repeated. If a breaker has been triggered, the triggered breakers counter is incremented by task T1340. Task T1350 then determines whether the triggered breakers counter exceeds the triggered breakers threshold. If not, the process returns to task T1330. If so, task T1360 shuts off the main water supply valve associated with the system. It is to be appreciated that the logic of the process 1300 can be implemented in various ways, and that the process 1300 can be modified to include timing logic (e.g., a watchdog timer) that considers whether a predetermined number of breakers have been triggered within a predetermined period.

In another embodiment, remote interface modules only interface with a sensor, but are not interfaced with a control valve. If a remote interface module is tripped (i.e., a problem condition is sensed), then the main controller shuts off the main water supply of the system.

Figures 1, 14:
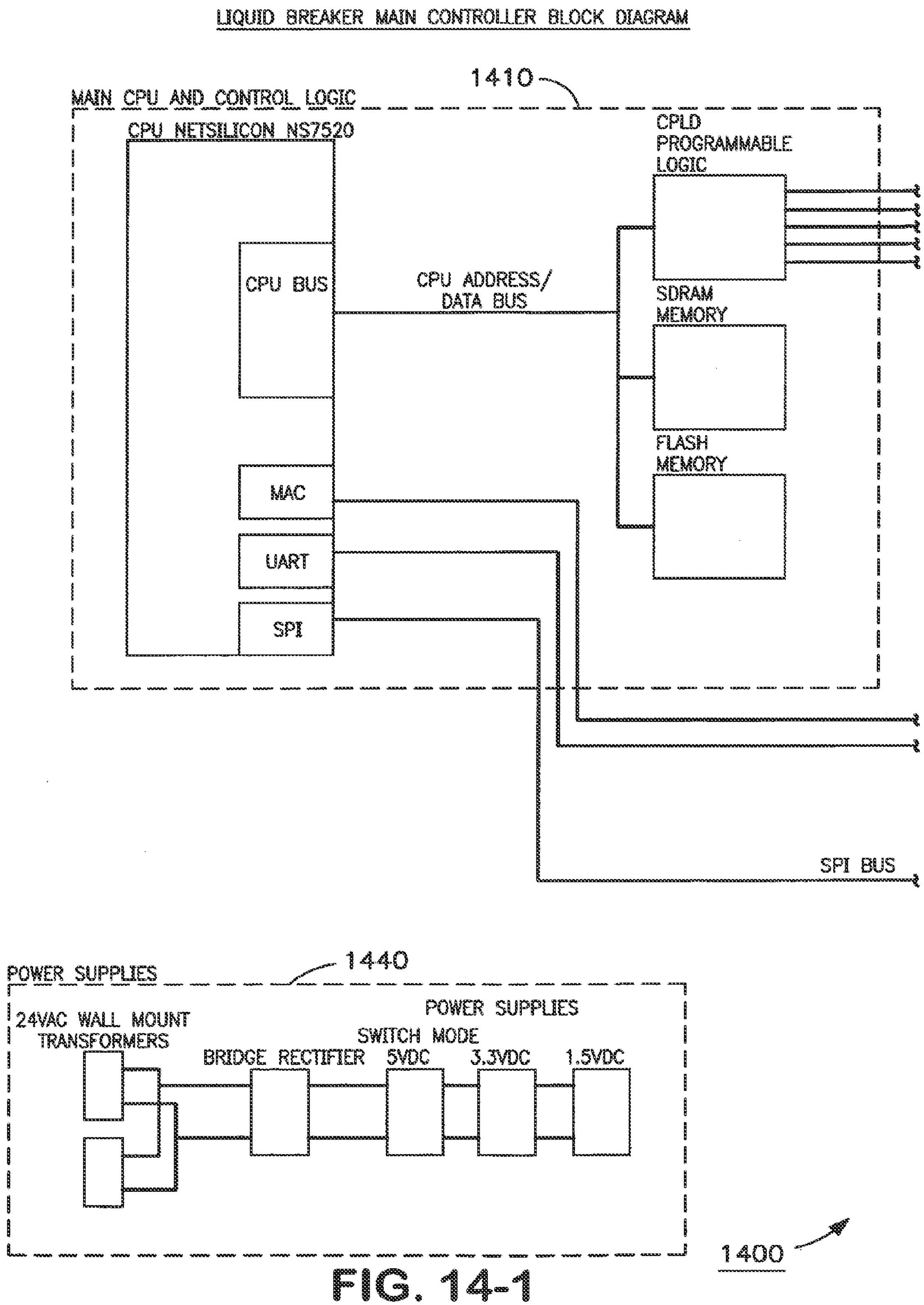
Figures 2, 14:
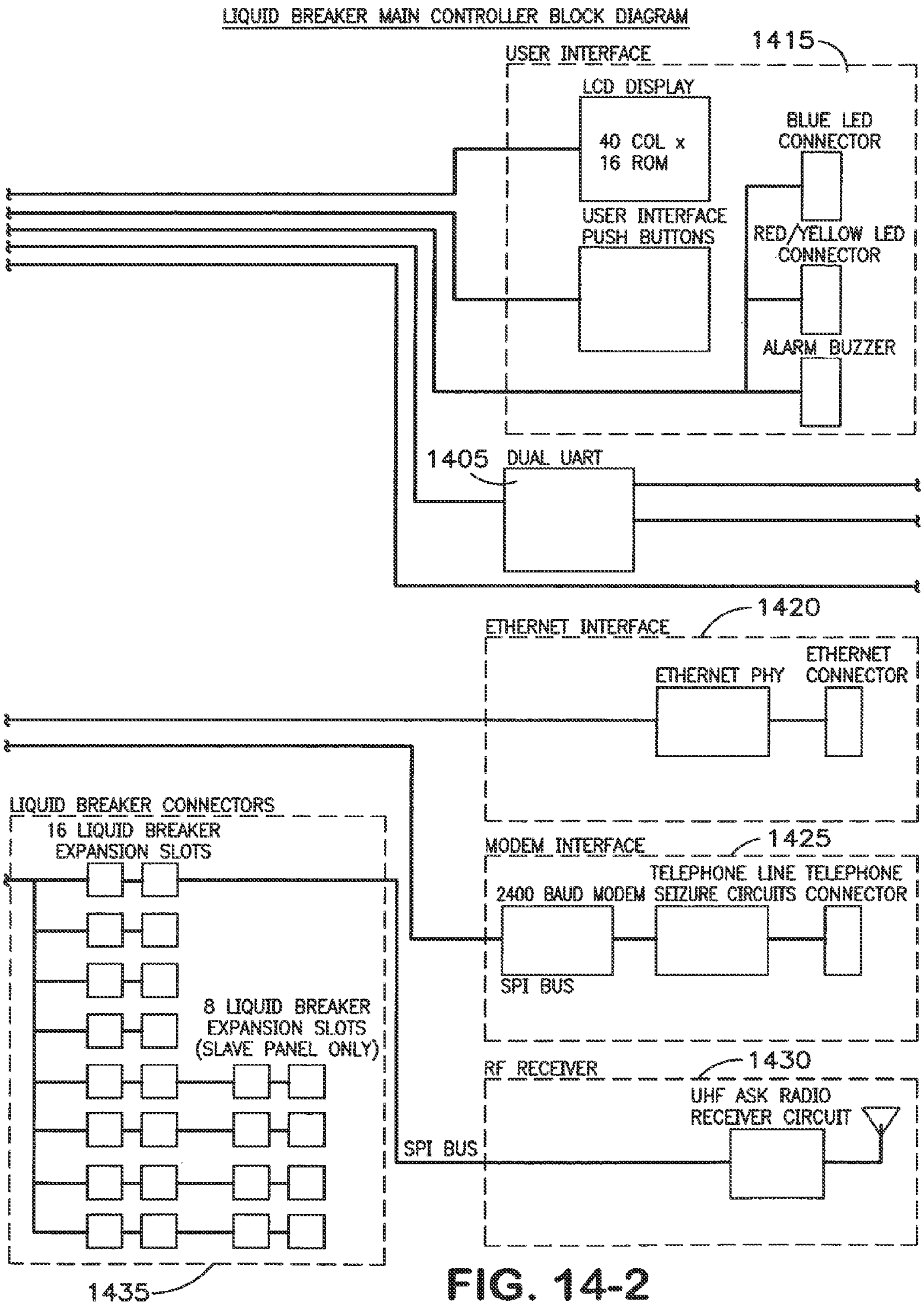
Figures 3, 14:
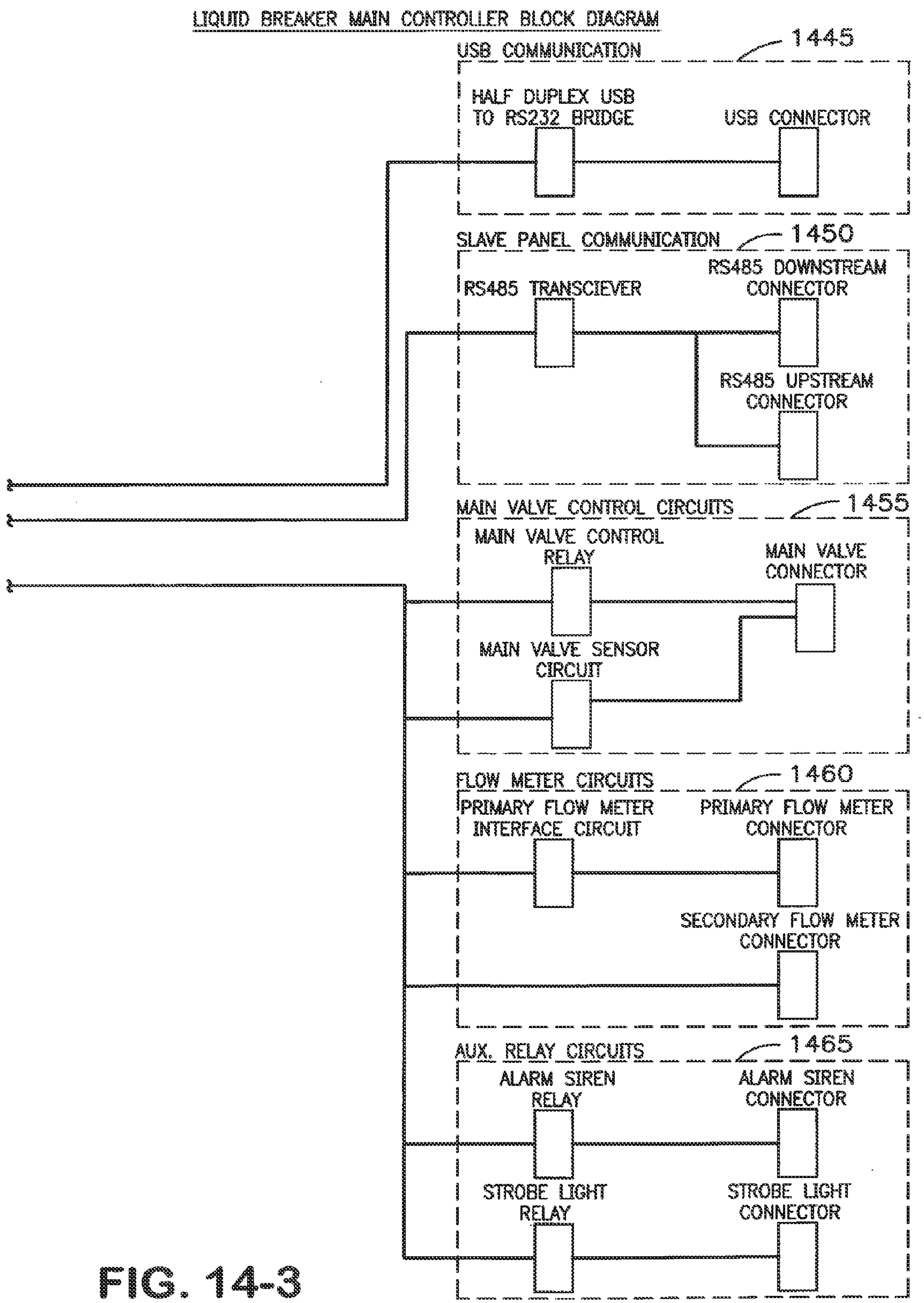
Figure 41:
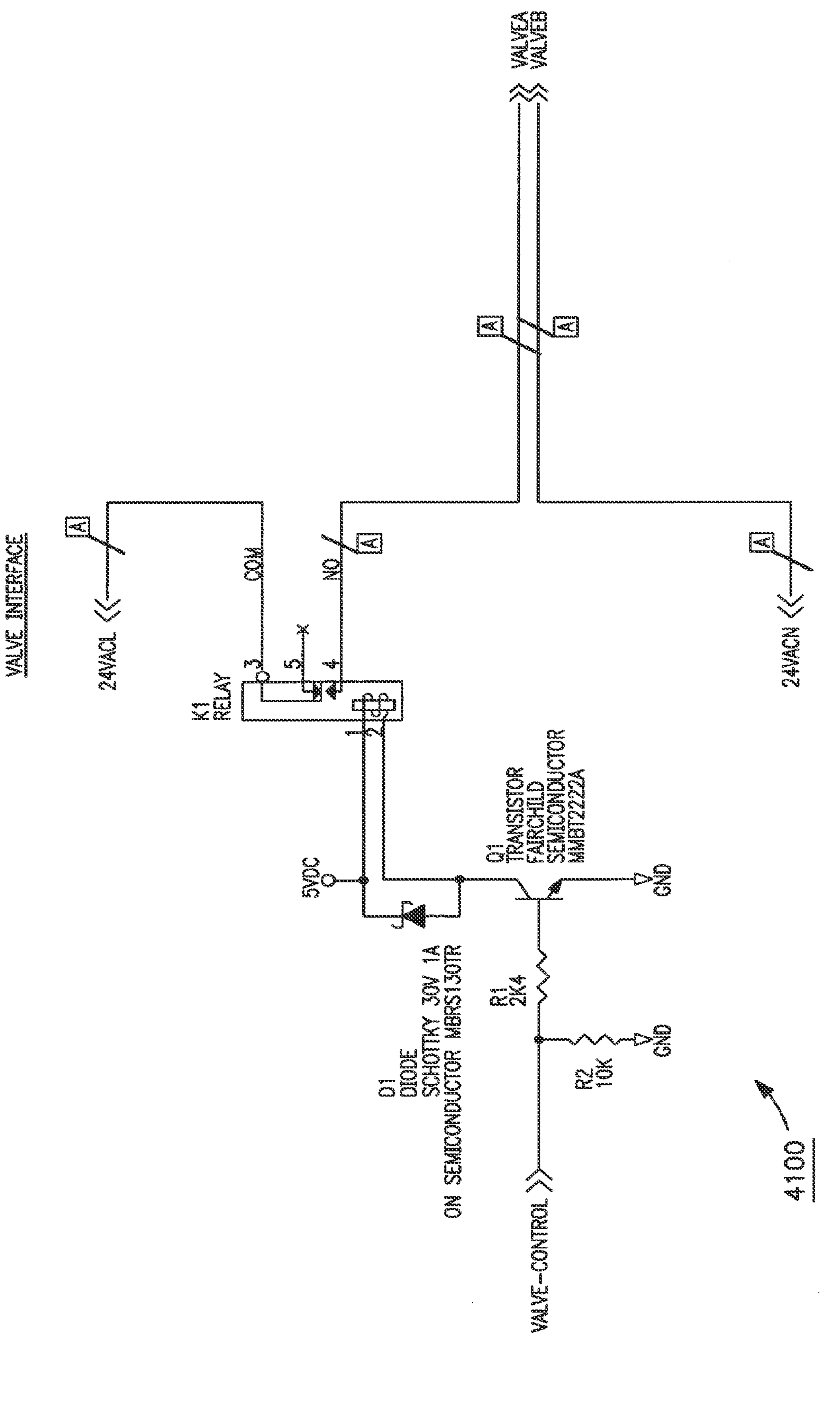
Figure 42:
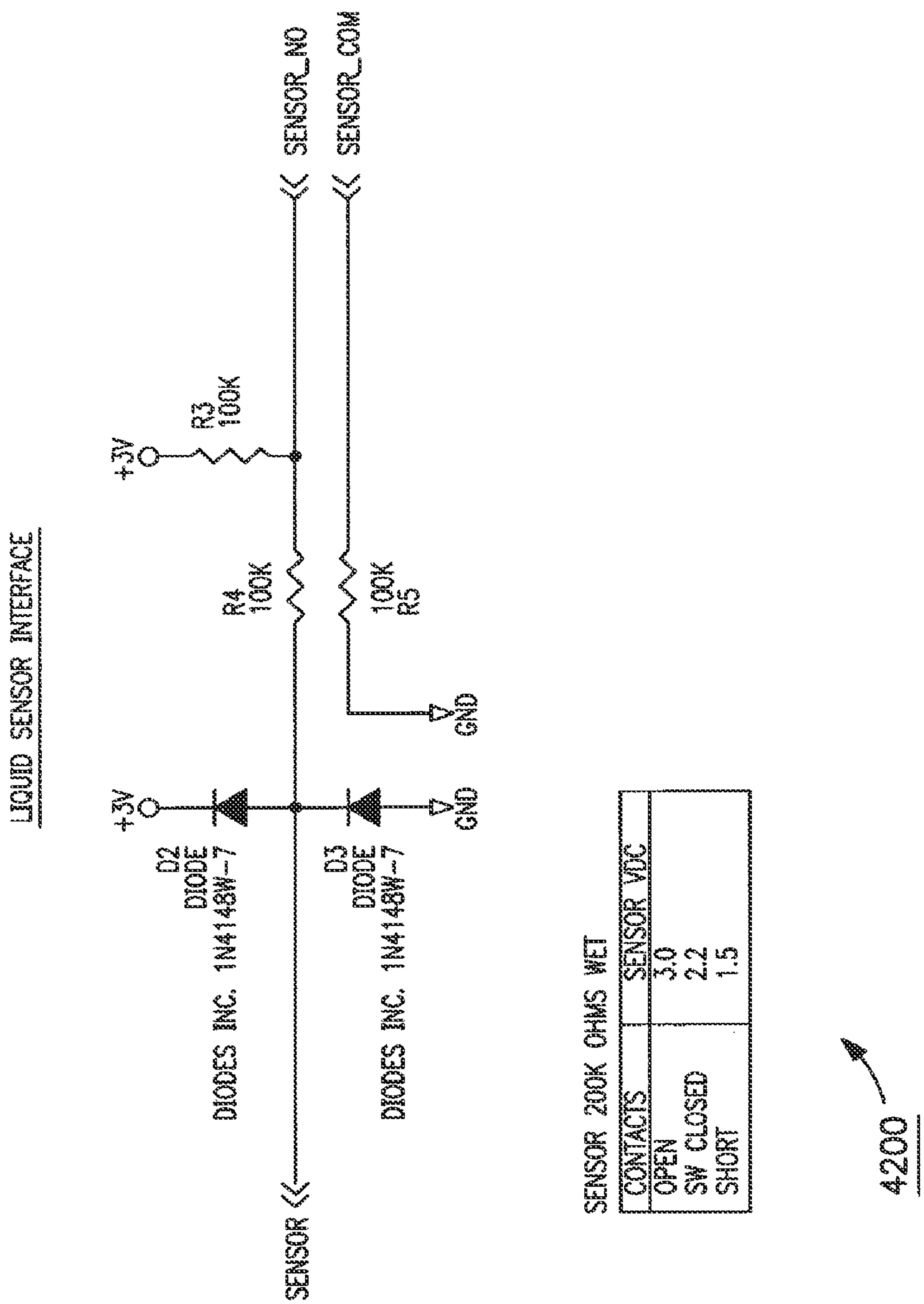

FIGS. 14-1 through 42 present alternative embodiments of the invention. The systems and devices presented in FIGS. 14-1 through 42 relate to an architecture that is streamlined in certain respects relative to some of the embodiments above and that can be manufactured more cost effectively. Some of the differences are highlighted in the below discussion. It is to be appreciated that one or more aspects of the embodiments of FIGS. 14-42 can be incorporated in the embodiments above and vice versa. Moreover, the specific implementation details described and depicted are provided herein by way of example.

FIGS. 14-1 through 14-3 comprise a block diagram of a main controller 1400 for monitoring and controlling fluid (e.g., water) consumption according to an embodiment of the invention. The main controller 1400 can be implemented, for example, as a motherboard, such as that described above in connection with FIG. 1 or other embodiments. The block diagram of FIGS. 14-1 through 14-3 is similar in certain respects to the block diagram of FIGS. 1B and 1B-1.

The main controller 1400 includes a number of functional blocks, including a UART (universal asynchronous receiver/transmitter) block 1405, a main CPU and control logic block 1410, a user interface block 1415, an Ethernet interface block 1420, a modem interface block 1425, an RF receiver block 1430, a breaker connectors block 1435, a power supplies block 1440, a USB communication block 1445, a slave panel communication block 1450, a main valve control circuits block 1455, a flow meter circuits block 1460, and an auxiliary relay circuits block 1465.

As compared with the FIGS. 1B and 1B-1 embodiment above, the main controller 1400 does not include a battery charger or a video uplink. The modem interface block 1425 includes a 2400 baud modem, which provides for an alternate method of sending e-mail using SMTP (Simple Mail Transfer Protocol), as well as the ability to call an alarm monitoring station to report an alarm. The web page interface of the main controller 1400 is accessible only from a LAN. The flow meter circuits block 1460 includes flow meter interface circuits for two flow meters. In addition, the breaker connectors block 1435 supports a maximum of sixteen breakers (interface modules), and the slave panel (motherboard) communication block 1450 supports a maximum of twenty-four breakers. Further, the main controller 1400 supplies power to interface modules via the power supplies block 1440. The main controller 1400 also reads the breakers, which determine many of their own functions. For instance, a breaker can close a valve if a problem condition is sensed, and the main controller 1400 reads the status of the breaker. A slave motherboard (not shown) is similar to the main controller 1400, but includes eight additional breaker connectors, and unused circuits are removed. In an embodiment, slave motherboards each have their own power supply, which can be a plug-in power supply, and do not rely on the main controller 1400 for power. Additionally, slave motherboards can wirelessly operate on independent RF frequencies to communicate with the motherboard and/or interface modules.

The main CPU and control logic block 1410 can employ, for example, a NetSilicon NS7520 as the main processor. The NS7520 is a 32-bit ARM7-based RISC processor with a core processor based on the ARM7 TDMI processor that provides 28 address and 32 data lines. The processor uses a Vonn Neumann architecture in which a single 32-bit data bus conveys both instructions and data. In the example design of FIG. 14, a 32-bit data bus is used for FLASH and SDRAM memory, and an 8-bit data bus for external peripherals. The main processor is clocked at 36 MHz using an 18.432 MHz external crystal oscillator. Two ST Microelectronics M29V800DB70N6 512 k.times.16 FLASH memories are used to provide nonvolatile program memory and to provide storage for system settings. On power-up, the microcontroller boots from FLASH memory and copies the program from FLASH memory into SDRAM. The microcontroller executes the program from SDRAM. Two Micron MT48LC4M16A2TG-75 4M.times.16 133 MHz SDRAMs are provided for program memory execution and volatile variable storage. A Xilinx XC95144XL-10TQ144 is used to provide address decoding for the external peripherals and implements external digital input buffers and output latches.

The user interface block 1415 is used to monitor and control the system. The user interface block 1415 includes push buttons (keys) and an LCD display with a resolution of 240 by 128 pixels. The display is used in text and/or graphics mode and provides 40 columns by 16 lines of character data using a 5 by 7 dot character size. Configuration of the system is performed using a PC and one or more web pages, as described above.

The slave panel communication block 1450 provides an interface by which the motherboard can communicate with 50 slave panels (motherboards) using RS-485 multi-drop communication.

The RF receiver block 1430 includes a UHF receiver configured for a single channel at a fixed frequency of 433.92 MHz using Amplitude Shift Keying (ASK) modulation. The RF channel is used to receive messages from remote sensor modules.

The USB communication block 1445 includes a half-duplex RS-232 to USB bridge, which provides a USB interface for the main controller 1400. From the PC side, the USB interface complies with the HID (Human Interface Device) USB class protocols. The bridge interface permits a maximum transfer of 800 bytes per second using a low-speed USB device. The USB port optionally can be used to configure the system from a PC.

FIGS. 15-1 through 31-4 are circuit diagrams showing example implementations of various blocks of the main controller 1400 of FIGS. 14-1 through 14-3. The diagrams are drawn and labeled consistent with the art.

Figures 1, 15:
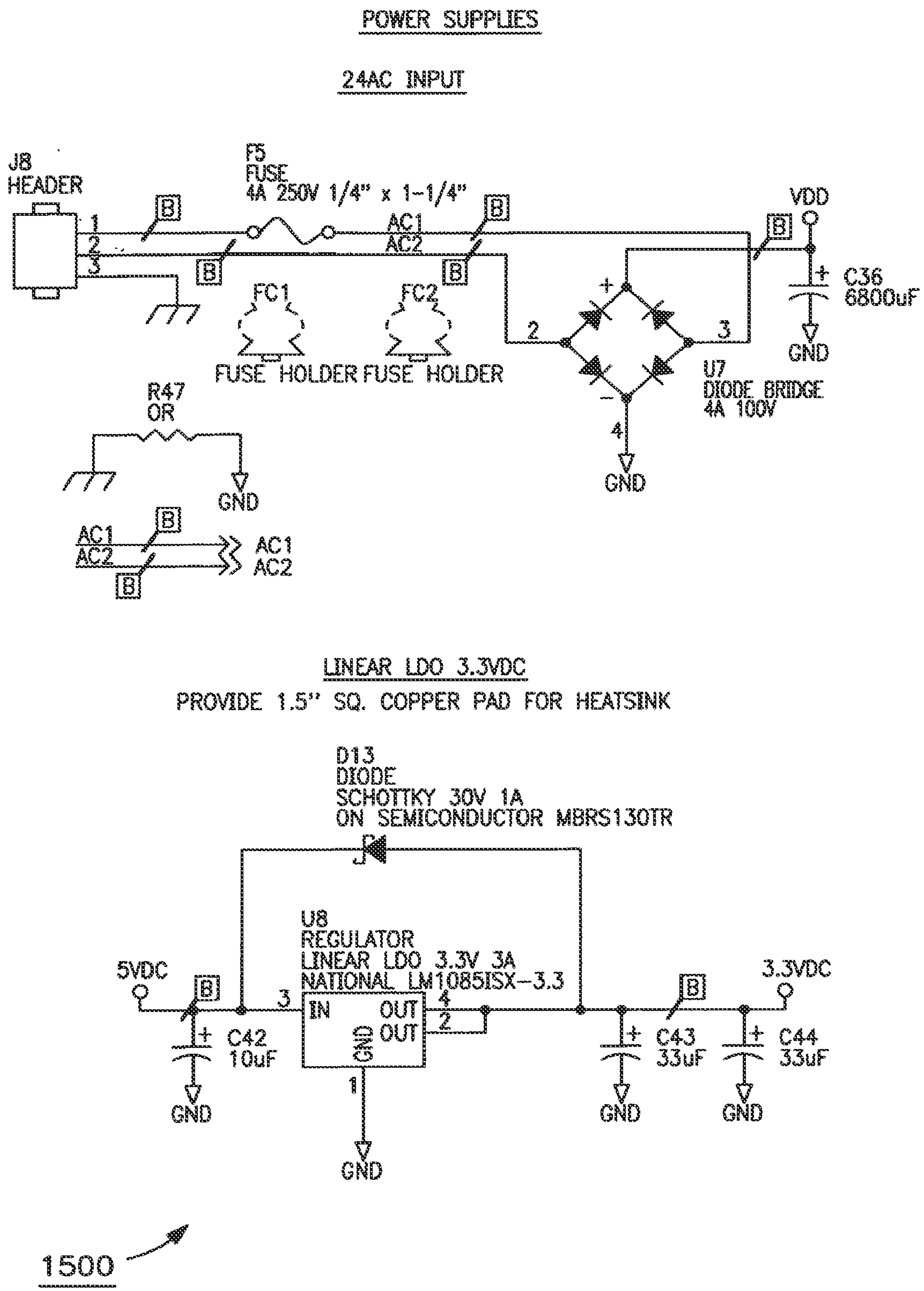
Figures 2, 15:
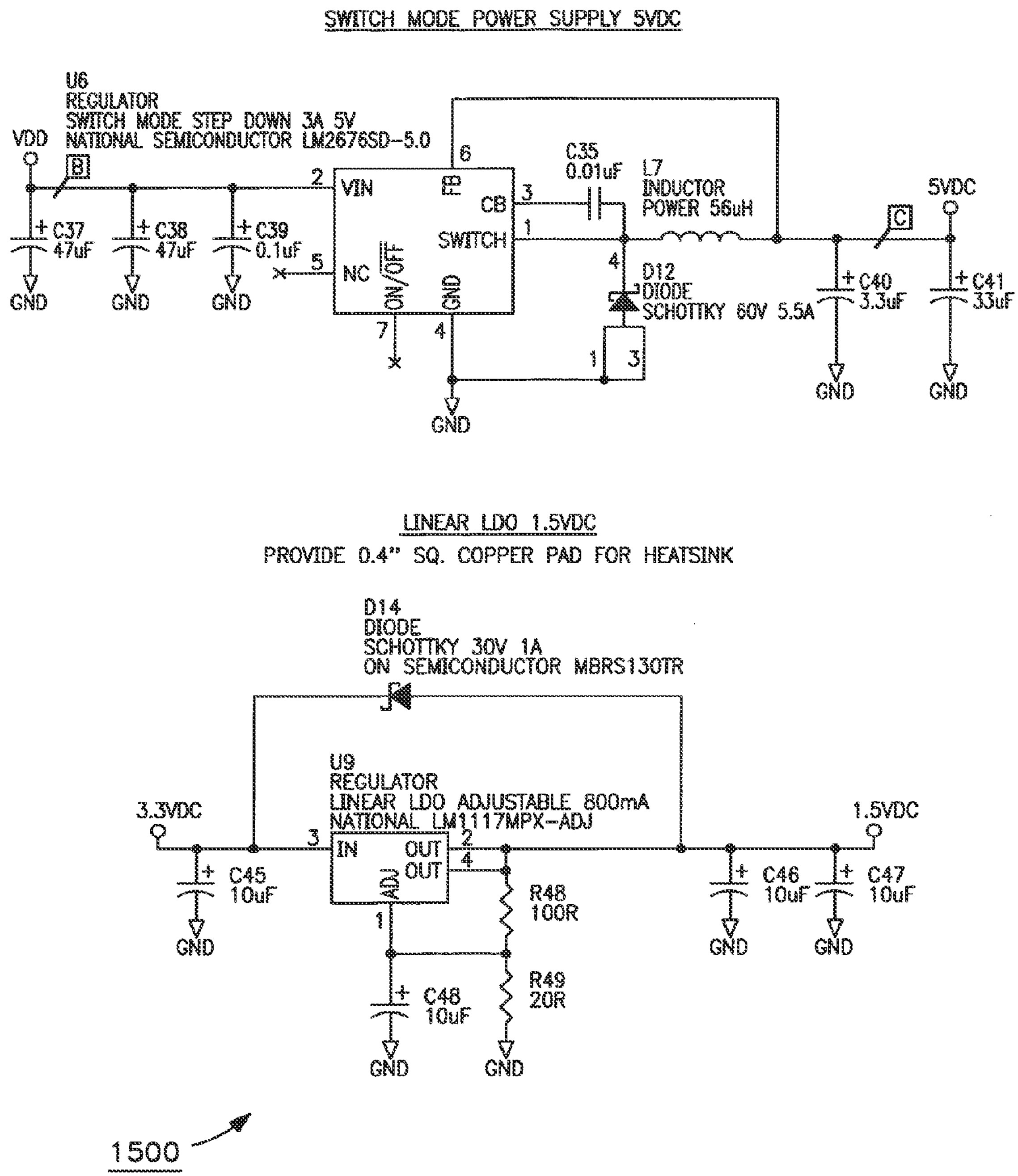

FIGS. 15-1 and 15-2 show example circuitry 1500 for the power supplies block 1440.

Figures 1, 16:
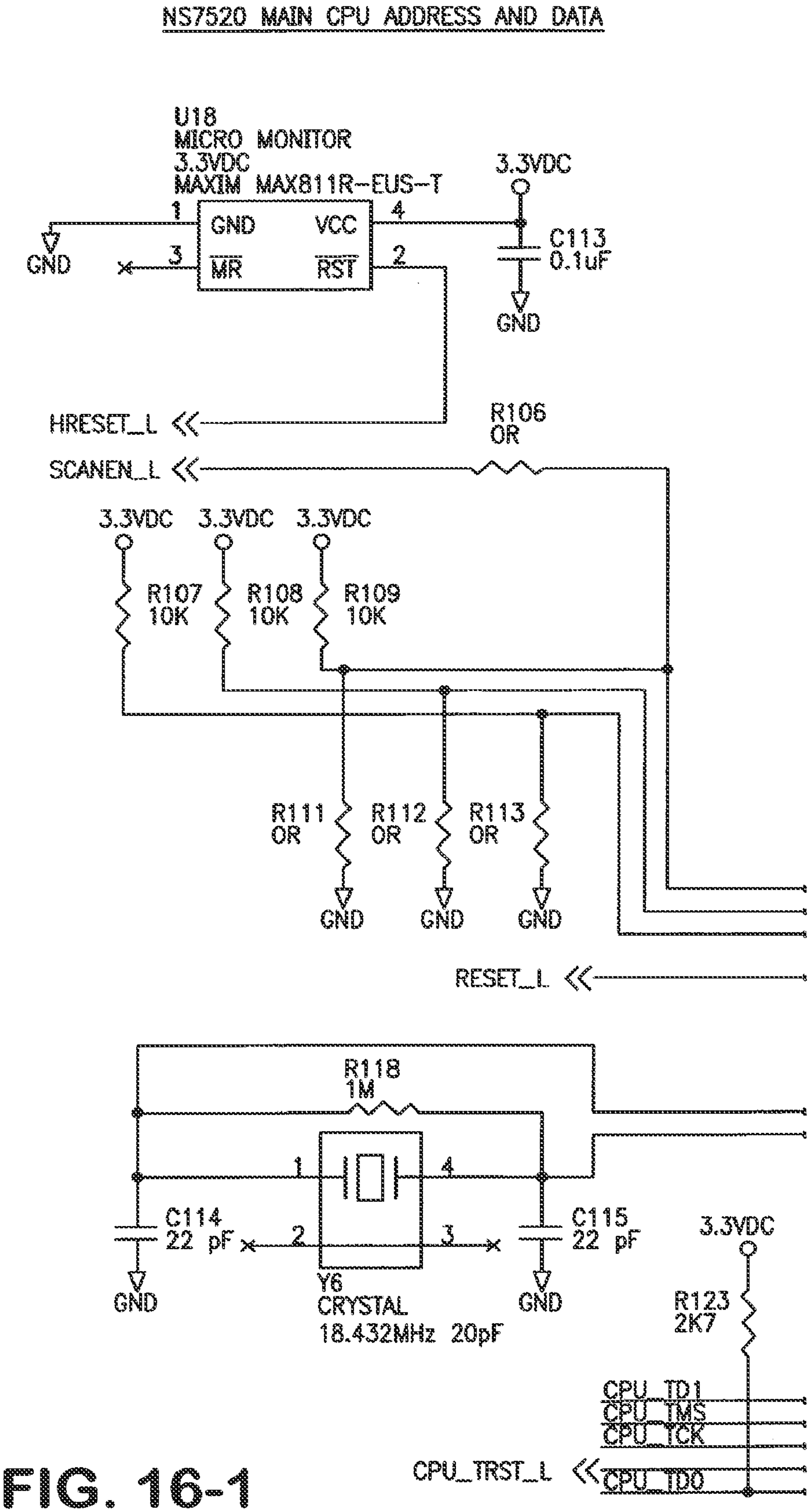
Figures 2, 16:
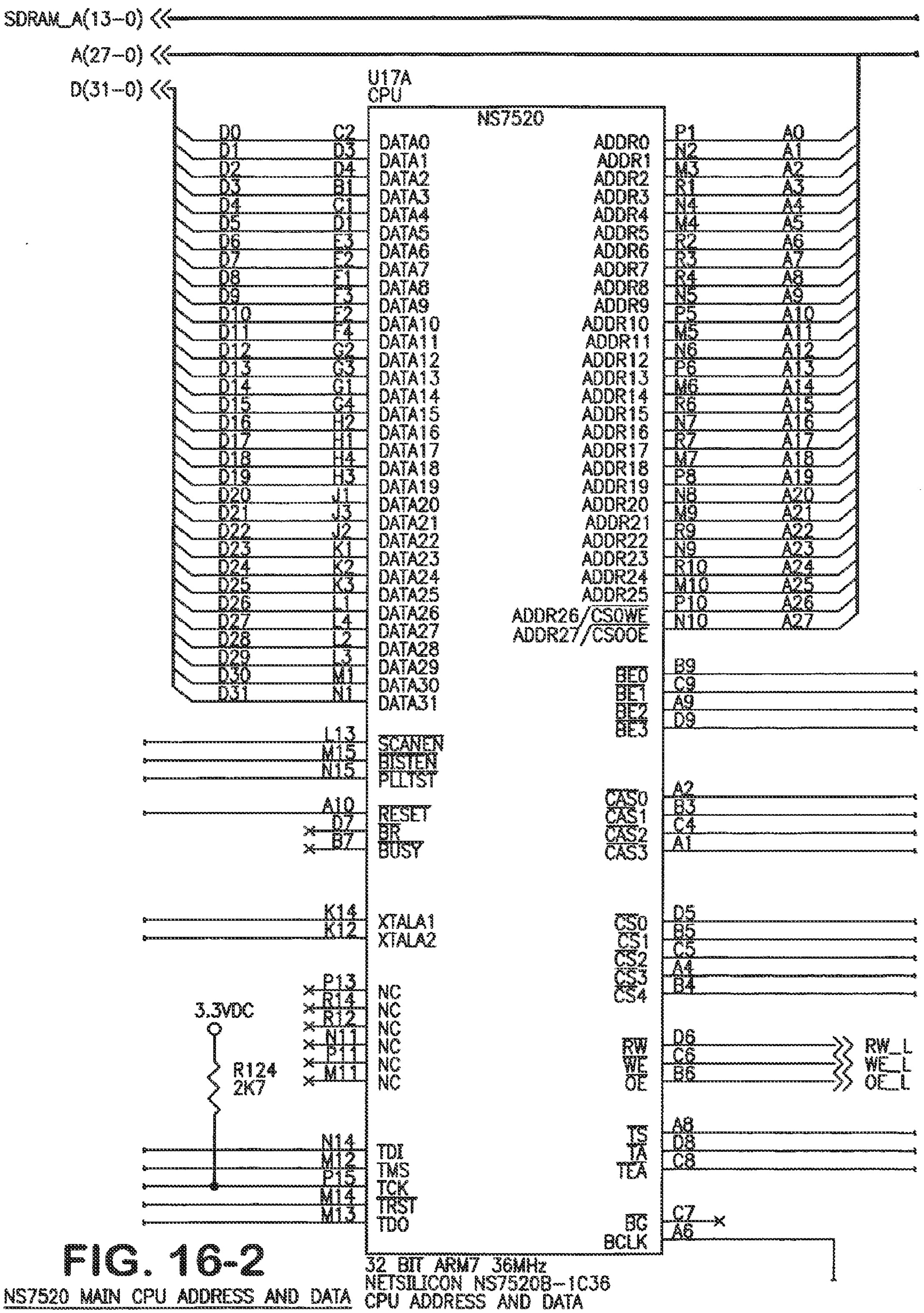
Figures 3, 16:
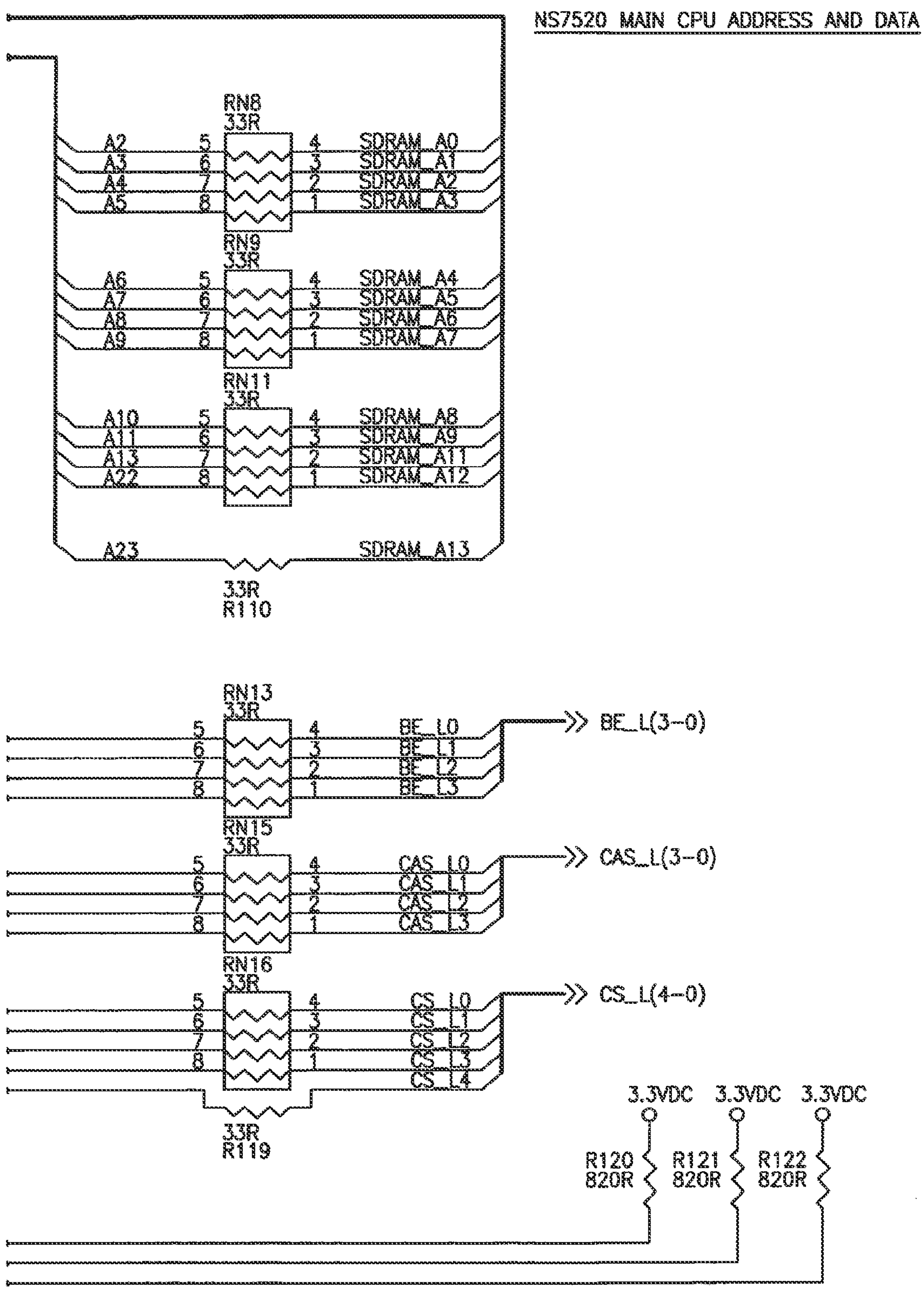
Figures 4, 16:
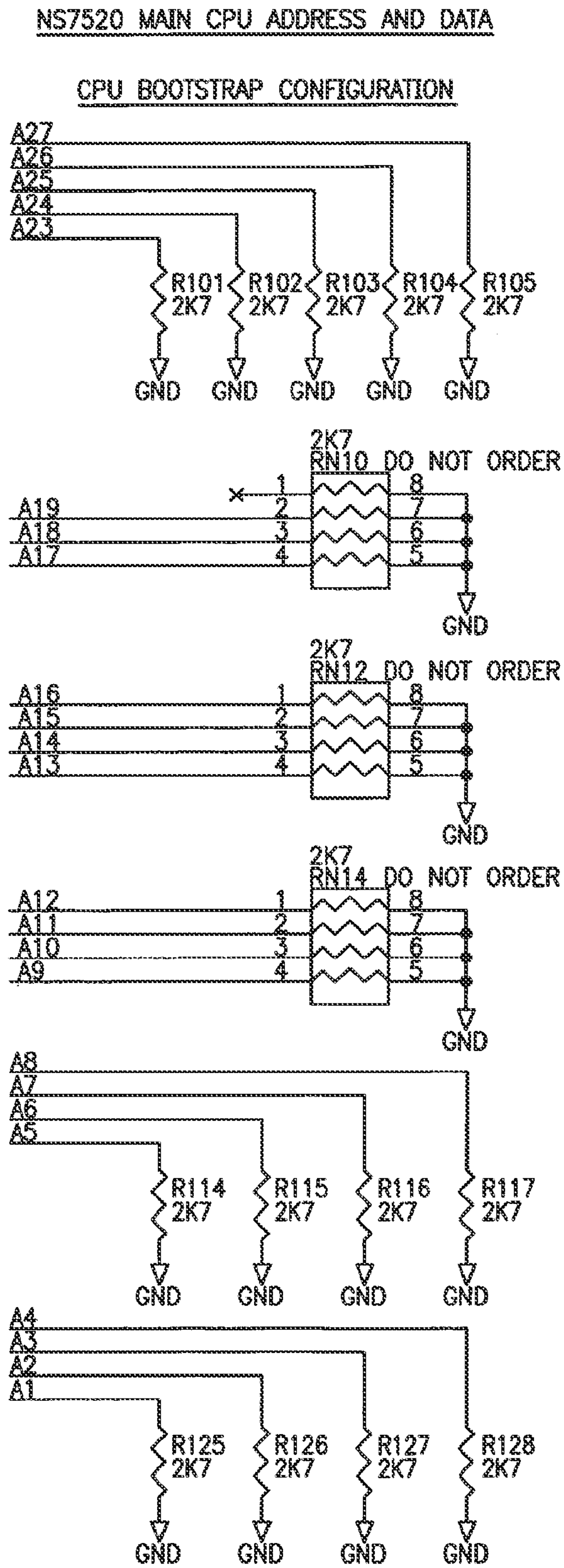
Figures 5, 16:
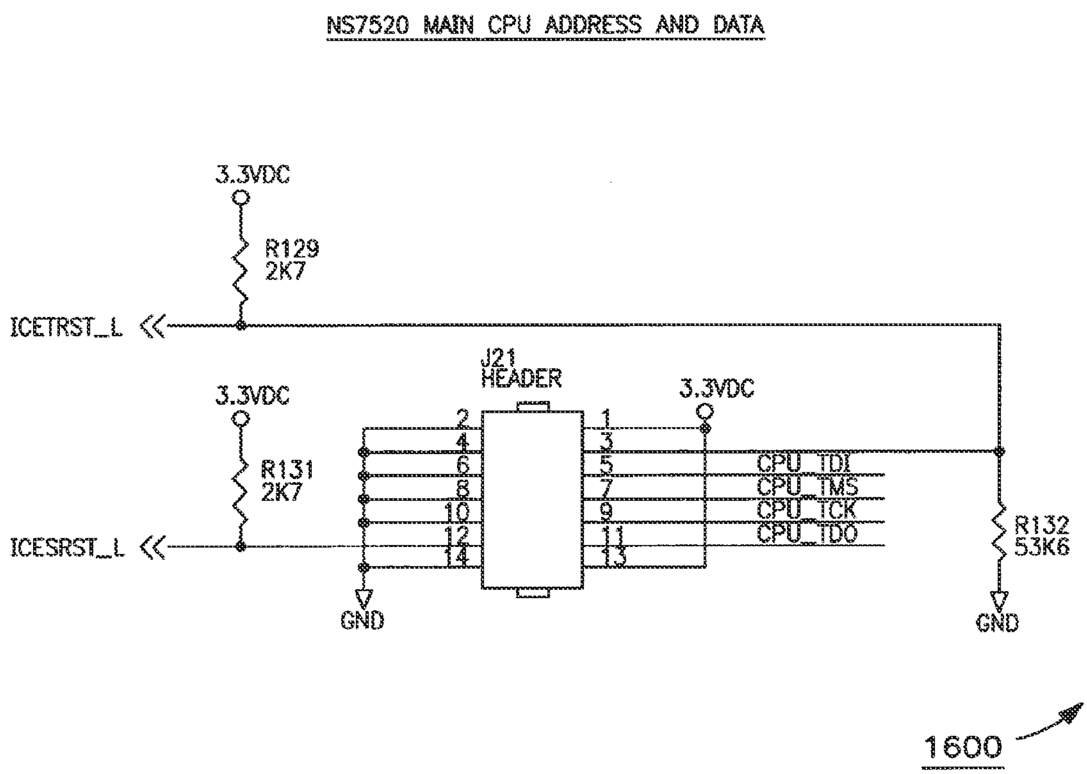
Figures 6, 16:
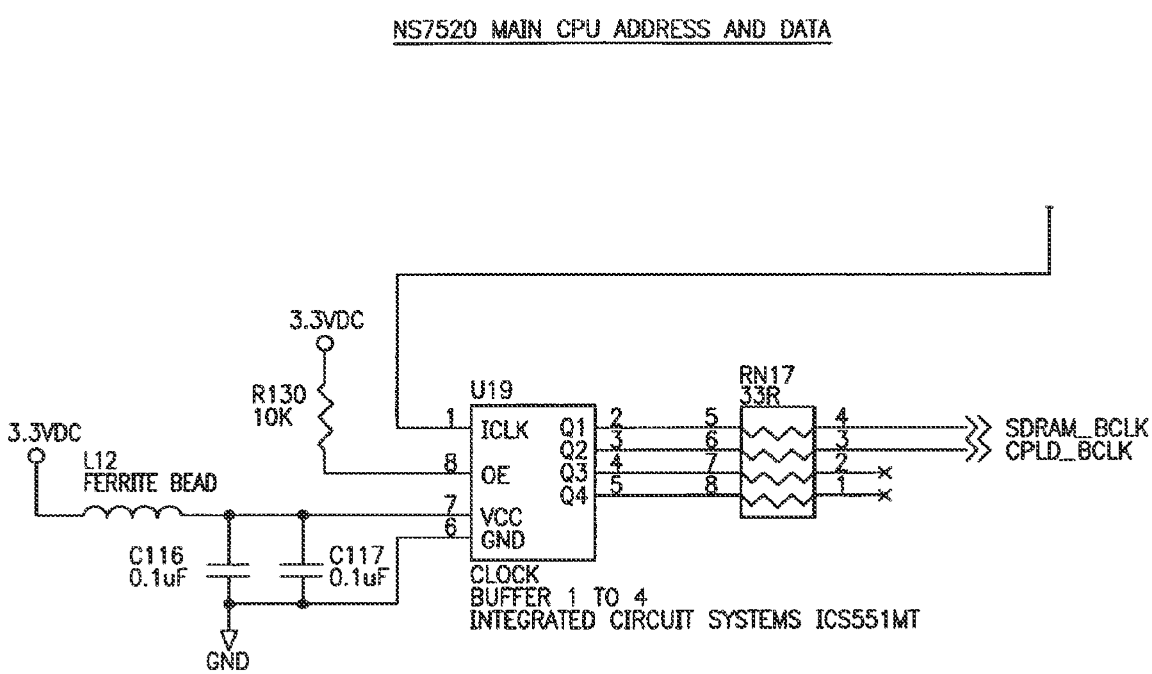
Figures 1, 17:
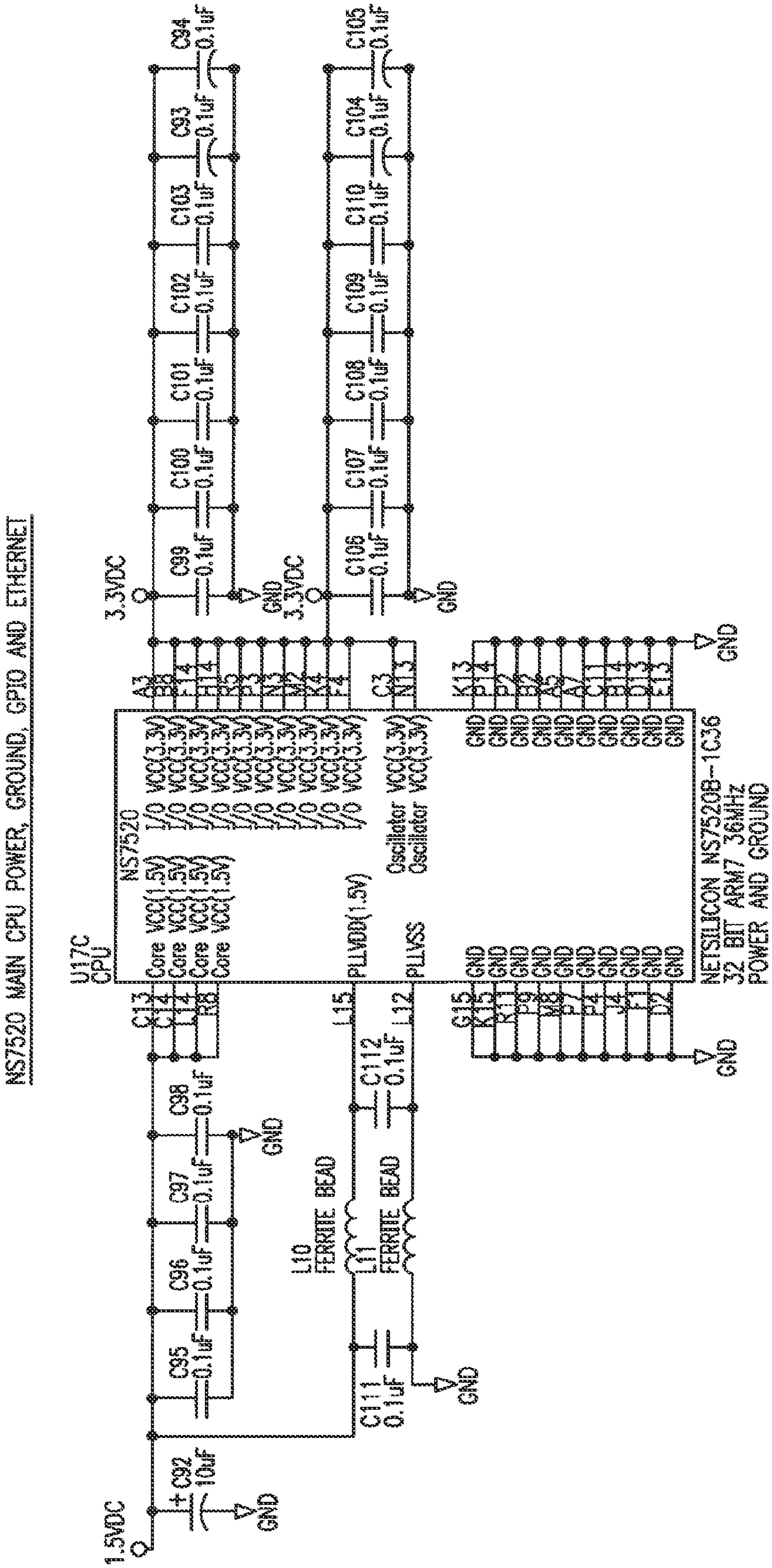
Figures 2, 17:
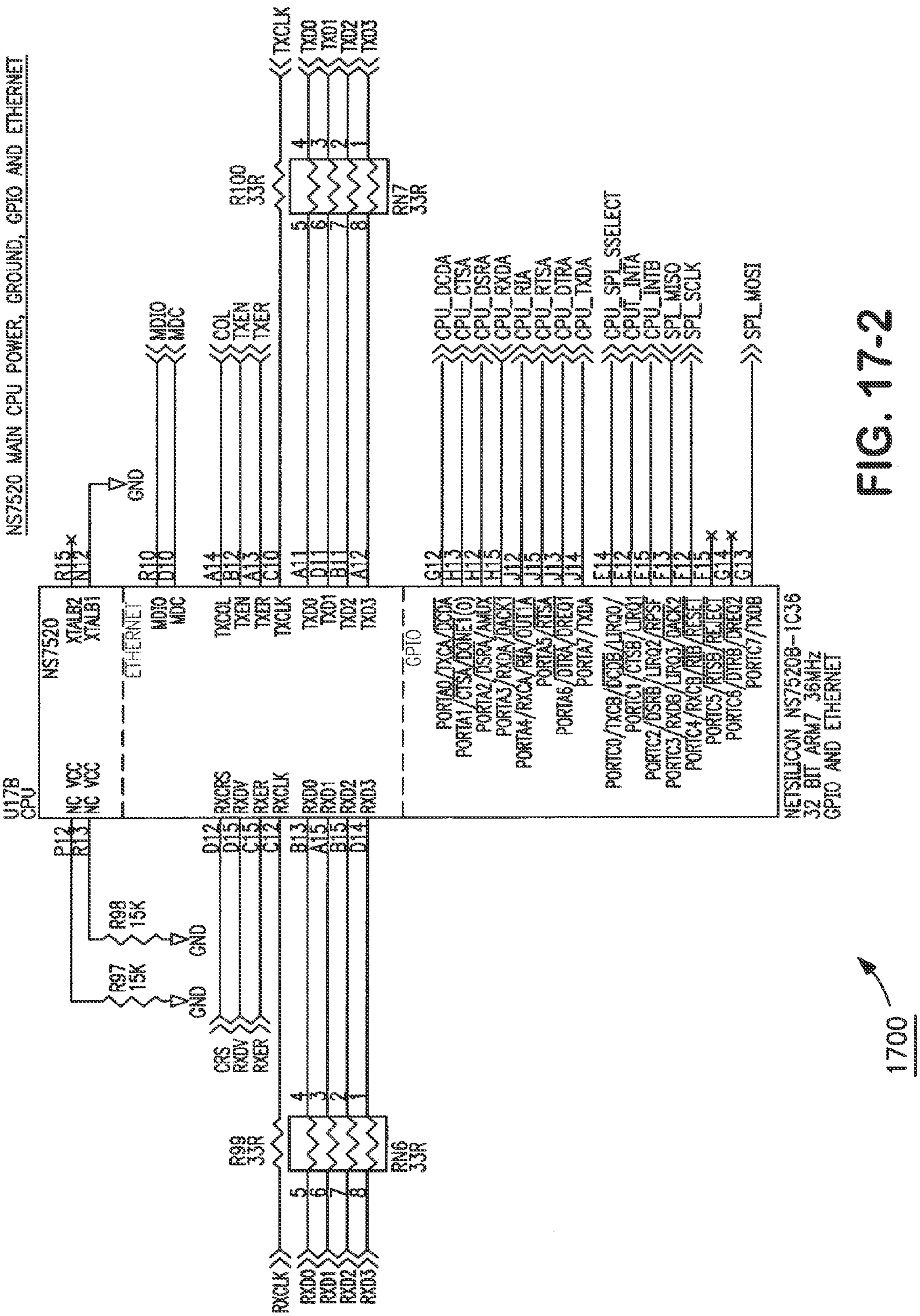
Figures 1, 18:
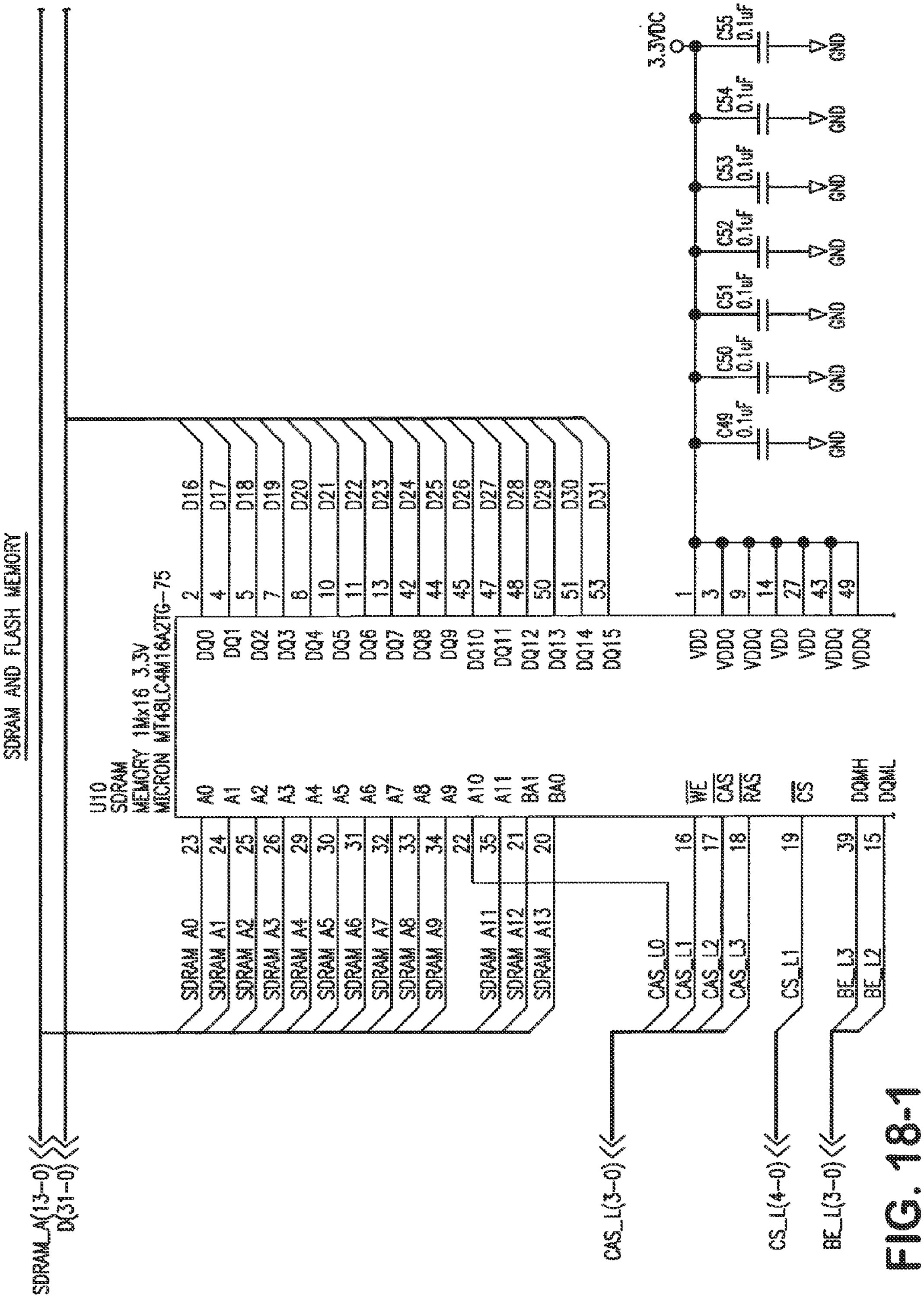
Figures 2, 18:
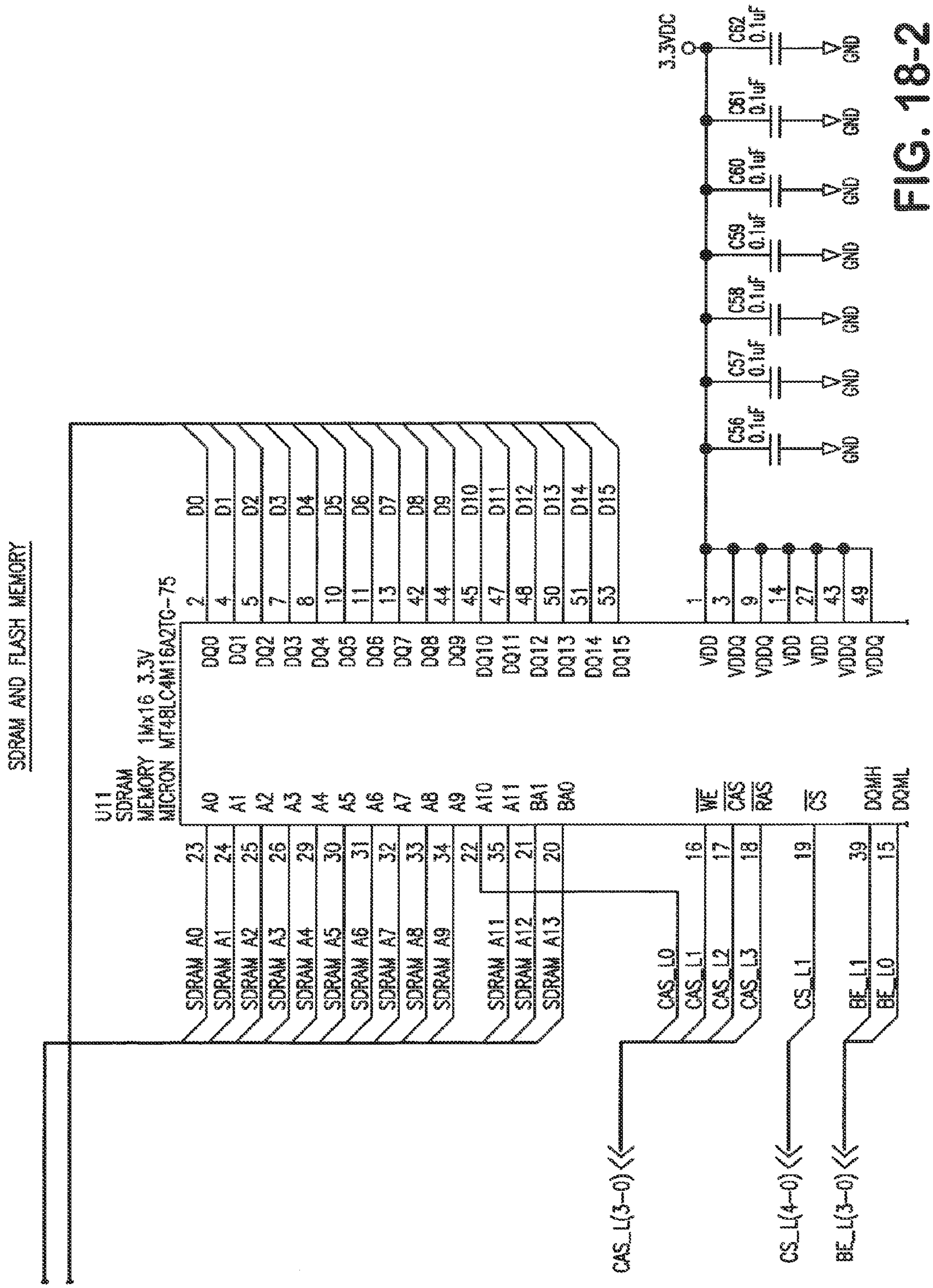
Figures 3, 18:
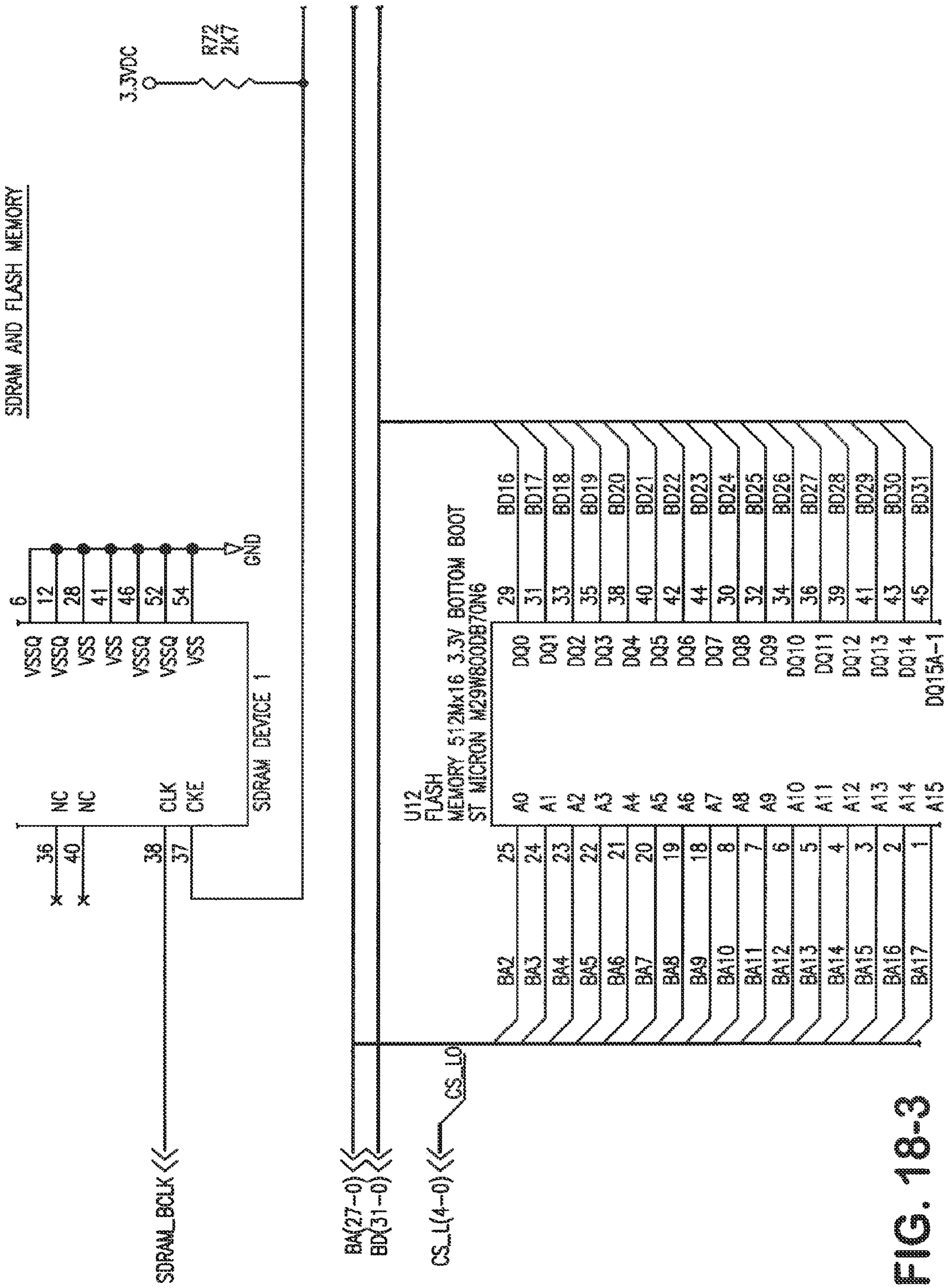
Figures 4, 18:
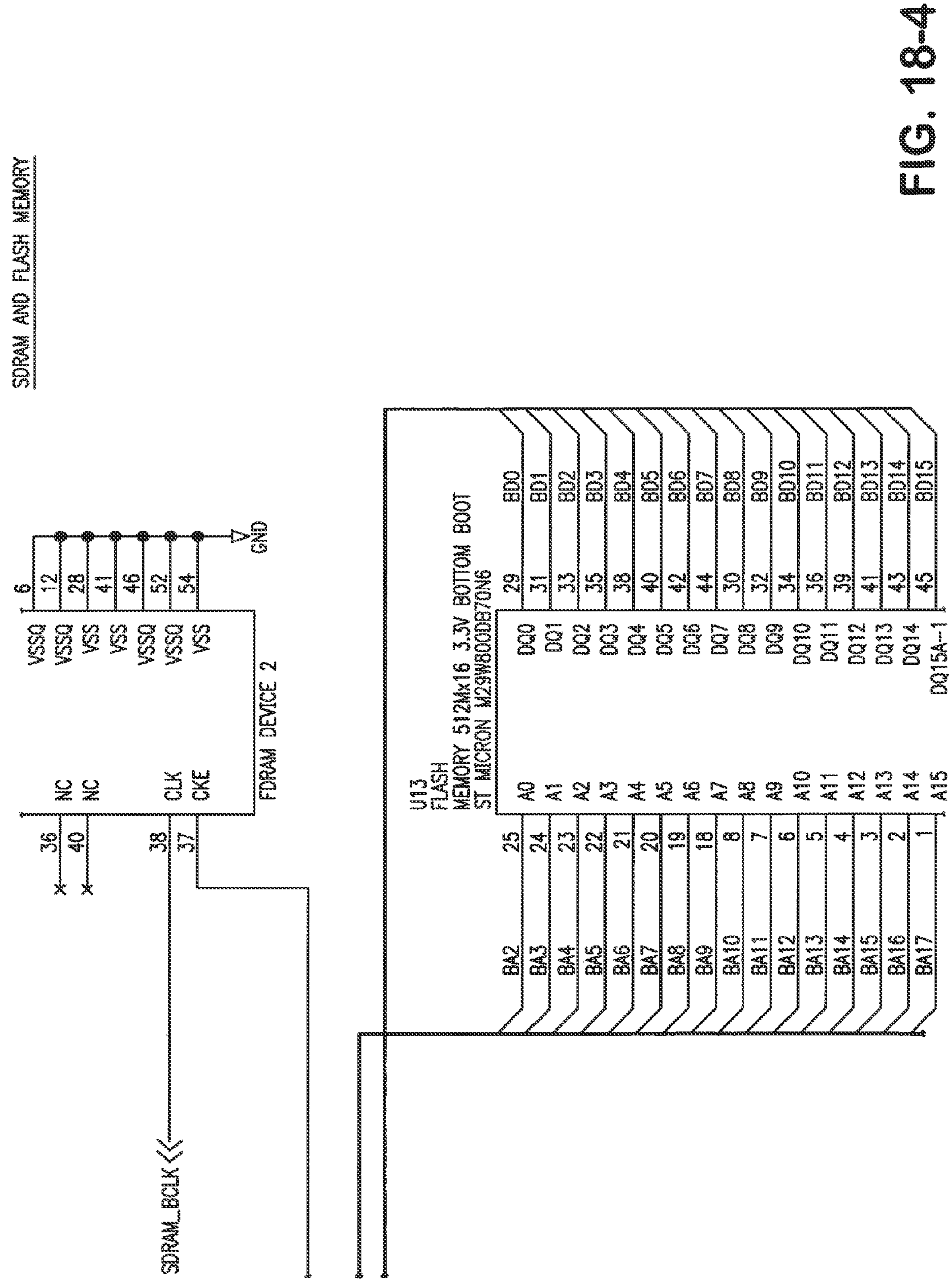
Figures 5, 18:
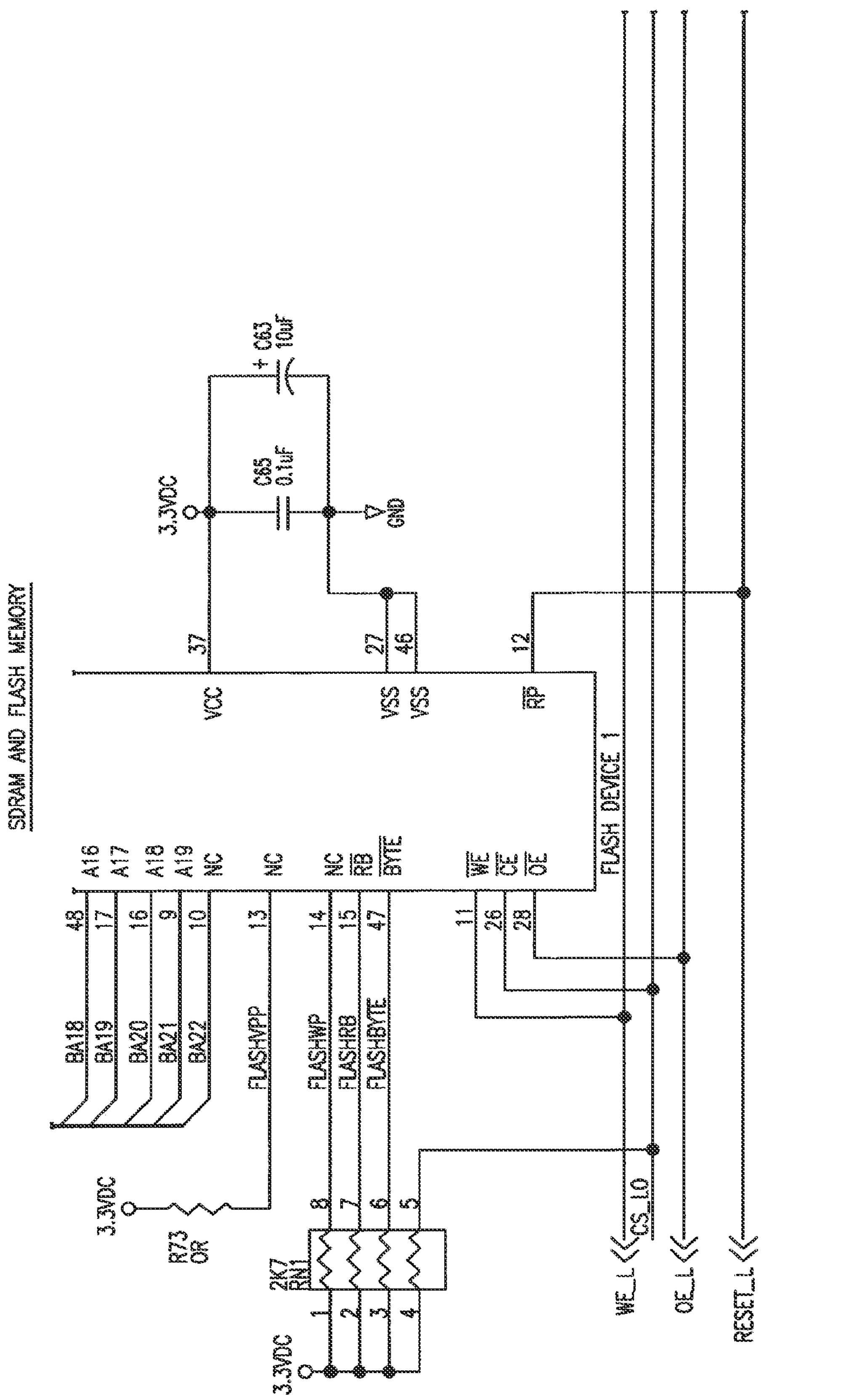
Figures 6, 18:
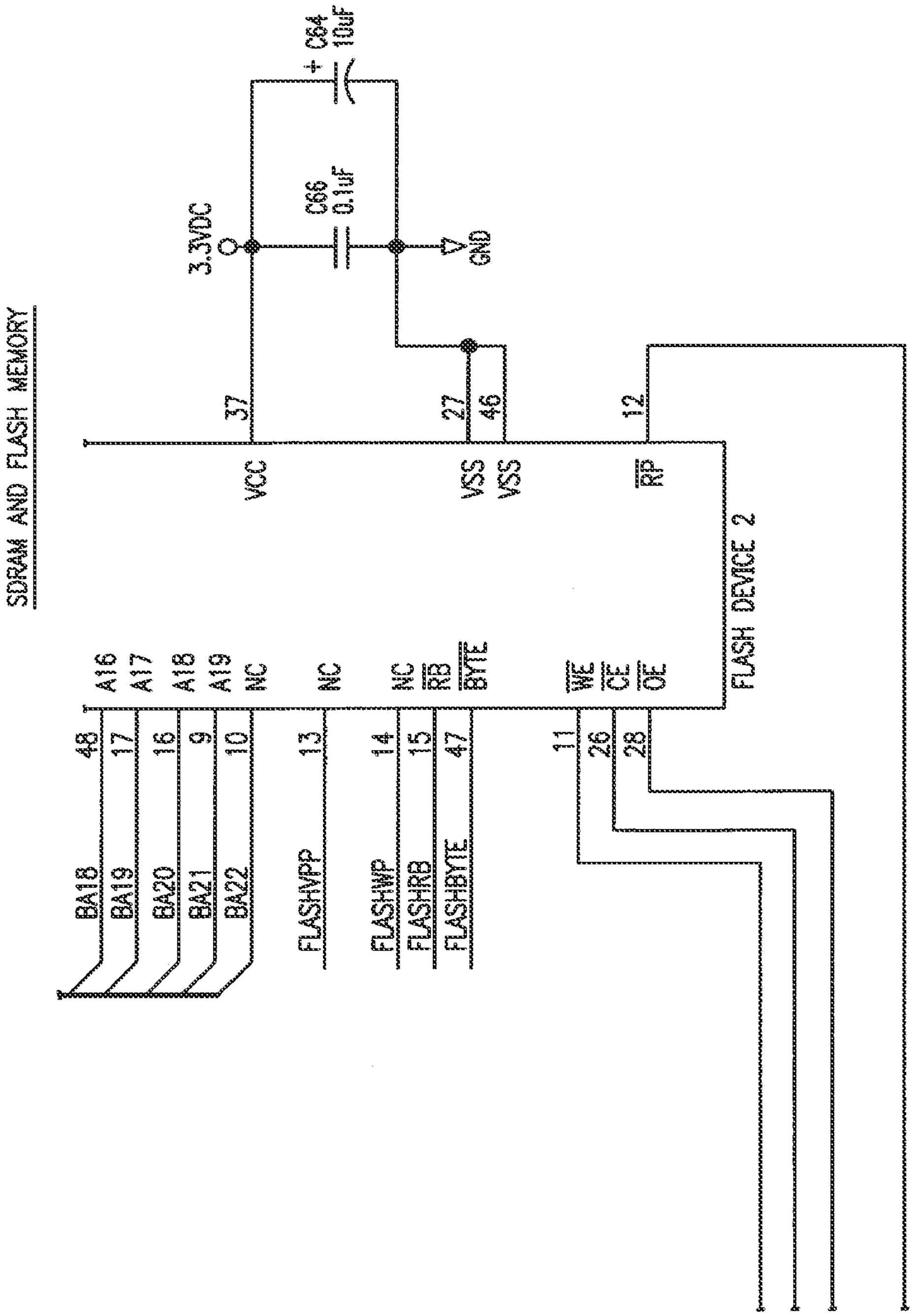
Figures 1, 19:
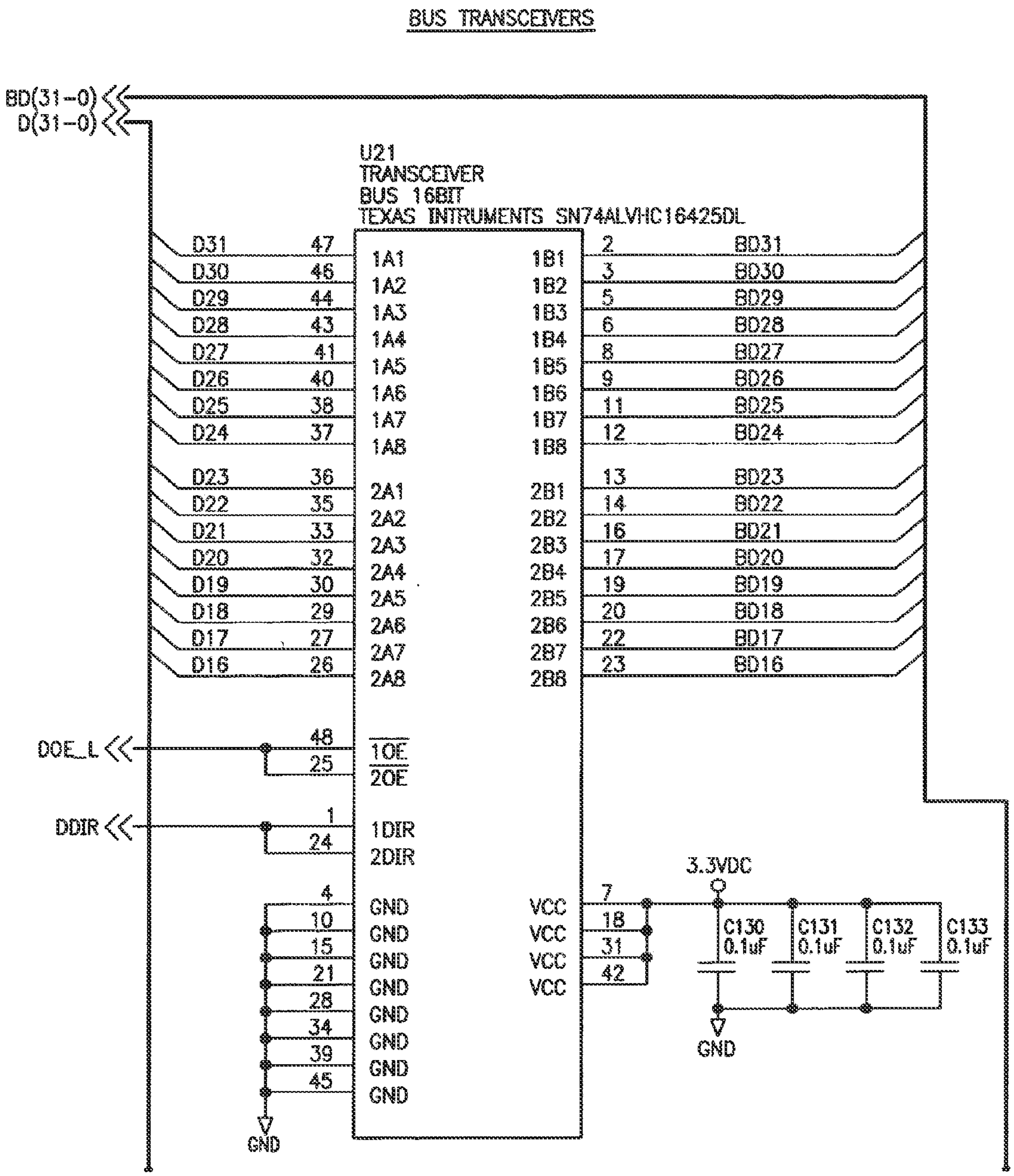
Figures 2, 19:
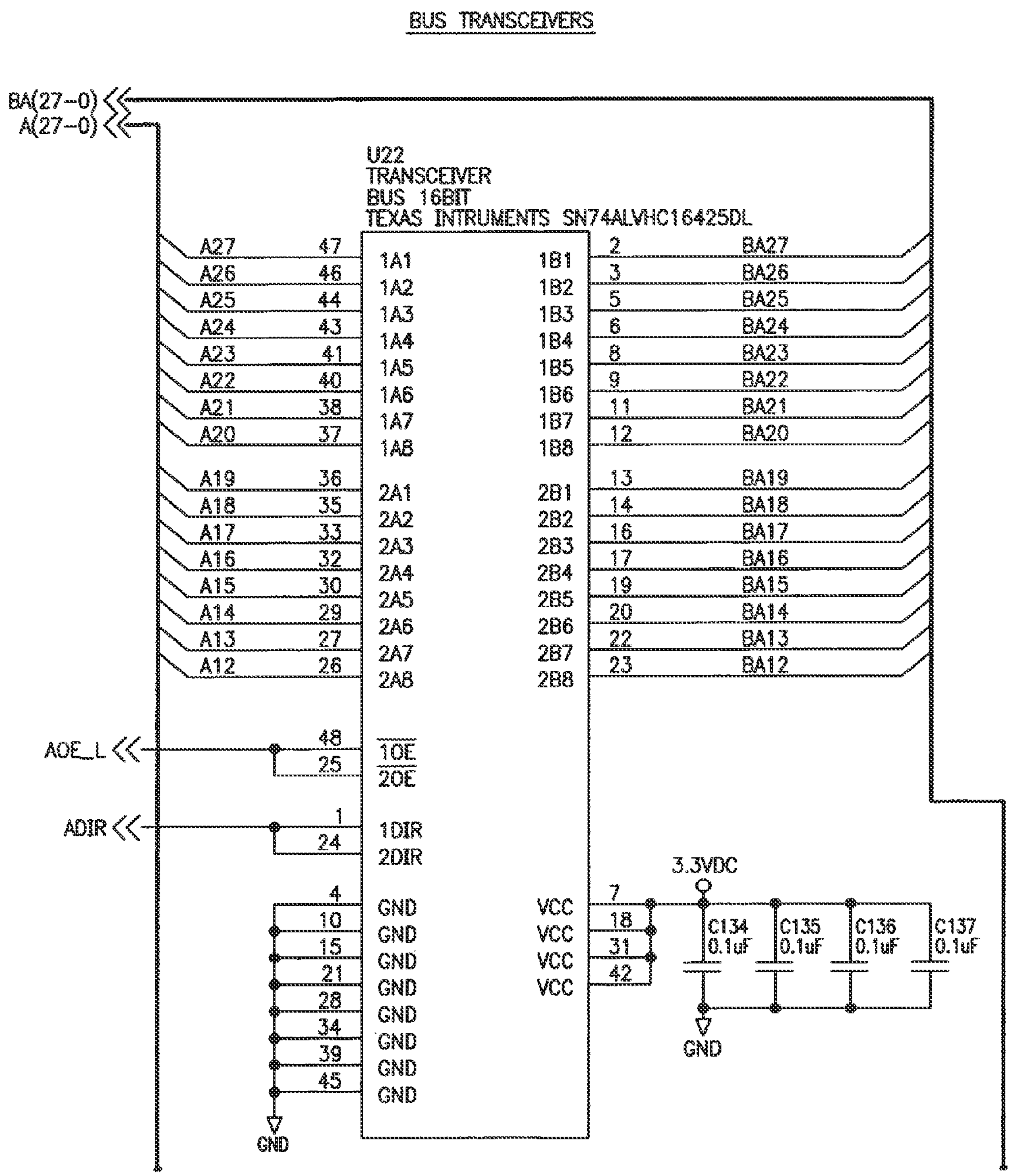
Figures 3, 19:
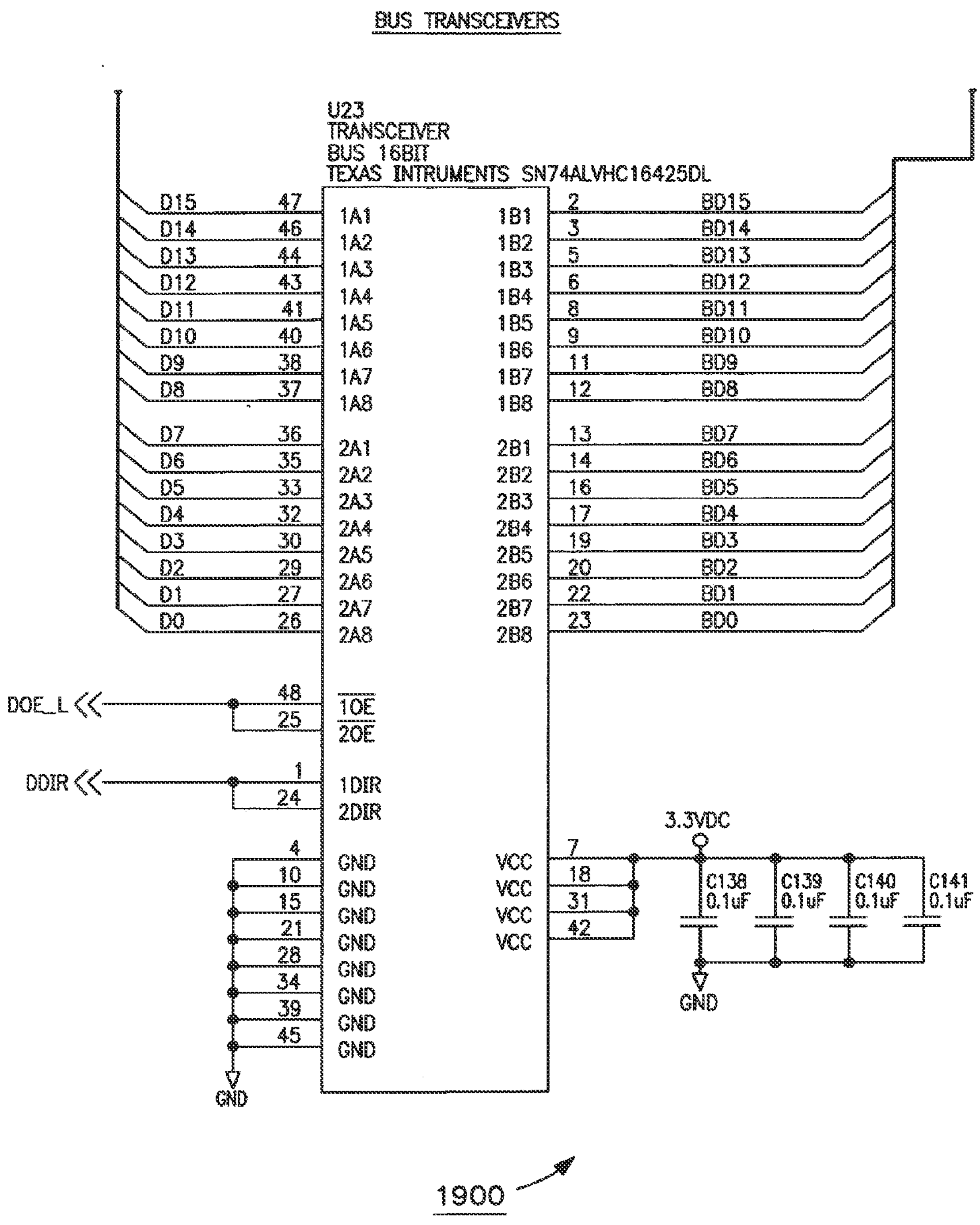
Figures 4, 19:
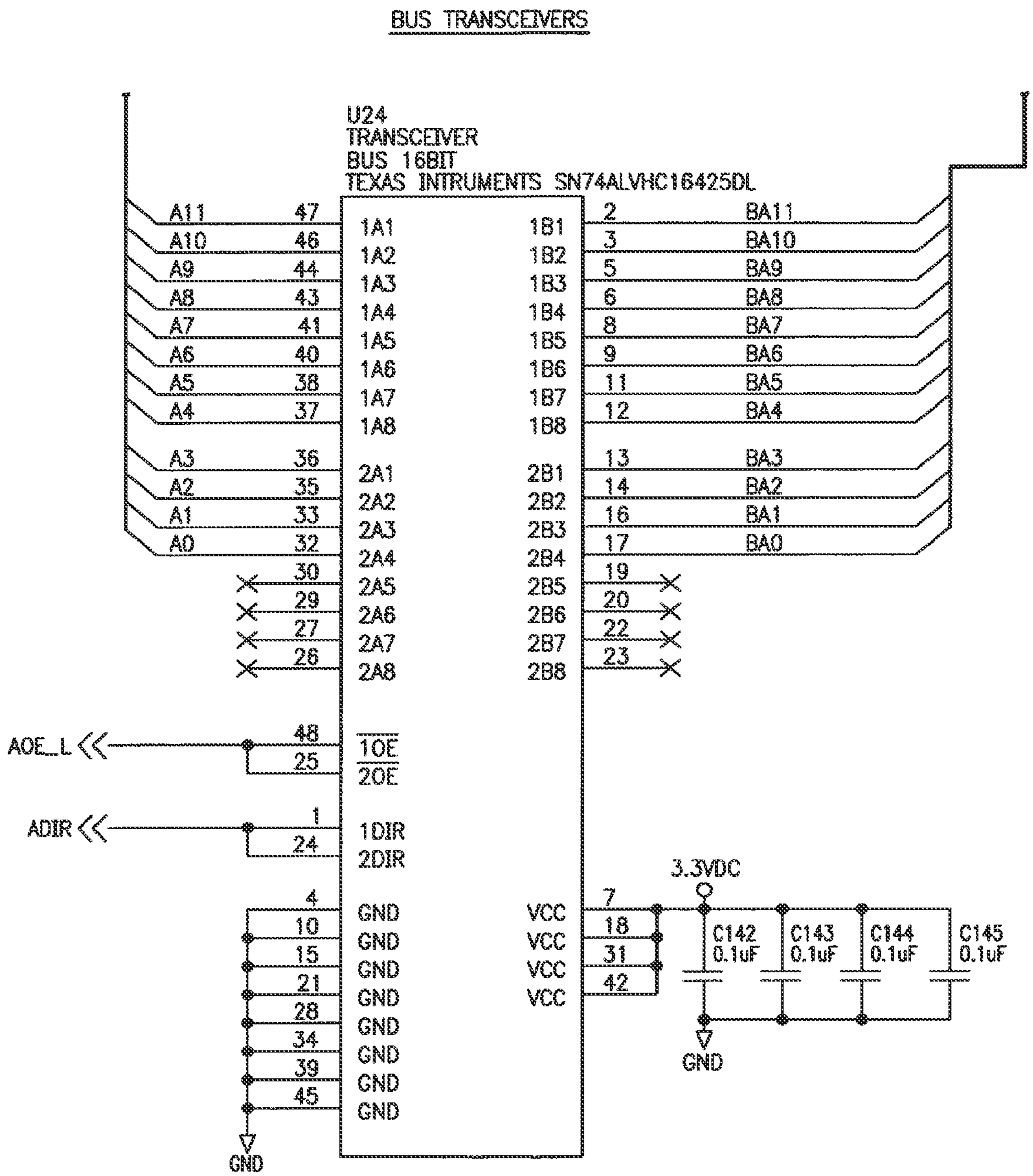
Figures 1, 20:
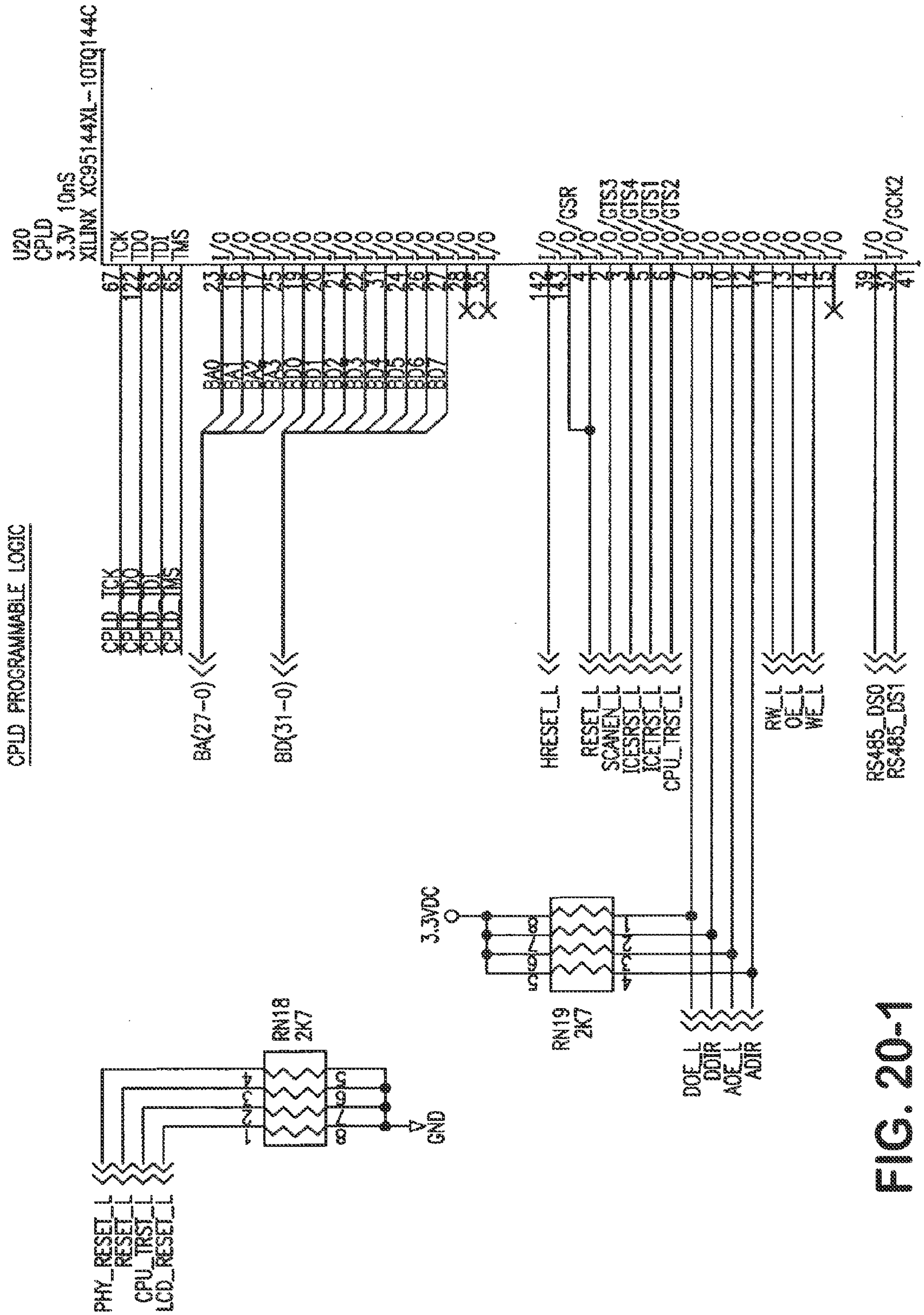
Figures 2, 20:
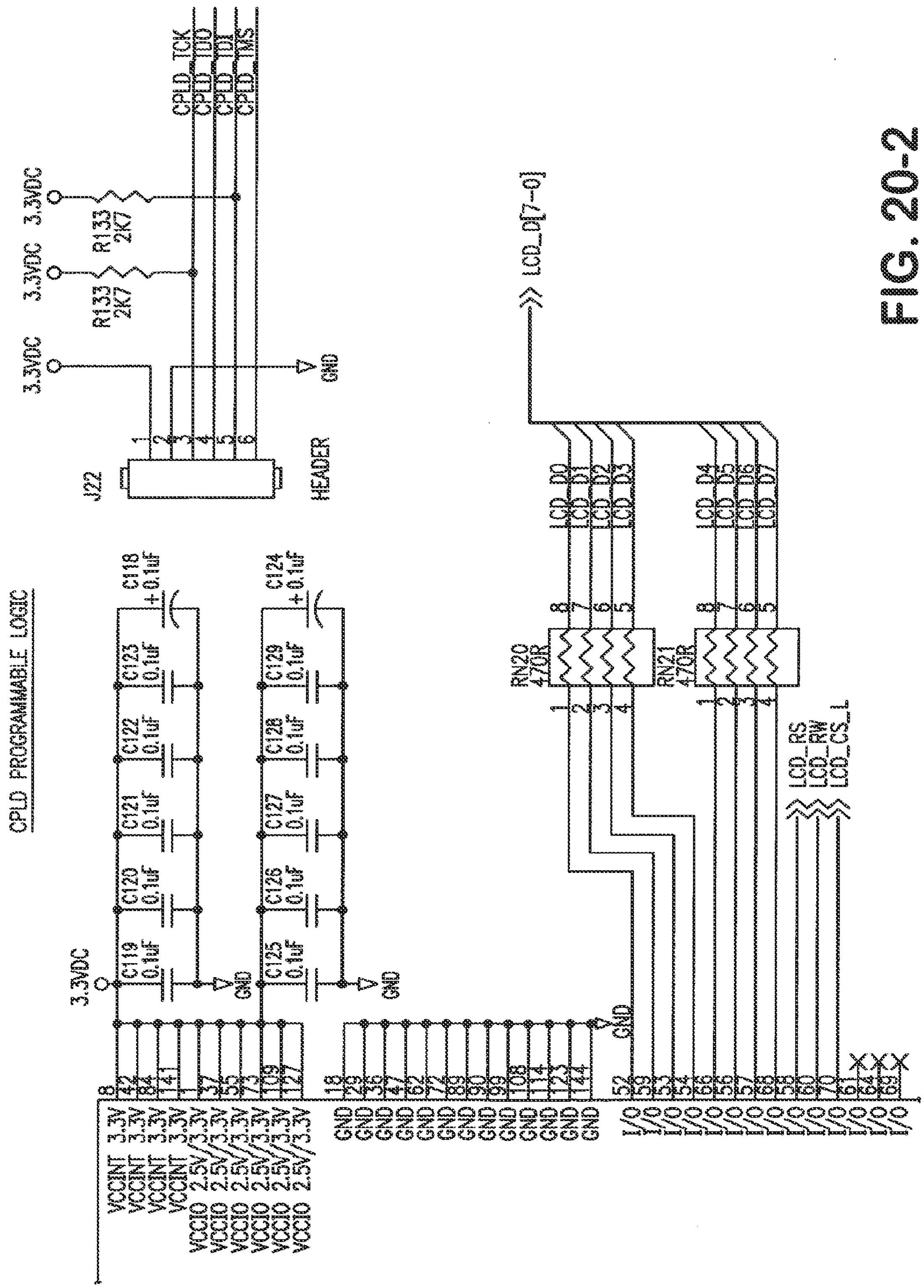
Figures 3, 20:
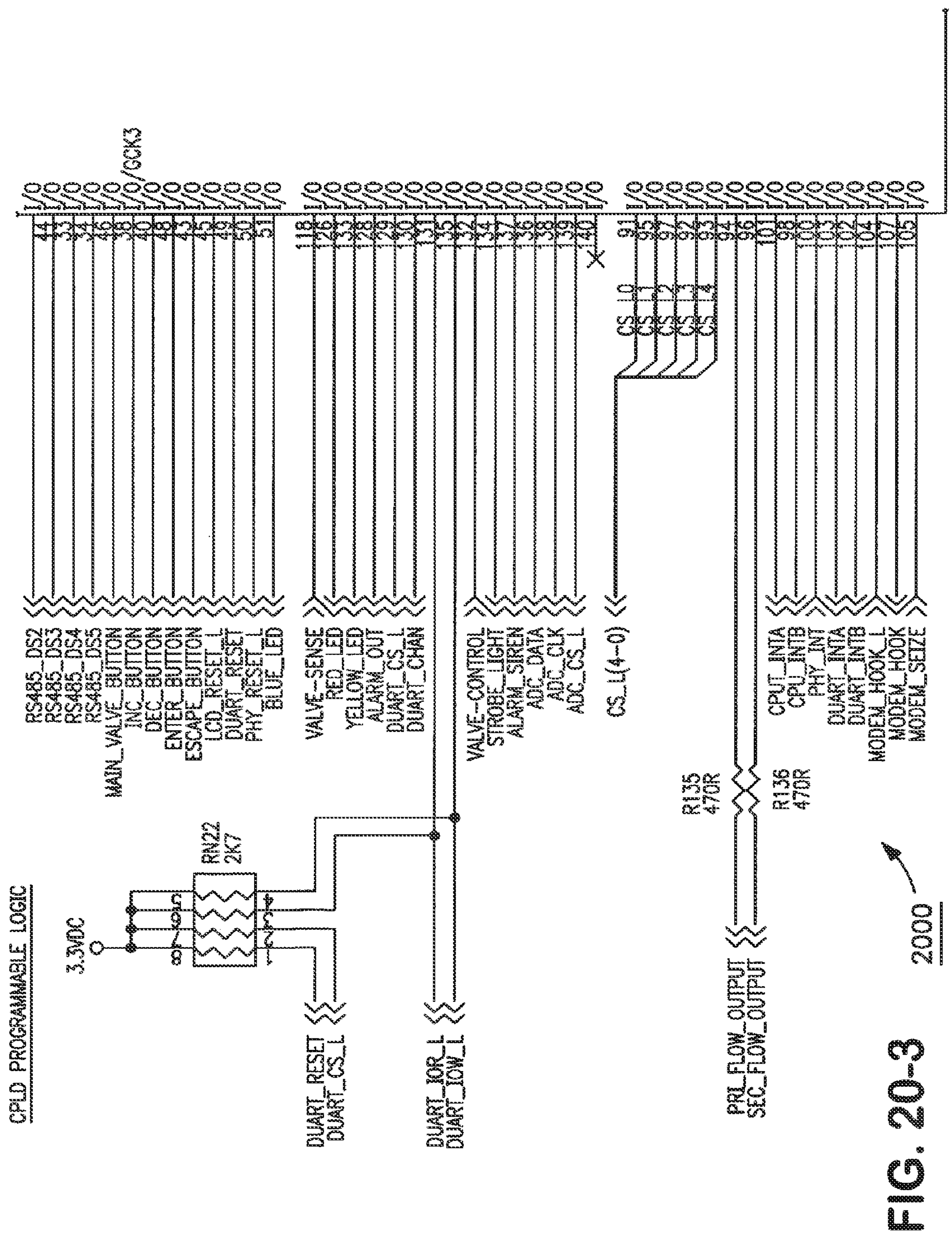
Figures 4, 20:
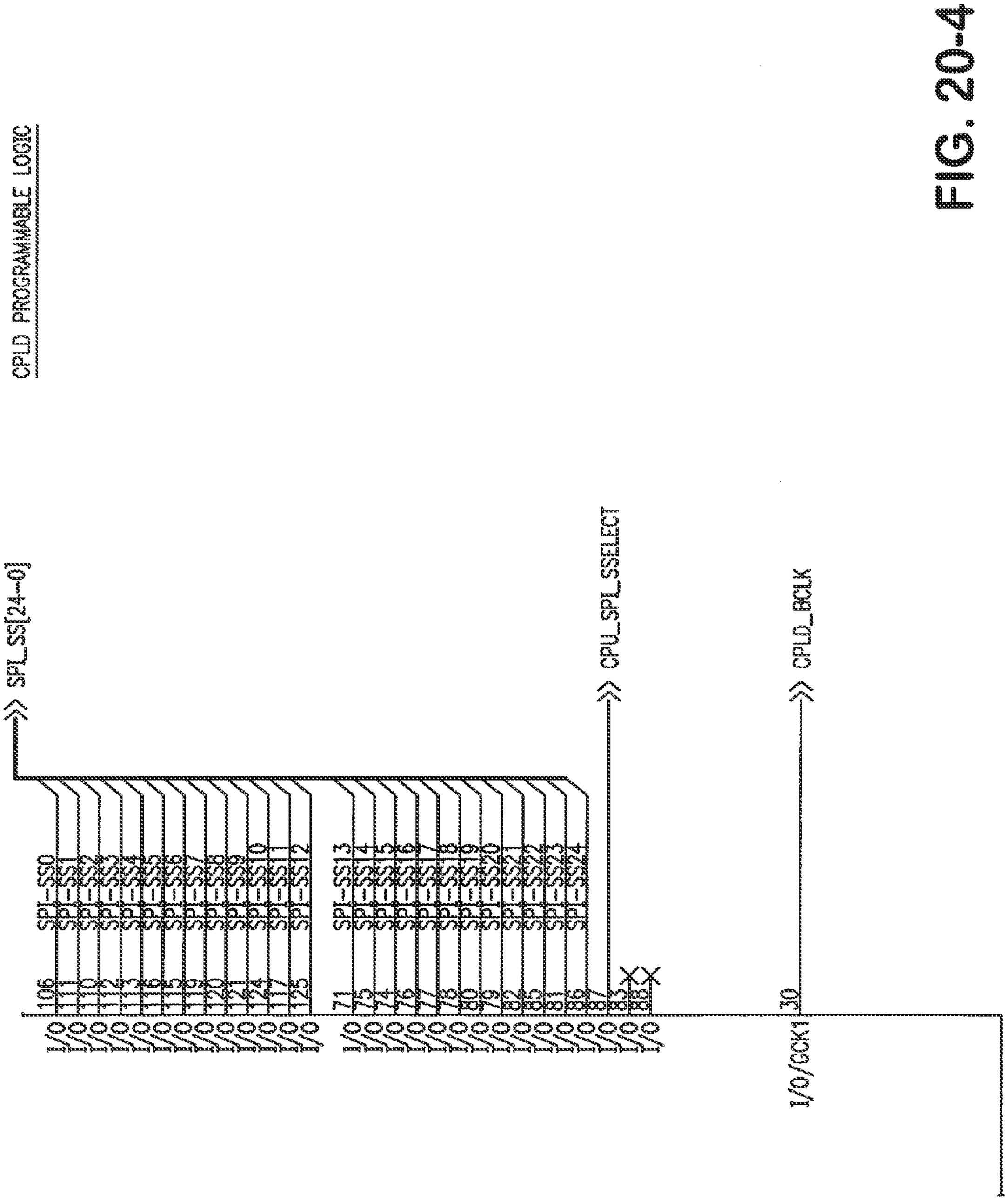

FIGS. 16-1 through 20-4 show example circuitry 1600, 1700, 1800, 1900, and 2000 for the main CPU and control logic block 1410. Specifically, FIGS. 16-1 through 16-6 shows the address and data connections associated with the main CPU; FIGS. 17-1 and 17-2 show the power, ground, GPIO (general purpose input output), and Ethernet connections associated with the main CPU; FIGS. 18-1 through 18-6 show the SDRAM and FLASH memories; FIGS. 19-1 through 19-4 show bus transceivers; and FIGS. 20-1 through 20-4 show CPLD (complex programmable logic device) programmable logic.

Figures 1, 21:
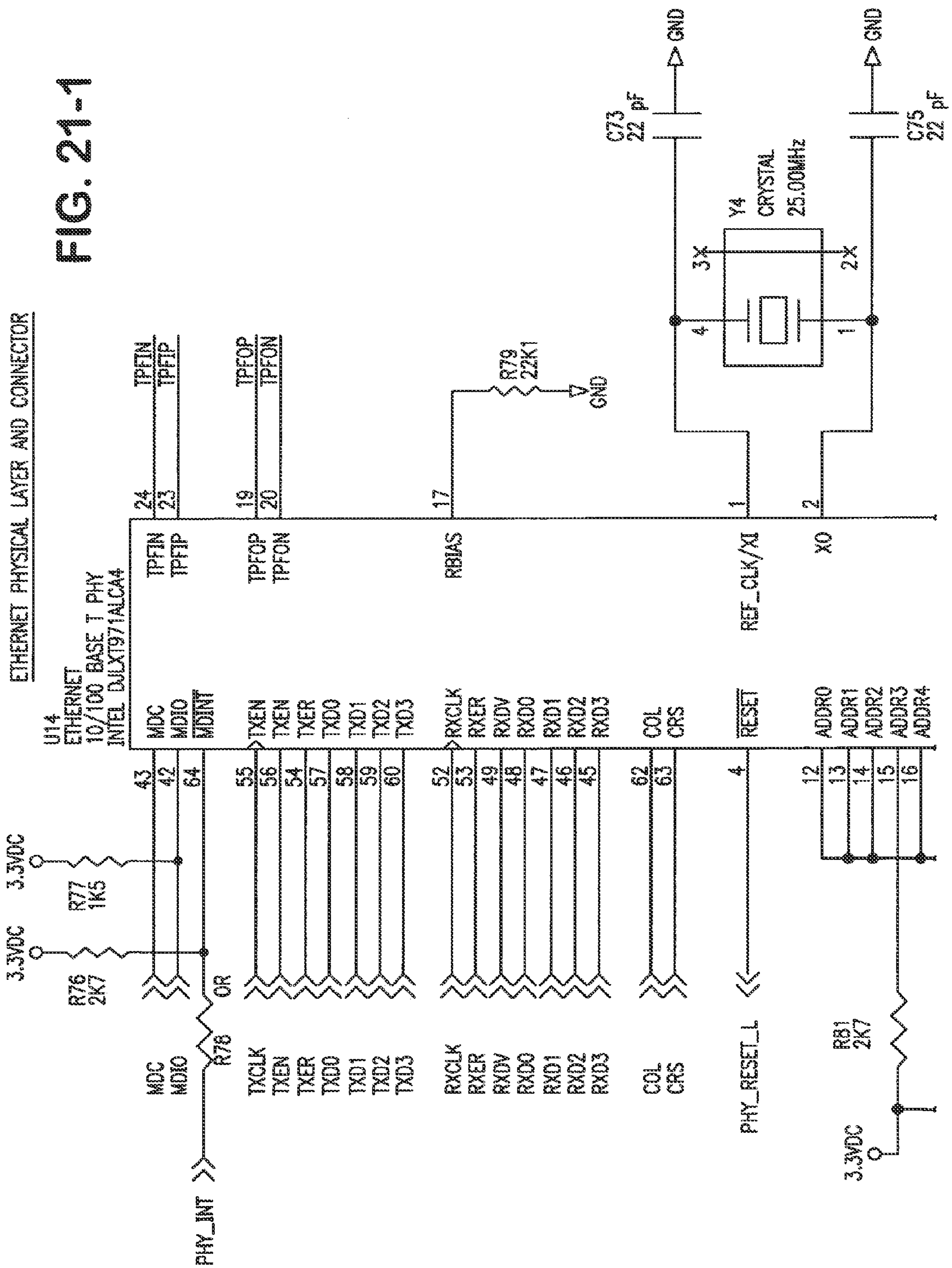
Figures 2, 21:
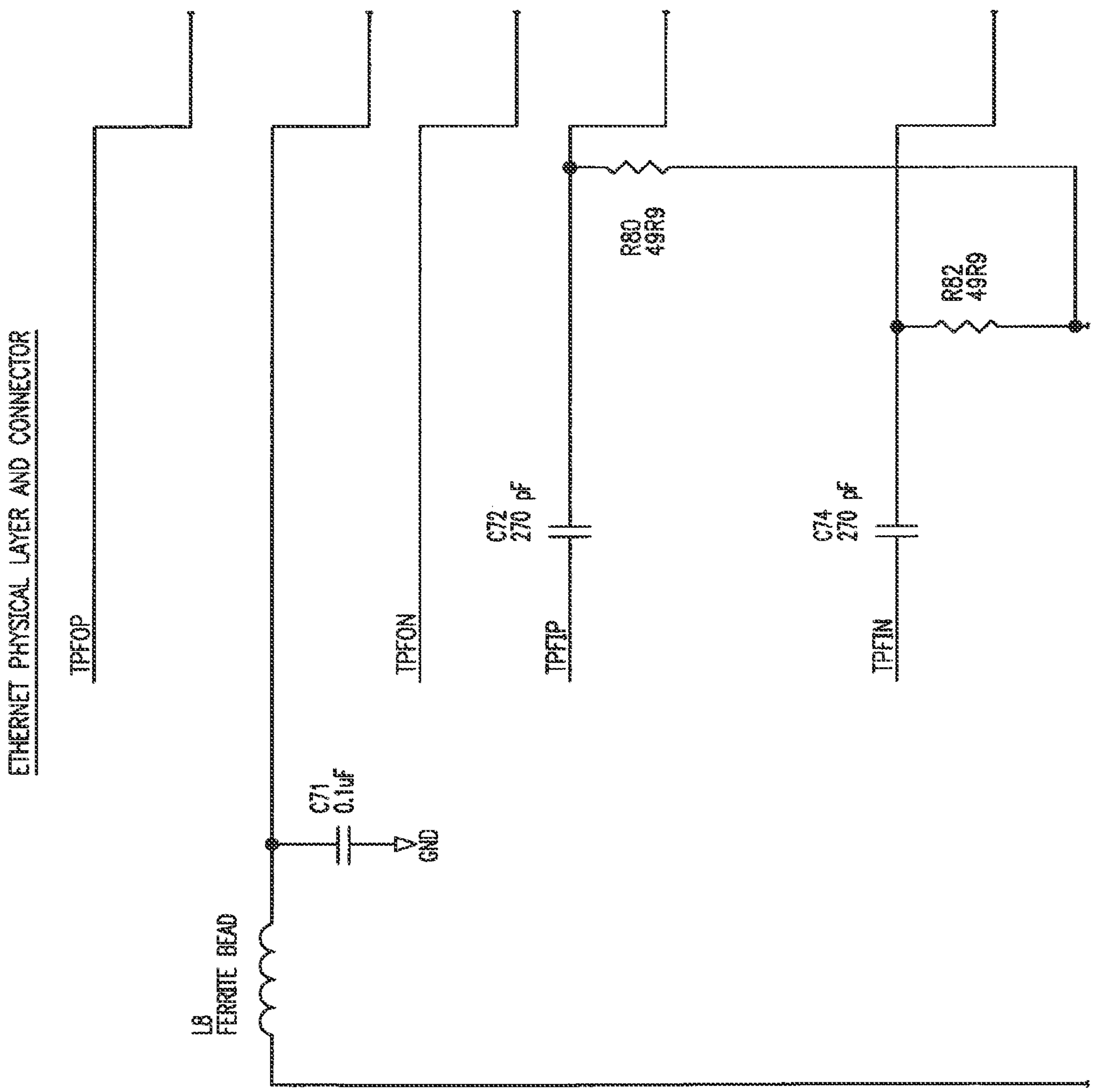
Figures 3, 21:
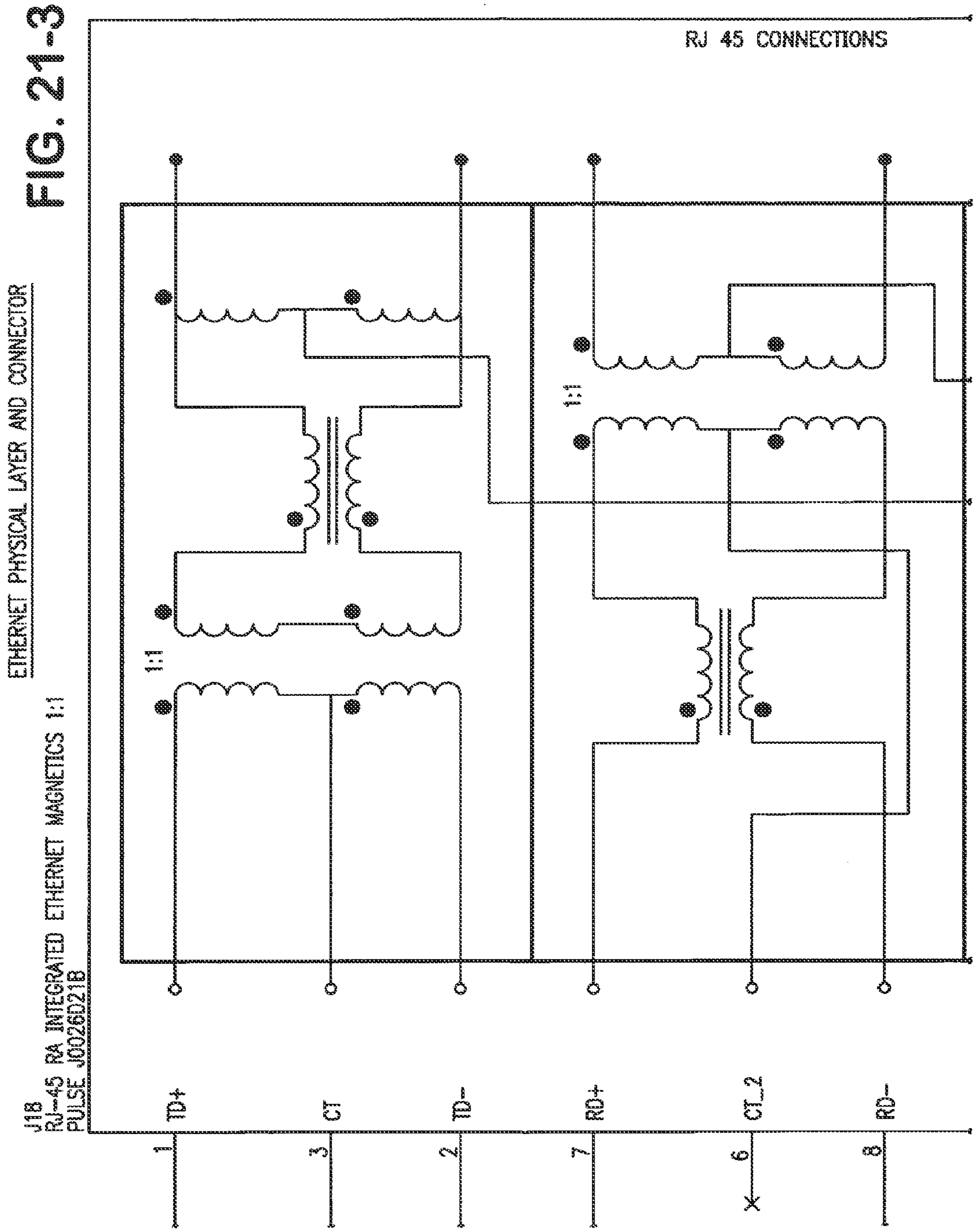
Figures 4, 21:
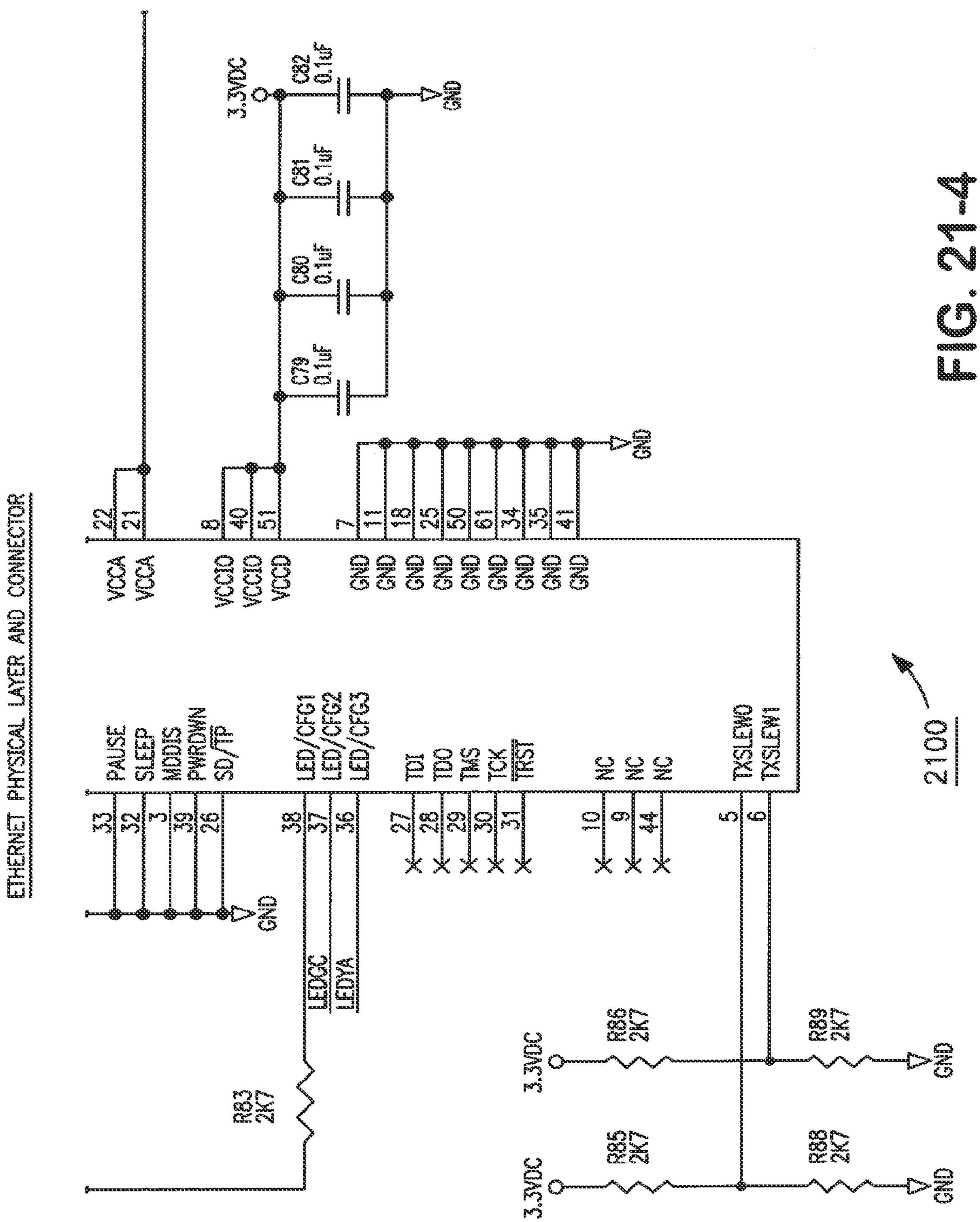
Figures 5, 21:
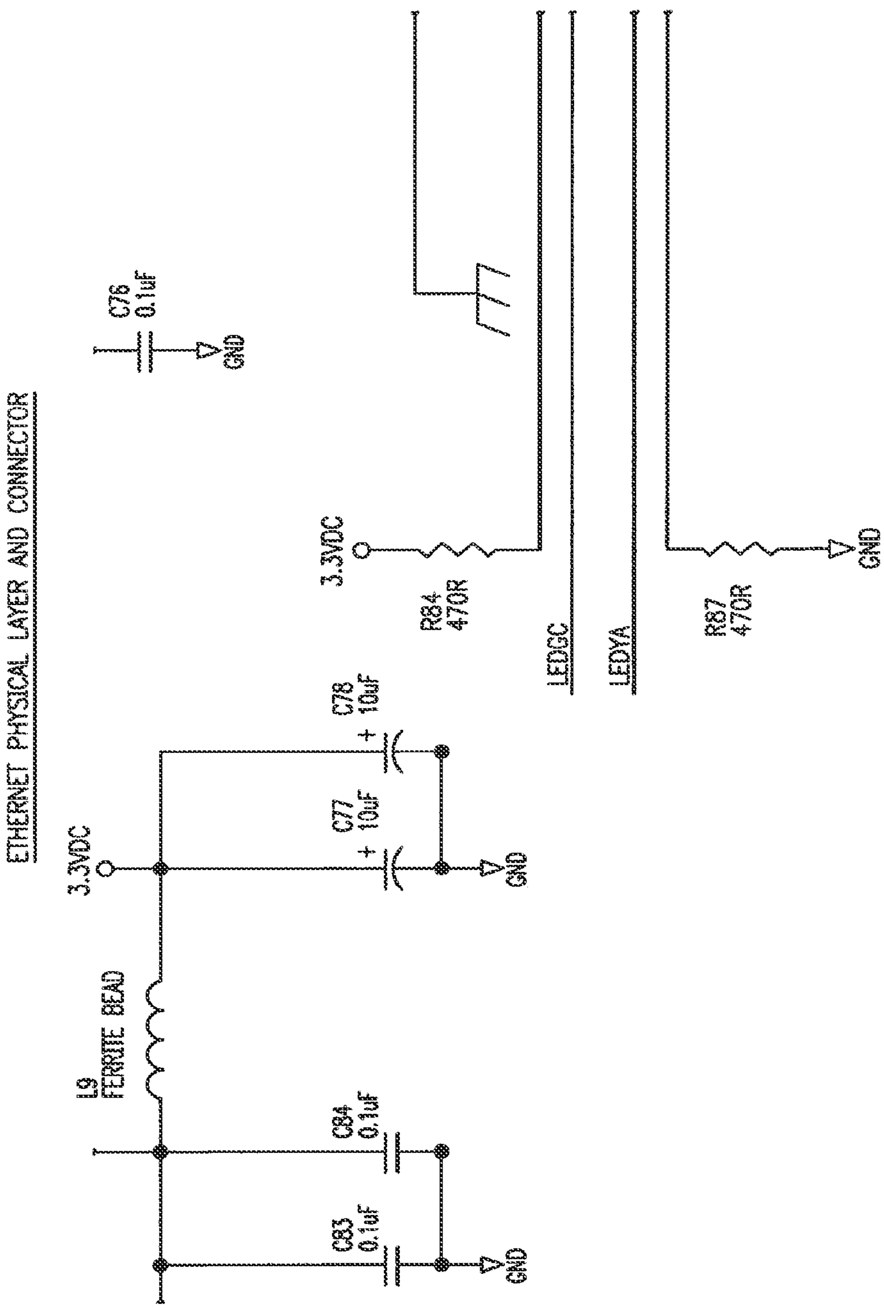
Figures 6, 21:
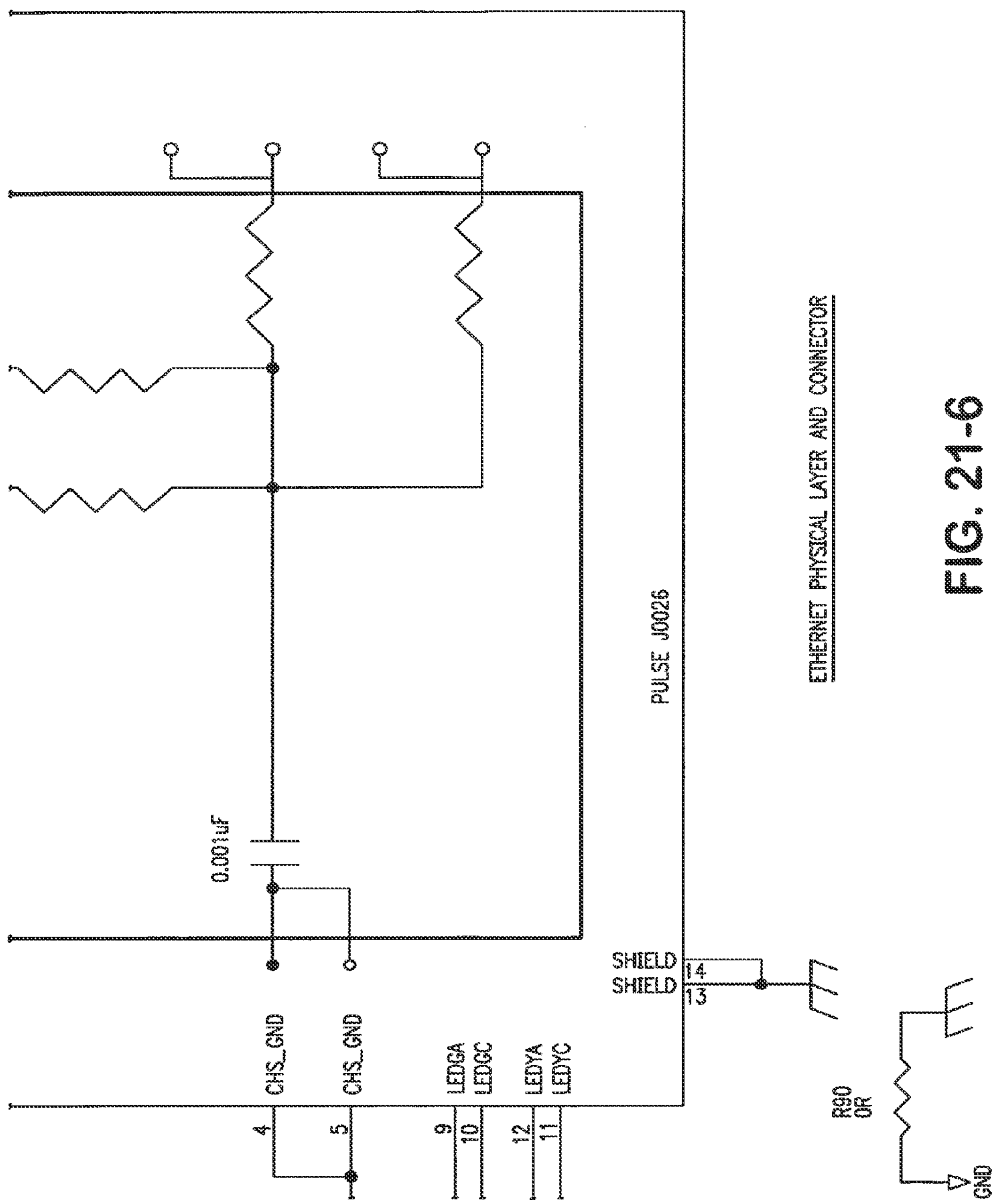
Figures 1, 22:
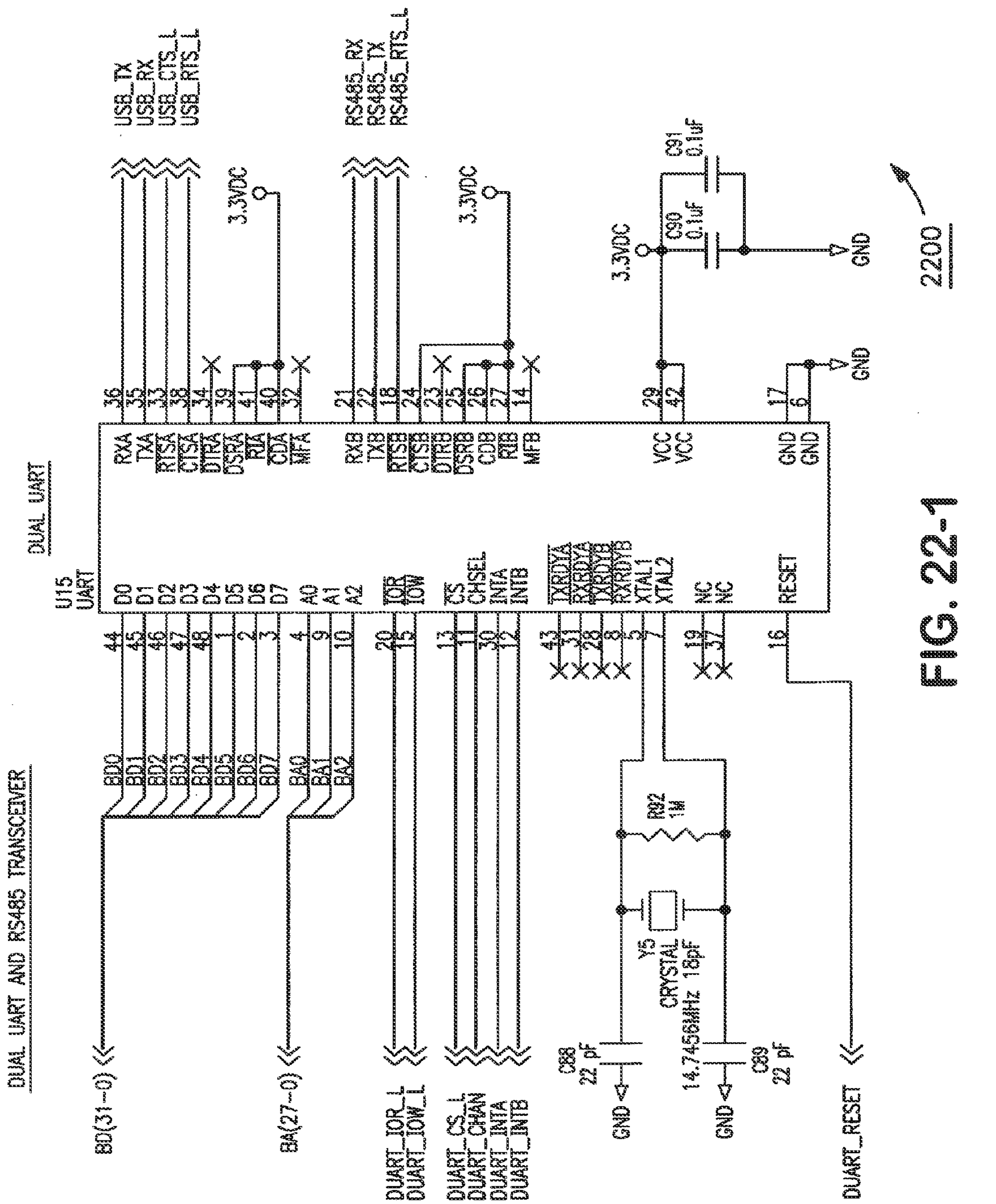
Figures 2, 22:
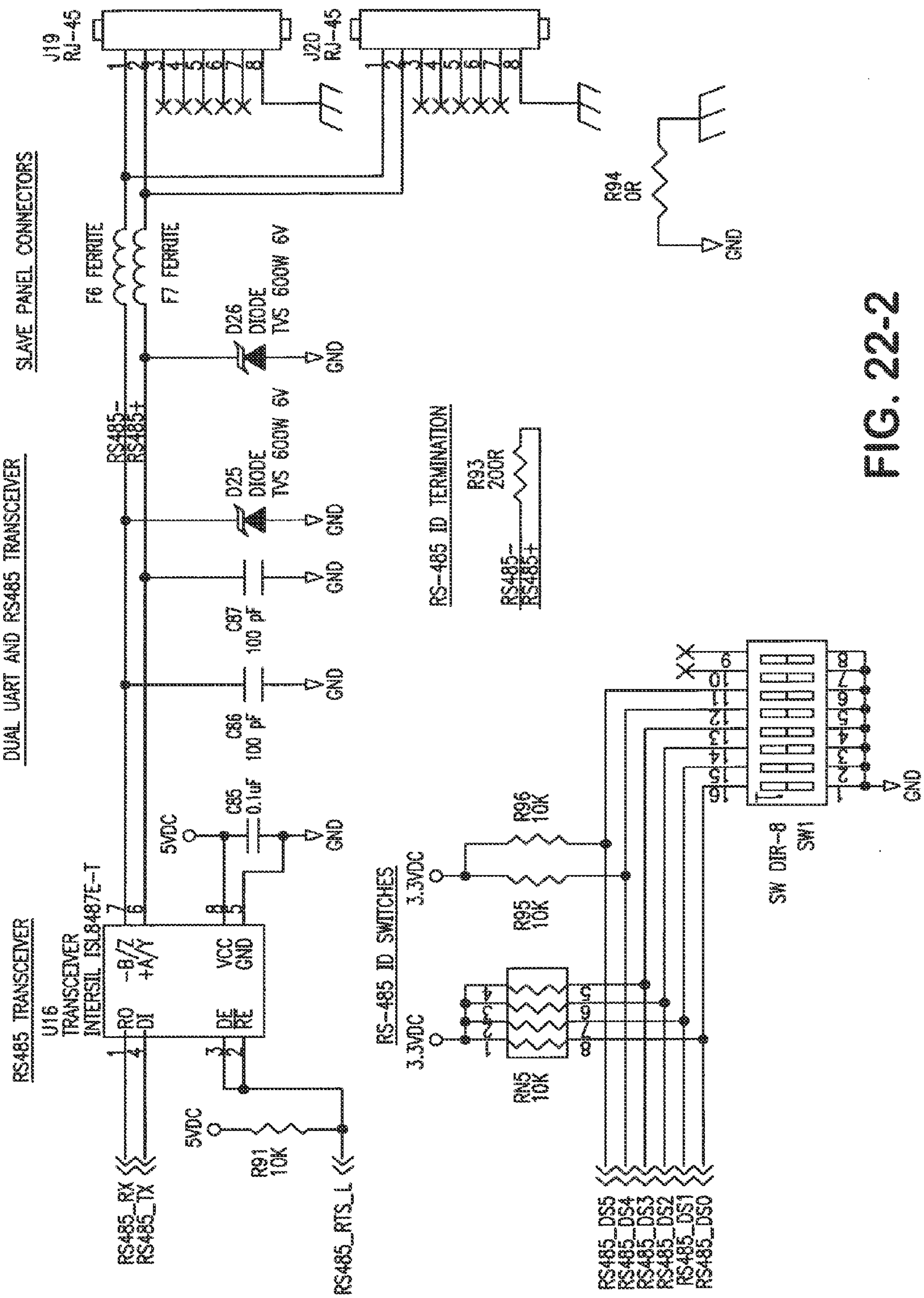

FIGS. 21-1 through 21-6 show example circuitry 2100 for the Ethernet interface block 1420. FIGS. 22-1 and 22-2 show example circuitry 2200 for the UART block 1405 and the slave panel communication block 1450.

Figures 1, 23:
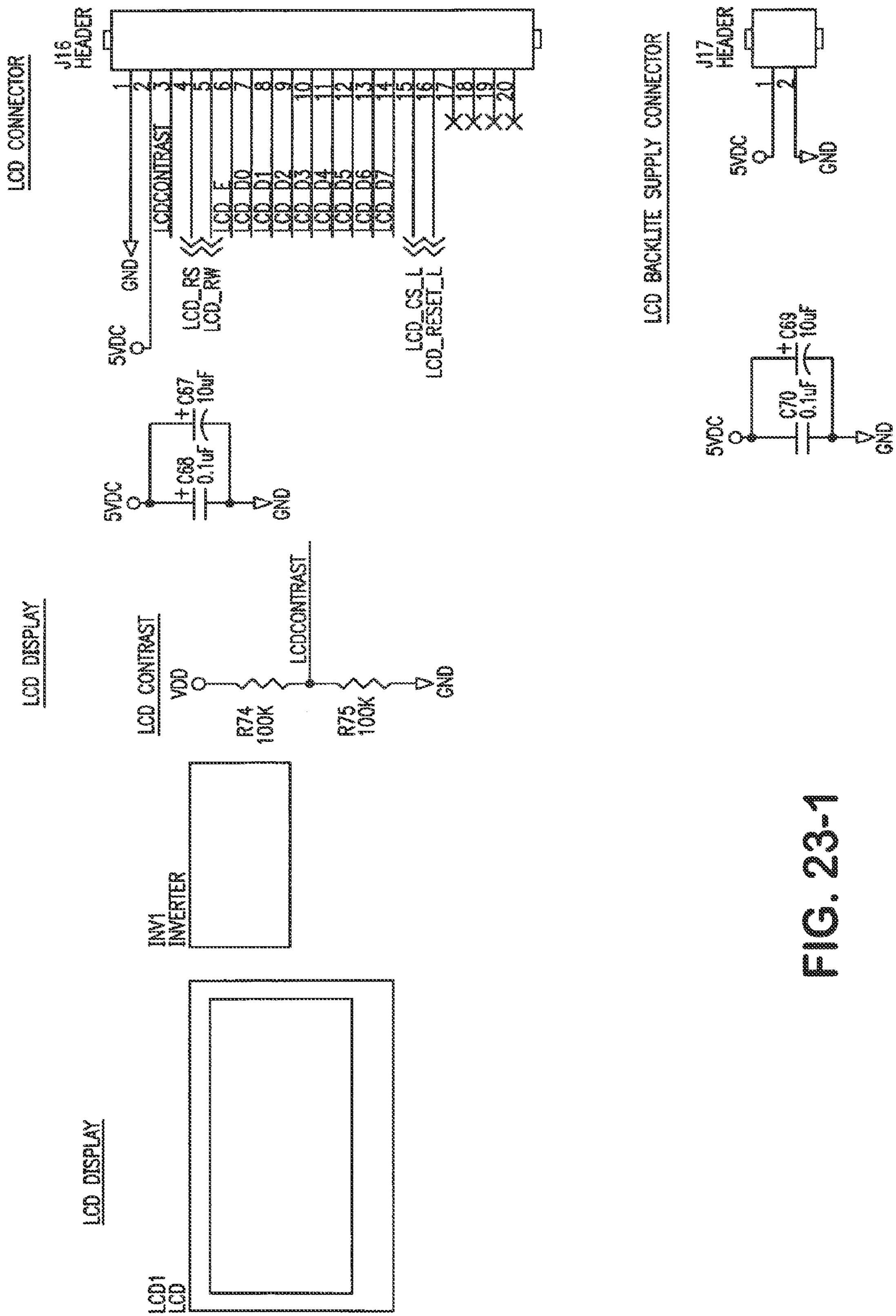
Figures 2, 23:
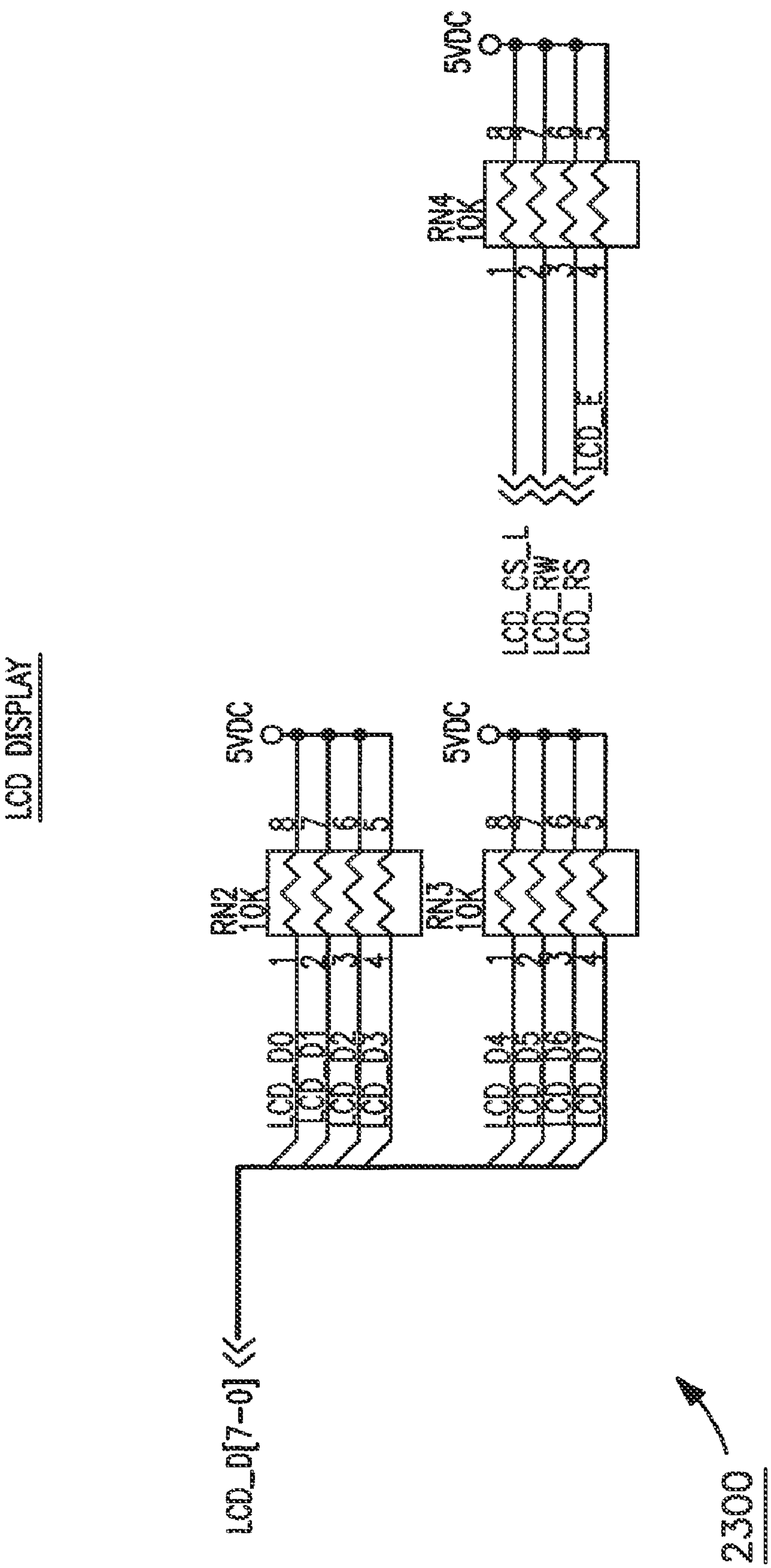
Figures 1, 24:
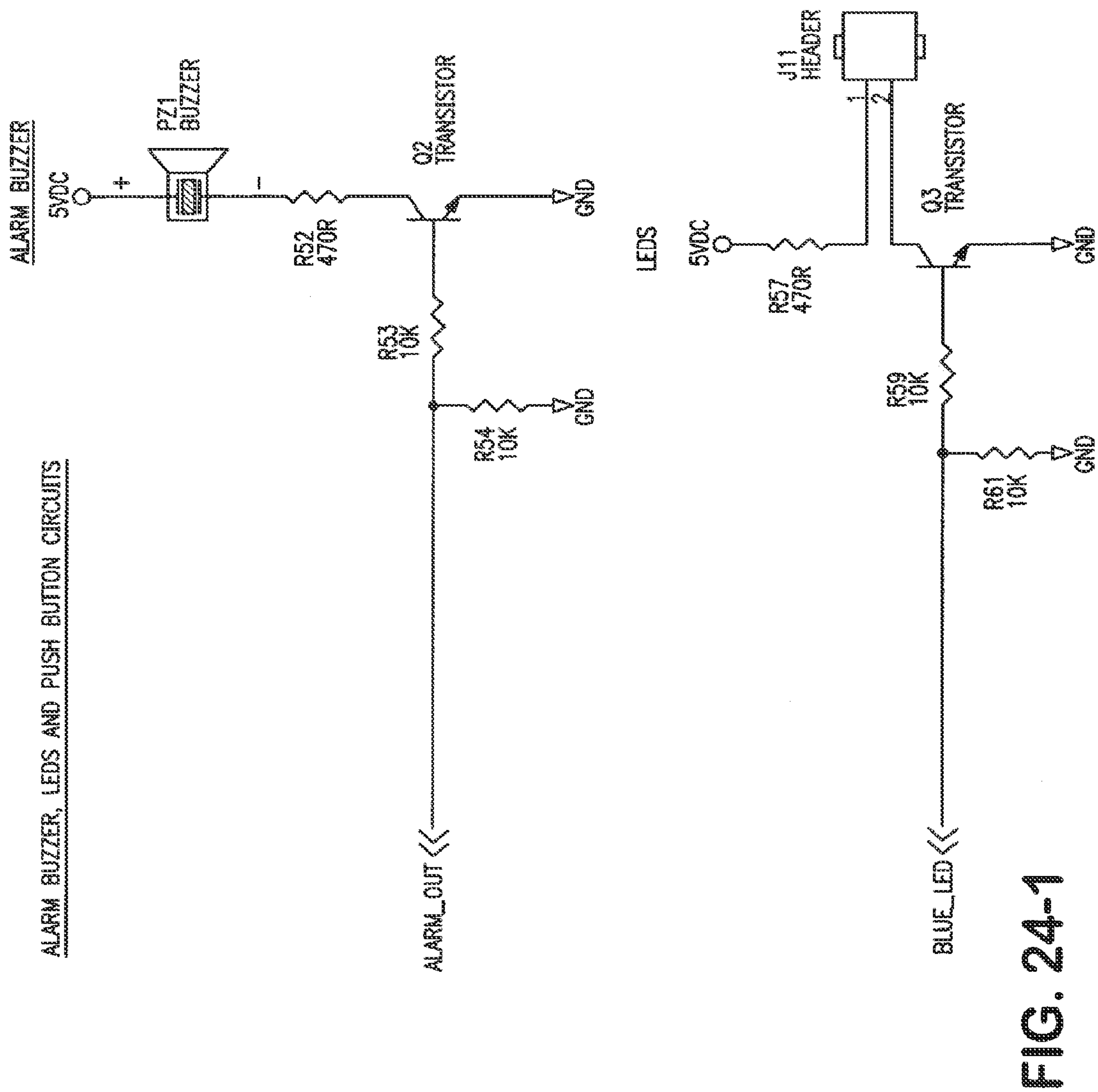
Figures 2, 24:
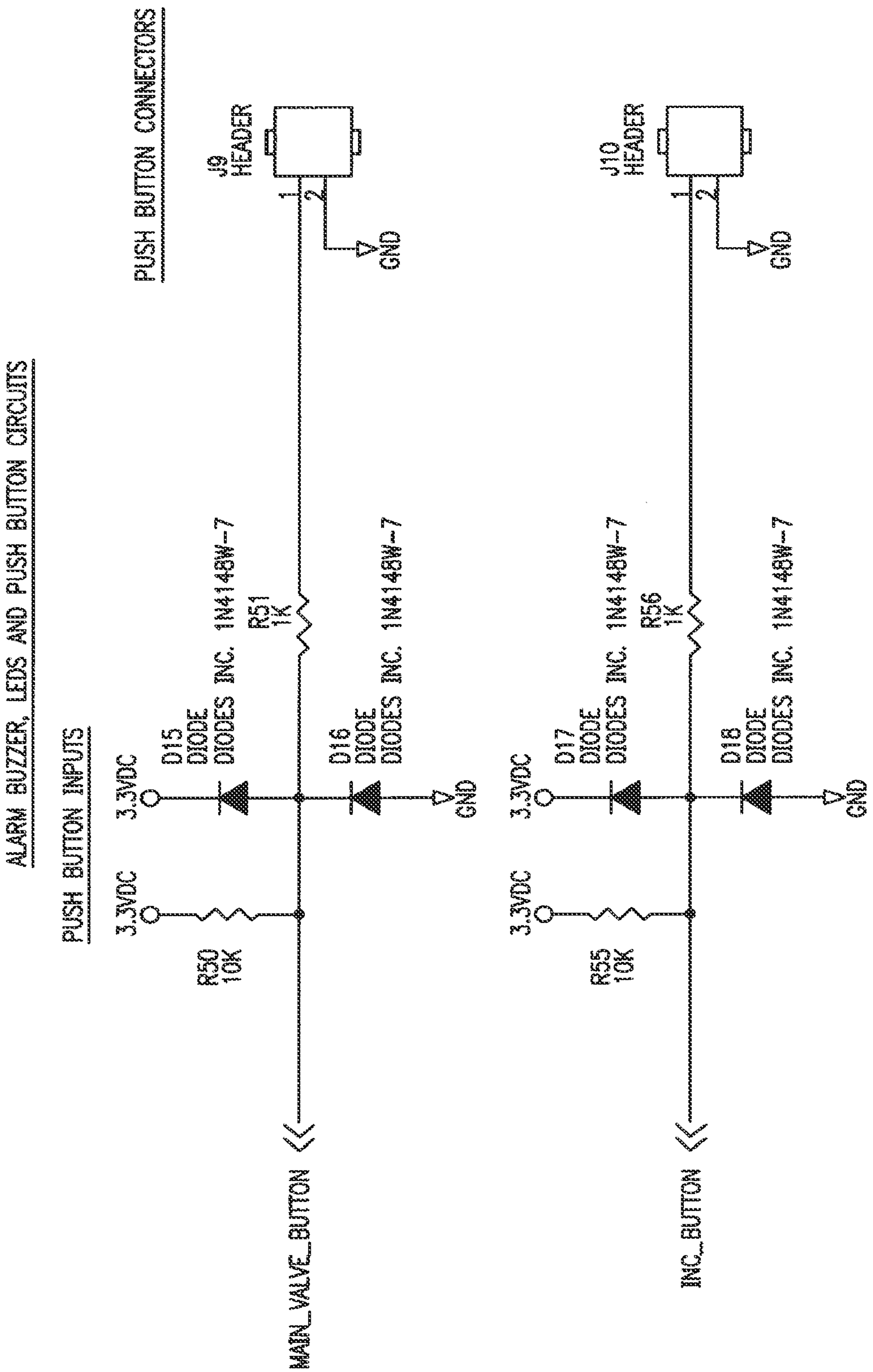
Figures 3, 24:
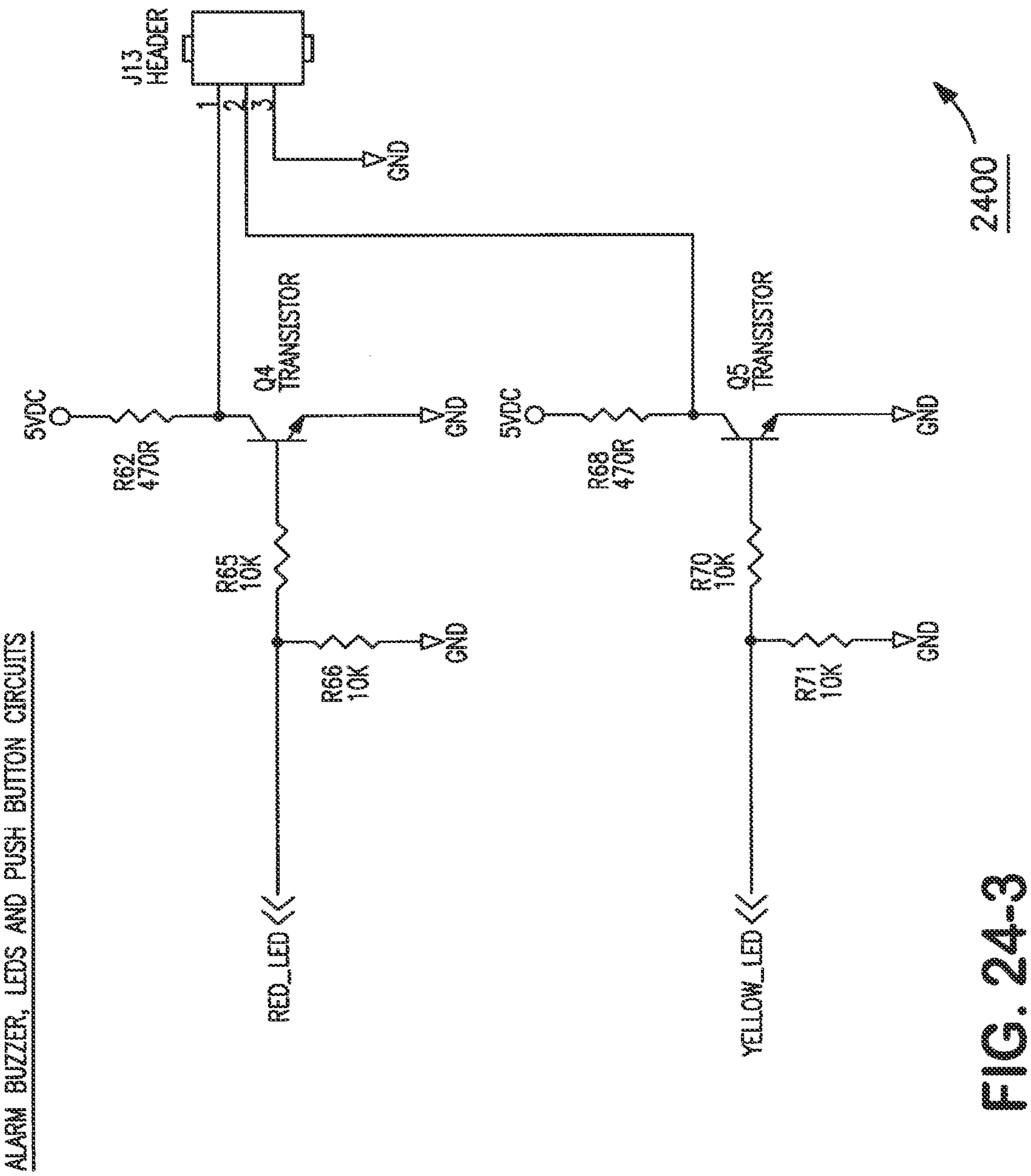
Figures 4, 24:
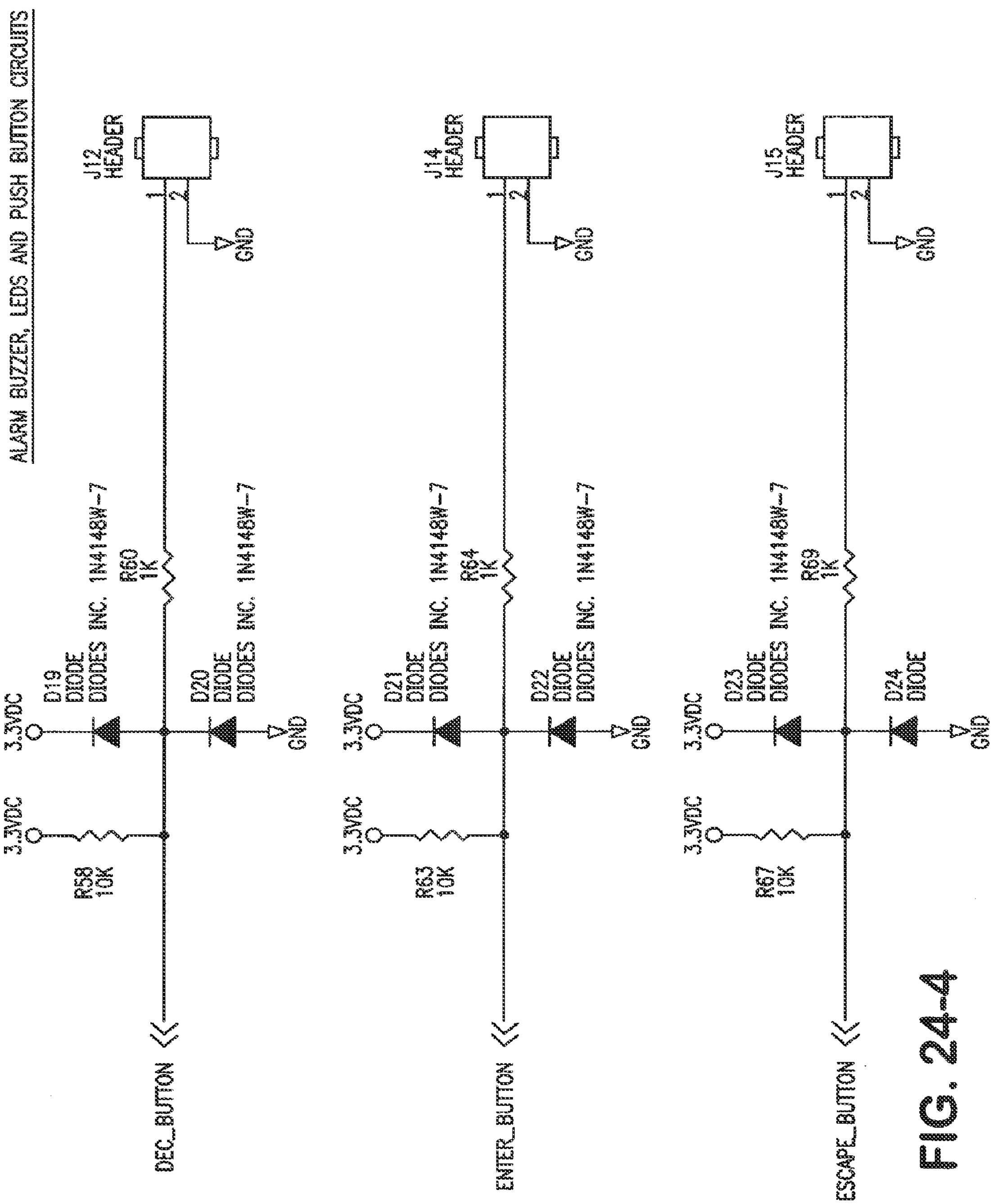

FIGS. 23-1 and 23-2 and FIGS. 24-1 through 24-4 show example circuitry 2300, 2400 for the user interface block 1415. Specifically, FIGS. 23-1 and 23-2 show circuitry related to the LCD display, and FIGS. 24-1 through 24-4 show circuitry for the alarm buzzer, LEDs, and push button circuits.

Figures 1, 25:
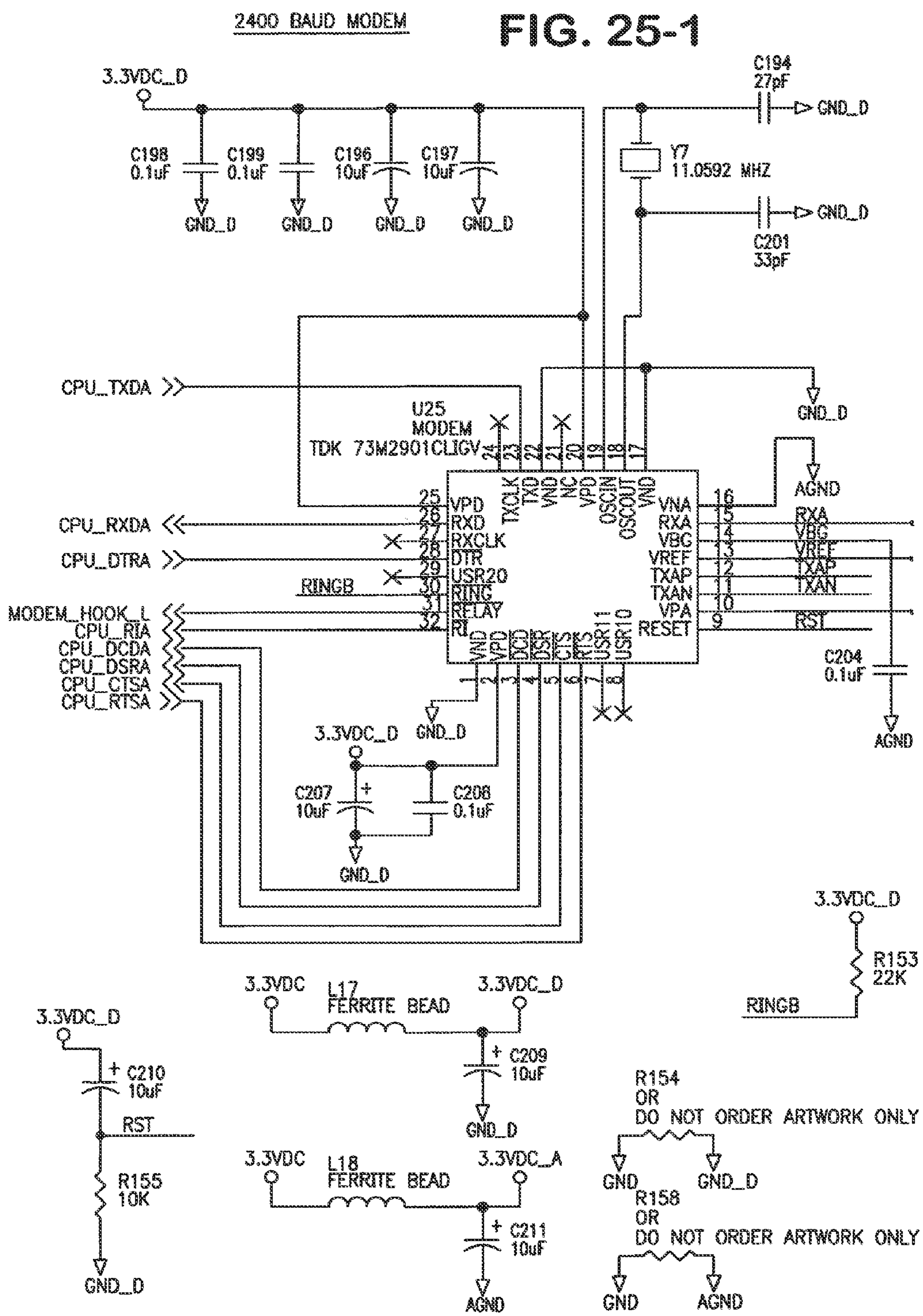
Figures 2, 25:
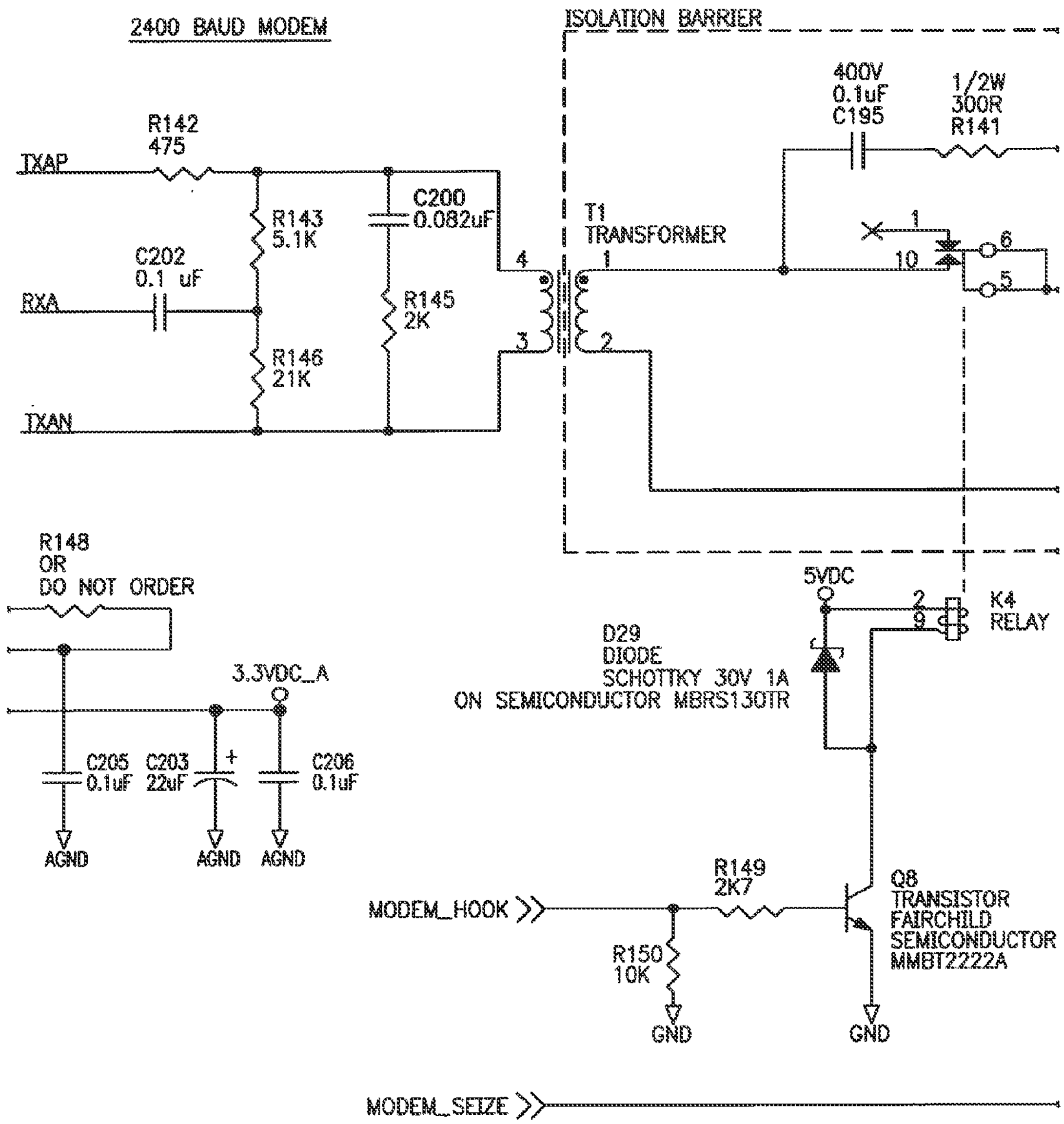
Figures 3, 25:
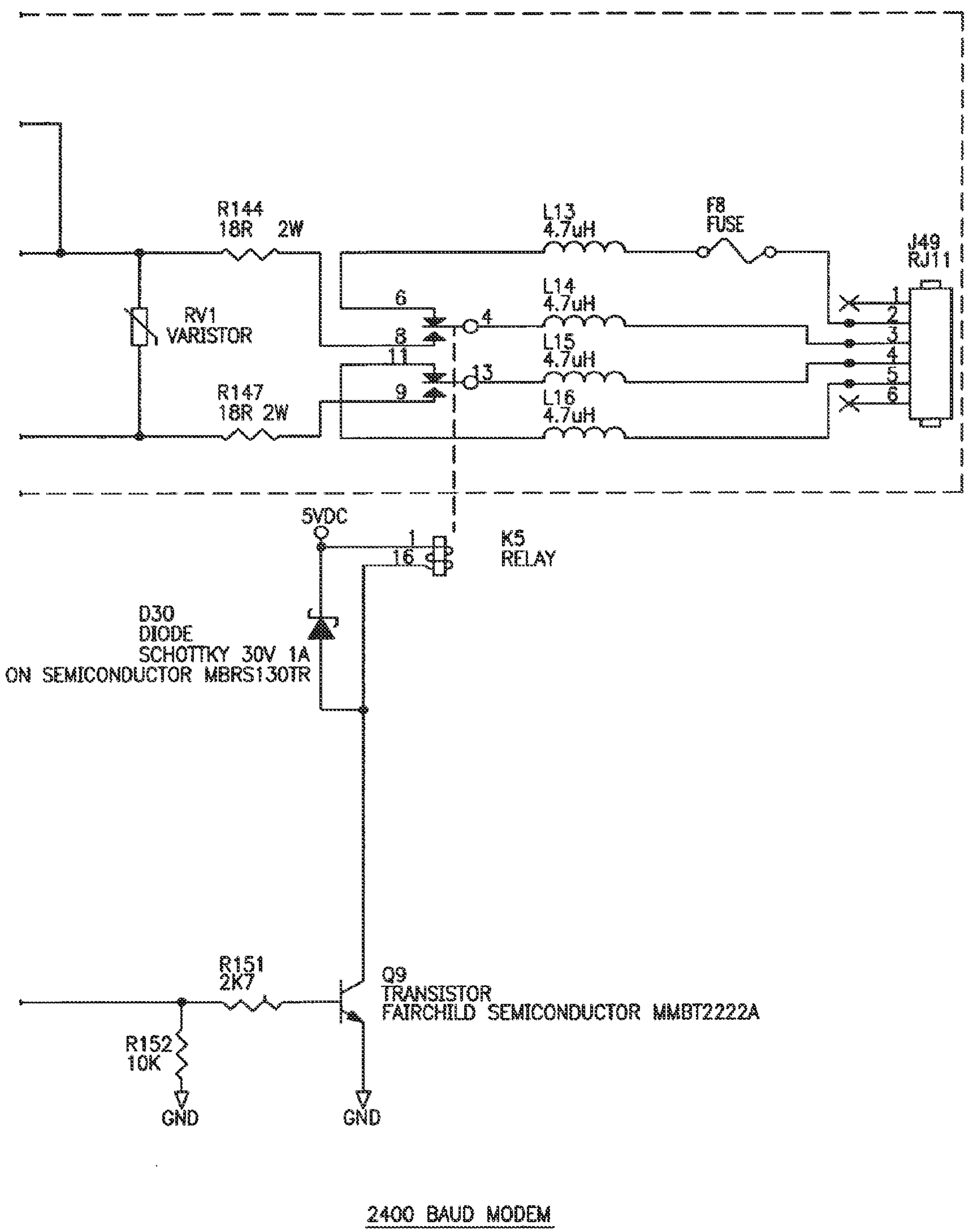

FIGS. 25-1 through 25-3 show example circuitry 2500 for the modem interface block 1425.

Figures 1, 26:
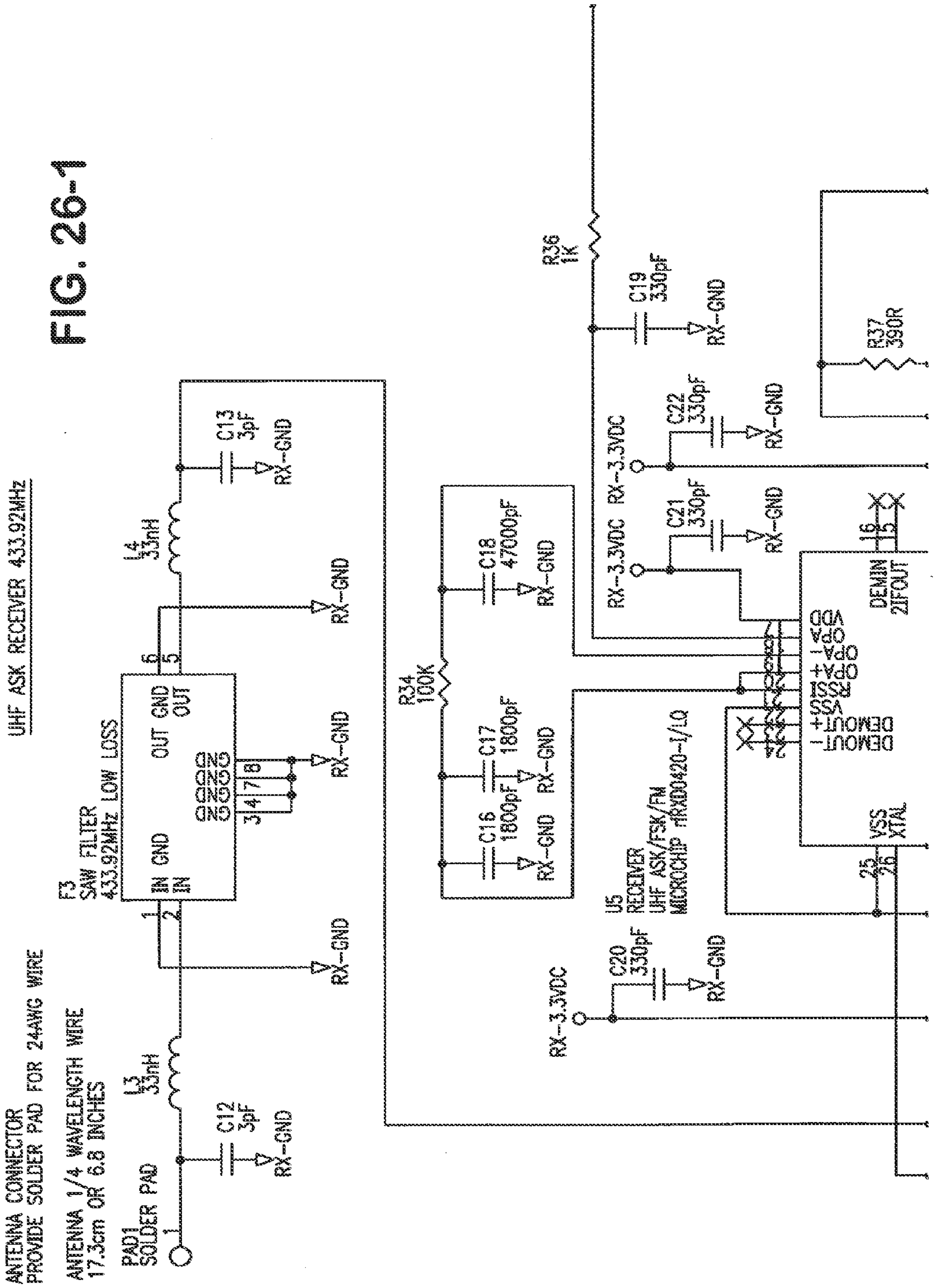
Figures 2, 26:
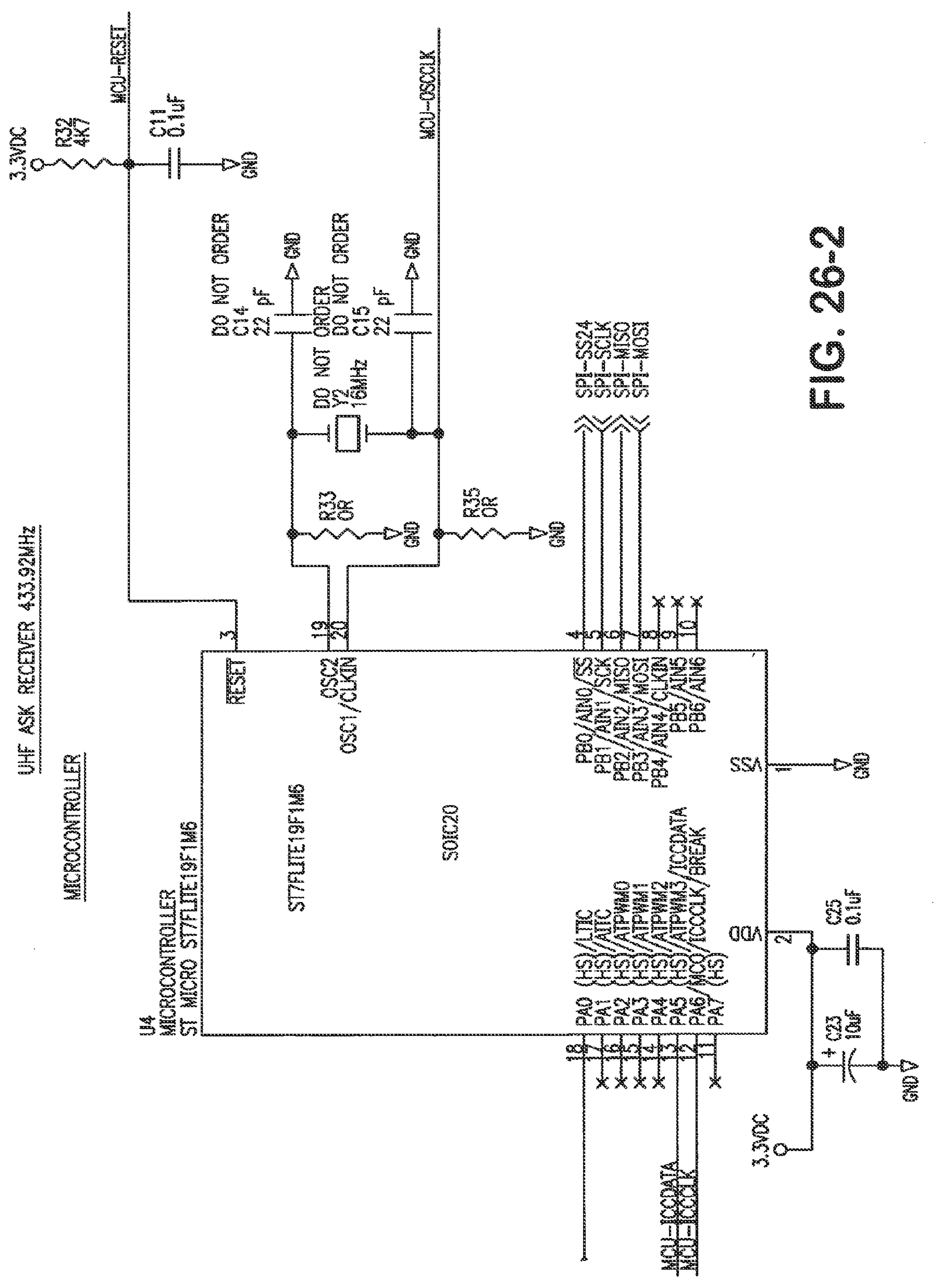
Figures 3, 26:
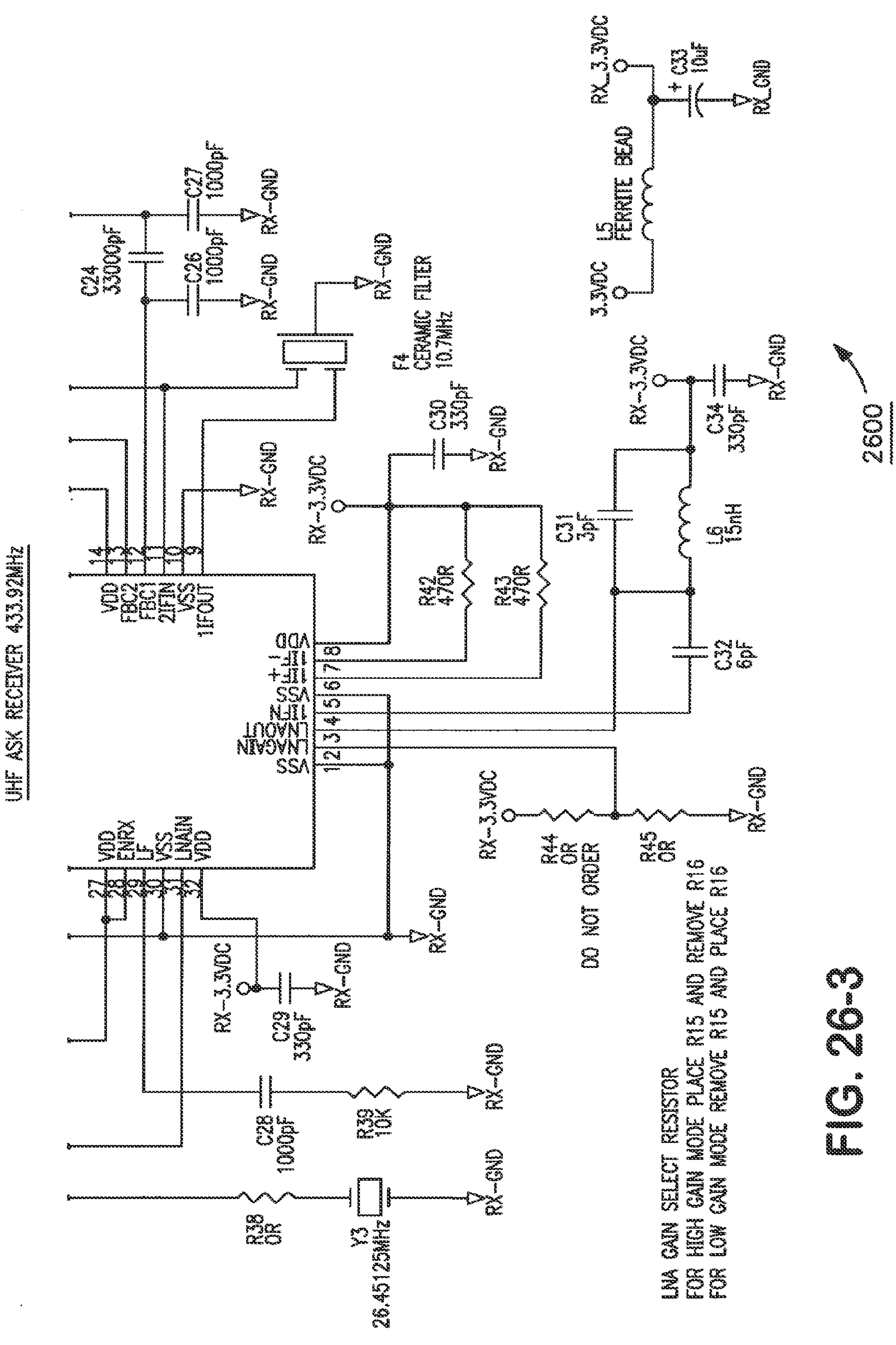
Figures 4, 26:
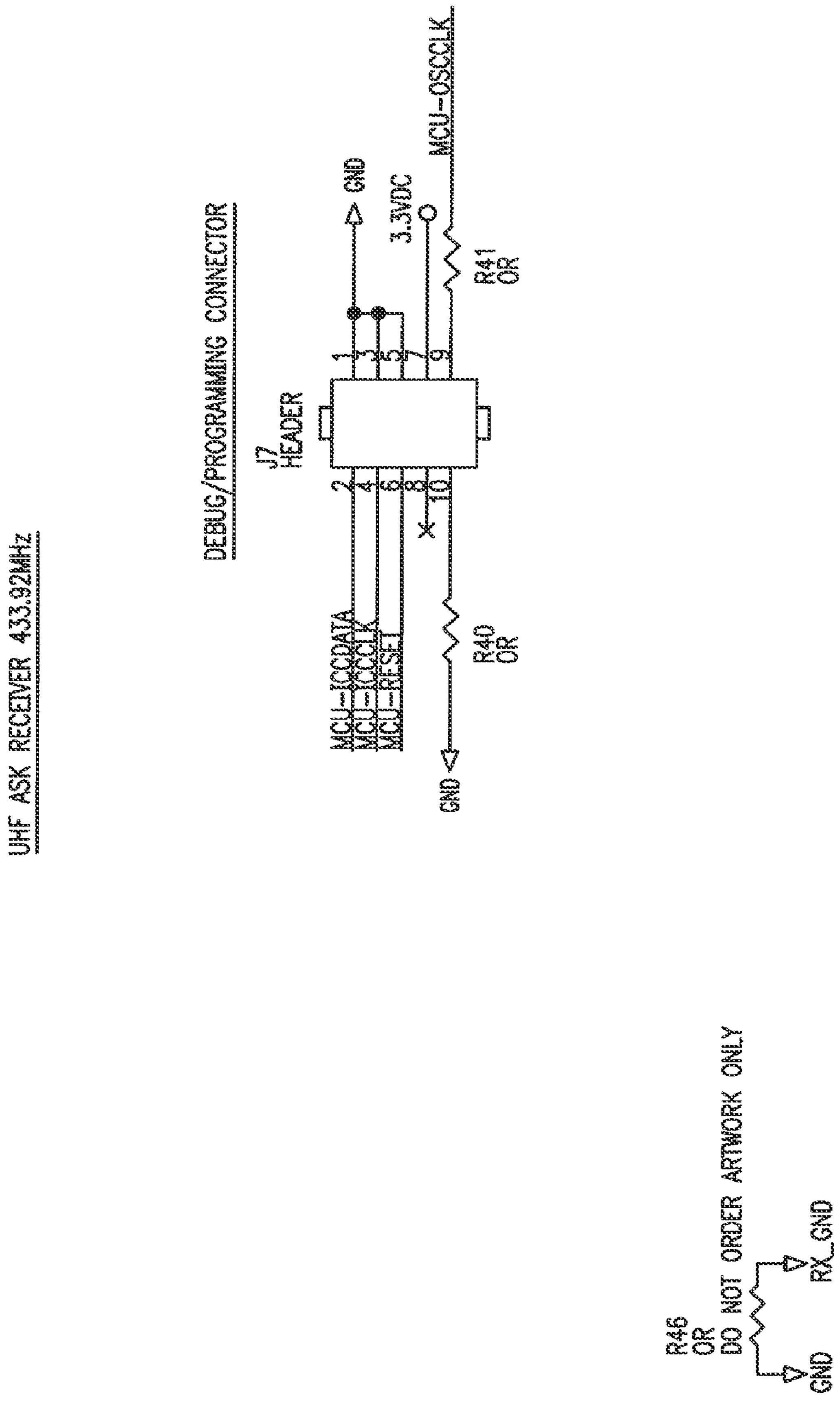

FIGS. 26-1 through 26-4 show example circuitry 2600 for the RF receiver block 1430.

Figures 1, 27:
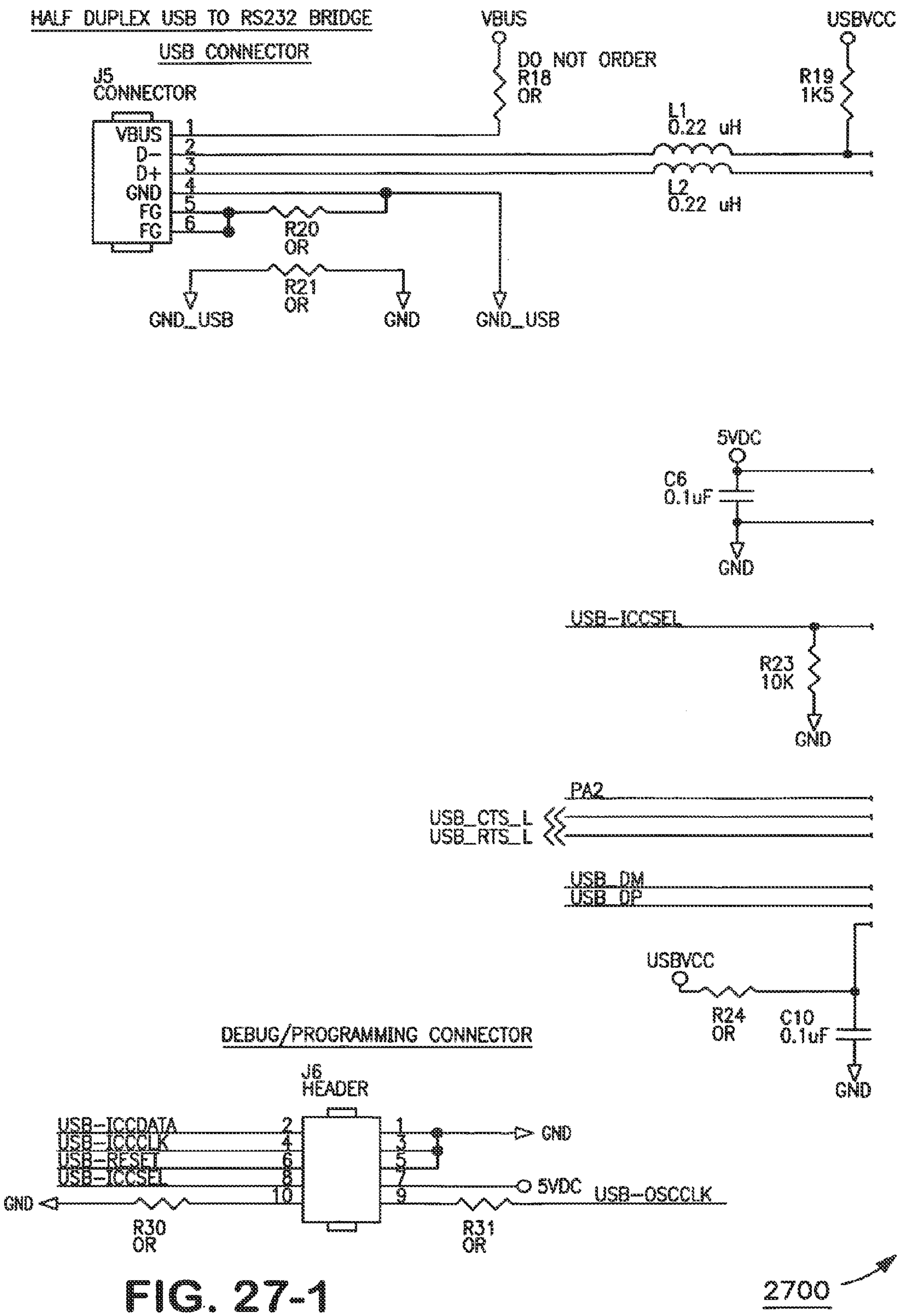
Figures 2, 27:
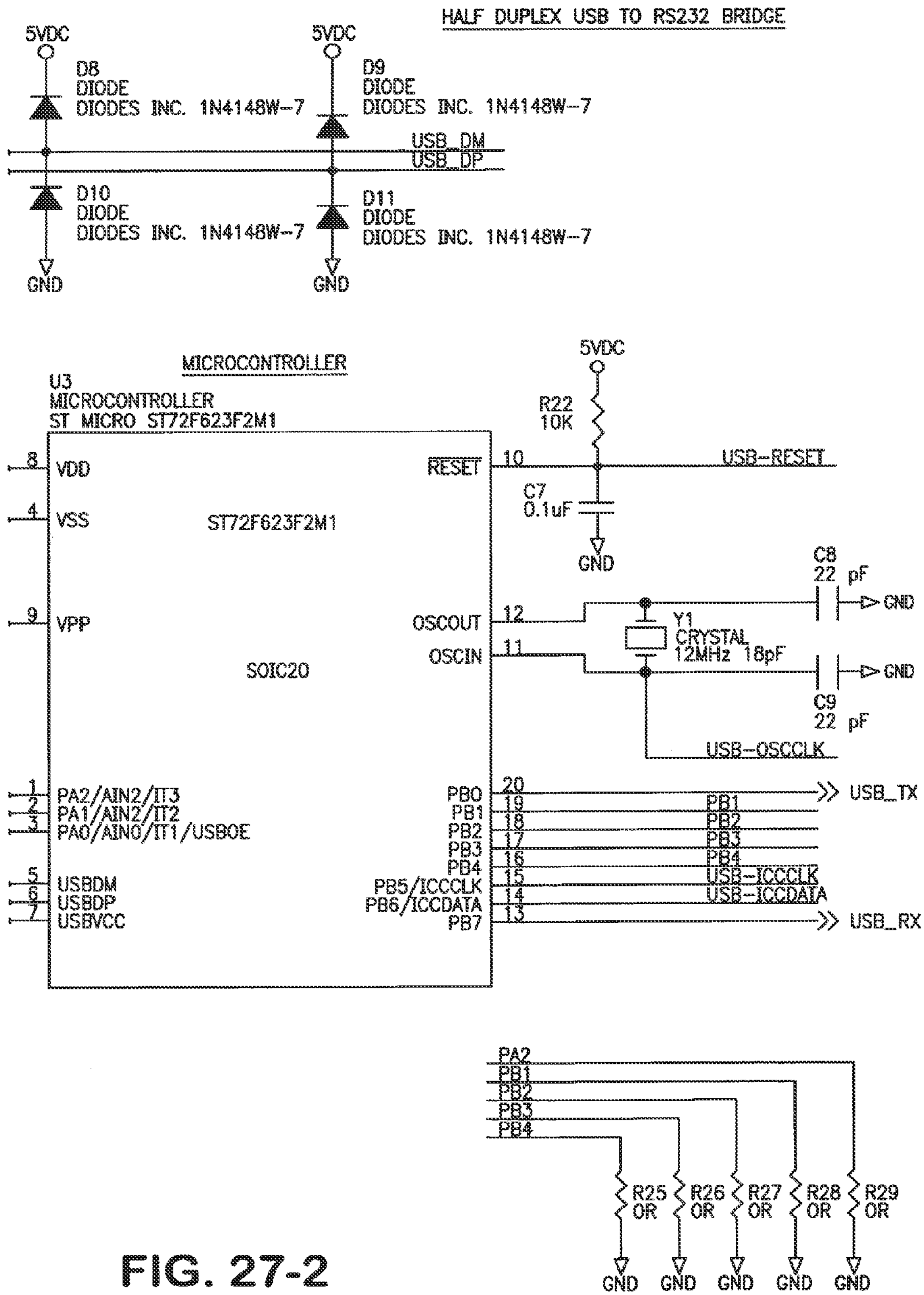

FIGS. 27-1 and 27-2 show example circuitry 2700 for the USB communication block 1445.

Figure 28:
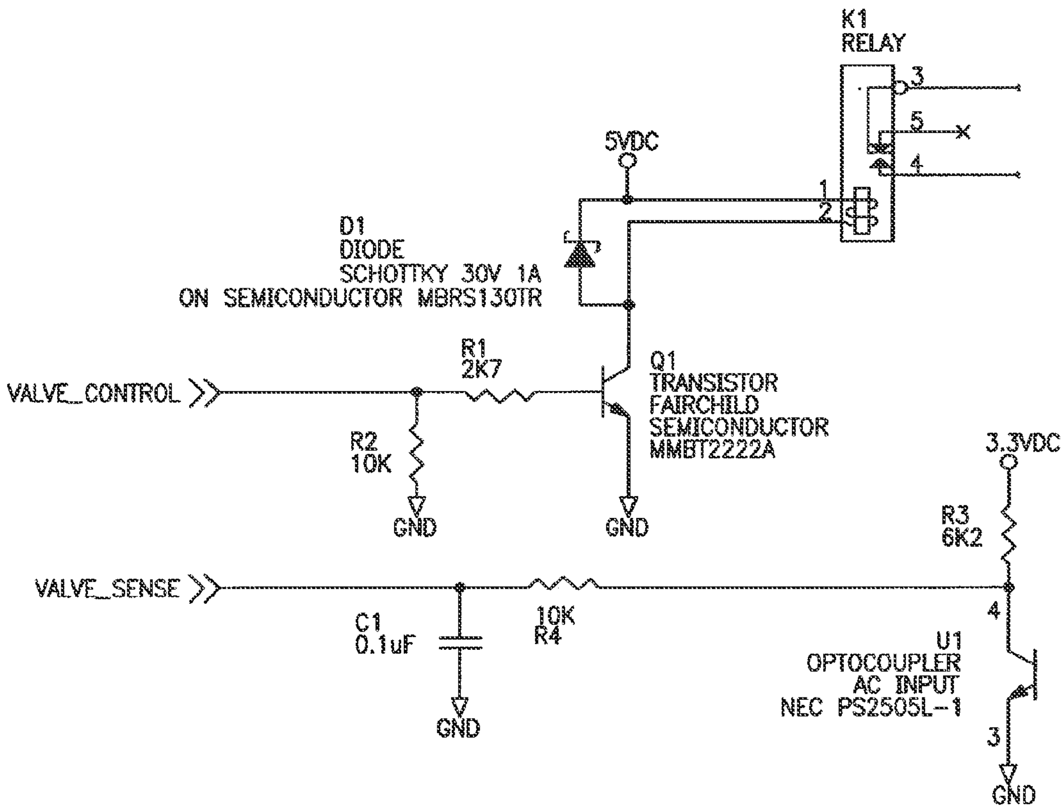
Figure 1:
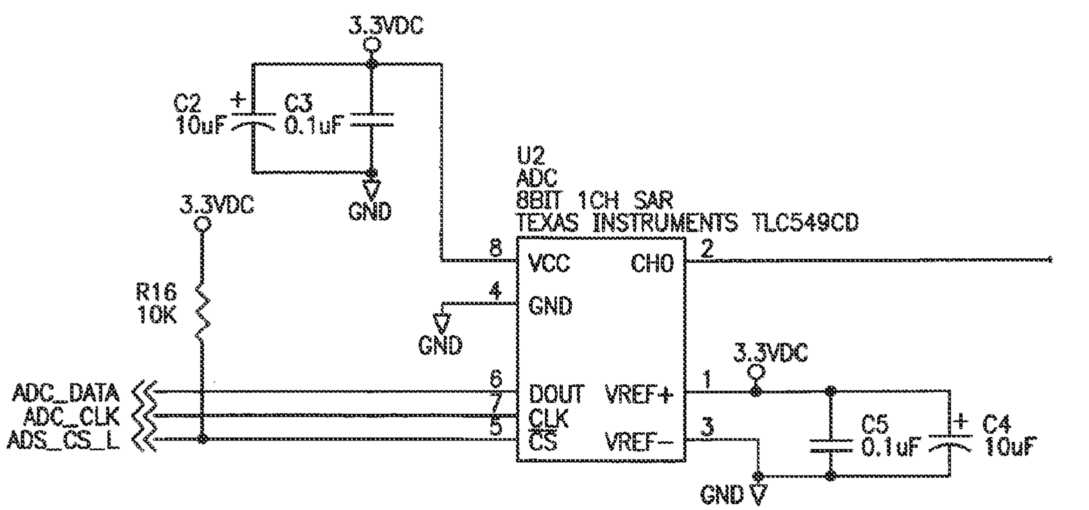
Figures 2, 28:
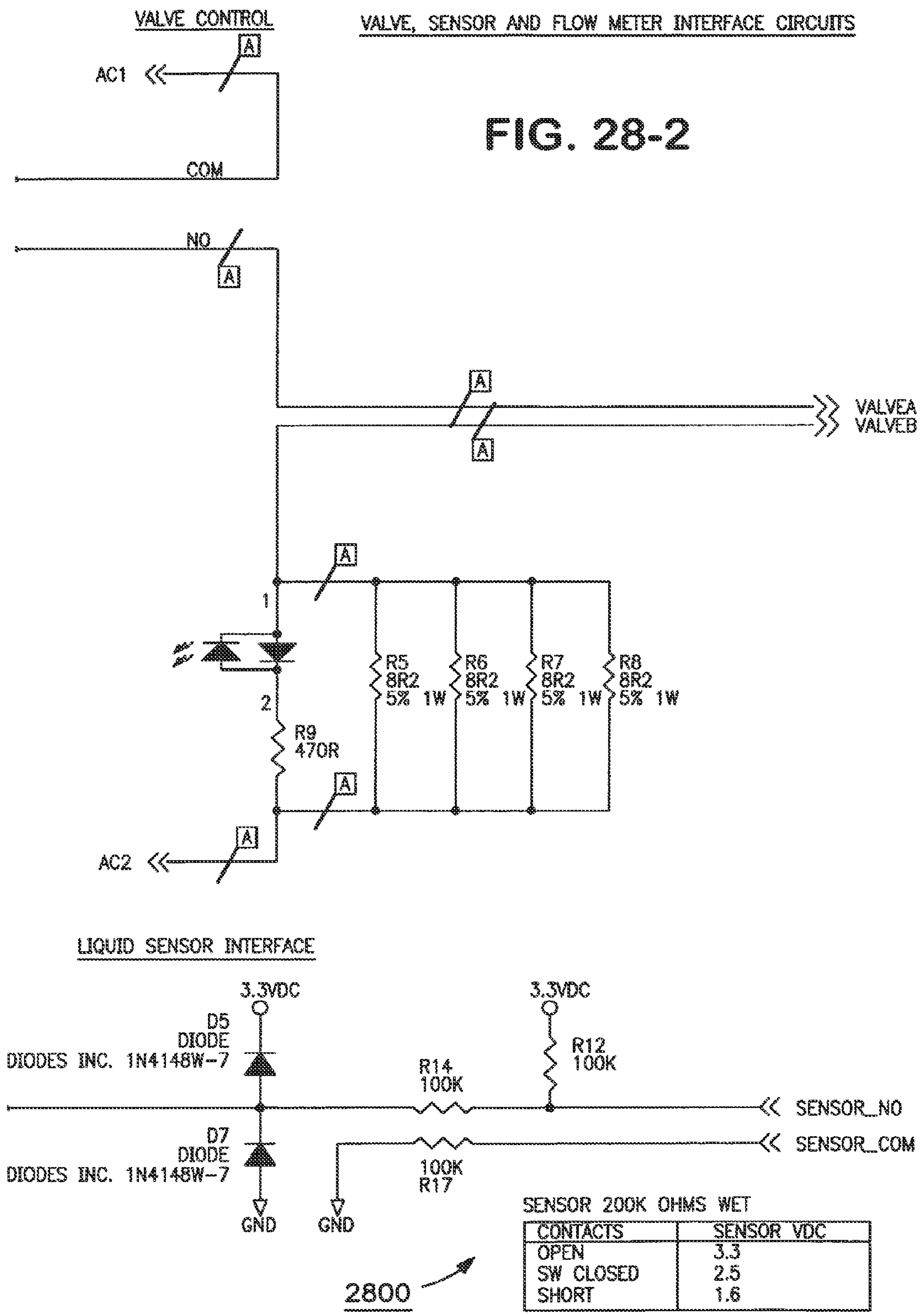
Figures 3, 28:
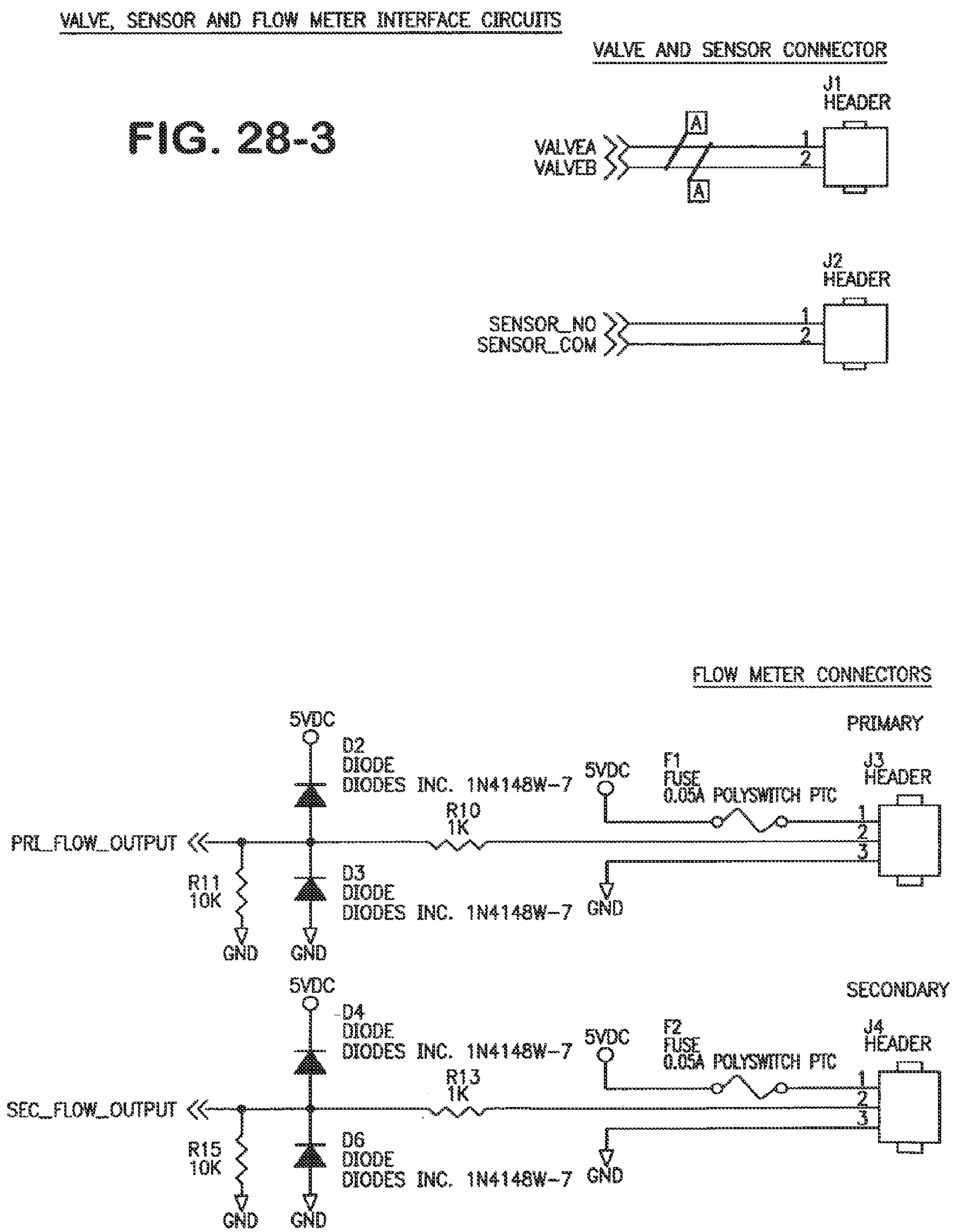

FIGS. 28-1 through 28-3 show example circuitry 2800 for the main valve control circuits block 1455 and the flow meter circuits block 1460.

Figure 29:
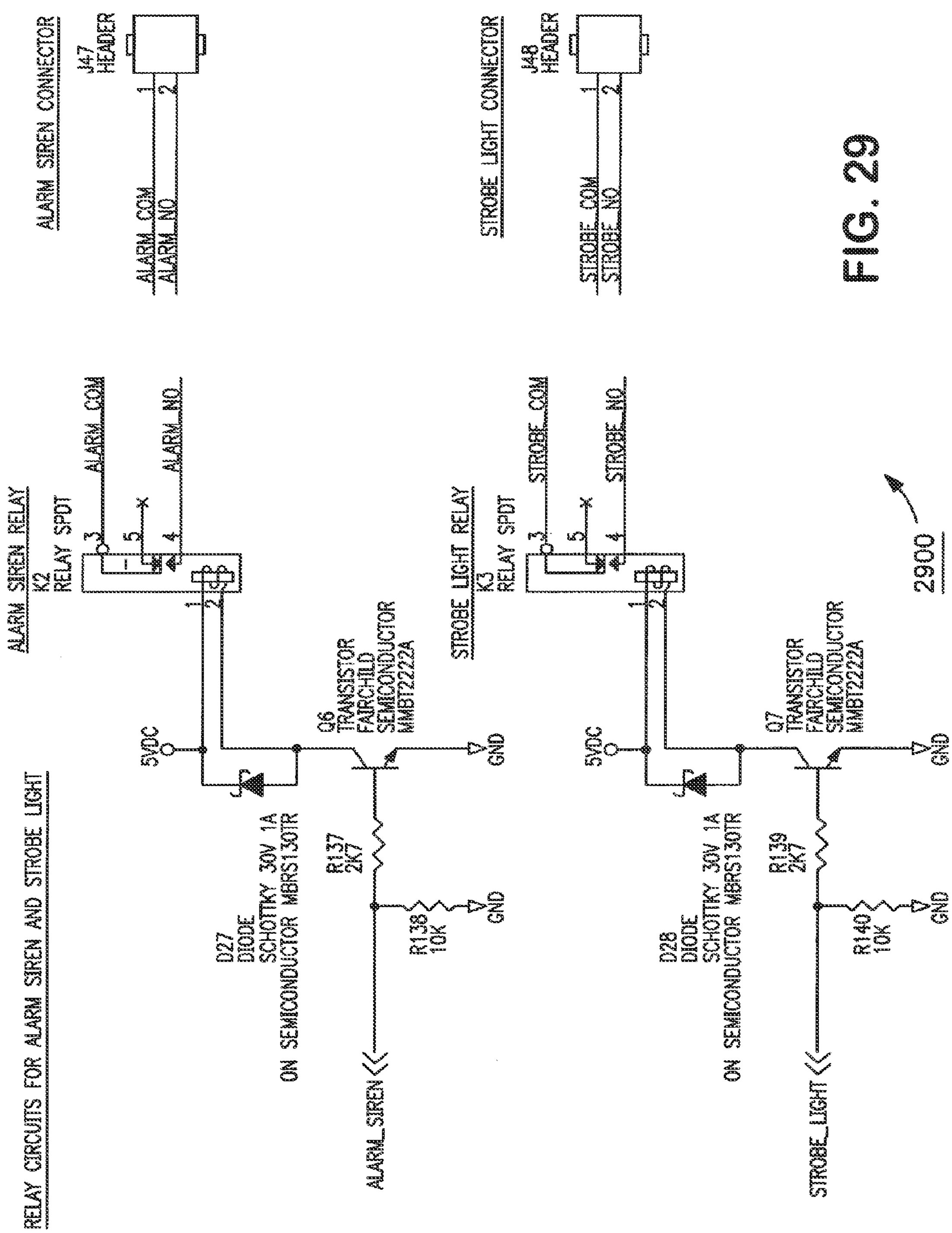
Figures 1, 30:
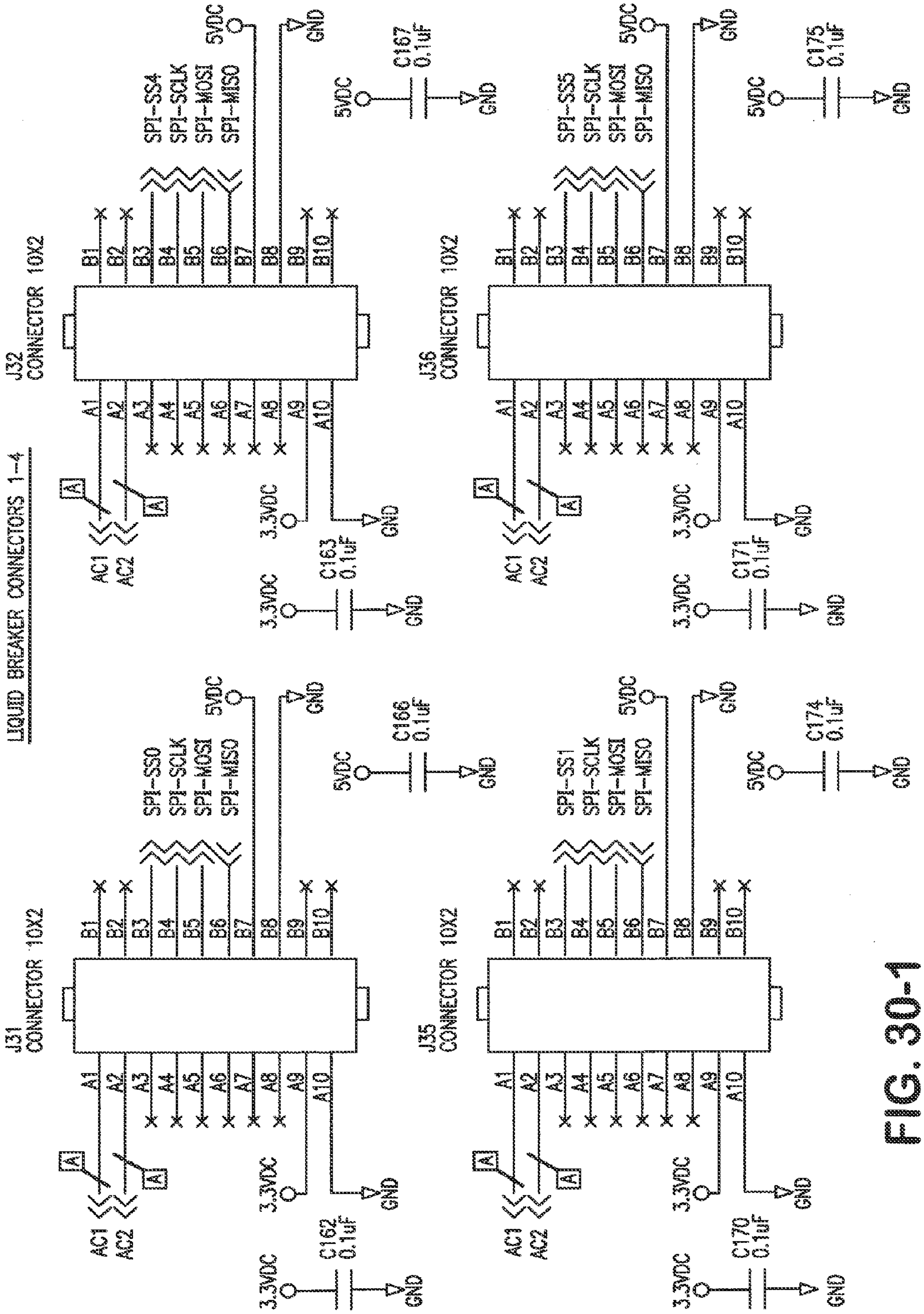
Figures 2, 30:
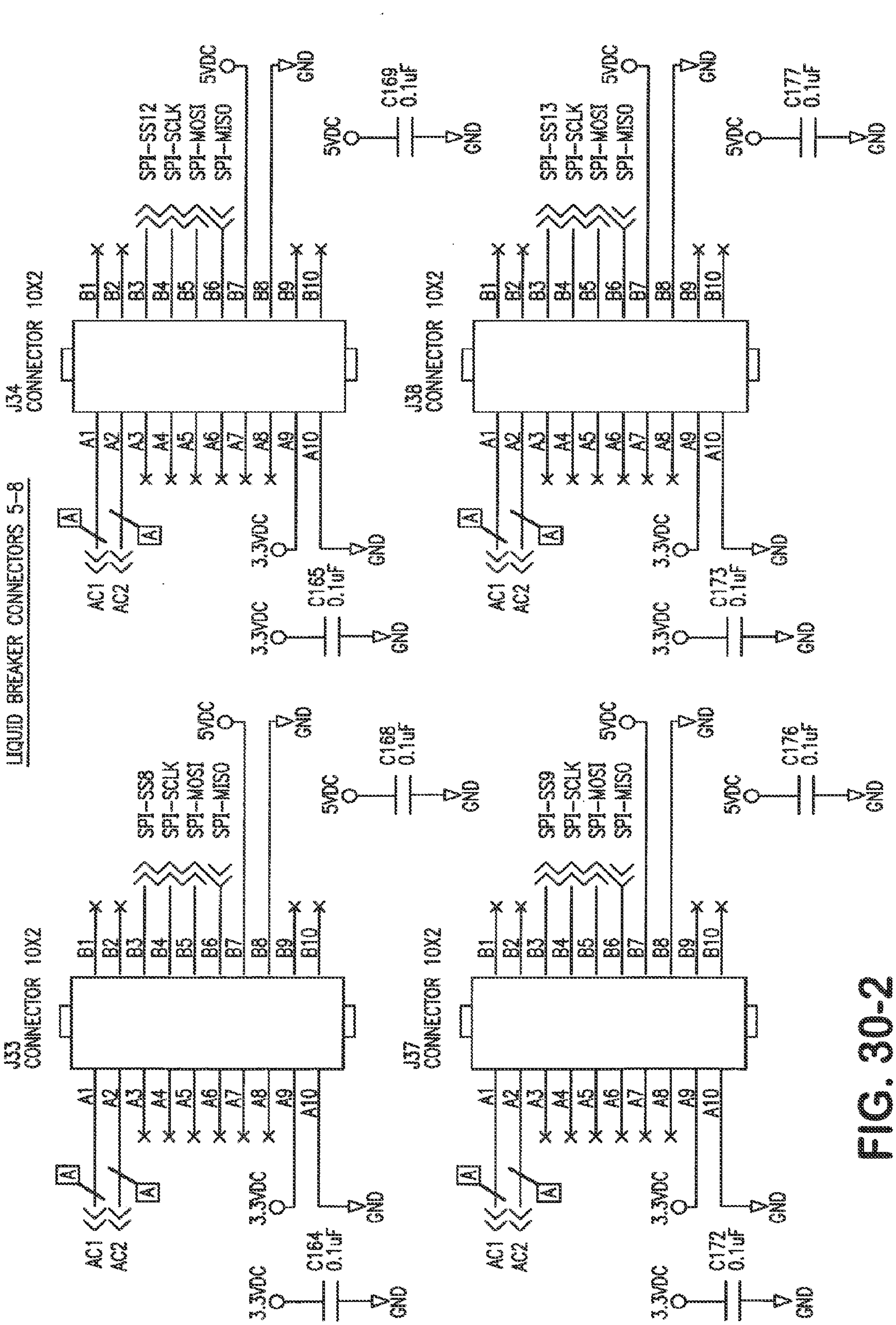
Figures 3, 30:
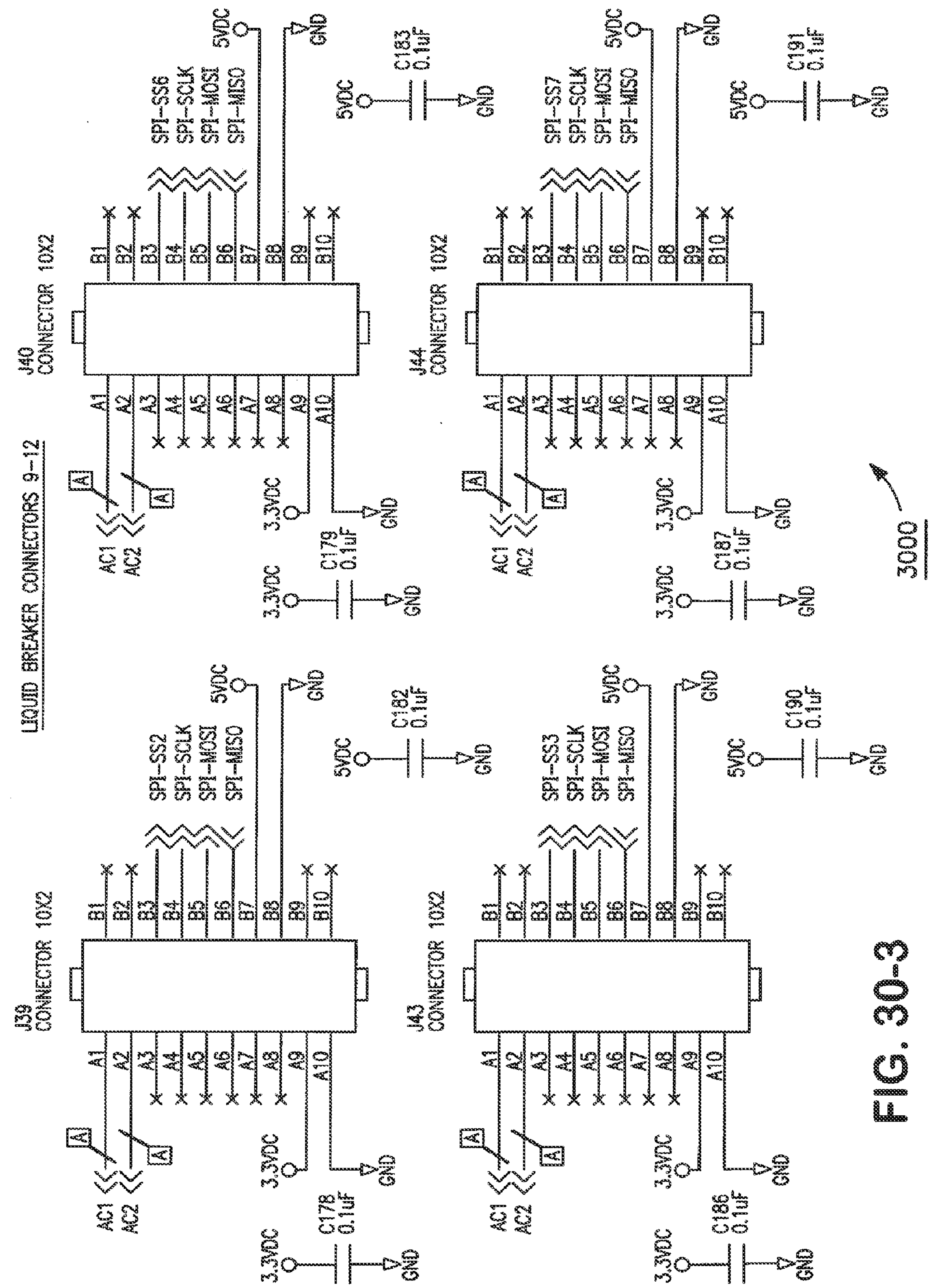
Figures 4, 30:
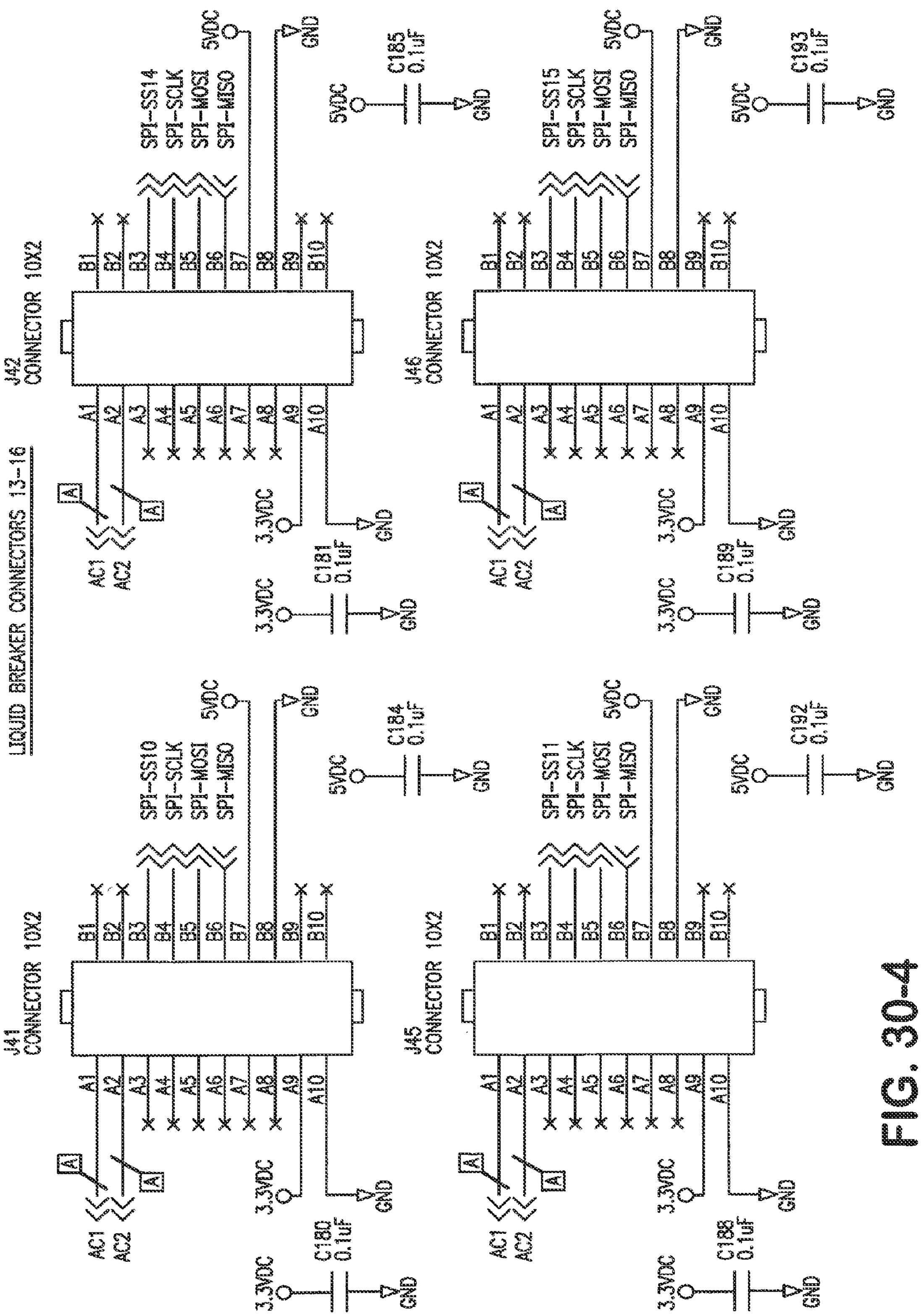
Figures 1, 31:
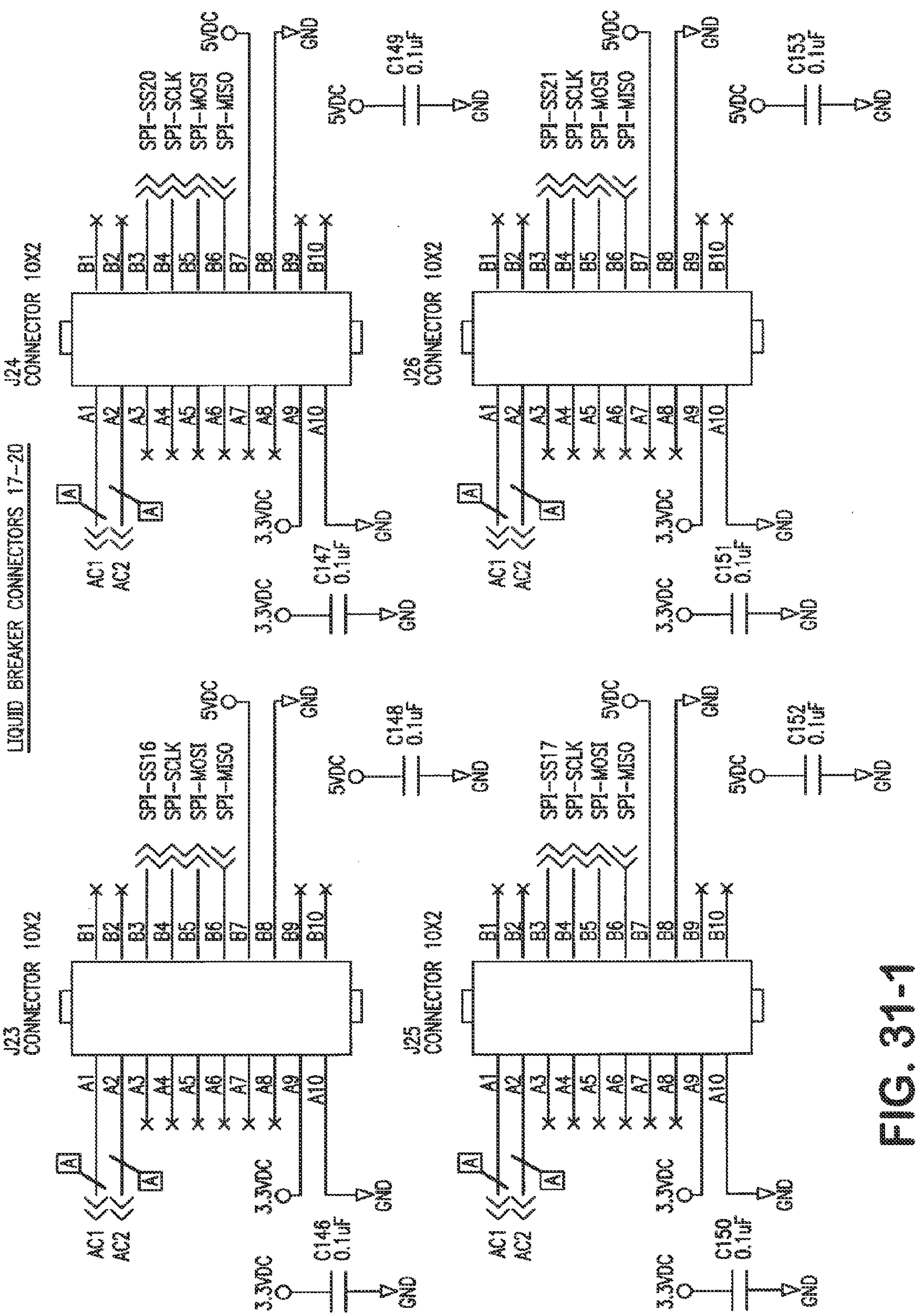
Figures 2, 31:
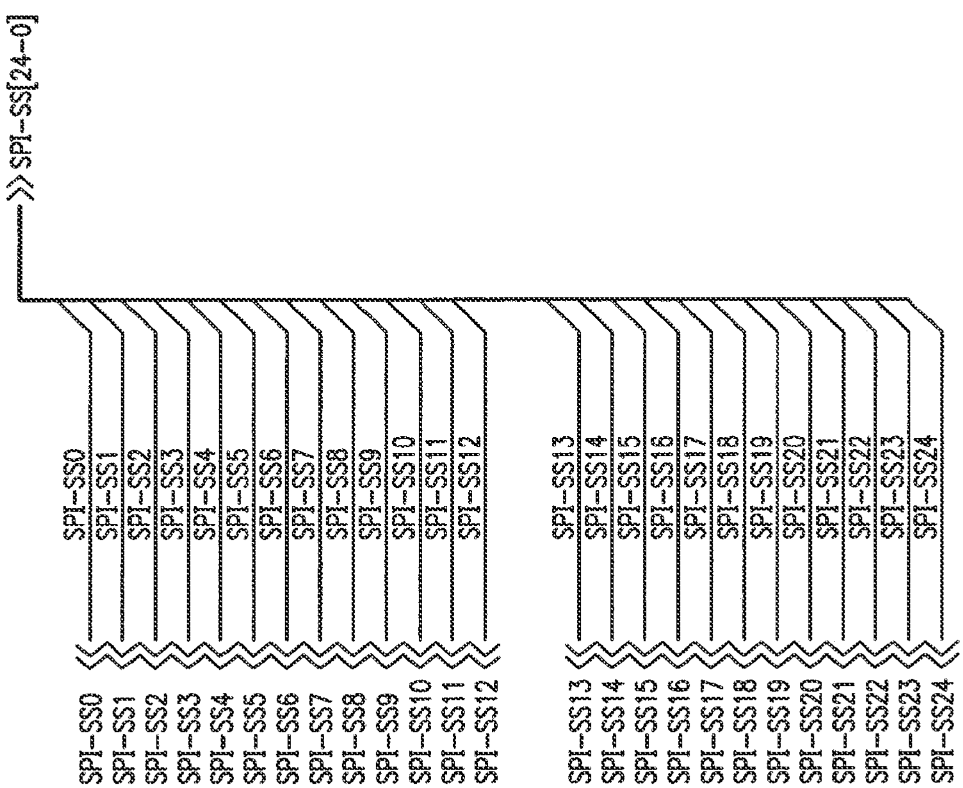
Figures 3, 31:
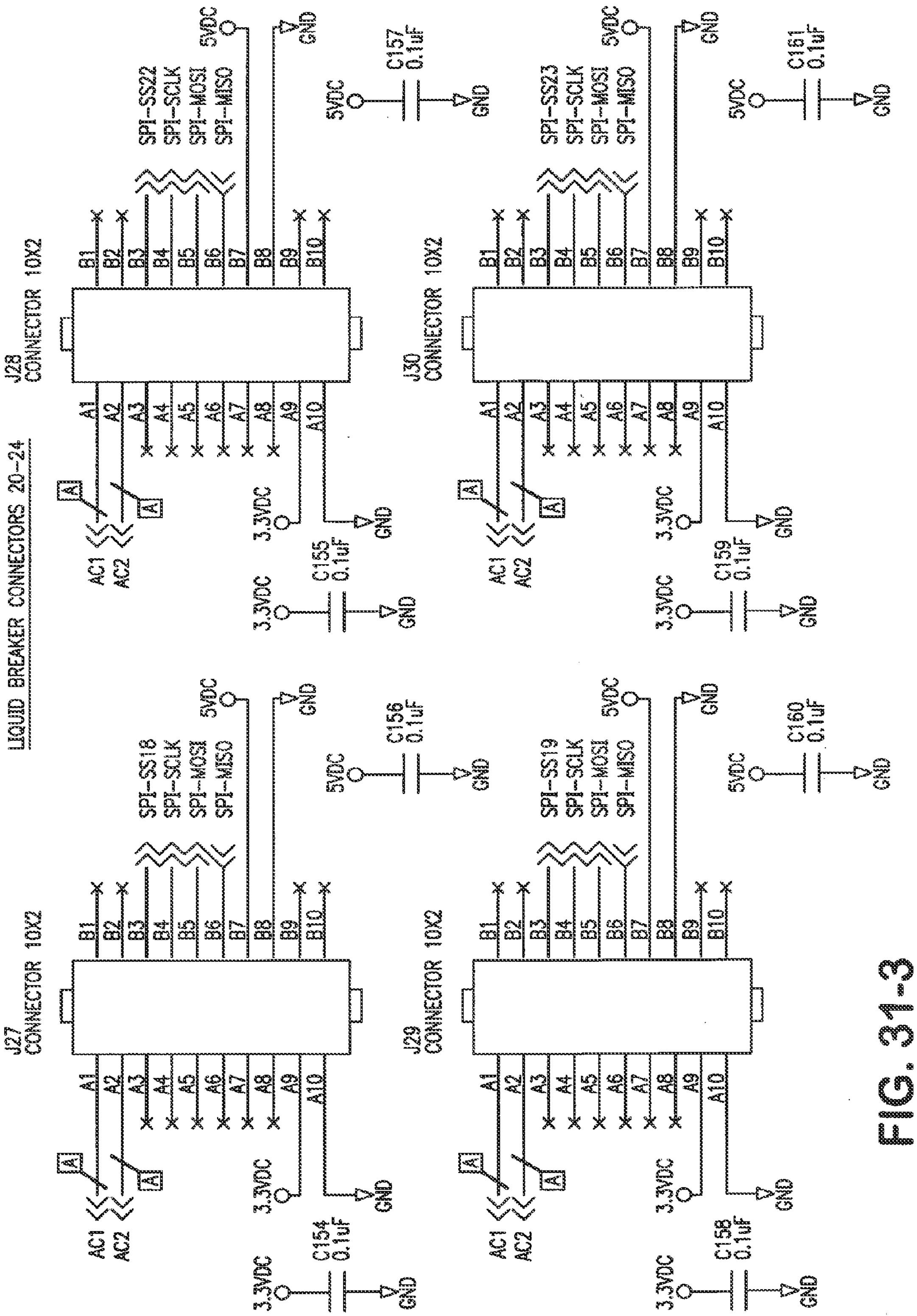
Figures 4, 31:
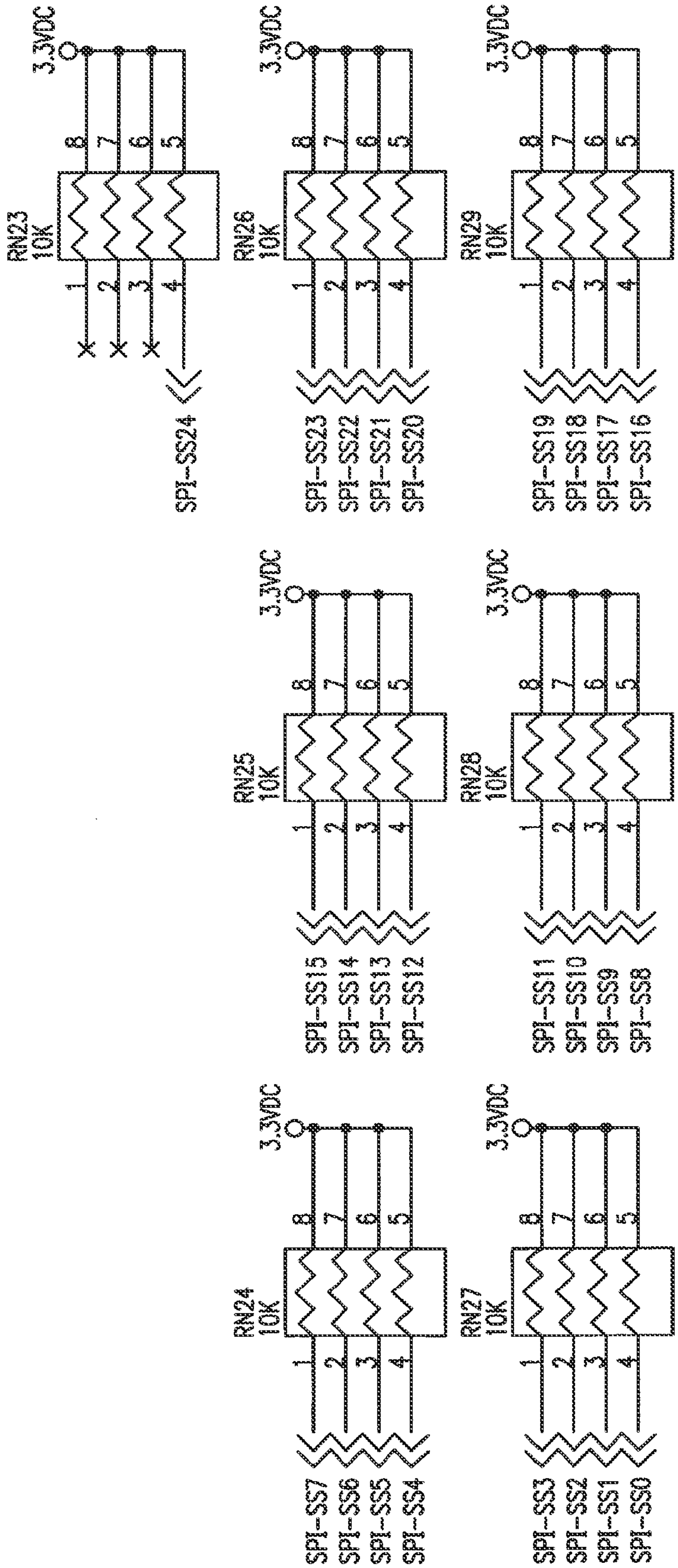

FIG. 29 shows example circuitry 2900 for the auxiliary relay circuits block 1465.

FIGS. 30-1 through 30-4 and FIGS. 31-1 through 31-4 show example circuitry 3000, 3100 for the breaker connectors block 1435.

FIGS. 32-36 are circuit diagrams of an example implementation of an interface module (also referred to as breaker board or breaker). The diagrams are drawn and labeled consistent with the art. The implementation shown in FIGS. 32-36 is similar in certain respects to the implementation of an interface module shown in FIGS. 4-1 through 4-6 and described above. However, in the implementation of FIGS. 32-36, relays on the interface module are not latched. In addition, flow meter monitoring is not performed on the interface module, but instead on the motherboard.

Figure 32:
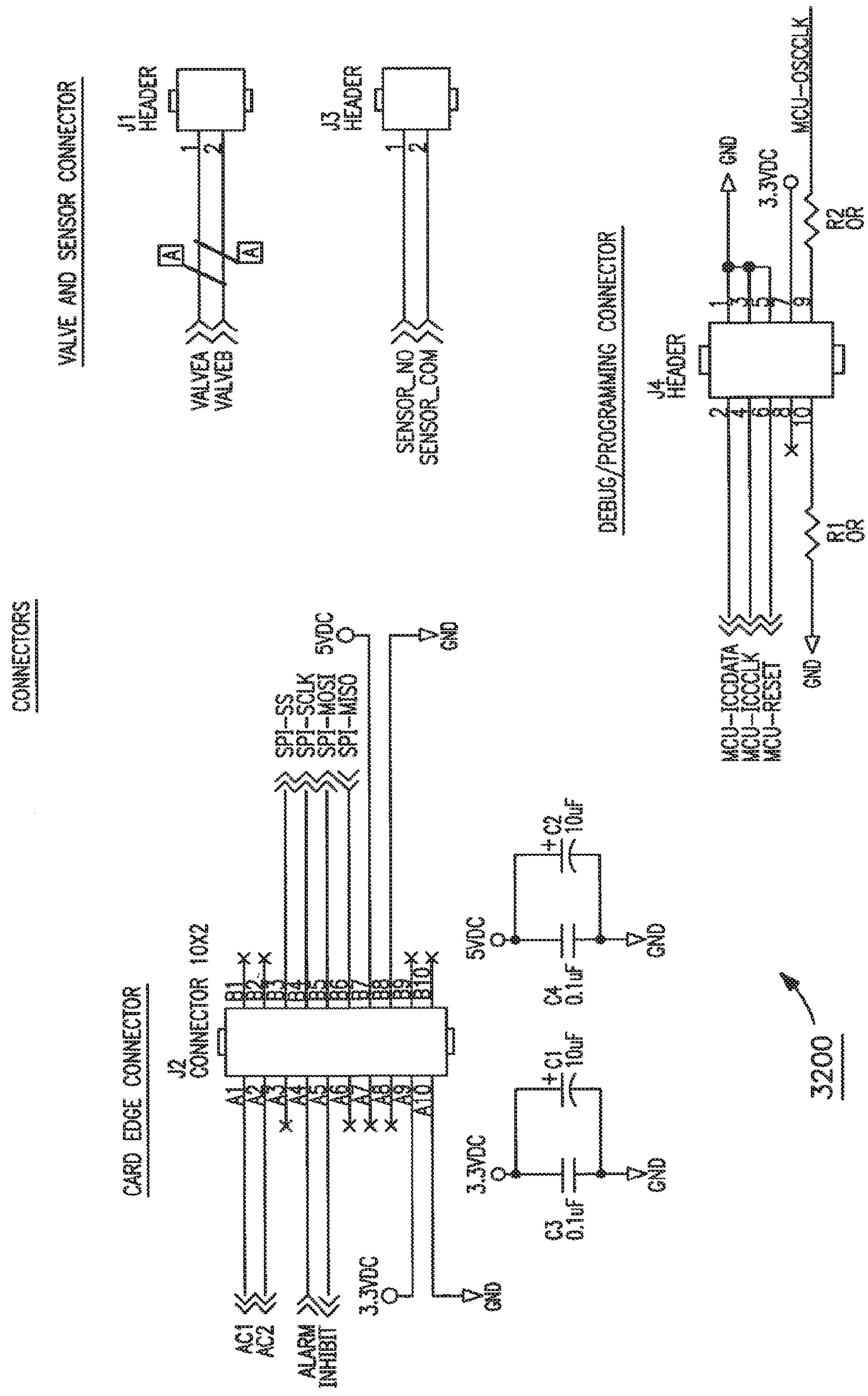
FIGS. 32-36 are schematic diagrams showing an example implementation of an interface module according to an embodiment of the invention.
Figure 33:
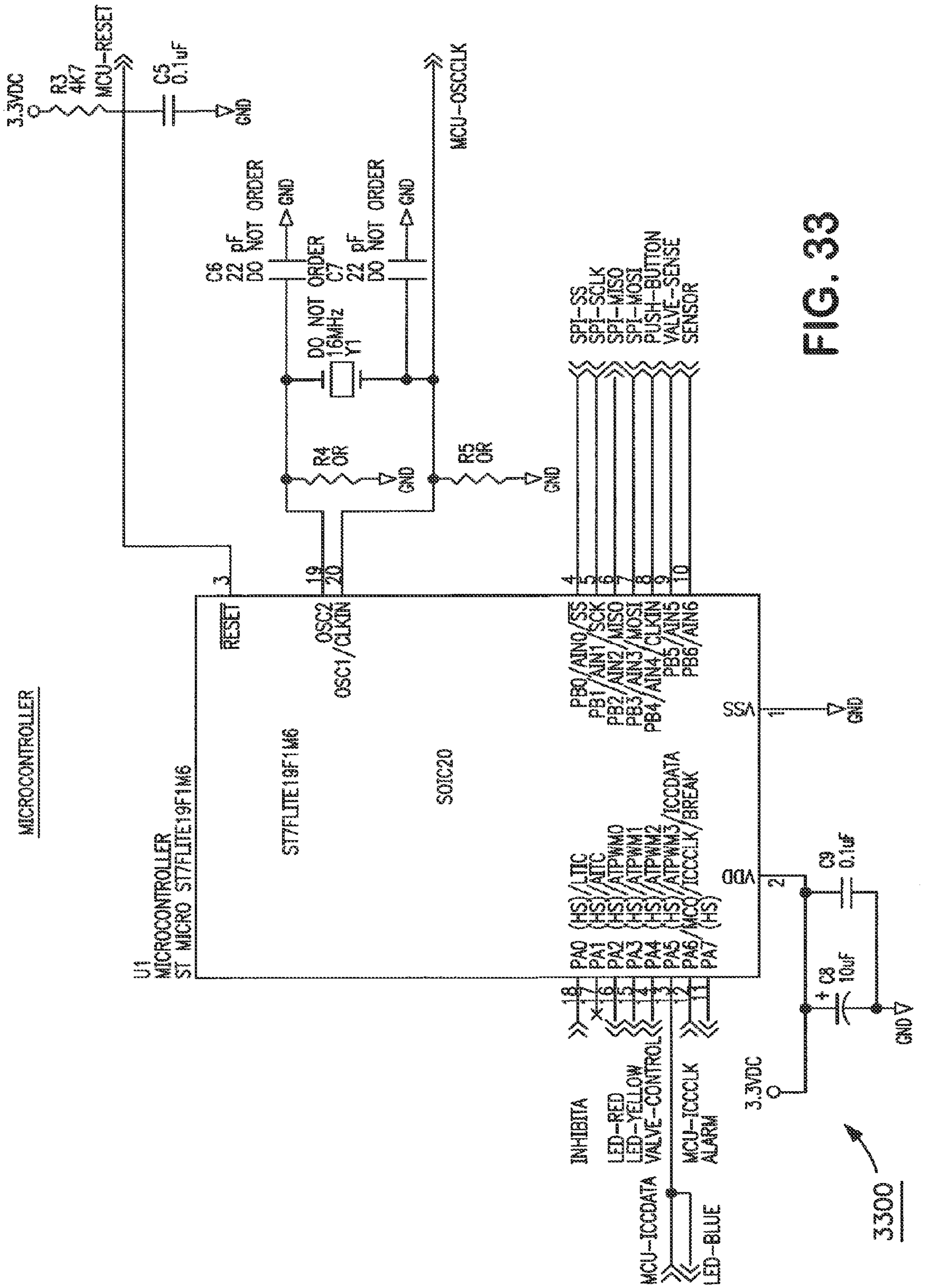
Figure 34:
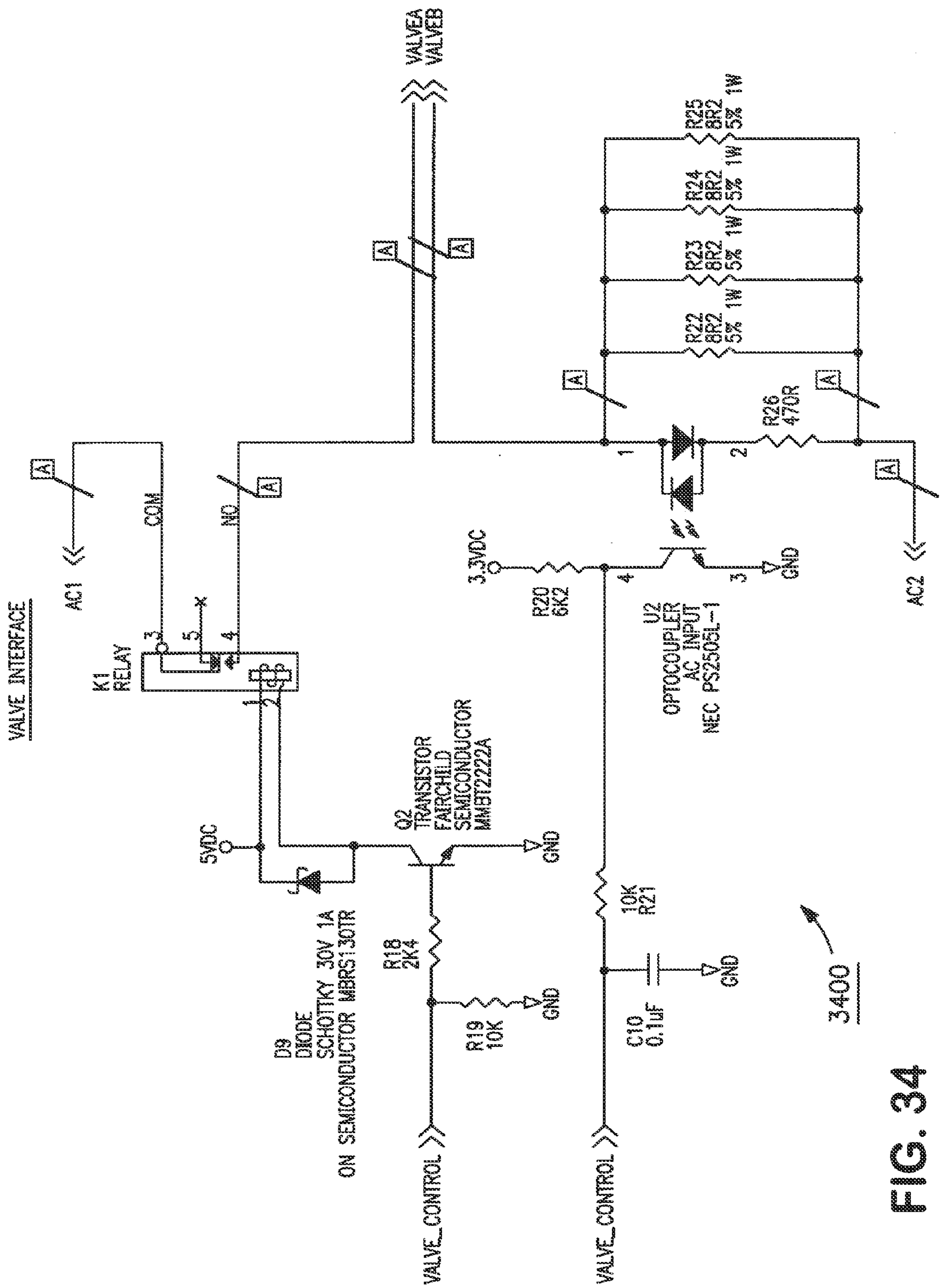
Figure 35:
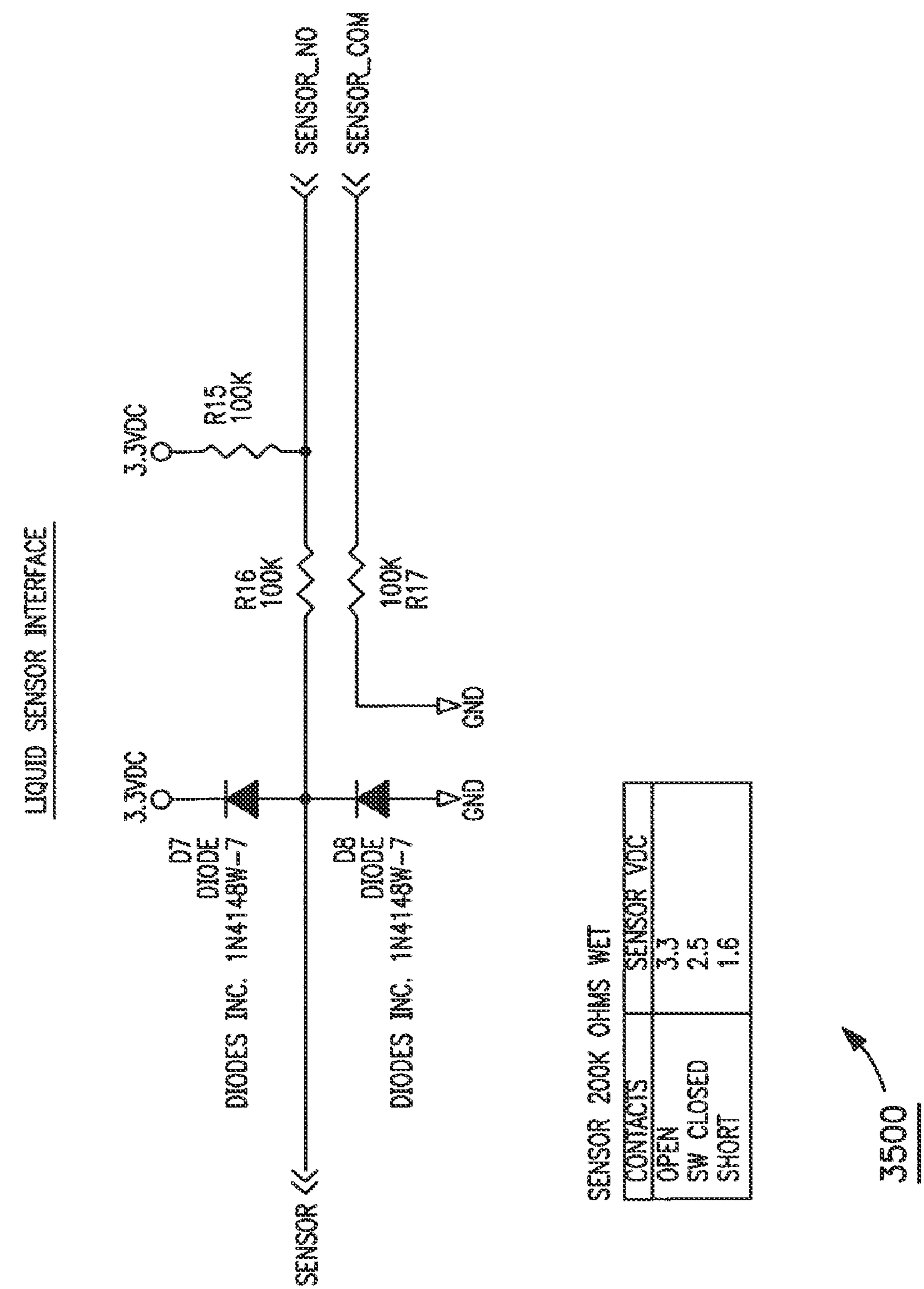
Figure 36:
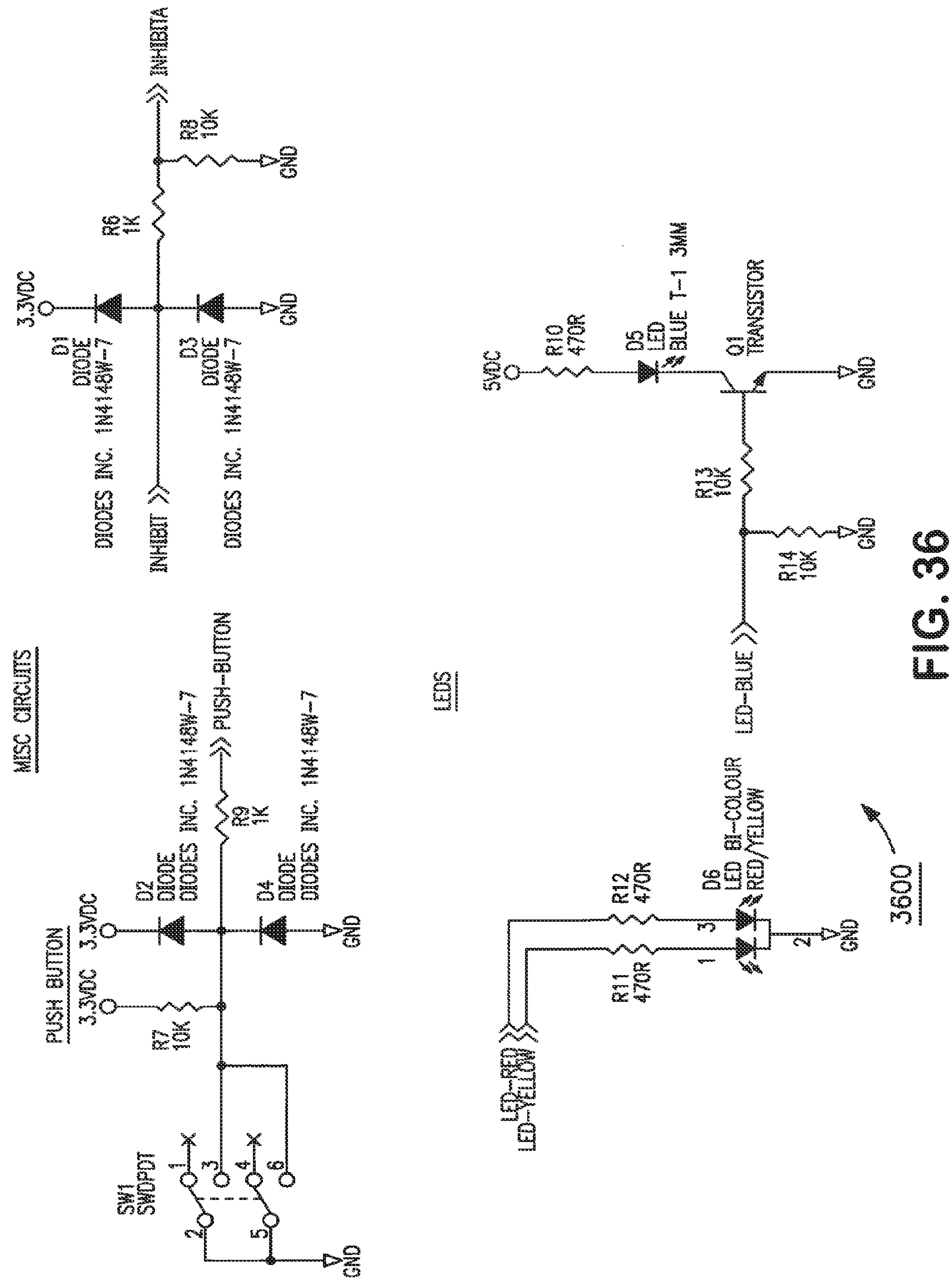

In particular, FIG. 32 shows example circuitry 3200 for connectors of the interface module, including card edge, valve and sensor, and debug/programming connectors. FIG. 33 shows example circuitry 3300 for the microcontroller of the interface module. FIG. 34 shows example circuitry 3400 for the valve interface of the interface module. FIG. 35 shows example circuitry 3500 for the sensor interface of the interface module. FIG. 36 shows example circuitry 3600, including circuitry for the push button and LEDs of the interface module.

In an embodiment, an interface module includes a push button reset switch that when depressed causes a valve interfaced to the interface module to re-open (or re-close). The reset switch also can be used as a test switch to test operation of the interface module and associated valve(s). Resetting of the reset switch on the breaker resets associated LEDs. For instance, a blue lamp is turned on, and a red lamp is turned off.

The architecture of the system is such that special purpose interface modules (breakers) can be designed for respective appliances. The main controller 1400 can be programmed to interface with such interface modules to control and monitor the appliances. For instance, a category of so-called “blue” interface modules monitors toilets, dishwashers, washing machines, hot water tanks, ice makers, sinks, swimming pools, or spas. Similarly, a category of “green” interface modules controls lawn sprinklers (e.g., turns the sprinklers on and then off based on time, quantity released per gallon per valve, etc.). The main controller 1400 can be programmed to read each interface module in real time and determine the intended application thereof. In an example implementation, an interface module can be configured to remotely read an individual water flow meter installed in each unit of an apartment building, and can be controlled to regulate the quantities of water usage per unit.

FIGS. 37-42 are circuit diagrams of an example implementation of a remote interface module (also referred to as remote sensor board). The diagrams are drawn and labeled consistent with the art. The remote interface module is similar in some respects to the stand-alone interface module described above. Additionally, the remote interface module is similar to the interface modules of FIGS. 32-36. However, the remote interface module includes a UHF transmitter (see FIGS. 40-1 and 40-2) to wirelessly send alarm messages to the motherboard. The remote interface module operates in wired or wireless mode, plugs into a wall outlet, and has a battery backup unit. The remote interface module can be connected directly to a valve. When an alarm condition is detected, the remote interface module can wirelessly communicate with the main controller.

Figure 37:
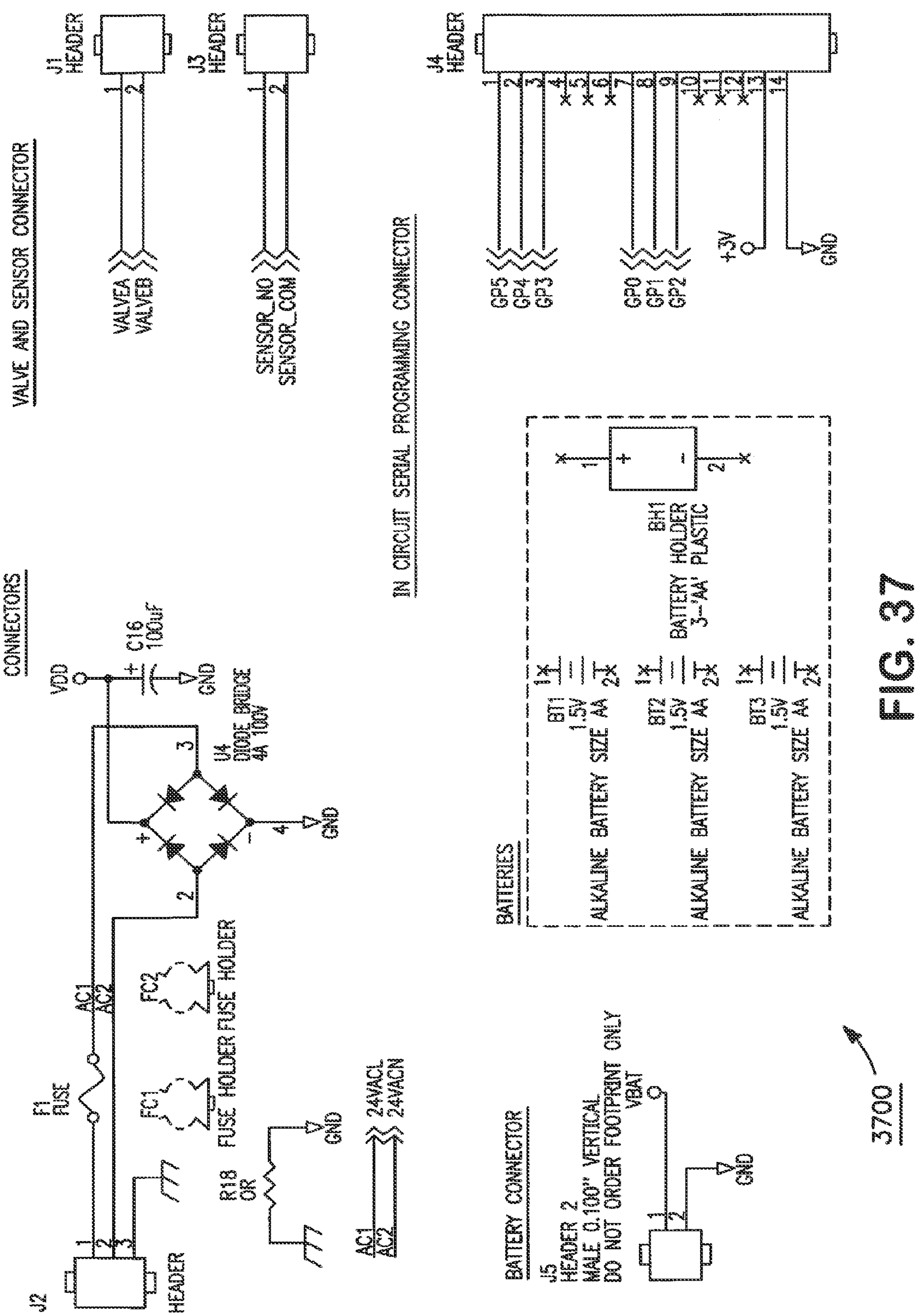
FIGS. 37-42 are schematic diagrams showing an example implementation of an interface module according to an embodiment of the invention.
Figure 38:
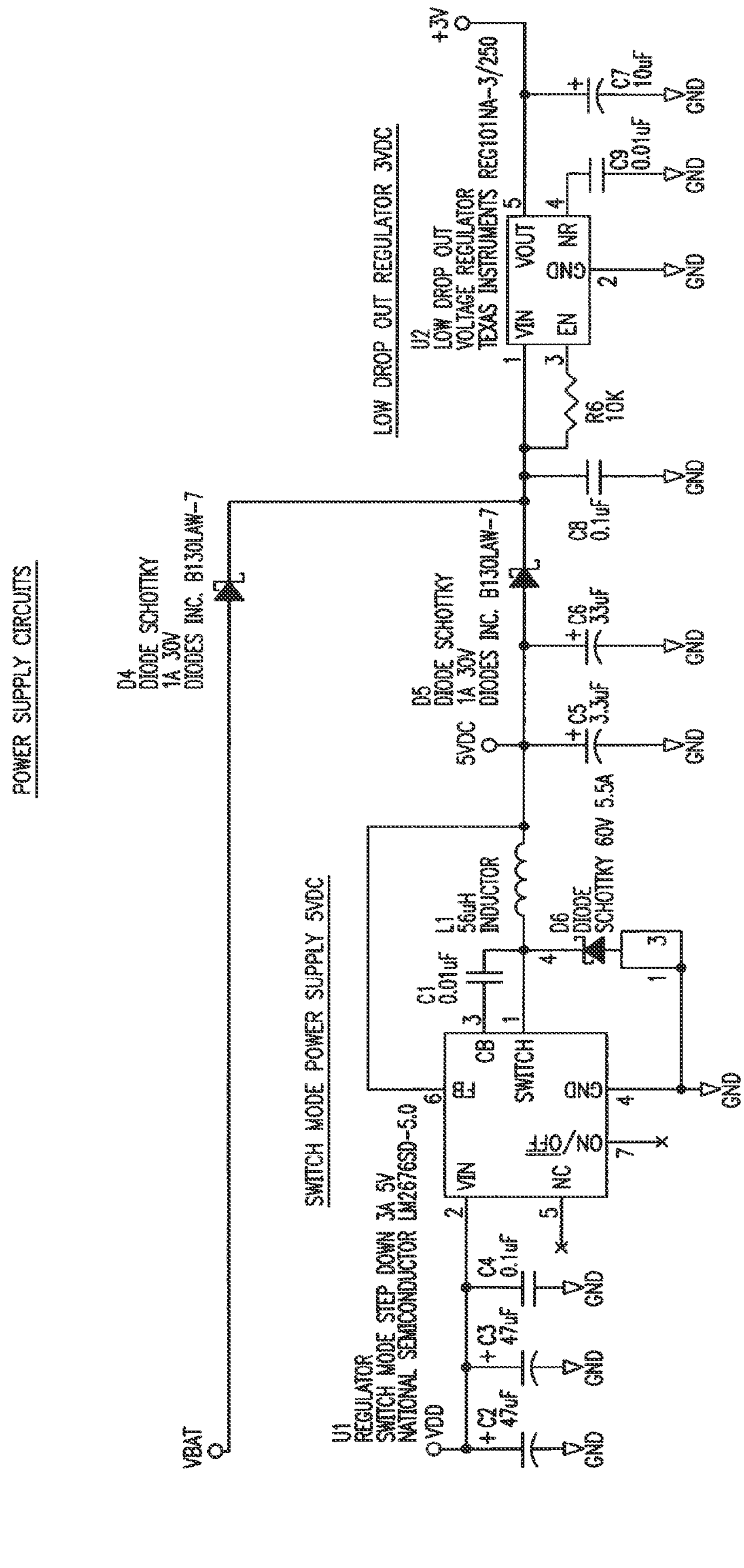
Figure 39:
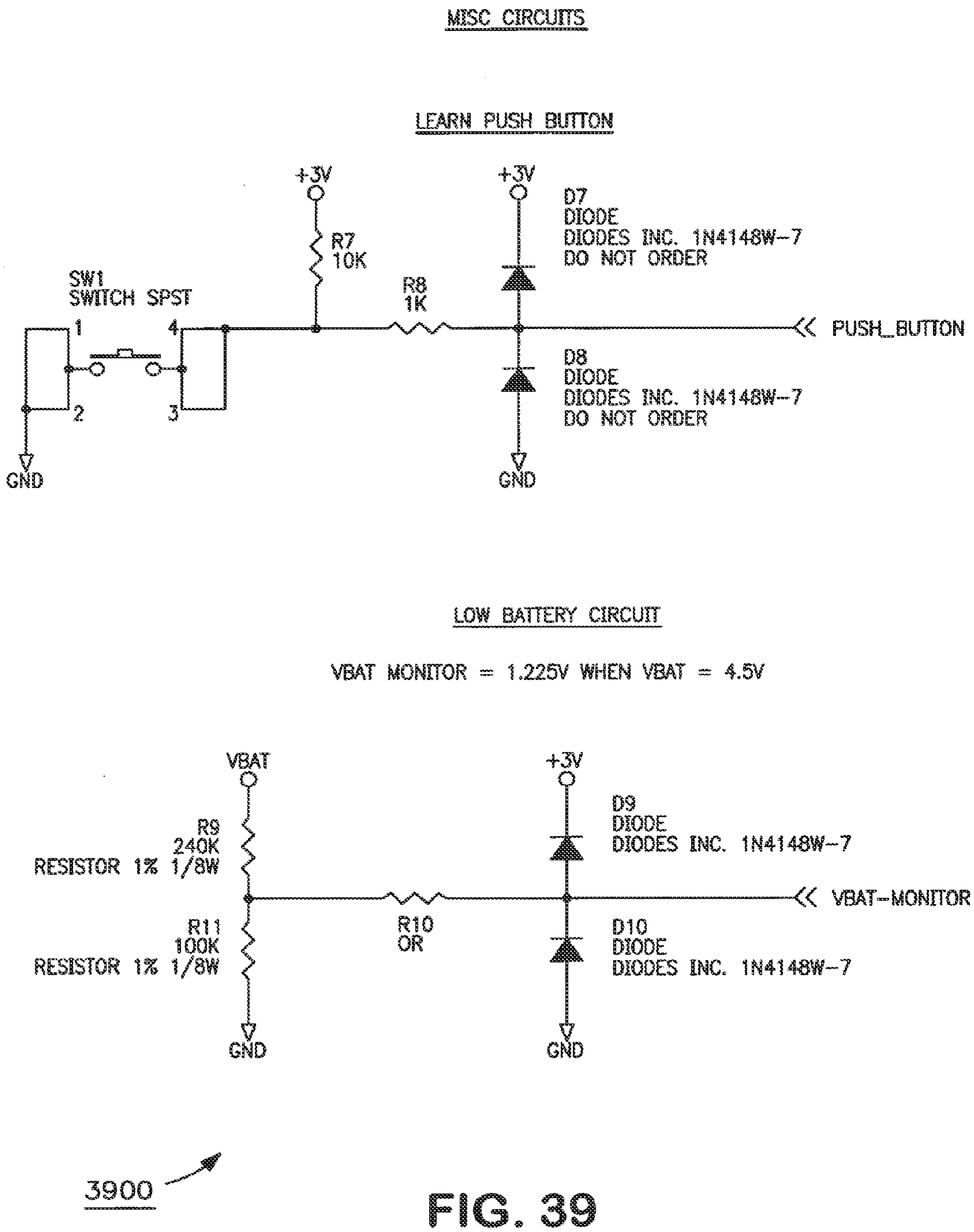
Figure 40:
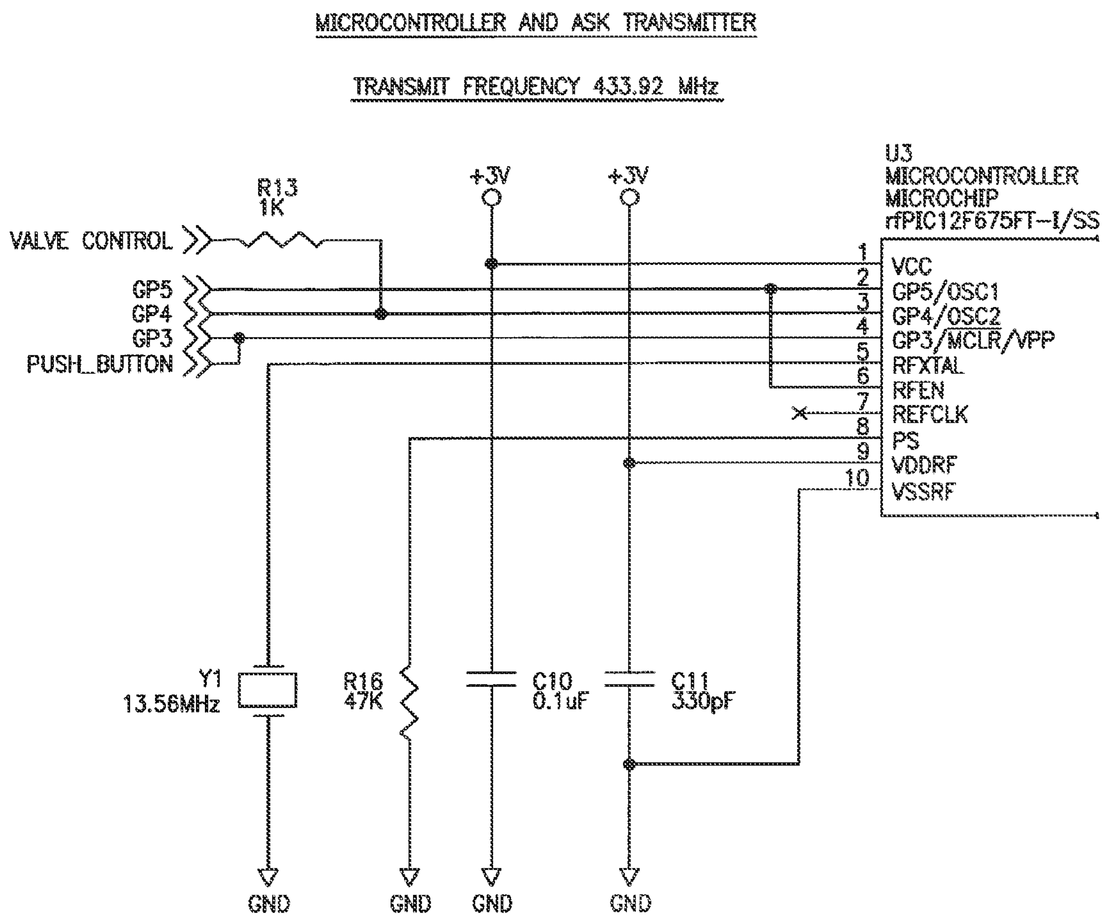
Figure 1:
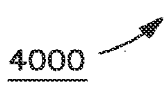
Figures 2, 40:
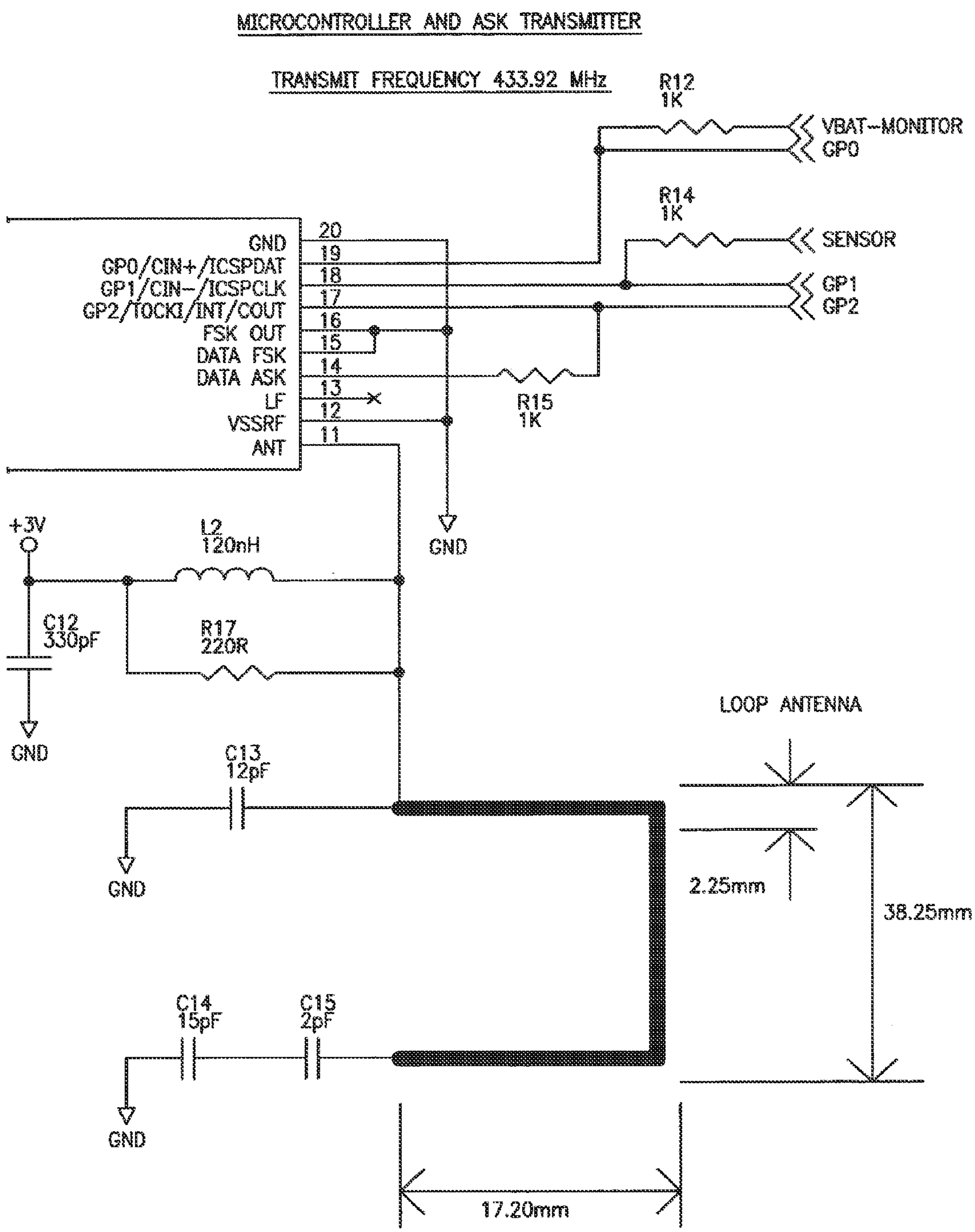

Specifically, FIG. 37 shows example circuitry 3700 for connectors of the remote interface module, including the battery connector, valve and sensor connector, and in-circuit serial programming connector. FIG. 38 shows example circuitry 3800 for power supply circuits of the remote interface module. FIG. 39 shows example circuitry 3900, including circuitry for the learn push button and low battery circuit of the remote interface module. FIGS. 40-1 and 40-2 show example circuitry 4000 for the microcontroller and ASK transmitter of the remote interface module. FIG. 41 shows example circuitry 4100 for the valve interface of the remote interface module. FIG. 42 shows example circuitry 4200 for the sensor interface of the remote interface module.

Figure 43:
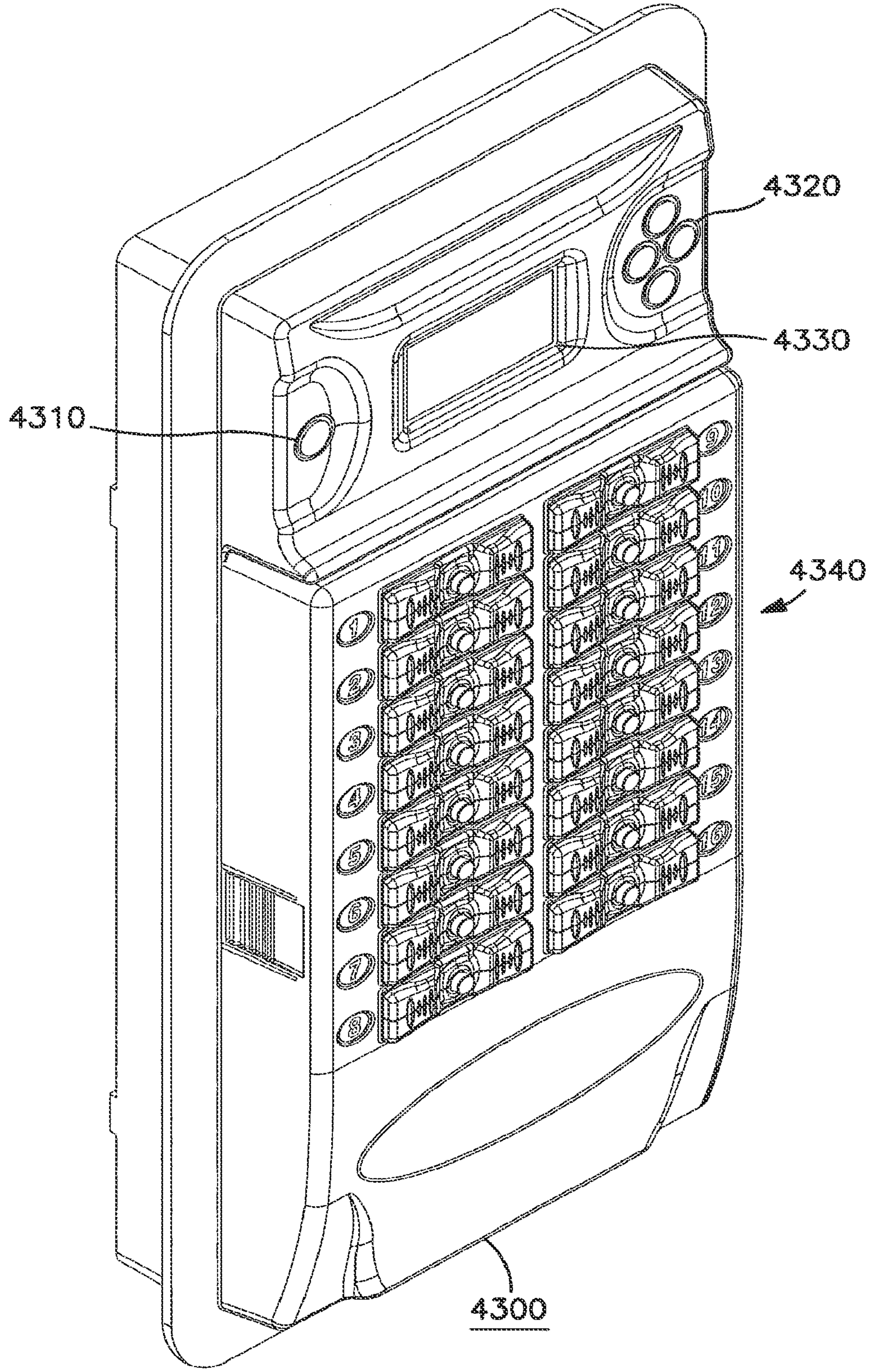
FIGS. 43 and 44 show various views of an example panel housing for a motherboard.
Figure 44:
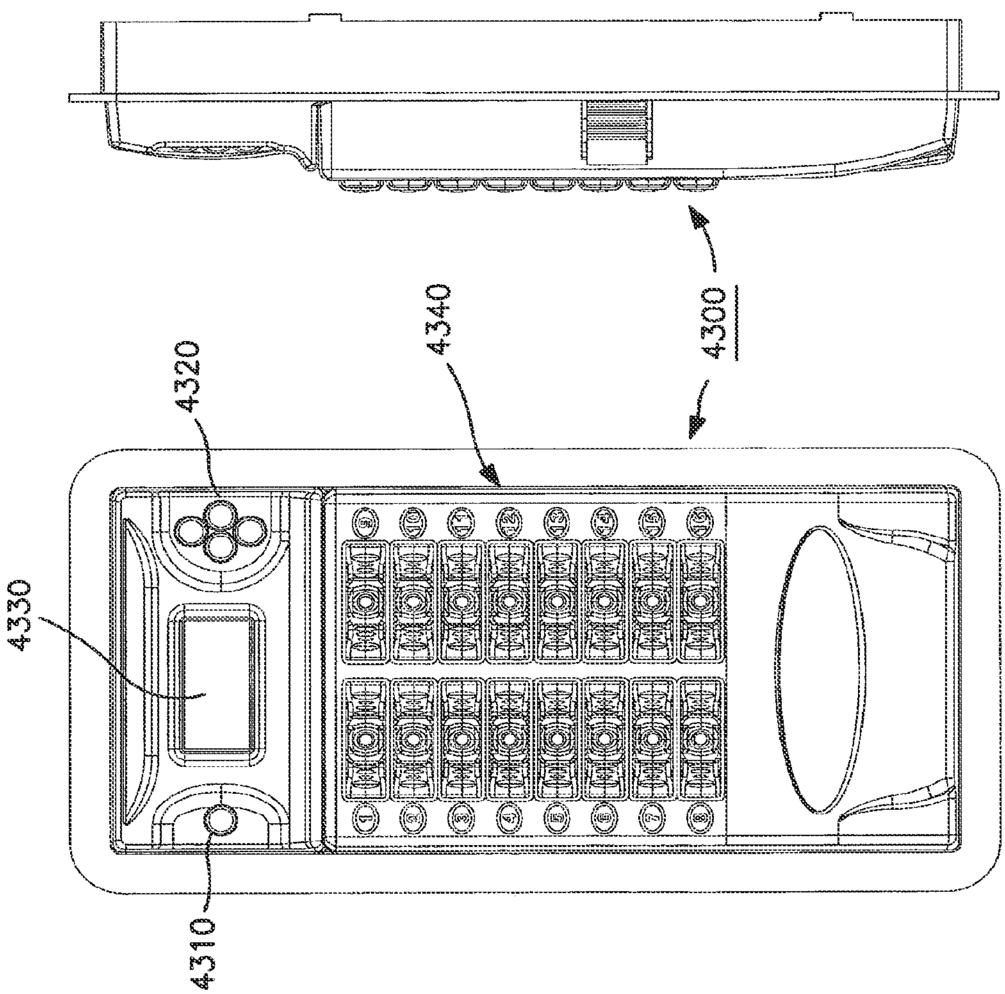

FIG. 43 shows a perspective view of a panel housing 4300 for a motherboard that receives a plurality of interface modules. FIG. 44 shows front and side views of the panel housing 4300 of FIG. 43. As shown, the panel housing 4300 exposes a main valve on/off button 4310, additional buttons 4320, an LCD display 4330, and breaker switches 4340. Depressing of the main valve on/off button 4310 opens and closes the main valve in a toggled manner. The additional buttons 4320 can include an Increment, Decrement, Escape, and Enter button. The additional buttons 4320 can be used, for example, to allow a user to navigate through screens of an event log displayed on the LCD display 4330. The breaker switches 4340 are associated with interface modules plugged in the motherboard.

Figure 45:
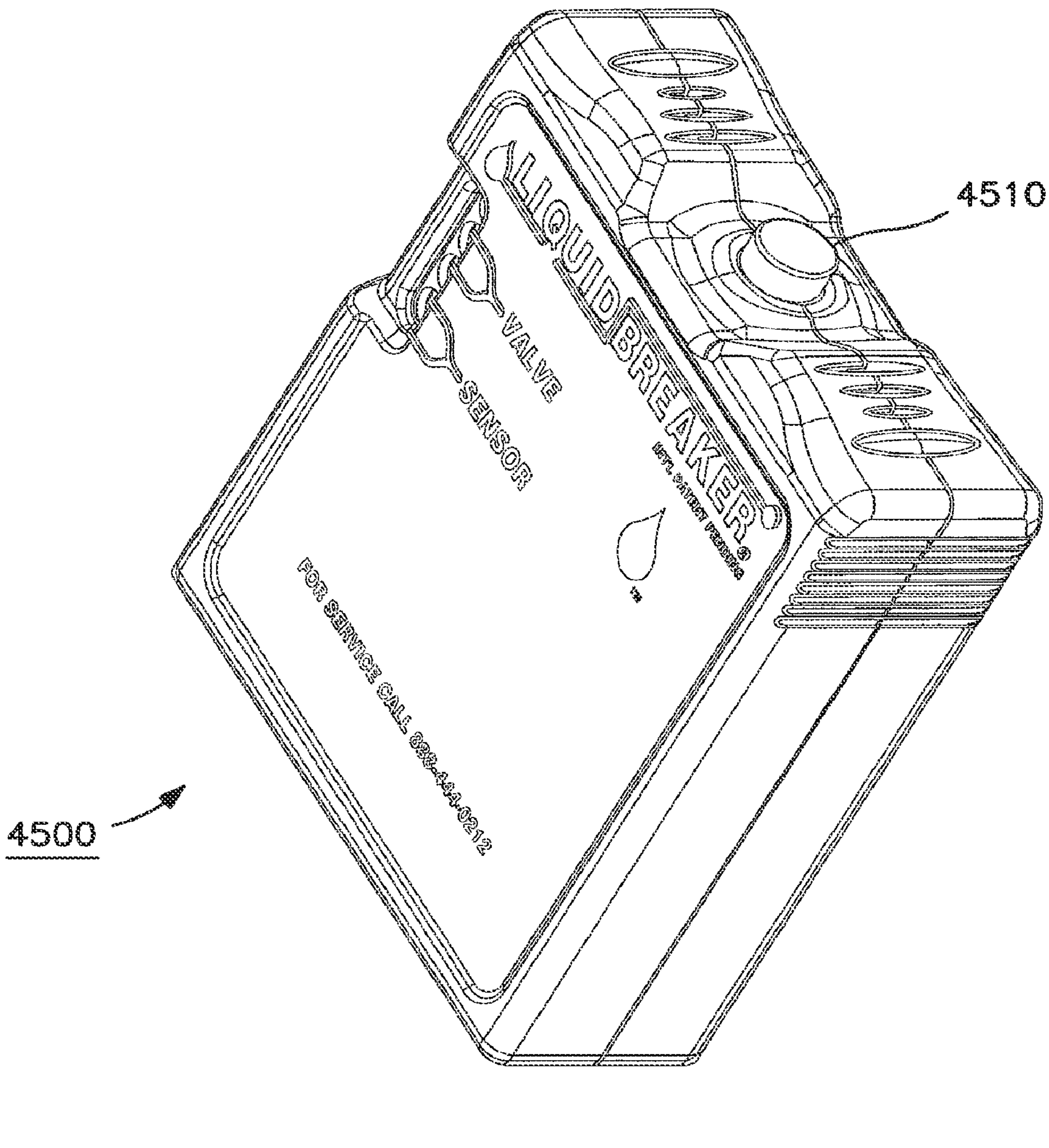
FIG. 45 shows a perspective view of an example housing for a remote interface module.

FIG. 45 shows a perspective view of a housing 4500 for a remote interface module. The housing 4500 exposes a push button 4510 that is depressed to open and close the valve to which the remote interface module is connected in a toggled manner.

Figure 46A:
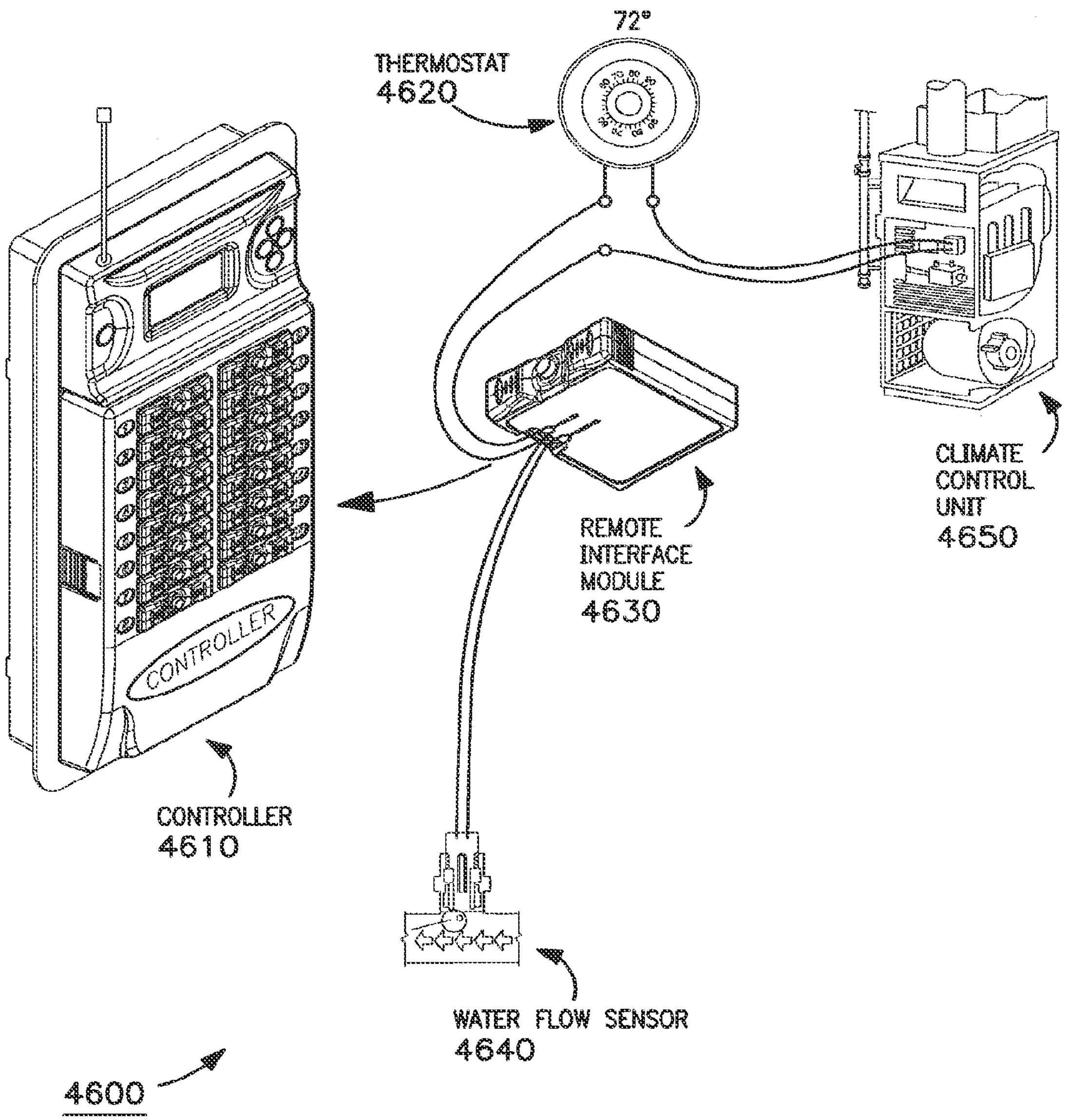
FIGS. 46A and 46B show systems involving a climate control unit according to an embodiment of the invention.

FIG. 46A shows a system 4600 involving a climate control unit according to an embodiment of the invention. As used herein, the term climate control unit encompasses air or water heating or cooling systems and devices, as well as other systems and devices that need not be active or can be active at other (e.g., reduced) levels when occupants are not present in a structure. The system 4600 is an example implementation in which a sensed parameter of a water-based system is used to advantageously affect operation of other systems or devices. The system 4600 includes a controller 4610, a thermostat 4620, a remote interface module 4630, a water flow sensor 4640, and a climate control unit 4650. In this embodiment, nonexistent or negligible water movement in one or more water supply lines over time is used as an indicator that human occupants are not present, and as an energy and cost saving measure, heat or air conditioning service, a hot water tank, and/or another system or device is automatically shut off or otherwise controlled.

The remote interface module 4630 interfaces with the water flow sensor 4640, which provides information about water movement in a conduit of a building, such as a main water supply line to the building or a unit within the building. The remote interface module 4630 includes a switch or other suitable circuitry connected between a terminal of the thermostat 4620 (e.g., an ambient temperature thermostat) and a corresponding terminal of the climate control unit 4650. For instance, a two set screw splice can be used between the remote interface module 4630 and the thermostat 4620, and another can be used between the remote interface module 4630 and the climate control unit 4650. Alternatively, the remote interface module 4630 interfaces directly with the climate control unit 4650 (not indirectly via the thermostat 4620) to interrupt the power supply to the climate control unit 4650.

The climate control unit 4650 can be an HVAC (heating, ventilating, air conditioning) unit, a dedicated heater, a dedicated air conditioner, humidifier, hot water tank, or other device.

The controller 4610 is installed in a breaker panel housing and can receive interface modules corresponding to various components in water-based and/or other systems. The remote interface module 4630 sends status information to the controller 4610, and the controller 4610 sends control signals to the remote interface module 4630. The status information sent by the remote interface module 4630 can include information about detected water flow.

In an embodiment, if water movement detected by the remote interface module 4630 does not exceed a predetermined threshold over a predetermined period (e.g., 24 hours), then the controller 4610 sends control signals to the remote interface module 4630 that cause the remote interface module 4630 to open the switch between the thermostat 4620 and the climate control unit 4650. As such, power to the thermostat 4620 is interrupted, and the climate control unit 4650 is shut down.

In other embodiments, which can be applied, for example, in settings in which a central climate control system pumps air to other locations, the fan associated with a location is shut off when the water flow of associated pipes is nonexistent or negligible for more than a predetermined period.

Figure 46B:
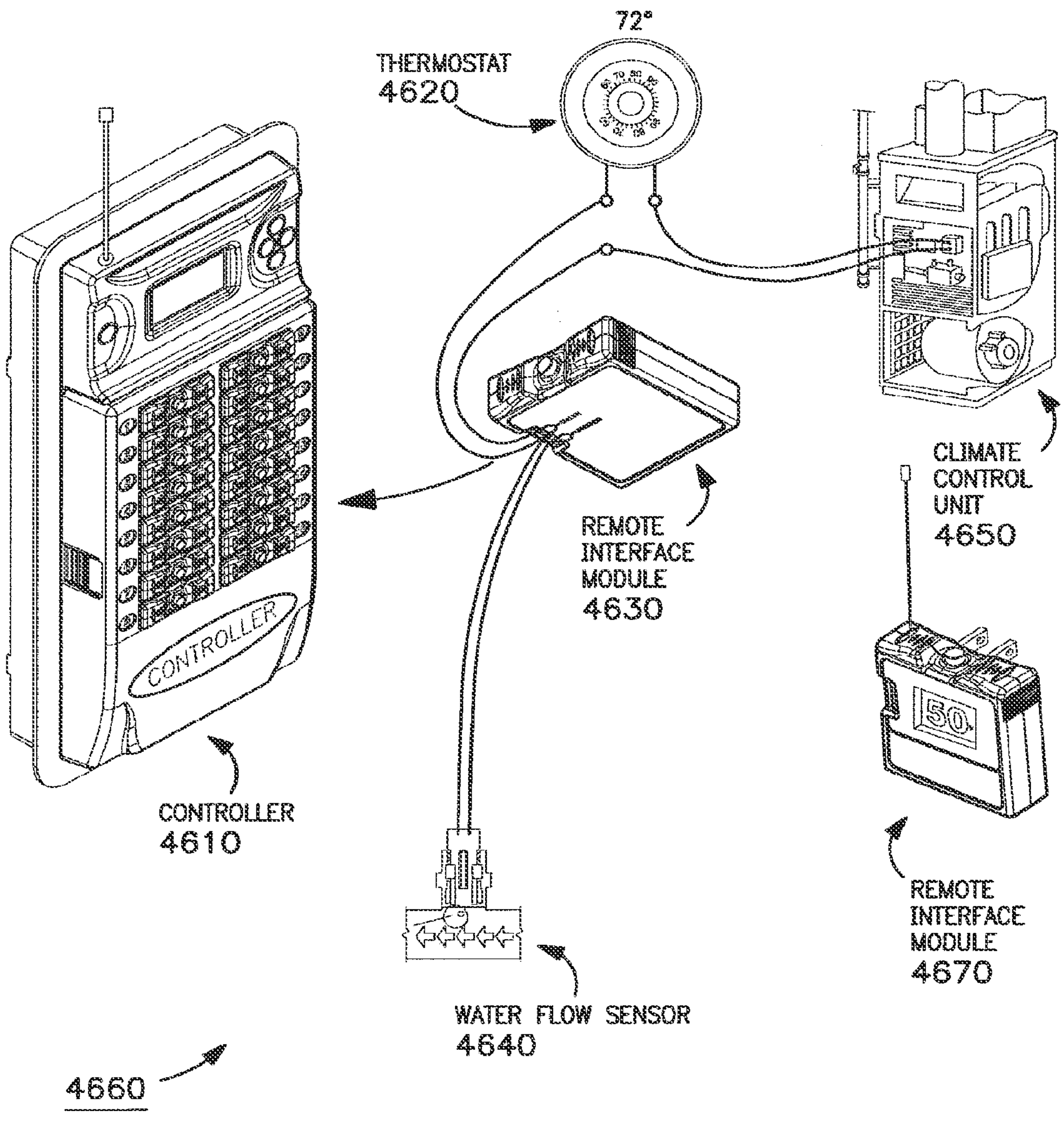

In an embodiment, the remote interface module 4630 or controller 4610 is configured to prevent the temperature from falling to (or rising to) unsafe temperatures, and the switch in the remote interface module 4630 is closed and opened as necessary. For instance, in an embodiment, the remote interface module 4630 has an onboard temperature sensor, and can be configured by the controller 4610 or via a web interface, to keep the above switch closed to prevent the temperature from falling below a programmed temperature (e.g., 50 degrees). Accordingly, such an embodiment ensures that pipes do not freeze or burst. In a related embodiment, as shown in FIG. 46B, wherein the climate control unit 4650 is in a location (e.g., in the basement) remote from the location to be heated or cooled, the location to be heated or cooled can have another remote interface module 4670 plugged into the wall, which has an RF transmitter to transmit the ambient temperature to the controller 4610 for control purposes.

In another embodiment, after the climate control unit 4650 is shut off, power is not restored to the climate control unit 4650 until a user pushes a reset button on the remote interface module 4630 or on an associated interface module within the breaker panel housing. Alternatively or additionally, a web interface associated with the remote interface module 4630 can be used to reactivate the climate control unit 4650.

In other embodiments, when detected water flow is insignificant over a predetermined time period, a notification is sent to an appropriate party. For instance, insignificant water flow in a unit occupied by an elderly person may be indicative of a health emergency. Similarly, insignificant water flow in a unit of a detention facility may be indicative of a possible escapee situation.

Figure 47:
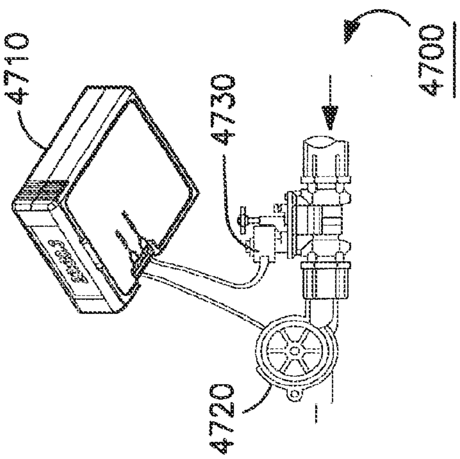
FIG. 47 shows an example installation of an interface module according to an embodiment of the invention.

FIG. 47 shows an example installation 4700 of an interface module according to an embodiment of the invention. The installation 4700 includes an interface module 4710, a flow sensor 4720 (e.g., a flow meter), and a control valve 4730. The control valve 4730 can be implemented, for example, as a shut-off solenoid valve in a pipe. The interface module 4710, which can optionally be a remote interface module installed at a location remote from a controller (described below), receives sensor information from the flow sensor 4720, which can include information indicative of water flow. The interface module 4710 sends control information to the control valve 4730 to shut off or turn on the water supply in the pipe. The interface module 4710 optionally can include a display to present the detected water flow to a user.

In an embodiment, installations like the installation 4700 are respectively installed for each unit of a multiple-unit structure, such as, for example, an apartment building, condominium or town home complex, hospital, or detention facility. As such, water consumption of individual units can be monitored and controlled on a centralized and/or automated basis.

Figure 48:
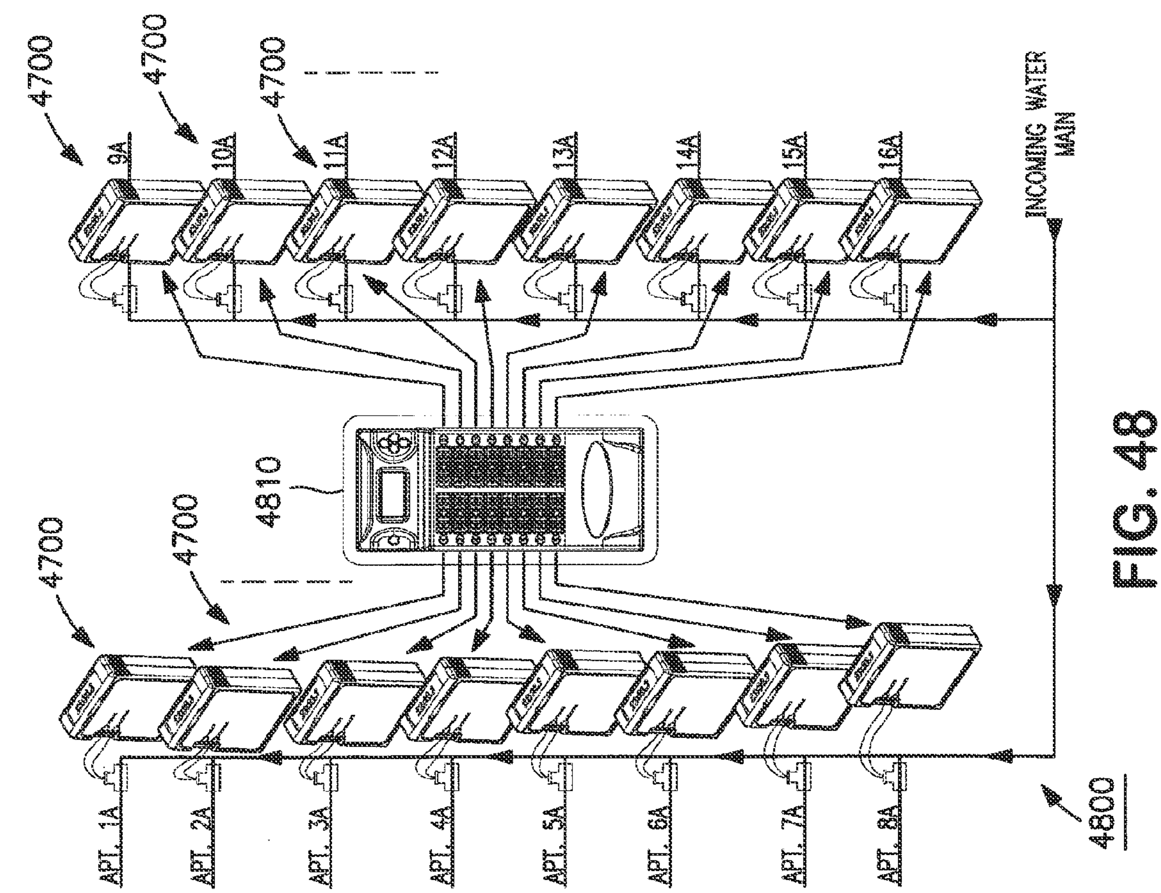
FIG. 48 shows a system incorporating multiple installations like that of FIG. 47 according to an embodiment of the invention.

FIG. 48 shows a system 4800 incorporating multiple installations like that of FIG. 47 according to an embodiment of the invention. The system 4800 includes a controller 4810 and multiple installations 4700. The multiple installations 4700 each communicate with the controller 4810. In the embodiment shown, each installation 4700 is associated with a particular apartment in an apartment building and provides the controller 4800 with information on detected water flow. A user of the controller 4810, such as a manager, landlord, or agent thereof, can read the flow consumption of each unit at the panel housing 4810 or via a computer with a web browser. In addition, the user can take any necessary control actions, such as directing particular interface modules 4710 to turn off the water supply to a unit when a tenant has vacated or has been delinquent in paying rent or a water bill. Additionally, the user can shut off the water supply in the case of a leak in a unit, without affecting the water supply to other units and effectively containing the leak to within as localized an area as possible.

In an embodiment, the water company has access (e.g., password-protected access) to the controller 4810, such as via a network connection. Accordingly, the water company can read the water consumption of each unit in the structure and send bills (e.g., electronic bills) to the associated tenants or to the landlord. Such an approach is not limited to multi-unit structures, and can be applied to any kind of structure, such as a single-family home or business, to enable remote determination of water consumption and efficient billing by a water utility.

Figure 49:
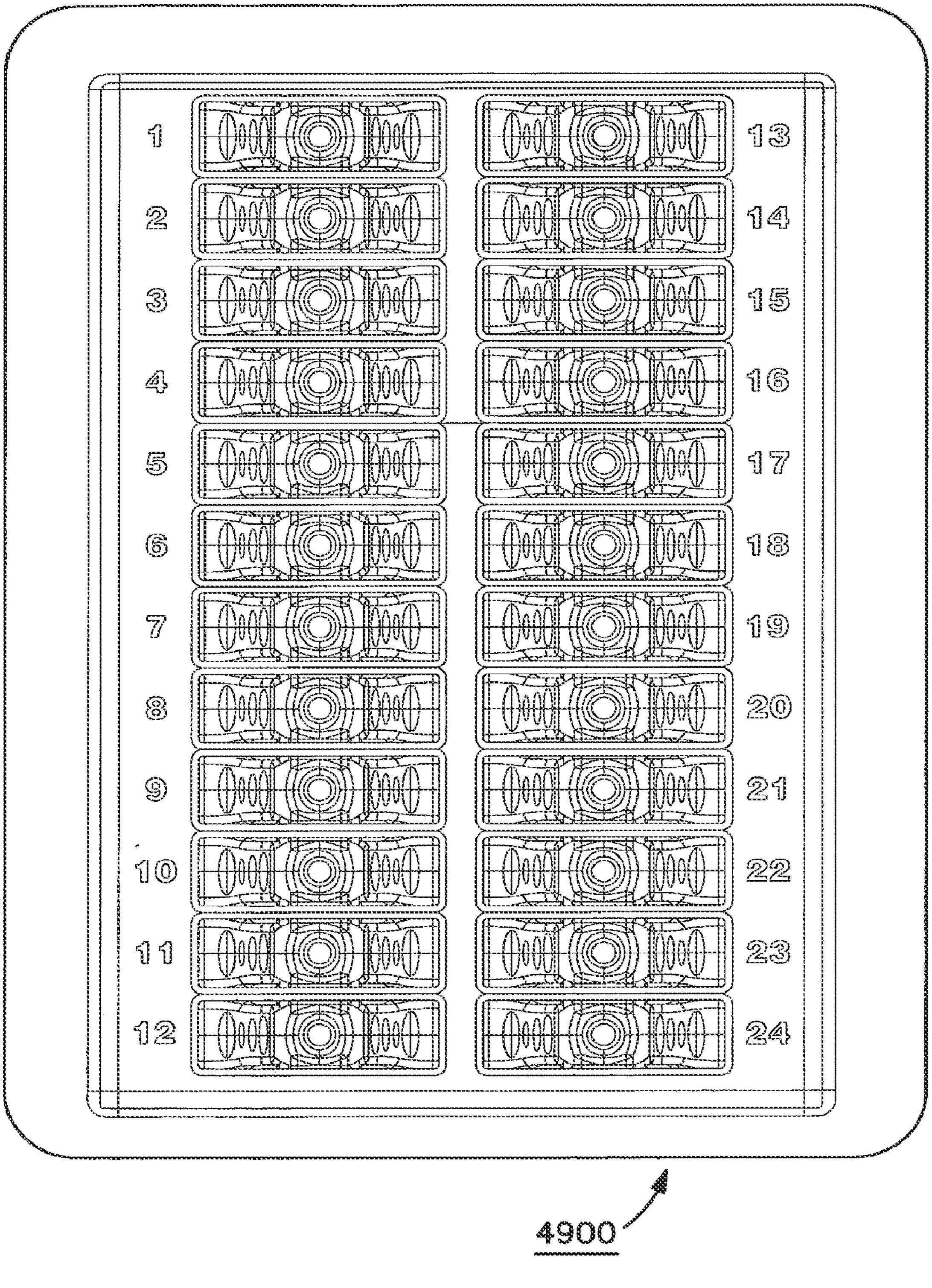
FIG. 49 shows a front view of an example of a panel housing for an expansion (slave) motherboard.

FIG. 49 shows a front view of an example of a panel housing 4900 for an expansion (slave) motherboard. As shown, the panel housing 4900 supports twenty-four interface modules (breakers). Further, unlike the panel housing of the main motherboard (see FIGS. 43 and 44), the panel housing 4900 does not include an LCD display, a main valve on/off button, or additional input buttons.

Some embodiments herein have been implemented by Liquid Breaker (Carlsbad, Calif.). Embodiments herein can be implemented in structures located on land, such as, for example, houses, apartments, condominiums, town houses, hospitals, commercial buildings, military bases, and detention facilities. It is to be appreciated that systems herein are not limited in application to structures located on land, but can also be implemented in structures such as boats or ships. In addition, it is to be appreciated that a controller and an associated interface module can be respectively located in different structures provided that suitable communication linkages (e.g., wired or wireless) are available.

The foregoing system is a comprehensive system for monitoring and controlling the safe operation of a system involving one or more fluids, such as water. Clearly, some components of the system may be employed in other environments than the one described previously. The foregoing description is to be considered as illustrative and not as limiting. Various other changes and modifications will occur to those skilled in the art without departing from the true scope of the invention as defined in the appended claims.

What is claimed is:

1. A system for monitoring and controlling water consumption in a structure, the system comprising:
- a first flow sensor configured to monitor water consumption in a first region of the structure, and a second flow sensor configured to monitor water consumption in a second region of the structure;
- a first interface module configured to receive first flow signals from the first flow sensor;
- a second interface module configured to receive second flow signals from a second flow sensor;
- the first and second interface modules configured to produce a first and second control signal, respectively, based upon at least a portion of the first and second received flow signals; and
- a controller configured to control first and second fluid control devices as a function of at least one of the first and second control signals, and further configured to send a control command to at least one of (a) a hot water heater and (b) a climate control unit of the structure.

2. The system of claim 1, wherein the controller is configured to shut off the climate control unit if the water consumption in the first and second regions is less than a predetermined threshold.

3. The system of claim 1, wherein the controller is configured to control a hot water heater and a climate control unit as the function of at least one of the first and second control signals.

4. The system of claim 1, wherein at least one of the first and second interface modules are further configured to interrupt (a) a flow of water and (b) a flow of energy to an appliance.

5. The system of claim 1, wherein the climate control unit comprises a HVAC unit.

6. The system of claim 1, wherein the controller sends the control command to at least one of (a) the hot water heater and (b) the climate control unit via the first interface module, and wherein the first interface module is configured to shut off the climate control unit as the function of the control command.

7. The system of claim 1, wherein at least one of the first and second interface modules is configured to communicate wirelessly with the controller.

8. The system of claim 1, wherein the first and second interface modules are configured to communicate a first and second status information, and the first and second status information is readable by a user via a web interface.

9. The system of claim 1, wherein the controller is further configured to communicate a third control signal, and the first fluid control device is configured to receive the third control signal.

10. The system of claim 9, further comprising a web interface configured to allow a user to direct the controller to communicate the third control signal.

11. The system of claim 1, wherein the first and second interface modules are further configured to cycle the first and second fluid control devices, respectively, after a defined period of time.

12. A method of monitoring and controlling water consumption, the method comprising:
- detecting a water flow in a component of a water-based system of a structure using a first flow sensor to produce a status information;
- sending the status information to a controller, where the status information is indicative of the detected water flow; and
- the controller sending a control command to a climate control unit of the structure based at least in part on the status information.

13. The method of claim 12, wherein the climate control unit comprises a HVAC unit.

14. The method of claim 12, wherein the climate control unit comprises a hot water heater.

15. The method of claim 12, further comprising determining if the water flow exceeds a predetermined threshold within a predetermined time period.

16. The method of claim 12, wherein the controlling the climate control unit comprises turning off the climate control unit.

17. The method of claim 12, further comprising communicating a notification to a user if a water flow is less than a predetermined threshold for a defined interval.

* * * * *